US011508225B2

(12) United States Patent
Shakedd et al.

(10) Patent No.: US 11,508,225 B2
(45) Date of Patent: Nov. 22, 2022

(54) THEFT PREVENTION FOR RETURNED MERCHANDISE

(71) Applicant: NEXITE LTD., Tel-Aviv Yafo (IL)

(72) Inventors: Anat Shakedd, Rishon Lezion (IL); Guillermo Rotstein, Tel-Aviv Yafo (IL); Ran Polager, Tel-Aviv Yafo (IL); Lior Shakedd, Rishon Lezion (IL)

(73) Assignee: NEXITE LTD., Tel-Aviv Yafo (IL)

(*) Notice: Subject to any disclaimer, the term of this patent is extended or adjusted under 35 U.S.C. 154(b) by 0 days.

(21) Appl. No.: 17/653,391

(22) Filed: Mar. 3, 2022

(65) Prior Publication Data
US 2022/0223019 A1    Jul. 14, 2022

Related U.S. Application Data

(63) Continuation of application No. PCT/IB2022/000004, filed on Jan. 11, 2022.
(Continued)

(51) Int. Cl.
*G08B 13/24* (2006.01)
*G06Q 30/00* (2012.01)
(Continued)

(52) U.S. Cl.
CPC ..... *G08B 13/2454* (2013.01); *G06K 7/10297* (2013.01); *G06K 7/10475* (2013.01);
(Continued)

(58) Field of Classification Search
CPC ............ G08B 13/2454; G08B 13/2417; G08B 13/242; G08B 13/246; G08B 13/2462;
(Continued)

(56) References Cited

U.S. PATENT DOCUMENTS 3,231,834 A   1/1966  Watanabe
4,688,026 A   8/1987  Scribner
(Continued)

FOREIGN PATENT DOCUMENTS

CN   108471948 A   8/2018
EP     3279836 A1   2/2018
(Continued)

OTHER PUBLICATIONS

International Search Report and Written Opinion of the International Searching Authority from the European Patent Office for corresponding International Application No. PCT/IB2020/000254, dated Aug. 10, 2020 (43 pages).
(Continued)

*Primary Examiner* — Joseph H Feild
*Assistant Examiner* — Sharmin Akhter
(74) *Attorney, Agent, or Firm* — Finnegan, Henderson, Farabow, Garrett & Dunner LLP

(57) ABSTRACT

Consistent with disclosed embodiments, systems, methods, and computer readable media for electronic security systems for preventing theft of returned goods may be provided. Embodiments may include an electronic article surveillance (EAS) gate in an establishment and at least one receiver configured to receive transmissions from wirelessly transmitting tags. Embodiments may also include at least one processor configured to receive, from a mobile communications device associated with a previous purchaser, a notification of intent to return a previously purchased product to the establishment; identify a unique tag ID of a specific wirelessly transmitting tag associated with the previously purchased product; update a data structure to indicate that the previously purchased product was returned to the establishment; and enable an ability to initiate an alarm when the at least one receiver receives a transmission from the spe-
(Continued)

cific tag associated with the previously purchased product in proximity to the EAS gate.

22 Claims, 27 Drawing Sheets

Related U.S. Application Data

(60) Provisional application No. 63/145,735, filed on Feb. 4, 2021, provisional application No. 63/135,963, filed on Jan. 11, 2021.

(51) Int. Cl.
*G06K 7/10* (2006.01)
*G06Q 10/08* (2012.01)
*G06Q 20/32* (2012.01)
*G06Q 30/02* (2012.01)
*G06Q 30/06* (2012.01)

(52) U.S. Cl.
CPC ......... *G06Q 10/087* (2013.01); *G06Q 20/327* (2013.01); *G06Q 20/3224* (2013.01); *G06Q 30/016* (2013.01); *G06Q 30/0257* (2013.01); *G06Q 30/0261* (2013.01); *G06Q 30/0267* (2013.01); *G06Q 30/0623* (2013.01); *G06Q 30/0639* (2013.01); *G08B 13/242* (2013.01); *G08B 13/246* (2013.01); *G08B 13/2417* (2013.01); *G08B 13/2462* (2013.01); *G08B 13/2485* (2013.01); *G06K 2007/10504* (2013.01)

(58) Field of Classification Search
CPC ........... G08B 13/2485; G06K 7/10297; G06K 7/10475; G06K 2007/10504; G06Q 10/087; G06Q 20/3224; G06Q 20/327; G06Q 30/016; G06Q 30/0257; G06Q 30/0261; G06Q 30/0267; G06Q 30/0623; G06Q 30/0639

See application file for complete search history.

(56) References Cited

U.S. PATENT DOCUMENTS

| | | | |
|---|---|---|---|
| 6,097,301 A | 8/2000 | Tuttle |
| 6,476,708 B1 | 11/2002 | Johnson |
| 6,609,198 B1 | 8/2003 | Wood |
| 6,617,962 B1 | 9/2003 | Horwitz |
| 6,693,599 B1 | 2/2004 | Chia |
| 6,927,637 B1 | 8/2005 | Koh |
| 7,034,683 B2 | 4/2006 | Ghazarian |
| 7,170,201 B2 | 1/2007 | Hamel |
| 7,187,299 B2 | 3/2007 | Kunerth |
| 7,233,958 B2 | 6/2007 | Weng |
| 7,242,306 B2 | 7/2007 | Wildman |
| 7,400,298 B2 | 7/2008 | Fogg |
| 7,518,511 B1 | 4/2009 | Panja |
| 7,521,890 B2 | 4/2009 | Lee |
| 7,551,137 B2 | 6/2009 | Gagnon |
| 7,633,378 B2 | 12/2009 | Rodgers |
| 7,940,224 B2 | 5/2011 | Kato |
| 8,232,868 B2 | 7/2012 | Steeves |
| 8,242,907 B2 | 8/2012 | Butler |
| 8,457,757 B2 | 6/2013 | Cauller |
| 8,459,541 B2 | 6/2013 | Yoo |
| 8,668,139 B2 | 3/2014 | Yoo |
| 9,087,281 B2 | 7/2015 | Maguire |
| 9,396,447 B2 | 7/2016 | Dalley, Jr. |
| 9,436,923 B1 | 9/2016 | Sriram |
| 9,680,533 B2 | 6/2017 | Gudan |
| 9,740,895 B1 | 8/2017 | Liu |
| 9,767,230 B2 | 9/2017 | Kimchi |
| 10,127,486 B2 | 11/2018 | Glaser |
| 10,128,857 B1 | 11/2018 | Elkholy |
| 10,158,401 B2 | 12/2018 | Hull |
| 10,681,133 B2 | 6/2020 | Puleston |
| 10,805,130 B2 | 10/2020 | Shakedd |
| 10,922,939 B1 | 2/2021 | Shakedd |
| 10,930,128 B2 | 2/2021 | Shakedd |
| 10,991,220 B2 | 4/2021 | Shakedd |
| 10,997,840 B2 | 5/2021 | Shakedd |
| 11,107,336 B2 | 8/2021 | Shakedd |
| 11,138,851 B2 | 10/2021 | Shakedd |
| 11,170,620 B2 | 11/2021 | Shakedd |
| 11,217,077 B2 | 1/2022 | Shakedd |
| 11,238,714 B2 | 2/2022 | Shakedd |
| 11,288,940 B2 | 3/2022 | Shakedd et al. |
| 11,295,592 B2 | 4/2022 | Shakedd et al. |
| 2002/0008633 A1 | 1/2002 | Heller |
| 2002/0017979 A1 | 2/2002 | Krause |
| 2002/0019761 A1 | 2/2002 | Lidow |
| 2002/0190845 A1 | 12/2002 | Moore |
| 2003/0104848 A1 | 6/2003 | Brideglall |
| 2003/0151511 A1 | 8/2003 | Duncan |
| 2004/0078662 A1 | 4/2004 | Hamel |
| 2004/0100359 A1 | 5/2004 | Reade |
| 2004/0155755 A1 | 8/2004 | Bui |
| 2004/0188531 A1 | 9/2004 | Gengel |
| 2004/0199428 A1 | 10/2004 | Silverbrook et al. |
| 2004/0242201 A1 | 12/2004 | Sasakura |
| 2004/0266481 A1 | 12/2004 | Patel |
| 2005/0017602 A1 | 1/2005 | Arms |
| 2005/0040961 A1 | 2/2005 | Tuttle |
| 2005/0052281 A1 | 3/2005 | Bann |
| 2005/0110641 A1 | 5/2005 | Mendolia |
| 2005/0110674 A1 | 5/2005 | Mendolia |
| 2005/0113138 A1 | 5/2005 | Mendolia |
| 2005/0159187 A1 | 7/2005 | Mendolia |
| 2005/0179551 A1 | 8/2005 | Lian |
| 2005/0207848 A1 | 9/2005 | Kunerth |
| 2005/0253686 A1 | 11/2005 | Shafer |
| 2005/0263591 A1 | 12/2005 | Smith |
| 2006/0038658 A1 | 2/2006 | Jarvis |
| 2006/0049947 A1 | 3/2006 | Forster |
| 2006/0109109 A1 | 5/2006 | Rajapakse |
| 2006/0114109 A1 | 6/2006 | Geissler |
| 2006/0145814 A1 | 7/2006 | Son |
| 2006/0158316 A1 | 7/2006 | Eckstein |
| 2006/0229113 A1 | 10/2006 | Rowse |
| 2006/0230232 A1 | 10/2006 | Yokomizo |
| 2006/0255917 A1 | 11/2006 | Park |
| 2006/0276206 A1 | 12/2006 | Shiatsu |
| 2007/0001812 A1 | 1/2007 | Powell |
| 2007/0016942 A1 | 1/2007 | Sakai et al. |
| 2007/0024423 A1 | 2/2007 | Nikitin |
| 2007/0046470 A1 | 3/2007 | Pempsell |
| 2007/0090185 A1 | 4/2007 | Lewkowitz |
| 2007/0103303 A1 | 5/2007 | Shoarinejad |
| 2007/0159338 A1 | 7/2007 | Beber |
| 2007/0179978 A1 | 8/2007 | Lee |
| 2007/0188342 A1 | 8/2007 | Valeriano |
| 2007/0229268 A1 | 10/2007 | Swan |
| 2008/0048863 A1 | 2/2008 | Copeland |
| 2008/0048867 A1 | 2/2008 | Oliver |
| 2008/0100423 A1 | 5/2008 | Geissler |
| 2008/0100446 A1 | 5/2008 | Shintani |
| 2008/0122584 A1 | 5/2008 | Ltasaki |
| 2008/0143482 A1 | 6/2008 | Shoarinejad |
| 2008/0169909 A1 | 7/2008 | Park |
| 2008/0237339 A1 | 10/2008 | Stawar |
| 2008/0284600 A1 | 11/2008 | Drzaic |
| 2008/0297324 A1 | 12/2008 | Tuttle |
| 2008/0309490 A1 | 12/2008 | Honkanen |
| 2008/0311861 A1 | 12/2008 | Lepek |
| 2009/0058614 A1 | 3/2009 | Roz |
| 2009/0085745 A1 | 4/2009 | Gupta |
| 2009/0085746 A1 | 4/2009 | Erickson |
| 2009/0115578 A1 | 5/2009 | Geissler |
| 2009/0117872 A1 | 5/2009 | Jorgenson |
| 2009/0121828 A1 | 5/2009 | Suzuki |
| 2009/0146791 A1 | 6/2009 | Jantunen |

(56) References Cited

U.S. PATENT DOCUMENTS

| | | |
|---|---|---|
| 2009/0146816 A1 | 6/2009 | Patel |
| 2009/0189739 A1 | 7/2009 | Wang |
| 2009/0192647 A1 | 7/2009 | Nishiyama |
| 2009/0251286 A1 | 10/2009 | Black |
| 2009/0256680 A1 | 10/2009 | Kilian |
| 2009/0295543 A1 | 12/2009 | Kita |
| 2010/0019035 A1 | 1/2010 | Larson |
| 2010/0026467 A1 | 2/2010 | Van Eeden |
| 2010/0052865 A1 | 3/2010 | Eckstein |
| 2010/0059595 A1 | 3/2010 | Longfu |
| 2010/0121862 A1 | 5/2010 | Twitchell, Jr. |
| 2010/0250305 A1 | 9/2010 | Lee |
| 2010/0271187 A1 | 10/2010 | Uysal |
| 2011/0029997 A1 | 2/2011 | Wolinsky |
| 2011/0181392 A1 | 7/2011 | Cha |
| 2011/0223874 A1 | 9/2011 | Callaway, Jr. |
| 2011/0285511 A1 | 11/2011 | Maguire |
| 2012/0126945 A1 | 5/2012 | Kim |
| 2012/0161931 A1 | 6/2012 | Karmakar |
| 2012/0217307 A1 | 8/2012 | Martin |
| 2012/0286930 A1 | 11/2012 | Kim |
| 2013/0105584 A1 | 5/2013 | Forster |
| 2013/0194100 A1 | 8/2013 | Granhed |
| 2013/0231760 A1 | 9/2013 | Rosen |
| 2014/0097254 A1 | 4/2014 | Downie |
| 2014/0111338 A1 | 4/2014 | Bergman |
| 2014/0266727 A1 | 9/2014 | Padula |
| 2014/0279204 A1 | 9/2014 | Roketenetz |
| 2015/0048682 A1 | 2/2015 | Murley |
| 2015/0097716 A1 | 4/2015 | Wisherd |
| 2015/0145680 A1 | 5/2015 | Favier |
| 2015/0186692 A1 | 7/2015 | Stengel |
| 2015/0302475 A1 | 10/2015 | Zachariah et al. |
| 2015/0307245 A1 | 10/2015 | Puccini |
| 2016/0019766 A1 | 1/2016 | Padula |
| 2016/0026837 A1 | 1/2016 | Good |
| 2016/0035197 A1 | 2/2016 | Soto |
| 2016/0049030 A1 | 2/2016 | G |
| 2016/0049058 A1 | 2/2016 | Allen |
| 2016/0050530 A1 | 2/2016 | Corbalis |
| 2016/0055730 A1 | 2/2016 | Bergman |
| 2016/0064946 A1 | 3/2016 | Cho |
| 2016/0098730 A1 | 4/2016 | Feeney |
| 2016/0098907 A1 | 4/2016 | Noone |
| 2016/0132532 A1 | 5/2016 | German |
| 2016/0148150 A1 | 5/2016 | Curtat |
| 2016/0180126 A1 | 6/2016 | Saleem |
| 2016/0210483 A1 | 7/2016 | Glaser |
| 2016/0307013 A1 | 10/2016 | Uysal |
| 2017/0067983 A1 | 3/2017 | Teicher |
| 2017/0075346 A1 | 3/2017 | Oya |
| 2017/0078851 A1 | 3/2017 | Agrawal |
| 2017/0131222 A1 | 5/2017 | Zalbide Agirrezabalaga |
| 2017/0140330 A1 | 5/2017 | Rinzler |
| 2017/0208545 A1 | 7/2017 | Siann |
| 2017/0228566 A1 | 8/2017 | Sengstaken, Jr. |
| 2017/0330066 A1 | 11/2017 | Gibson |
| 2018/0089475 A1 | 3/2018 | Hattori |
| 2018/0096566 A1 | 4/2018 | Blair, II |
| 2018/0189725 A1 | 7/2018 | Mattingly et al. |
| 2018/0254640 A1 | 9/2018 | Jung |
| 2018/0293543 A1 | 10/2018 | Tiwari et al. |
| 2018/0300671 A1 | 10/2018 | Richardson |
| 2019/0005283 A1 | 1/2019 | Nikitin |
| 2019/0084525 A1 | 3/2019 | Ignaczak et al. |
| 2019/0102586 A1 | 4/2019 | Miller |
| 2019/0120471 A1 | 4/2019 | Witty |
| 2019/0165826 A1 | 5/2019 | Goto |
| 2019/0188545 A1 | 6/2019 | Locke |
| 2019/0325503 A1 | 10/2019 | Fein |
| 2020/0004995 A1 | 1/2020 | Kawaguchi |
| 2020/0057885 A1 | 2/2020 | Rao |
| 2020/0090481 A1 | 3/2020 | Huang |
| 2020/0096599 A1 | 3/2020 | Hewett |
| 2020/0175462 A1 | 6/2020 | Tan et al. |
| 2020/0200892 A1 | 6/2020 | Rajab |
| 2020/0226333 A1* | 7/2020 | Riggert .............. G08B 13/2471 |
| 2020/0226900 A1 | 7/2020 | Ho |
| 2020/0227813 A1 | 7/2020 | Yehezkely |
| 2020/0250958 A1 | 8/2020 | Wilson |
| 2020/0273013 A1* | 8/2020 | Garner ................. G06Q 10/087 |
| 2020/0327782 A1 | 10/2020 | Wong |
| 2021/0019766 A1 | 1/2021 | Shakedd |
| 2021/0020012 A1 | 1/2021 | Shakedd |
| 2021/0027608 A1 | 1/2021 | Shakedd |
| 2021/0027616 A1 | 1/2021 | Shakedd |
| 2021/0233157 A1 | 7/2021 | Crutchfield, Jr. |
| 2021/0304124 A1 | 9/2021 | Kawaguti |
| 2021/0350448 A1 | 11/2021 | Phillips et al. |
| 2021/0398163 A1 | 12/2021 | Nelsen |

FOREIGN PATENT DOCUMENTS

| | | |
|---|---|---|
| GB | 2396781 A | 6/2004 |
| JP | 2004-500760 A | 1/2004 |
| JP | 2018-124767 A | 8/2018 |
| WO | WO 2001/006444 A1 | 1/2001 |
| WO | WO 2020/208412 A1 | 10/2020 |

OTHER PUBLICATIONS

Extended European Search Report for European Application No. 21207656.6, dated Feb. 7, 2022 (13 pages).

First Examination Report for Indian Application No. 202147051724, dated Jan. 18, 2022 (7 pages).

G. Barmpalias et al., *Algorithmic Randomness of Closed Sets* (available Jun. 3, 2007) accessed on Apr. 27, 2022 from https://www.rweber.net/mathpapers/randclosedsets.pdf (24 pages).

International Search Report and Written Opinion of the International Searching Authority for International Application No. PCT/IB2022/000004, dated Apr. 25, 2022 (10 pages).

* cited by examiner

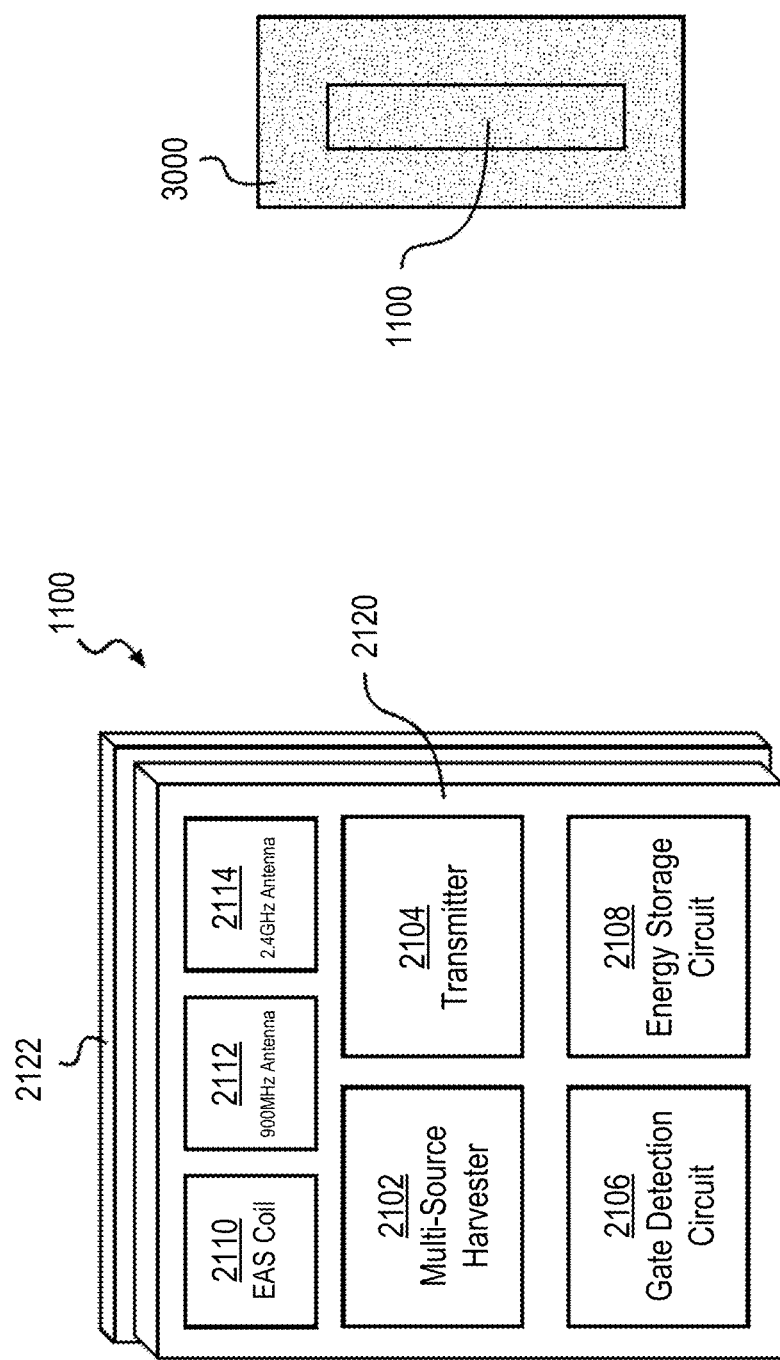

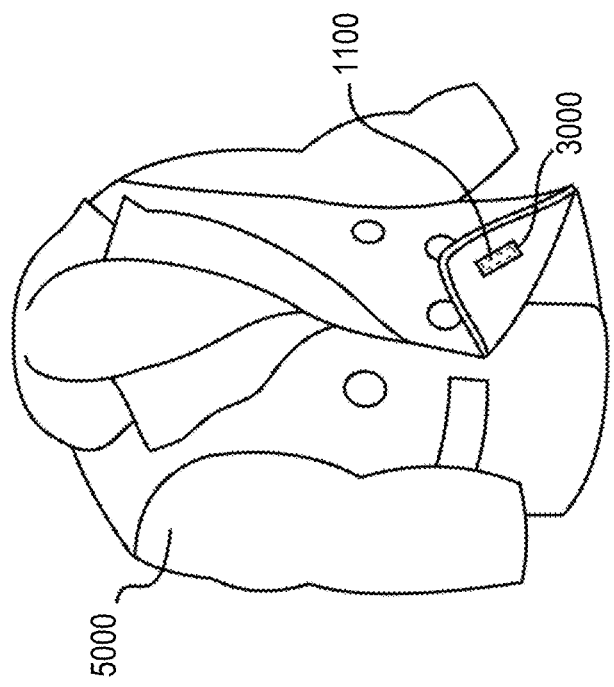
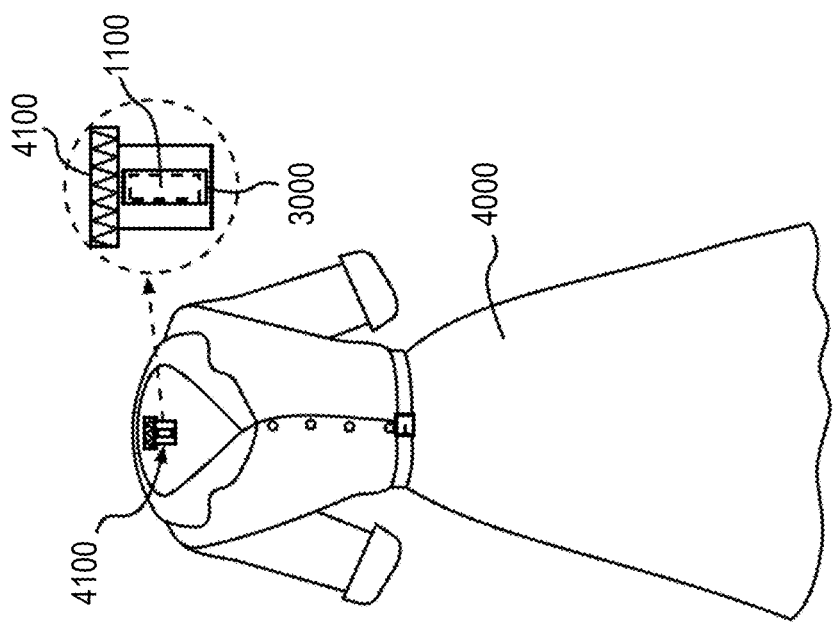
FIG. 5
FIG. 4

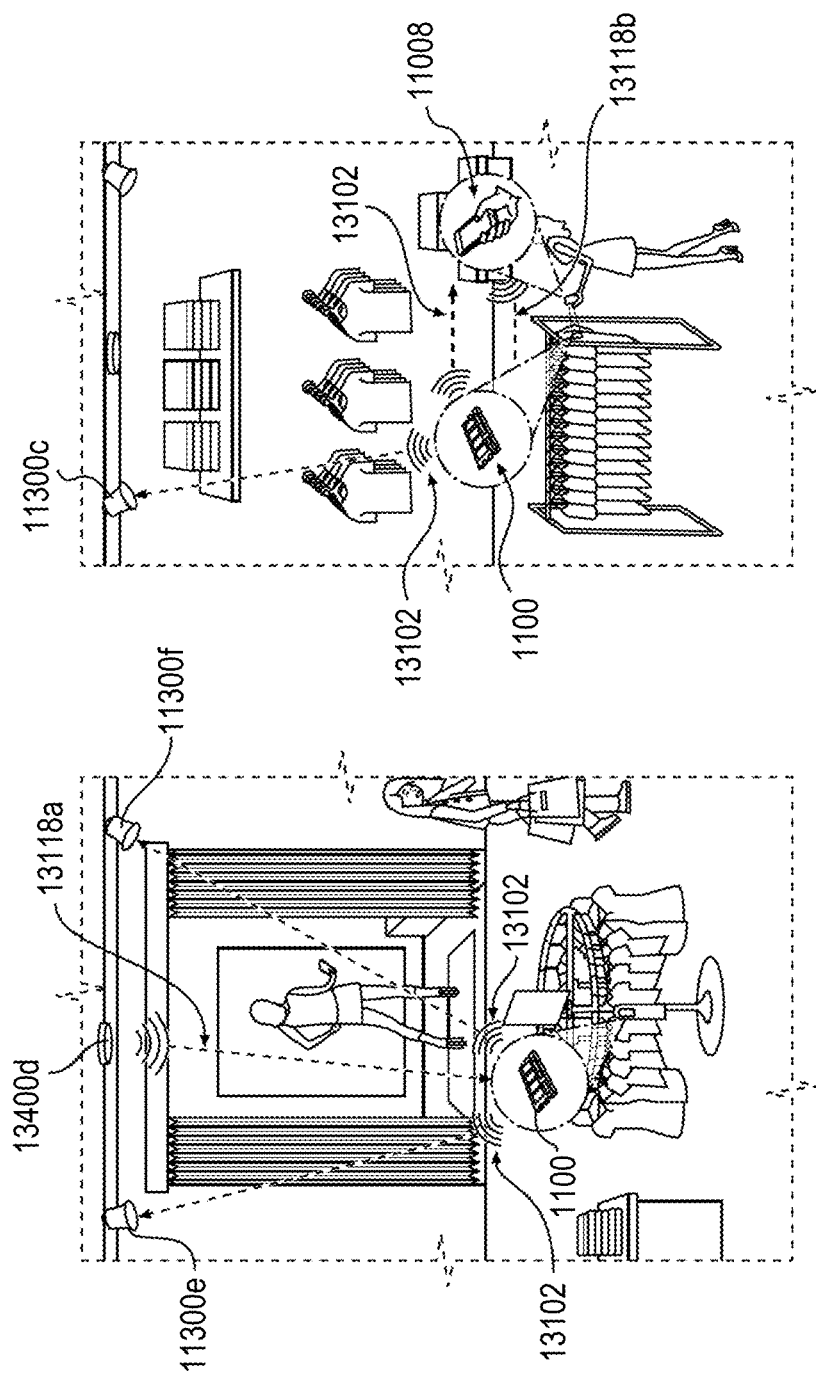

THEFT PREVENTION FOR RETURNED MERCHANDISE

CROSS-REFERENCE TO RELATED APPLICATION

This application is a continuation of and claims the benefit of priority to International Application No. PCT/IB2022/000004, filed on Jan. 11, 2022, which claims the benefit of priority of U.S. Provisional Patent Application No. 63/135,963, filed Jan. 11, 2021, and U.S. Provisional Patent Application No. 63/145,735, filed Feb. 4, 2021, each of which is hereby incorporated by reference in its entirety.

TECHNICAL FIELD

The disclosed embodiments generally relate to systems and methods for wireless identification tags for association with products and electronic security systems including wireless identification tags.

BACKGROUND

The ability to transfer data over a network provides many opportunities to enable various electronic devices to connect with other devices and networks, to perform increasingly autonomous operations, and to provide interactive experiences for users. However, conventional systems and methods for providing digital communication may use a certain amount of hardware, energy consumption, costs, and other technical limitations that may prevent them from being implemented with respect to certain products, systems, and industries. Further, there are a multitude of security and privacy concerns related to the transfer of data that may render the implementation of such technologies impractical with respect to certain fields.

Therefore, there is a need for cost-efficient and unconventional approaches that efficiently, effectively, and safely enable the digital self-representation of a wide range of products as well and/or the management such products.

SUMMARY

Embodiments consistent with the present disclosure provide systems and methods generally relating to wireless identification tags for association with products. The disclosed systems and methods may be implemented using a combination of conventional hardware and software as well as specialized hardware and software, such as a machine constructed and/or programmed specifically for performing functions associated with the disclosed method steps. Consistent with other disclosed embodiments, non-transitory computer readable storage media may store program instructions, which are executable by at least one processing device and perform any of the steps and/or methods described herein.

Consistent with disclosed embodiments, systems, methods, and computer readable media for electronic security systems for establishments offering products having associated wireless transmitting tags are disclosed. The embodiments may include at least one electronic article surveillance (EAS) gate. The embodiments may further include at least one receiver configured to receive transmissions from the wireless transmitting tags. The embodiments may further include at least one processor configured to receive, from a device operated by a prospective purchaser, a specific tag ID of a specific tag associated with a specific product for prospective purchase from the establishment; access a data structure containing a plurality of tag IDs associated with a plurality of products in the establishment; perform a lookup in the data structure of the specific tag ID, to thereby identify the specific product; initiate an electronic purchase transaction to debit an account associated with the prospective purchaser for an electronic purchase of the specific product; and following the electronic purchase of the specific product, disable an ability to initiate an alarm when the at least one receiver receives a transmission from the specific tag in proximity to the EAS gate.

Consistent with additional disclosed embodiments, systems, methods, and computer readable media for electronic security systems for inventory control operations are also disclosed. The embodiments may include receiving transmissions from a plurality of wireless transmitting tags. The embodiments may further include receiving, from a device operated by a prospective purchaser, a specific tag ID of a specific tag associated with a specific product for prospective purchase from an establishment. The embodiments may further include accessing a data structure containing a plurality of tag IDs associated with a plurality of products in the establishment. The embodiments may further include performing a lookup in the data structure of the specific tag ID, to thereby identify the specific product. The embodiments may further include initiating an electronic purchase transaction to debit an account associated with the prospective purchaser for an electronic purchase of the specific product. The embodiments may further include following the electronic purchase of the specific product, disabling an ability to initiate an alarm when a transmission is received from the specific tag in proximity to an electronic article surveillance (EAS) gate associated with the establishment.

Consistent with disclosed embodiments, systems, methods, and computer readable media for electronic security systems for establishments offering in-store pick-up of previously purchased products are further disclosed. The embodiments may include products having associated wirelessly transmitting tags. The embodiments may further include at least one electronic article surveillance (EAS) gate. The embodiments may further include at least one receiver configured to receive transmissions from the wirelessly transmitting tags. The embodiments may further include at least one processor. The embodiments may further include accessing a purchase transaction record of an out-of-store product purchase, the purchase transaction record including an identification of at least one purchased product and purchaser-identifying information of a purchaser associated with the at least one purchased product. The embodiments may further include receiving a unique tag ID of a specific tag associated with at least one specific product in inventory corresponding to the at least one purchased product. The embodiments may further include assigning the at least one specific product to a record associated with the purchase transaction. The embodiments may further include receiving, from a mobile communications device associated with the purchaser, a notification that the at least one purchased product is being picked up at the establishment. The embodiments may further include authorizing pick-up of the at least one specific product based on information received from the mobile communications device associated with the purchaser. The embodiments may further include following the authorization of pick-up of the at least one specific product, disabling an ability to initiate an alarm when the at least one receiver receives a transmission from the specific tag in proximity to the EAS gate.

Consistent with additional disclosed embodiments, systems, methods, and computer readable media for in-store pick-up of products are additionally disclosed. The embodiments may include previously purchased products. The embodiments may further include products associated with wirelessly transmitting tags. The embodiments may further include receiving transmissions from at least one of the wirelessly transmitting tags. The embodiments may further include accessing a purchase transaction record of an out-of-store product purchase from an establishment, the purchase transaction record including an identification of at least one purchased product and purchaser-identifying information of a purchaser associated with the at least one purchased product. The embodiments may further include receiving a unique tag ID of a specific tag associated with at least one specific product in inventory corresponding to the at least one purchased product. The embodiments may further include assigning the at least one specific product to a record associated with the purchase transaction. The embodiments may further include receiving, from a mobile communications device associated with the purchaser, a notification that the at least one purchased product is being picked up at the establishment. The embodiments may further include authorizing pick-up of the at least one specific product based on information received from the mobile communications device associated with the purchaser. The embodiments may further include following the authorization of pick-up of the at least one specific product, disabling an ability to initiate an alarm when a transmission is received from the specific tag in proximity to an electronic article surveillance (EAS) gate associated with the establishment.

Consistent with disclosed embodiments, systems, methods, and computer readable media for electronic security systems for preventing theft of returned goods are disclosed. The embodiments may include at least one electronic article surveillance (EAS) gate in an establishment. The embodiments may further include at least one receiver configured to receive transmissions from wirelessly transmitting tags. The embodiments may further include at least one processor. The embodiments may further include receiving, from a mobile communications device associated with a previous purchaser, a notification of intent to return a previously purchased product to the establishment. The embodiments may further include identifying in a data structure, following receipt of the notification, a unique tag ID of a specific wirelessly transmitting tag associated with the previously purchased product. The embodiments may further include updating the data structure to indicate that the previously purchased product was returned to the establishment. The embodiments may further include enabling, upon updating the data structure, an ability to initiate an alarm when the at least one receiver receives a transmission from the specific tag associated with the previously purchased product in proximity to the EAS gate.

Consistent with additional disclosed embodiments, systems, methods, and computer readable media for preventing theft of wirelessly tagged returned items are also disclosed. The embodiments may include receiving transmissions from wirelessly transmitting tags. The embodiments may further include receiving, from a mobile communications device associated with a previous purchaser, a notification of intent to return a previously purchased product to an establishment. The embodiments may further include identifying in a data structure, following receipt of the notification, a unique tag ID of a specific wirelessly transmitting tag associated with the previously purchased product. The embodiments may further include updating the data structure to indicate that the previously purchased product was returned to the establishment. The embodiments may further include enabling, upon updating the data structure, an ability to initiate an alarm when at least one receiver associated with the establishment receives a transmission from the specific tag associated with the previously purchased product in proximity to at least one electronic article surveillance (EAS) gate in the establishment.

Consistent with disclosed embodiments, systems, methods, and computer readable media for wireless transactions and wireless transaction communications are further disclosed. The embodiments may include at least one processor. The embodiments may further include accessing at least one data structure containing identities of a plurality of display areas and identities of a plurality of products associated with the plurality of display areas. The embodiments may further include receiving, from a mobile communications device, a request for information related to a particular display area in a vicinity of the mobile communications device. The embodiments may further include receiving location information associated with a locus of the mobile communications device. The embodiments may further include performing, in response to the location information, a look-up in the at least one data structure to identify the particular display area in the vicinity of the mobile communications device. The embodiments may further include retrieving from the at least one data structure, based on the identification of the particular display area, product-related information of products associated with the particular display area. The embodiments may further include transmitting the product-related information to the mobile communications device.

Consistent with disclosed embodiments, systems, methods, and computer readable media for wireless transmitting tags in an establishment containing a plurality of wirelessly tagged products, and for automatically generating a product distribution planogram are additionally disclosed. The embodiments may further include at least one processor configured to receive from a plurality of receivers in the establishment, wireless signals from the plurality of the wirelessly tagged products, wherein the wireless signals include an ID associated with each of the plurality of wirelessly tagged products; access a data structure associating each ID of each wirelessly tagged product with classification information; determine from the wireless signals, locations in the establishment of each of the wirelessly tagged products; perform a lookup in the data structure of each ID of each of the wirelessly tagged products to determine the product classification information associated with each of the wirelessly tagged products; and generate a planogram for the establishment using the determined locations of each wirelessly tagged product and the determined product classification information, wherein the planogram indicates on a map of the establishment locations of groups of the wirelessly tagged products sharing common classification information.

Consistent with additional disclosed embodiments, systems, methods, and computer readable media for performing operations for generating a planogram based on information collected from wireless tags are disclosed. The embodiments may include receiving from a plurality of receivers in the establishment, wireless signals from the plurality of the wirelessly tagged products, wherein the wireless signals include an ID associated with each of the plurality of wirelessly tagged products. The embodiments may further include accessing a data structure associating each ID of each wirelessly tagged product with classification information. The embodiments may also include determining from the wireless signals, locations in the establishment of each of the wirelessly tagged products. Further the embodiments may include performing a lookup in the data structure of each ID of each of the wirelessly tagged products to determine the product classification information associated with each of the wirelessly tagged products. The embodiments may also include generating the planogram for the establishment using the determined locations of each wirelessly tagged product and the determined product classification information, wherein the planogram indicates on a map of the establishment locations of groups of the wirelessly tagged products sharing common classification information.

Consistent with disclosed embodiments systems, methods, and computer readable media relating to reading wireless transmitting tags in an establishment containing a plurality of wirelessly tagged products, and for automatically generating replenishment alerts are disclosed. The embodiments may include at least one processor configured to receive from a plurality of receivers in the establishment, wireless signals from the plurality of wirelessly tagged products, wherein the wireless signals reflect an ID associated with each of the plurality of wirelessly tagged products; access at least one data structure associating each ID of each wirelessly tagged product with one of a plurality of product models; perform a look-up in the data structure of a product model associated with at least one ID of at least one wirelessly tagged product; determine, based on the look-up, a total number of units of each product model detected in the establishment; access in the at least one data structure a target threshold of units associated with each product model in the establishment; compare the determined total number of units of each product model with the target threshold to determine when a particular product model falls below an associated threshold; and output a replenishment notification for the particular product model.

Consistent with additional disclosed embodiments, systems, methods, and computer readable media for reading wireless transmitting tags in an establishment containing a plurality of wirelessly tagged products, and for automatically generating replenishment alerts are disclosed. The embodiments may include receiving from a plurality of receivers in an establishment, wireless signals from the plurality of wirelessly tagged products, wherein the wireless signals reflect an ID associated with each of the plurality of wirelessly tagged products. The embodiments may further include accessing at least one data structure associating each ID of each wirelessly tagged product with one of a plurality of product models. The embodiments may also include performing a look-up in the data structure of a product model associated with at least one ID of at least one wirelessly tagged product. The embodiments may include determining, based on the look-up, a total number of units of each product model detected in the establishment. The embodiments may also include accessing in the at least one data structure a target threshold of units associated with each product model in the establishment. The embodiments may include comparing the determined total number of units of each product model with the target threshold to determine when a particular product model falls below an associated threshold. Further, the embodiments may include outputting a replenishment notification for the particular product model.

The forgoing summary provides certain examples of disclosed embodiments to provide a flavor for this disclosure and is not intended to summarize all aspects of the disclosed embodiments. Additional features and advantages of the disclosed embodiments will be set forth in part in the description that follows, and in part will be apparent from the description, or may be learned by practice of the disclosed embodiments. The features and advantages of the disclosed embodiments will be realized and attained by the elements and combinations particularly pointed out in the appended claims.

It is to be understood that both the foregoing general description and the following detailed description are examples and explanatory only and are not restrictive of the disclosed embodiments as claimed.

The accompanying drawings constitute a part of this specification. The drawings illustrate several embodiments of the present disclosure and, together with the description, serve to explain the principles of the disclosed embodiments as set forth in the accompanying claims.

BRIEF DESCRIPTION OF THE DRAWINGS

The accompanying drawings, which are incorporated in and constitute a part of this disclosure, illustrate various disclosed embodiments. In the drawings:

FIG. 2 is a block diagram of an exemplary wireless identification tag of the system of FIG. 1, consistent with disclosed embodiments.

FIG. 3 depicts the exemplary wireless identification tag of FIG. 2 encapsulated within a fabric pocket, consistent with disclosed embodiments.

FIG. 4 depicts the exemplary wireless identification tag of FIG. 2 attached to a garment tag, consistent with disclosed embodiments.

FIG. 5 depicts the exemplary wireless identification tag of FIG. 2 sewn into an item, consistent with disclosed embodiments.

FIG. 13B depicts an example of a wireless identification tag operating in an exemplary infrastructure-excitable mode, consistent with disclosed embodiments.

FIG. 13C depicts an example of a wireless identification tag operating in an exemplary user-excitable mode, consistent with disclosed embodiments.

DETAILED DESCRIPTION

Figure 1:
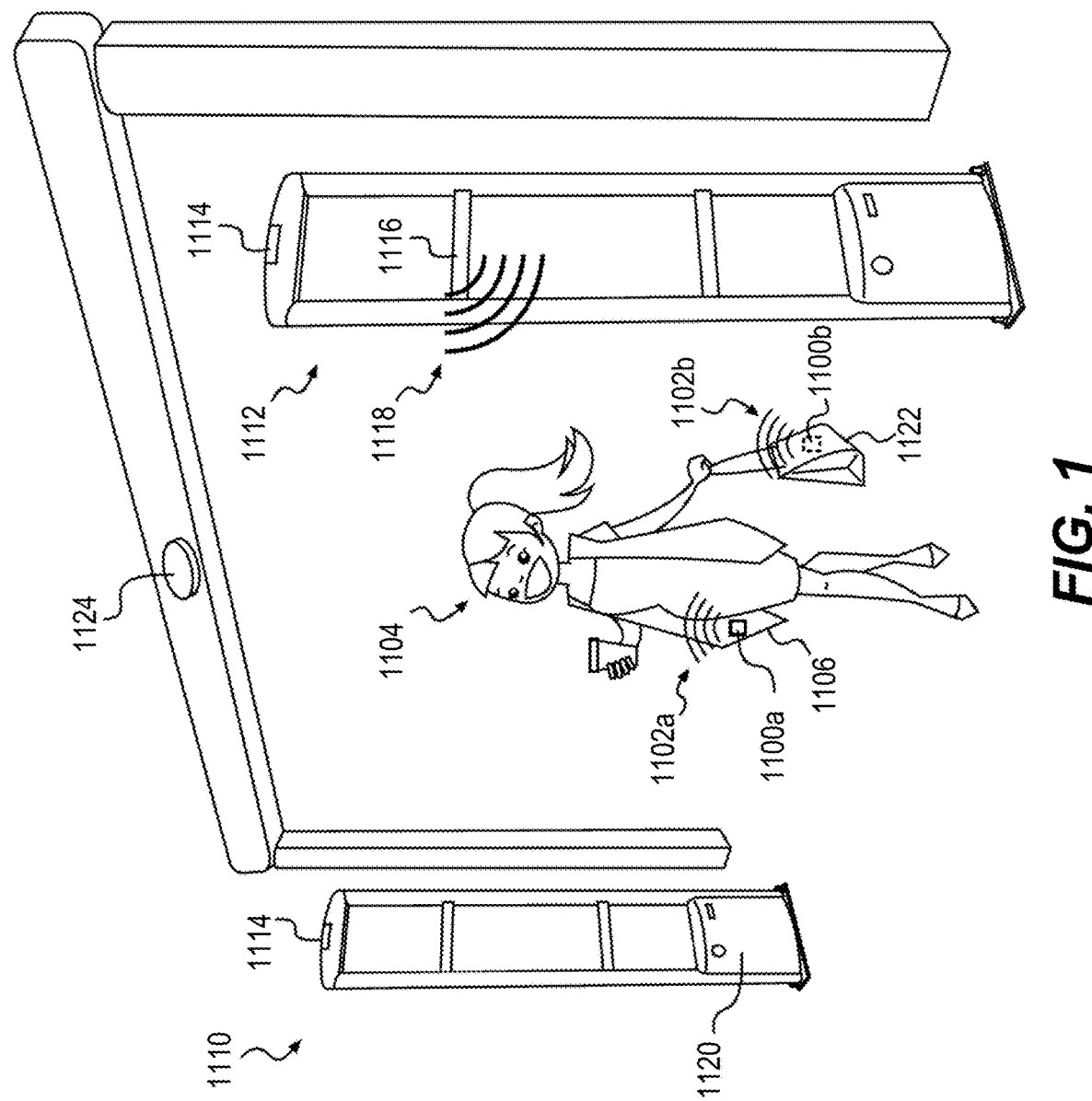
FIG. 1 is a perspective view of an exemplary wireless identification system including gates, a wireless identification tag incorporated into an item worn by a user, and a wireless identification tag incorporated into an item held by the user, consistent with disclosed embodiments.

Exemplary embodiments are described with reference to the accompanying drawings. In the figures, which are not necessarily drawn to scale, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items or meant to be limited to only the listed item or items. It should also be noted that as used in the present disclosure and in the appended claims, the singular forms "a," "an," and "the" include plural references unless the context clearly dictates otherwise.

Unless specifically stated otherwise, as apparent from the following description, throughout the specification discussions utilizing terms such as "processing," "calculating," "computing," "determining," "generating," "setting," "configuring," "selecting," "defining," "applying," "obtaining," "monitoring," "providing," "identifying," "segmenting," "classifying," "analyzing," "associating," "extracting," "storing," "receiving," "transmitting," or the like, include actions and/or processes of a computer that manipulate and/or transform data into other data, the data represented as physical quantities, for example such as electronic quantities, and/or the data representing physical objects. The terms "computer," "processor," "controller," "processing unit," "computing unit," and "processing module" should be expansively construed to cover any kind of electronic device, component or unit with data processing capabilities, including, by way of non-limiting example, a personal computer, a wearable computer, smart glasses, a tablet, a smartphone, a server, a computing system, a cloud computing platform, a communication device, a processor (for example, digital signal processor (DSP), an image signal processor (ISR), a microcontroller, a field programmable gate array (FPGA), an application specific integrated circuit (ASIC), a central processing unit (CPA), a graphics processing unit (GPU), a visual processing unit (VPU), and so on), possibly with embedded memory, a single core processor, a multi core processor, a core within a processor, any other electronic computing device, or any combination of the above.

The operations in accordance with the teachings herein may be performed by a computer specially constructed or programmed to perform the described functions.

As used herein, the phrase "for example," "such as," "for instance" and variants thereof describe non-limiting embodiments of the presently disclosed subject matter. Reference in the specification to features of "embodiments," "one case," "some cases," "other cases" or variants thereof means that a particular feature, structure or characteristic described may be included in at least one embodiment of the presently disclosed subject matter. Thus the appearance of such terms does not necessarily refer to the same embodiment(s). As used herein, the term "and/or" includes any and all combinations of one or more of the associated listed items.

Features of the presently disclosed subject matter, are, for brevity, described in the context of particular embodiments. However, it is to be understood that features described in connection with one embodiment are also applicable to other embodiments. Likewise, features described in the context of a specific combination may be considered separate embodiments, either alone or in a context other than the specific combination.

In embodiments of the presently disclosed subject matter, one or more stages illustrated in the figures may be executed in a different order and/or one or more groups of stages may be executed simultaneously and vice versa. The figures illustrate a general schematic of the system architecture in accordance embodiments of the presently disclosed subject matter. Each module in the figures can be made up of any combination of software, hardware and/or firmware that performs the functions as defined and explained herein. The modules in the figures may be centralized in one location or dispersed over more than one location.

Examples of the presently disclosed subject matter are not limited in application to the details of construction and the arrangement of the components set forth in the following description or illustrated in the drawings. The subject matter may be practiced or carried out in various ways. Also, it is to be understood that the phraseology and terminology employed herein is for the purpose of description and should not be regarded as limiting.

In this document, an element of a drawing that is not described within the scope of the drawing and is labeled with a numeral that has been described in a previous drawing may have the same use and description as in the previous drawings.

The drawings in this document may not be to any scale. Different figures may use different scales and different scales can be used even within the same drawing, for example different scales for different views of the same object or different scales for the two adjacent objects.

Consistent with disclosed embodiments, "at least one processor" may constitute any physical device or group of devices having electric circuitry that performs a logic operation on an input or inputs. For example, the at least one processor may include one or more integrated circuits (IC), including application-specific integrated circuit (ASIC), microchips, microcontrollers, microprocessors, all or part of a central processing unit (CPU), graphics processing unit (GPU), digital signal processor (DSP), field-programmable gate array (FPGA), server, virtual server, or other circuits suitable for executing instructions or performing logic operations. The instructions executed by at least one processor may, for example, be pre-loaded into a memory integrated with or embedded into the controller or may be stored in a separate memory. The memory may include a Random-Access Memory (RAM), a Read-Only Memory (ROM), a hard disk, an optical disk, a magnetic medium, a flash memory, other permanent, fixed, or volatile memory, or any other mechanism capable of storing instructions. In some embodiments, the at least one processor may include more than one processor. Each processor may have a similar construction, or the processors may be of differing constructions that are electrically connected or disconnected from each other. For example, the processors may be separate circuits or integrated in a single circuit. When more than one processor is used, the processors may be configured to operate independently or collaboratively. The processors may be coupled electrically, magnetically, optically, acoustically, mechanically or by other means that permit them to interact.

Disclosed embodiments may include and/or access a data structure. A data structure consistent with the present disclosure may include any collection of data values and relationships among them. The data may be stored linearly, horizontally, hierarchically, relationally, non-relationally, uni-dimensionally, multidimensionally, operationally, in an ordered manner, in an unordered manner, in an object-oriented manner, in a centralized manner, in a decentralized manner, in a distributed manner, in a custom manner, or in any manner enabling data access. By way of non-limiting examples, data structures may include an array, an associative array, a linked list, a binary tree, a balanced tree, a heap, a stack, a queue, a set, a hash table, a record, a tagged union, ER model, and a graph. For example, a data structure may include an XML database, an RDBMS database, an SQL database or NoSQL alternatives for data storage/search such as, for example, MongoDB, Redis, Couchbase, Datastax Enterprise Graph, Elastic Search, Splunk, Solr, Cassandra, Amazon DynamoDB, Scylla, HBase, and Neo4J. A data structure may be a component of the disclosed system or a remote computing component (e.g., a cloud-based data structure). Data in the data structure may be stored in contiguous or non-contiguous memory. Moreover, a data structure, as used herein, does not require information to be co-located. It may be distributed across multiple servers, for example, that may be owned or operated by the same or different entities. Thus, the term "data structure" as used herein in the singular is inclusive of plural data structures.

Exemplary embodiments generally relate to wireless communication tags configured to be embedded within, attached to, or otherwise associated with physical items in order to digitally represent each item on an exemplary digital platform. In some embodiments, an exemplary tag may be configured to harvest ambient energy and to use the harvested energy to send an identification signal to a receiver. The identification signal may include various types of data, including product, location, history, status, ownership, and/or characteristic data. Such data may be conveyed to a receiver associated with various types of platforms, depending on intended use. The platform may be, for example, a software program, running on one or more servers, for accomplishing one or more types of product tracking and/or authentication. Examples of platforms with which disclosed embodiments may be employed include, but are not limited to, inventory management systems in business establishments such as stores and warehouses; kitchen management systems, for tracking supplies and/or tools; appliance management systems for tracking tagged materials used within or in connection with appliances; manufacturing systems for tracking components used during the manufacture of products; transportation and distribution systems for tracking parcels and other deliverables through transit and delivery; other supply chain management; wardrobe management systems for tracking clothing items stored in wardrobes and closets; clothing laundering systems for tracking the cleaning of clothing items and/or receipt of clothing to be laundered and the return of clothing to either a customer or a designated location such as a closet or wardrobe; food delivery systems; systems for managing ownership of goods transferred to differing owners; systems for authenticating goods to prevent counterfeiting; vehicle tracking systems; systems for tracking materials and or persons in vehicles and/or in public and private domains; waste management systems; and all other systems where it may be beneficial to track and/or authenticate people, animals, or objects.

In some embodiments, the exemplary tag may be configured to harvest energy without a designated battery and to operate, in both an active transmission state and an idle state, while consuming minimum amounts of power. Advantageously, the configuration of the exemplary tag may enable radio performance comparable to commercial battery-powered devices, at a power envelope comparable to a passive RFID device.

FIG. 1 illustrates a non-limiting embodiment of exemplary wireless tags 1100a and 1100b in an environment of a security gate, such as an Electronic Article Surveillance (EAS) gate 1110, 1112. In some embodiments, one or both of tags 1100a and 1100b may be wireless identification tags. Tag 1100a may be embedded, sewn, clipped, attached, or otherwise incorporated into an object, such as clothing item 1106. Tag 1100b may be attached to, or otherwise incorporated with, an item purchased or otherwise procured by user 1104 and held within bag 1122. Tags 1100a and 1100b may be configured to receive wireless signals, such as signal 1118. Signal 1118 may be produced by an external system or device, such as EAS transmitter 1116, which may form a part of EAS gate 1110, 1112. In some embodiments, one or both of tags 1100a and 1100b may be configured to receive gate signal 1118 and, in response, to generate and output a signal having a frequency different from the frequency of gate signal 1118. For example, tag 1100a may output signal 1102a upon receiving gate signal 1118, and tag 1100b may output signal 1102b upon receiving gate signal 1118. In some embodiments, one or both of signals 1102a and 1102b may have a frequency within a frequency band around 2.4 GHz such that signals 1102a and 1102b are not detected by EAS sensor 1120 and therefore do not trigger alarm 1114 of EAS gate 1110, 1112.

In some embodiments, the exemplary system of FIG. 1 may include at least one receiver/exciter device 1124 configured to receive broadcasts of signals from a plurality of wireless tags (such as signals 1102a and 1102b) and also configured to deliver energy to be collected and stored by the wireless tags in order to power the wireless tags, as discussed in detail below. For example, device 1124 may include a transceiver, a router, a duplexer, or any other device configured to both transmit and receive signals. In some alternative embodiments, such as the exemplary clothing retail establishment depicted in FIG. 13A, the system may include a plurality of receivers 11300a-h configured to receive broadcasts of signals from the wireless tags, as well as exciters 13400 configured to deliver energy to be collected and stored by the wireless tags. However, persons of ordinary skill will understand that exemplary systems described herein may include only receiver/exciter devices (such as device 1124), only receiver devices and exciter devices (such as receivers 11300 and exciters 13400), or any desired combination thereof. Additionally, persons of ordinary skill will understand that exemplary exciters and receivers described herein (such as receivers 11300 and exciters 13400) may be implemented as separate devices and/or as combination receiver/exciter devices (such as receiver/exciter device 1124), and vice versa.

In some embodiments, the exemplary wireless tag may include at least one antenna, at least one transmitter, and at least one circuit. The at least one antenna, the at least one transmitter, and the at least one circuit may be provided on a flexible substrate. A substrate may be a structure on or in which components such as the at least one antenna, the at least one transmitter, and the at least one circuit may be disposed. The substrate may be flexible, such that when encountering a force, the substrate may be configured to be deformable in one or more directions. For example, a flexible substrate may be one that allows the components affixed thereto to conform to a desired shape, or to flex during its use. Materials suitable for the flexible substrate may include, but are not limited to, various types of paper, various types of fabric, various types of plastics including, but not limited to, polyester (PET), polyimide (PI), polyethylene naphthalate (PEN), polyetherimide (PEI), polyether ether ketone (PEEK), along with various fluoropolymers (FEP) and copolymers and/or any other substrate capable of at least in part conforming to a desired shape or flexing during use.

FIG. 2 is a block diagram of an exemplary wireless communication tag 1100, which may include an EAS coil 2110, a 900 MHz antenna 2112, a 2.4 GHz antenna 2114, a multi-source harvester 2102, a transmitter 2104, a gate detection circuit 2106, and an energy storage circuit 2108, some or all of which may be formed on a substrate 2120. Substrate 2120 may be flexible such that the tag may function despite flexing or movement that might occur, for example, when the tag is affixed and/or embedded into a piece of clothing, such as the various products illustrated in FIGS. 4-8, which are discussed below.

Various embodiments of the wireless tag may include an adhesive layer for affixation to a product. The wireless tag, in some embodiments, may be affixed, or otherwise disposed on products or packings of products. This affixation may be aided by one or more adhesive layers. Embodiments of adhesive layer may include glue of various types, tape, cement, wax, mucilage, paste, epoxy, sealants, elastomer, and other suitable materials that may promote cohesion between surfaces. By way of example with reference to FIG. 2, tag 1100 may include a substrate 2120 that supports its electronic components and may also include an adhesive layer 2122 that may be positioned on a side of the substrate layer opposite the electronic components, or in cases where the electronic components are encapsulated between two or more layers of the substrate, the adhesive layer may be positioned on either side of the multi-layer substrate. Adhesive layer 2120 may enable the tag to be bound to certain items, such as hanging tag 6100 in FIG. 6 or product 8000 in FIG. 8.

Disclosed embodiments may also include at least one material layer, such as a fabric layer, that at least partially encapsulates the wireless tag, the material layer configured for affixation by sewing. Alternatively, the tag may be connectable to the fabric by bonding or by incorporation into a pocket. The fabric may include any material that can be used in a garment, accessory, or any other object that employs fabric. The fabric may be woven, non-woven, fibrous, or non-fibrous. It may include any suitable material, including but not limited to silk, wool, linen, cotton, rayon, nylon, polyester, or inorganic material and rubber, plastic, manmade or natural, spunbound/spunlace, airlaid, drylaid, wetlaid, vinyl, sheet material or any other layer. In some embodiments, fabric may be flexible or deformable.

In some embodiments, the wireless tag may be incorporated into layers of the material. The wireless tag may be partially incorporated, where a portion of the wireless tag may be exposed or uncovered. Alternatively, the wireless tag may be completely incorporated, where the wireless tag may be completely surrounded by the fabric. In some embodiments, the wireless tag may be partially or completely incorporated into the fabric by sewing. FIG. 3 illustrates a non-limiting embodiment of an encapsulated wireless tag in fabric. For example, tag 1100, as depicted, is encapsulated in fabric pocket 3000. FIG. 5 further illustrates a placement of fabric pocket 3000, containing tag 1100 on product 5000, such as a garment.

As used herein, partially encapsulating the wireless tag may include positioning at least one material layer around the wireless tag such that the wireless tag is fixed with a certain point or area, relative to the material layer. The material layer may include fabric, other textiles, or any other material that may suitably be affixed to another material through sewing, such as leather, rubber, paper materials, and the like. By way of example, FIG. 3 illustrates tag 1100 encapsulated within fabric pocket 3000. Fabric pocket 3000 may then be sewn into jacket 5000 depicted in FIG. 5 so that the wireless tag becomes affixed to jacket 5000.

FIGS. 4-8 illustrate non-limiting embodiments of products incorporating tags 1100. For example, FIG. 4 depicts a garment, such as a dress 4000 with a garment tag 4100; garment tag 4100 may be a care tag (for example, with instructions for cleaning dress 4000) and/or a tag specifying the size and brand of the dress 4000. In the example of FIG. 4, tag 1100 may be sewn or otherwise affixed to the garment tag 4100. For example, tag 1100 may be encapsulated within fabric pocket 3000, which may be sewn to the garment tag 4100.

Figure 8:
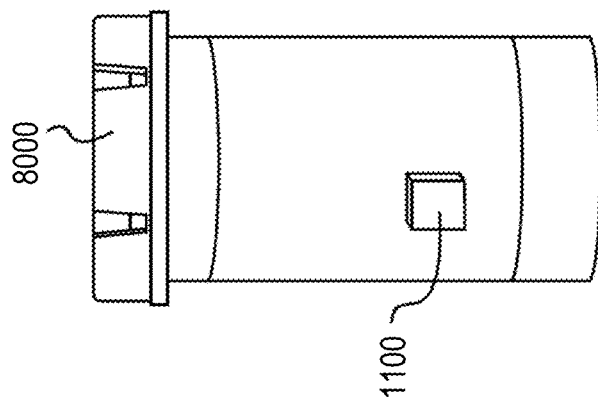
FIG. 8 depicts the exemplary wireless identification tag of FIG. 2 adhered to a container, consistent with disclosed embodiments.
Figure 7:
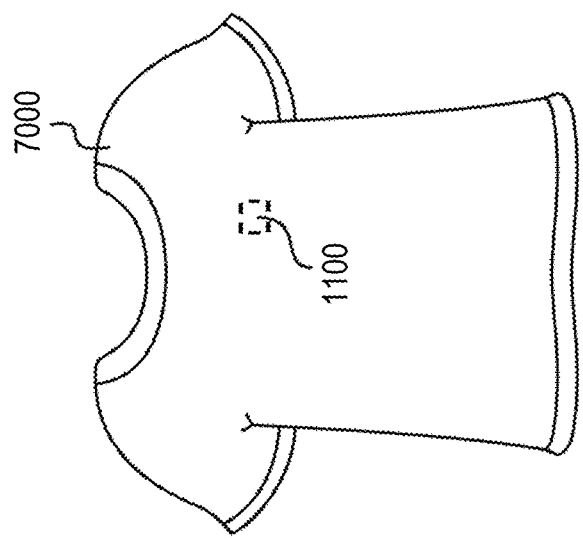
FIG. 7 depicts the exemplary wireless identification tag of FIG. 2 embedded into a clothing item, consistent with disclosed embodiments.
Figure 6:
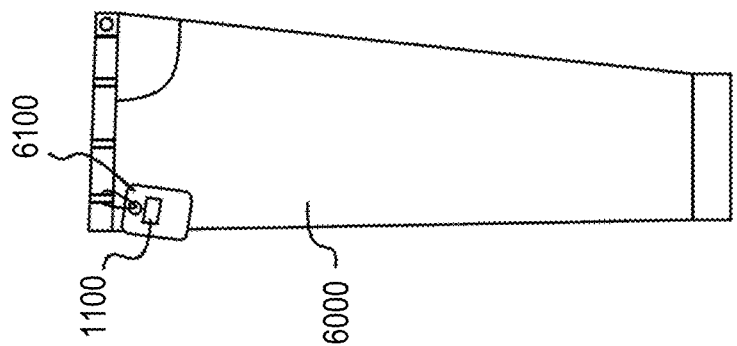
FIG. 6 depicts the exemplary wireless identification tag of FIG. 2 mounted onto a hanging tag, consistent with disclosed embodiments.

FIG. 5 depicts an embodiment of an exemplary tag 1100 encapsulated within the fabric pocket 3000, which is sewn into a clothing item 5000 (e.g., a jacket). FIG. 6 depicts an exemplary tag 1100 on a hanging label 6100, which may be attached to product such as a pair of pants 6000. In another non-limiting embodiment as depicted in FIG. 7, tag 1100 may be affixed to a product such as a t-shirt 7000 by being placed between layers of the t-shirt, such that tag 1100 may be hidden from view. By way of another example, as depicted in FIG. 8, tag 1100 may be adhered to product packaging, such as a container 8000. Garments and a container are illustrated for illustrative purposes only. As previously described, the tag can be associated in virtually any way with virtually any item. For example, as described above, the tag may be adhered to product packaging either on the outside of the package or on the inside. In some embodiments, the tag may be adhered to packaging material or another internal portion of the packaging adjacent to the product placed inside the package.

Figure 9:
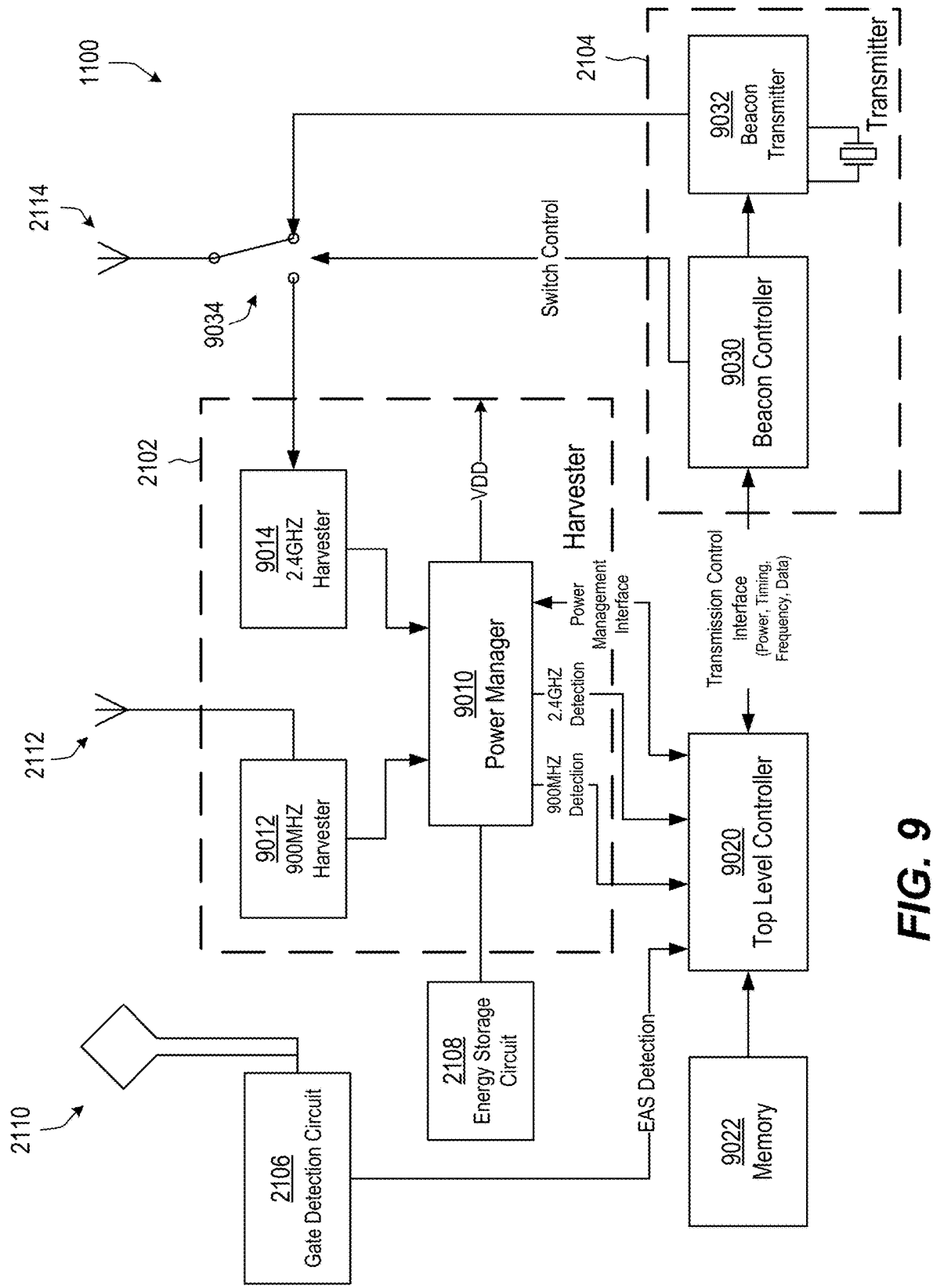
FIG. 9 is a block diagram of exemplary system architecture for a wireless identification tag, consistent with disclosed embodiments.
Figure 10:
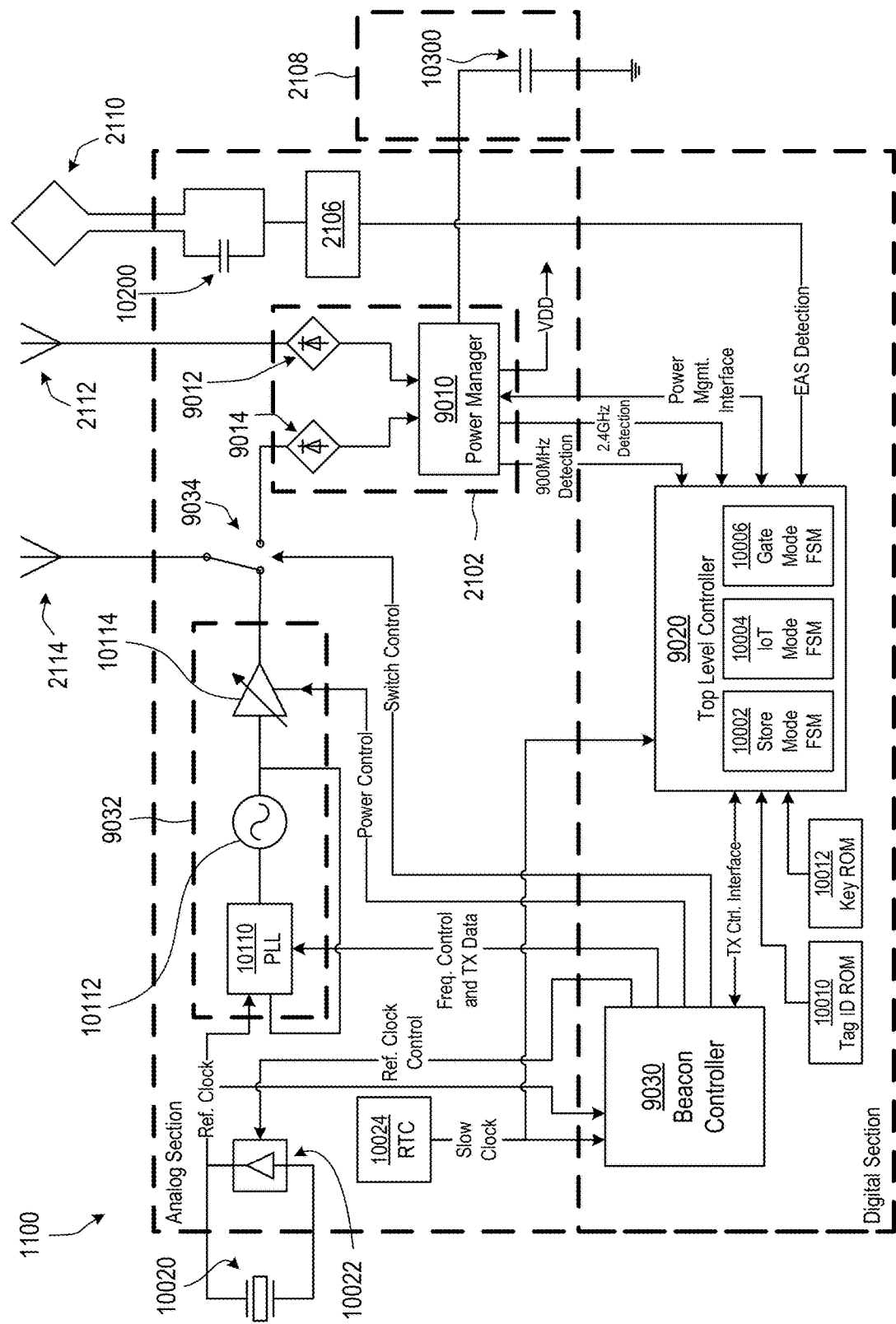
FIG. 10 is another block diagram of the exemplary system architecture of FIG. 9, showing details of exemplary controller architecture, consistent with disclosed embodiments.

FIGS. 9 and 10 depict block diagrams of exemplary system architecture for wireless identification tag 1100. In some embodiments, the exemplary tag 1100 may be configured to harvest energy in multiple frequency bands, and to power operation thereof using the harvested energy. For example, tag 1100 may include one antenna for harvesting energy, two antennae for harvesting energy, three antennae for harvesting energy, or any other number of antennae to harvest energy in a desired number of frequency bands. In some embodiments, tag 1100 may be configured to harvest energy in a frequency band around 900 MHz VWV ISM (e.g., an ultra-high frequency RFID band between 860 MHz and 960 MHz). For example, FIG. 9 illustrates an embodiment of the tag architecture of tag 1100 with an antenna 2112 tuned to receive energy in a frequency below 1 GHz (e.g., energy in a frequency band around 900 MHz) and to convey received energy to a 900 MHz harvester 9012. Additionally, or alternatively, the exemplary tag may be configured to harvest energy in a frequency band around 2.4 GHz VWV ISM (e.g., ambient and intentional energy sources around 2.45 GHz, such as Bluetooth and Wi-Fi). For example, the exemplary tag architecture depicted in FIG. 9 may additionally include an antenna 2114 tuned to receive energy in a frequency band around 2.4 GHz, and to convey received energy to a 2.4 GHz harvester 9014. In some embodiments, harvested energy may be conveyed to a power manager 9010, which may store energy in an energy storage circuit 2108 or provide the harvested energy to power transmission of signals from the tag to one or more receivers.

In some embodiments, an exemplary wireless communication tag 1100 may include at least one transmitter configured to transmit a signal from the tag to one or more receivers. For example, tag 1100 may transmit a unique ID signal (optionally, along with status indicators and/or other data) in a frequency band around 2.4 GHz VWV ISM. In some embodiments, an antenna configured to harvest energy may additionally be configured to transmit the tag's signal. For example, transmitter 2104 depicted in FIG. 9 may be configured to transmit signals having a frequency around 2.4 GHz using antenna 2114; thus, antenna 2114 may be configured to both harvest energy and to transmit tag signals. The exemplary tag 1100 may additionally include a switch 9034 configured to control the behavior of antenna 2114 and to cause antenna 2114 to switch between a transmission mode and an energy harvesting mode (e.g., under control of a beacon controller 9030 of transmitter 2104). In some alternative embodiments, the exemplary tag 1100 may include a signal transmitter that is connected to an additional antenna, separate from the energy harvesting antennae.

In some embodiments, the exemplary wireless communication tag 1100 may include at least one antenna configured to detect electromagnetic fields, including fields generated by EAS systems. In some embodiments, the antenna for detecting electromagnetic fields may include at least one coil. For example, as depicted in FIGS. 2 and 9, tag 1100 may include EAS coil 2110. Additionally, or alternatively, other types of antennae for detecting electromagnetic fields may be incorporated in tag 1100. Tag 1100 may include one antenna for detecting electromagnetic fields, two antennae for detecting electromagnetic fields, three antennae for detecting electromagnetic fields, or any other number of antennae to detect a desired number of electromagnetic fields.

In some embodiments, EAS coil 2110 may be configured to detect electromagnetic fields operating in one or more predetermined frequency bands. For example, EAS coil 2110 may be configured to detect fields in a frequency band between 7-13 MHz and fields in a frequency band between 58-60 kHz. As illustrated in FIG. 10, EAS coil 2110 may include a tuning capacitor 10200 controlled by controller 9020 to tune coil 2110 between a mode for detecting fields in a first frequency band (e.g., 7-13 MHz) and a mode for detecting fields in a second frequency band (e.g., 58-60 kHz). In some embodiments, EAS coil 2110 may be configured not to activate a nearby EAS gate, even when coil 2110 detects an incident EAS field. That is, unlike traditional EAS tags that emit a detectable signal (or create a detectable interference) when they receive an incident EAS field, coil 2110 may be configured to detect the EAS field without emitting a signal that will trigger the EAS gate alarm. In some embodiments, EAS coil 2110 may detect an incident electromagnetic field and gate detection circuit 2106 may determine if the field is received from an EAS gate (for example, if the field is in a frequency band between 7-13 MHz or between 58-60 kHz). When an EAS field is detected, circuit 2106 may output an EAS detection signal to controller 9020, which may alter one or more signal transmission parameters of the transmitter 2104 in response to detection of the EAS field, as discussed below.

Harvesting energy from multiple sources, in multiple frequency bands, as described above, may provide several benefits for the exemplary tag. First, different frequency bands may have varying regulatory limits in different jurisdictions, allowing the tag to supplement its energy harvesting in a second band if there is insufficient power to be harvested in a first band. In addition, harvesting energy from multiple sources may also enable the exemplary tag to adapt its behavior, including the ID signal being transmitted by transmitter 2104, based on a context in which the tag is operating. In some embodiments, the tag's top-level controller 9020 may be configured to determine the type of energy being received by the tag and to control the operation of transmitter 2104 based on the type of energy received. For example, controller 9020 may be configured to determine when antenna 2112 receives energy in at least one predetermined frequency band (e.g., energy in a frequency below 1 GHz or energy in a frequency band around 900 MHz) and to control transmitter 2104 to operate in a first transmission mode based on the determination. Additionally, or alternatively, controller 9020 may be configured to determine when antenna 2114 receives energy in at least one predetermined frequency band (e.g., energy in a frequency band around 2.4 GHz) and to control transmitter 2104 to operate in a second transmission mode based on the determination. Additionally, or alternatively, controller 9020 may be configured to determine when EAS coil 2110 receives energy in at least one predetermined frequency band (e.g., energy in a frequency band between 7-13 MHz and/or energy in a frequency band between 58-60 kHz) and to control transmitter 2104 to operate in a third transmission mode based on the determination. Advantageously, the tag may be configured to identify its environment based on the frequency of incident energy and to adjust its behavior, including the control parameters of transmitter 2104, according to the identified environment.

In some embodiments, the exemplary tag may be configured to store energy locally (e.g., in energy storage circuit 2108) and to transmit only its unique ID signal in some embodiments (rather than, for example, a signal with large amounts of data). This may reduce the amount of power required to operate the transmitter, and the digital content of the tag as a whole, to levels much lower than those of prior, battery-driven devices. For example, the exemplary tag may consume around 500 µA or less in an active state (e.g., while transmitter 2104 transmits one or more signals) and may only require an idle current on the order of nanoamperes. Additionally, or alternatively, the exemplary tag may be configured to power transmitter 2104 to actively transmit unsynchronized Bluetooth Low Energy (BLE) signals at around −10 dBm using only harvested energy, without the need for a battery or other power source. The foregoing examples are for non-limiting illustrative purposes only. Devices that use significantly more or less energy are also within the scope of this disclosure.

Advantageously, low levels of required power may enable the tag's transmitter 2104 to achieve a transmission range of 10 meters or more and, in embodiments in which the tag transmits unsynchronized BLE signals, may enable more reliable reception of the tag's transmitted signal than signals transmitted by RFID devices. This is driven mainly by the use of Backscatter reception techniques in RFID protocols, which makes them significantly more sensitive to environmental interference, reflections and blocking, as compared to other communications protocols, such as BLE. For example, in some embodiments a reader receiving the transmissions of the exemplary wireless communication tag may achieve receiver sensitivity levels of between −93 to −96 dBm, which is around 10 dB better than prior RFID reader chips.

Figure 11:
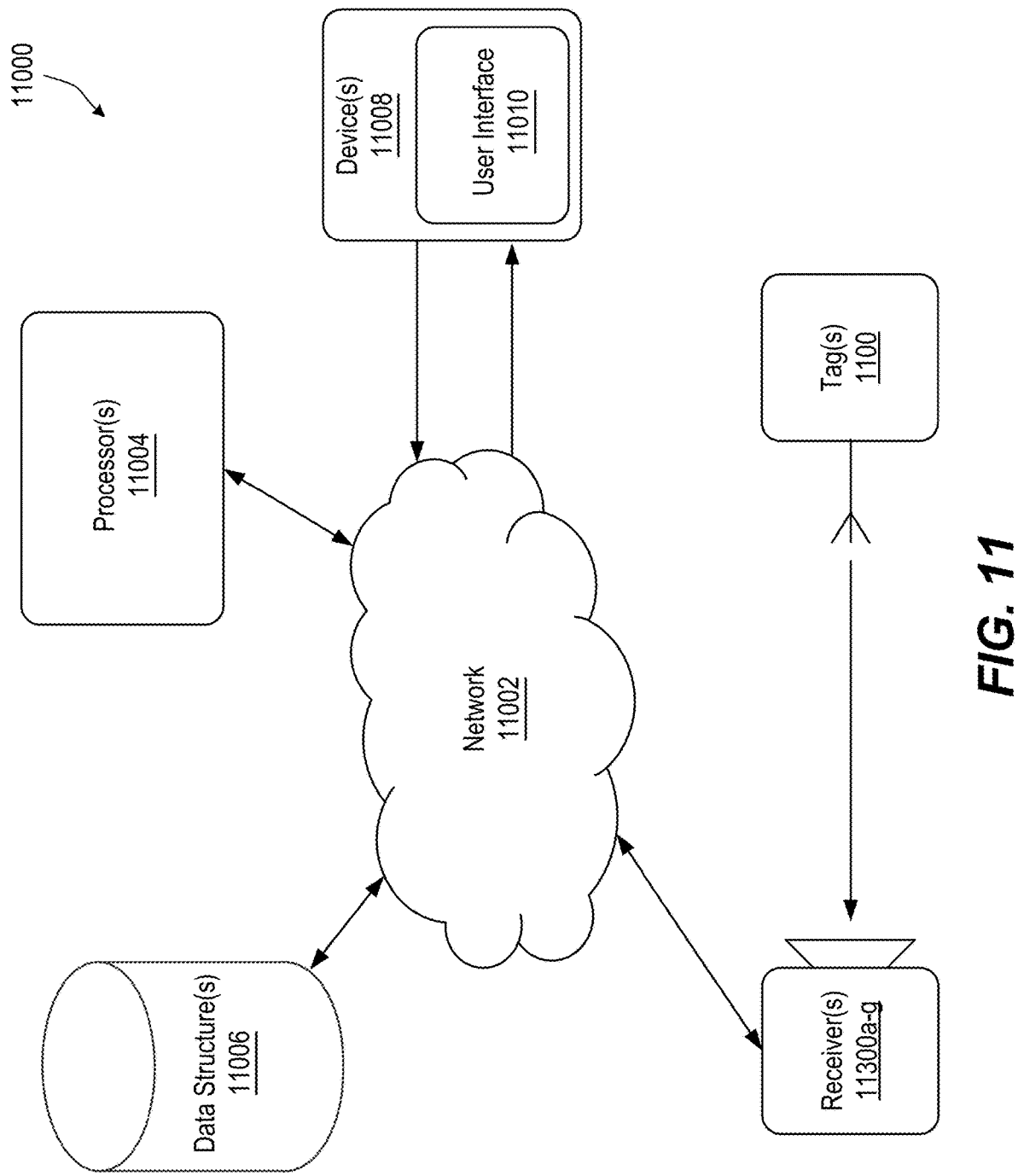
FIG. 11 is a network diagram of an exemplary system for monitoring the location of items within an establishment, consistent with disclosed embodiments.

FIG. 11 is a network diagram of an exemplary wireless identification system 11000 configured for use with wireless identification tags 1100. By way of example, wireless identification system 11000 may be established within, or otherwise associated with, at least one retail establishment. System 11000 may include network 11002, which may enable the exchange of data and/or information between elements of the system such as processor(s) 11004, data structure(s) 11006, user device(s) 11008, and receiver(s) 11300*a-g*. Network 11002 may include any type of wired and/or wireless computer networking arrangement configured for exchanging data.

In some embodiments, system 11000 may include at least one processor 11004 configured to receive, store, and process information related to wireless identification tags 1100, receive and execute queries and searches, communicate with databases (e.g., data structure(s) 11006) and/or networks, relay information to users (e.g., via user device(s) 11008), provide notifications, and/or provide alerts, etc. The at least one processor 11004 may include any physical device or group of devices having electric circuitry that performs a logic operation on input or inputs, such as an integrated circuit (IC), application-specific integrated circuit (ASIC), microchips, microcontrollers, microprocessors, all or part of a central processing unit (CPU), graphics processing unit (GPU), digital signal processor (DSP), field-programmable gate array (FPGA), server, virtual server, or other circuits suitable for executing instructions or performing logic operations. The instructions executed by the at least one processor 11004 may, for example, be pre-loaded into a memory integrated with or embedded into the controller or may be stored in a separate memory, such as data structure(s) 11006.

Wireless identification system 11000 may include at least one data structure 11006. In some disclosed embodiments, data structures 11006 may include at least one database, such as a local database for storing local information related with a particular facility or the store, a regional database, or a global database. Data structures 11006 may be configured to store data including, but not limited to, information related with an electronic tag (such as wireless tag 1100), an encrypted tag ID, information of a product corresponding to or associated with a specific tag 1100, product location, ownership history, a transaction history, owner information, manufacturer information, the decrypted tag ID of a specific tag 1100, an encryption key associated with a specific tag 1100, an inventory of the plurality of wireless tags 1100, the tag IDs of the plurality of wireless tags 1100, or a product ID associated with each tag ID. Information stored in data structures 11006 may be accessible to one or more processors 11004 directly or indirectly through network 11002.

Wireless identification system 11000 may include a plurality of receivers 11300*a-h* configured to receive broadcasts of signals from wireless tags 1100 and to exchange data and/or information with network 11002. Receivers 11300*a-h* may be configured to receive one or more identification signals from tags 1100 and to transmit data of the received identification signals (e.g., a tag ID specified by the identification signal and/or a strength or power level of the signal) to network 11002. In some embodiments, and as discussed above, receivers 11300*a-h* may also be configured as exciters for delivering energy to be collected and stored by the wireless tags 1100. However, persons of ordinary skill will understand that exemplary system 11000 may include receiver/exciter devices (such as device 1124), separate receiver devices and exciter devices, or any desired combination thereof.

Wireless identification system 11000 may include at least one user device 11008 configured for wired and/or wireless communication with network 11002. User device 11008 may include a cellular phone, smartphone, tablet, desktop, laptop, PDA, handheld scanner, wearable device, or other mobile computing device having computer programs (examples of applications) for controlling the operations of device 11008. User device 11008 may be configured to receive a user input and to transmit a corresponding signal to network 11002. Additionally, or alternatively, user device 11008 may include at least one user interface 11010 configured to output a notification signal to the user, such as an audible signal, a visual signal, a haptic signal, or another sensory signal; examples of a user interface 11010 may include a display screen or a speaker.

For example, a user may create a query about a particular product in a retail establishment by using device 11008 to scan a wireless tag 1100 associated with the product. User device 11008 may transmit the query to processor 11004 via network 11002. Processor 11004 may then perform a look up and locate the information pertaining to the scanned tag 1100 in the data structure 11006; the information may include, e.g., the product's size and color, price data, location within the retail establishment, manufacturing history, laundry instructions, product images, or any other characteristic of the product. The information pertaining to the scanned tag 1100 may be transmitted to user device 11008 via network 11002 and outputted to the user via user interface 11010.

Figure 12:
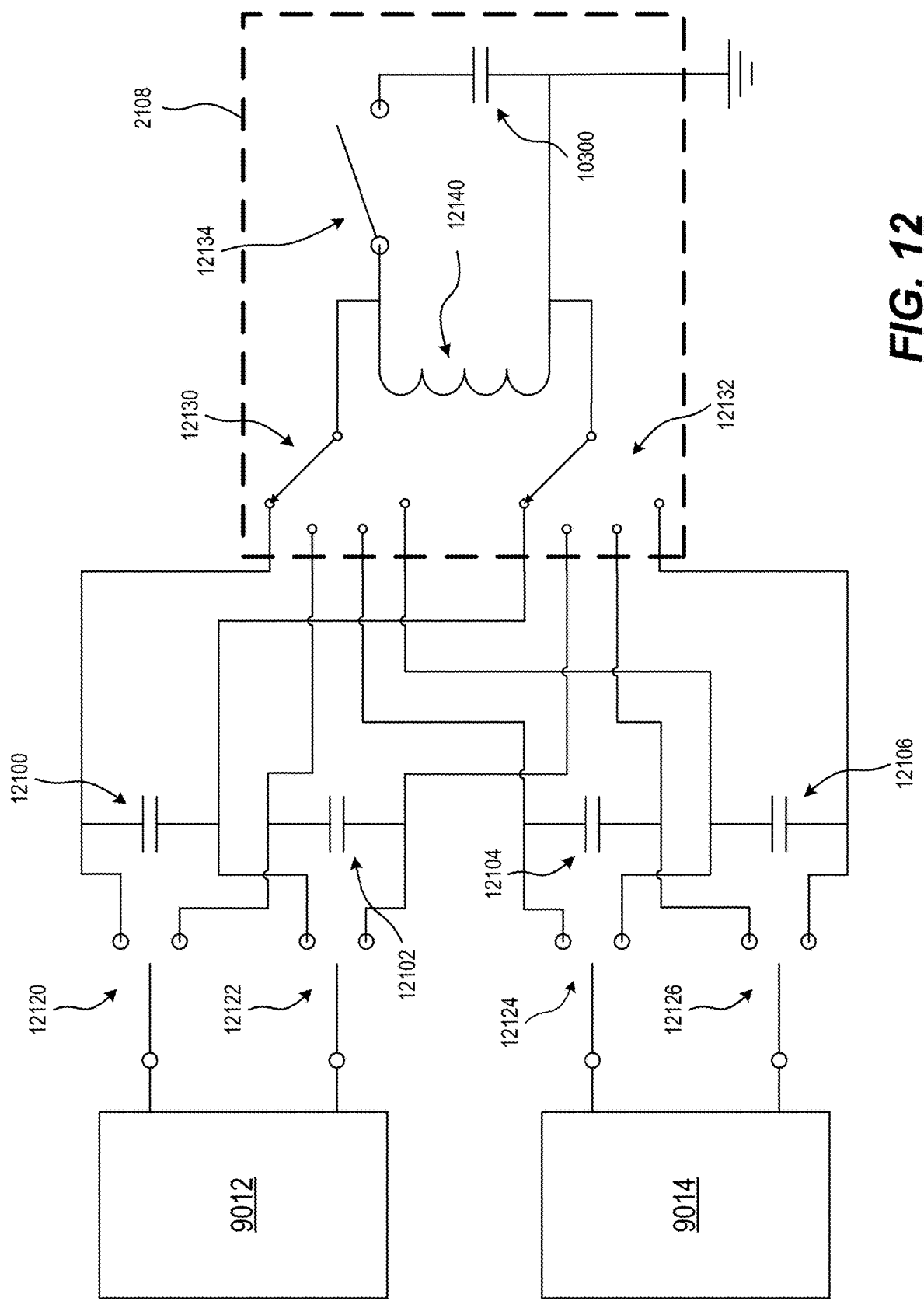
FIG. 12 is a block diagram of exemplary system for harvesting and storing ambient energy, consistent with disclosed embodiments.

FIG. 12 is a block diagram of components for harvesting and storing ambient energy in a wireless identification tag 1100. As discussed above, wireless tag 1100 may include an energy storage circuit 2108 having a storage capacitor 10300 configured to store the ambient energy harvested by tag 1100. Tag 1100 may also include a 900 MHz harvester 9012 configured to harvest energy in a frequency band around 900 MHz VWV ISM (e.g., an ultra-high frequency RFID band between 860 MHz and 960 MHz). Additionally, or alternatively, tag 1100 may include a 2.4 GHz harvester 9014 configured to harvest energy in a frequency band around 2.4 GHz VWV ISM (e.g., ambient and intentional energy sources around 2.45 GHz, such as Bluetooth and Wi-Fi). Storage capacitor 10300 may be electrically connected through the circuitry illustrated in FIG. 12 to 900 MHz harvester 9012 and 2.4 GHz harvester 9014 in order to store ambient energy received by those harvesters. While illustrated as a single capacitor in FIG. 12, there may be multiple storage capacitors for storing ambient energy.

Tag 1100 may additionally include transfer capacitors 12100 and 12102 disposed between 900 MHz harvester 9012 and energy storage circuit 2108, as well as transfer capacitors 12104 and 12106 disposed between 2.4 GHz harvester 9014 and energy storage circuit 2108. Transfer capacitors 12100-12106 may also be configured for collecting and storing the ambient energy harvested by tag 1100. At least one of the transfer capacitors 12100-12106 may have a lower capacitance than storage capacitor 10300: in some embodiments, the capacitance of the at least one of the transfer capacitors 12100-12106 may be less than 1 nF (e.g., less than 100 pF), while storage capacitor 10300 may be configured to have a capacitance of at least 10 nF (e.g., at least 100 nF).

In various embodiments, the circuitry depicted in FIG. 12 may interconnect the harvesters 9012 and 9014, storage capacitor 10300, and transfer capacitors 12100-12106 in a manner such that ambient energy harvested by either of the harvesters 9012 and 9014 may be initially stored in at least one of the transfer capacitors 12100-12106 and subsequently transferred to and stored in storage capacitor 10300. In some embodiments, ambient energy of around 900 MHz may be collected by harvester 9012 and initially stored in one or both of the transfer capacitors 12100 and 12102. For example, transfer capacitor 12100 may collect ambient energy until it is full, and then transfer capacitor 12102 may begin to collect ambient energy. Alternatively, transfer capacitors 12100 and 12102 may take turns to collect ambient energy. Operations of transfer capacitors 12104 and 12106 may be substantially similar to that of transfer capacitor 12100 and 12102 and may also take turns to collect ambient energy. Thus, in various embodiments, the transfer capacitors 12100-12106 may be configured for temporarily storing ambient energy collected in the form of electrical energy, and the storage capacitor 10300 may be configured as the main store of the collected ambient energy in a form of electrical energy.

In some embodiments, tag 1100 may include an inductor 12140 interconnecting storage capacitor 10300 and transfer capacitors 12100-12106. The inductor 12140, storage capacitor 10300, and transfer capacitors 12100-12106 may be interconnected by a series of switches configured to connect/disconnect these components to and from each other. As illustrated in FIG. 12, tag 1100 may include switches 12120 and 12122 configured to connect 900 MHz harvester 9012 to one of transfer capacitors 12100 and 12102; switches 12124 and 12126 configured to connect 2.4 GHz harvester 9014 to one of transfer capacitors 12104 and 12106; switches 12130 and 12132 configured to connect inductor 12140 to one of transfer capacitors 12100, 12102, 12104, and 12106; and switch 12134 configured to connect/disconnect inductor 12140 to storage capacitor 10300.

Switches 12130 and 12132 may connect transfer capacitors 12100-12106 and inductor 12140 during a time period when ambient energy collected in the transfer capacitors is being transferred for storage in storage capacitor 10300. At the end of the transfer period, switches 12130 and 12132 may disconnect the transfer capacitors from inductor 12140 to prevent energy from flowing back to the transfer capacitors. The end of the transfer period may be based on an LC characteristic of transfer capacitors 12100-12106 and inductor 12140, timed such that most of the energy from transfer capacitors 12100-12106 has flowed to inductor 12140 when the transfer period is ended.

The inclusion of inductor 12140, connected by the aforementioned switches, as an intermediary between transfer capacitors 12100-12106 and storage capacitor 10300 may mitigate the issue of unwanted energy discharge by helping to isolate the storage capacitor 10300. For example, in the absence of inductor 12140, the energy from one capacitor (e.g., storage capacitor 10300) will flow to another capacitor (e.g., at least one of transfer capacitors 12100-12106) until the voltages of the capacitors equalize. This situation results in inefficient energy storage, since the voltage of storage capacitor 10300 would be limited by the voltage of the at least one of the transfer capacitors 12100-12106, which in turn would limit the amount of energy the storage capacitor 10300 may store (since, if the voltage of the storage capacitor is higher than the transfer capacitor, energy will flow away from the storage capacitor and into the transfer capacitor to equalize the voltages). By providing inductor 12140, a different energy transferring mechanism may occur.

In some embodiments, inductor 12140 and storage capacitor 10300 may form a harmonic oscillator when connected together, such that the energy of storage capacitor 10300 may flow between the inductor and the capacitor as an oscillation while switch 12134 is closed. Taking advantage of the oscillation, switch 12134 may be timed to disconnect the inductor 12140 and storage capacitor 10300 at a time when most of the energy has flowed from the inductor 12140 to storage capacitor 10300, trapping most of the energy in the storage capacitor.

With this configuration, energy may be continuously transferred from the transfer capacitors 12100-12106 to the storage capacitor 10300, even if the storage capacitor has a higher voltage level than the transfer capacitors. Inductor 12130 may be connected to storage capacitor 10300 via switch 12134. When switches 12130 and 12132 connect inductor 12140 to any one of transfer capacitors 12100-12106, energy stored in these capacitors may be transferred to inductor 12140 via an oscillation as described previously through careful timing of the switches. Similarly, inductor 12140 may subsequently transfer its energy to storage capacitor 10300 via an oscillation.

According to some embodiments, the wireless identification tag 1100 may include at least one circuit configured to generate control signals to command the switching operations of switches 12120-12126, 12130/12132, and 12134. The aforementioned circuit may be designed to generate the control signals with specific timing so that ambient energy can be transferred from harvesters 9012 and 9014 to transfer capacitors 12100-12106, then to inductor 12140, and then to storage capacitor 10300.

Figure 13A:
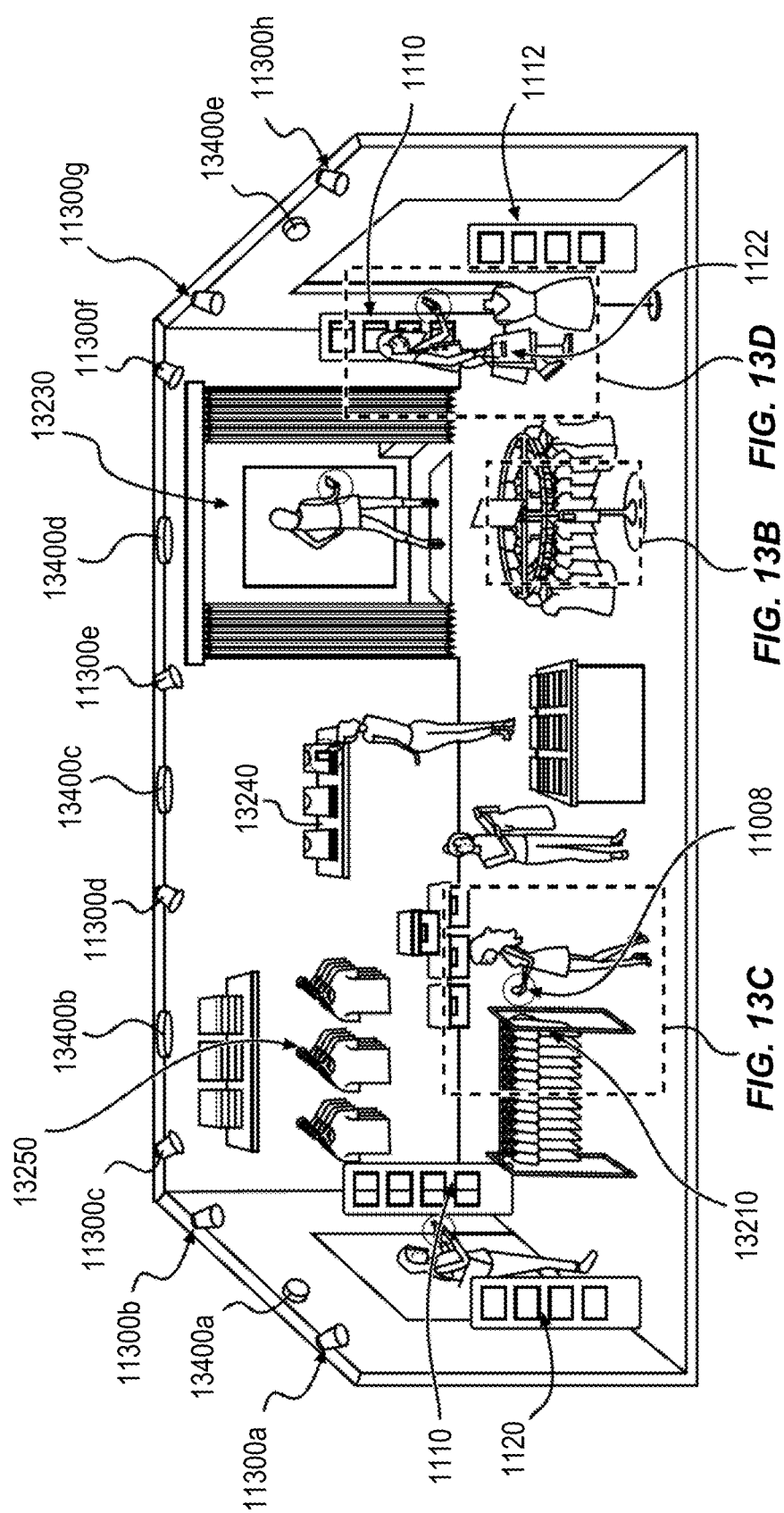
FIG. 13A is a perspective view of a retail establishment incorporating an exemplary wireless identification system, consistent with disclosed embodiments.

FIG. 13A is a perspective view of a retail establishment, which may contain a plurality of items 13210, each of which may be fixed to or otherwise associated with a wireless tag 1100. Within this exemplary establishment, there may be one or more locations designated for certain purposes, such as the storage and/or display of a particular item or the facilitation of other activities relating to operation of the establishment. For example, the establishment may contain rack 13250 and shelf 13240 that are designated for the storage and/or display of a certain item, such as a particular article of clothing. The establishment may also include other locations, such as fitting room 13230, that are not associated with the storage and/or display of items but enable customers to perform certain activities within the establishment, such as trying on different clothing items. Disclosed embodiments may provide systems, such as wireless identification system 11000 in FIG. 11, and methods that enable, for example, the identification and purchase of a particular item 13210.

Figure 13D:
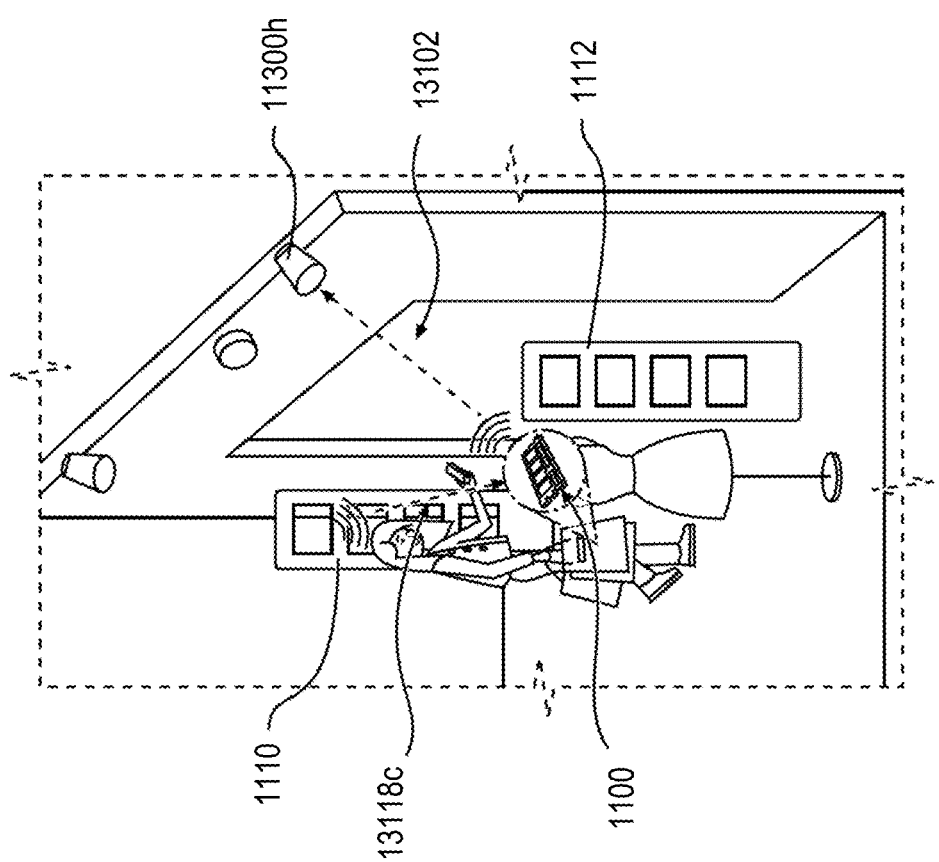
FIG. 13D depicts an example of a wireless identification tag operating in an exemplary gate mode, consistent with disclosed embodiments.

FIGS. 13B-13D depict exemplary operation modes of a wireless communication tag within the retail space illustrated in FIG. 13A. It is to be understood that the subject matter discussed below is merely exemplary and should not be regarded as limiting. The principles discussed below are applicable to the numerous other platforms listed earlier. FIG. 13B illustrates tag 1100 operating in a first mode referred to herein as "infrastructure-excitable mode" (an example of which may include a store mode). FIG. 13C illustrates tag 1100 operating in a second mode referred to herein as "user-excitable mode" (an example of which may include an Internet of Things (IoT) mode). FIG. 13D illustrates tag 1100 operating in a third mode referred to herein as "gate mode."

Tag 1100 may be configured to operate in the infrastructure-excitable mode of FIG. 13B when the tag is powered by environmental exciters, such as exciters 13400 arranged throughout the establishment. In this mode, for example, a location where goods are stored or presented for sale can keep track of its inventory. Each tag on each item can broadcast an ID, letting the system know it is still present in the establishment. Location tracking might also augment such a system so that not only is the presence of the item tracked, but also its location. For example, the strength of the ID signal received might indicate an approximate location of the item relative to a particular receiver, or multiple receives might be used to identify a more precise location, based on, for example, triangulation. Additional information stored in a system database might provide added value to a user. For example, the history of an item's movement or ownership might be stored in a database, along with characteristics of the item. Thus, the transmission of a single ID from a tag, might provide a user with rich information when coupled with prestored data about the item. In some embodiments, additional characterizing data may be stored on the tag for transmission.

Although FIG. 13B only illustrates a single exciter, tag 1100 may be simultaneously powered by multiple exciters. The exciters 13400 (including, for example, exciter 13400*d*) may be configured to deliver energy 13118*a* to the tag in an RFID frequency band between 860-960 MHz. Additionally, or alternatively, tag 1100 may receive energy from other sources having a frequency around 900 MHz. Energy 13118*a* may be received by antenna 2112 and may be stored in the energy storage circuit 2108 to power operation of the tag.

When infrastructure-excitable mode is triggered, tag 1100 may control the transmitter 2104 to broadcast the tag's ID signal 13102 in a frequency band around 2.4 GHz with a low repetition period. For example, the tag may transmit ID signal 13102 with a minimum repetition period of 10 minutes, with an added randomized period of up to five minutes, resulting in one broadcast every 12.5 minutes on average. Alternatively, the repetition period for a tag may be longer or shorter (e.g., less than five minutes, hours, or days). In some cases, a transmission of the ID signal 13102 may have a duration of around 300 µs; however, the transmission duration may be longer or shorter in alternative embodiments.

In the example illustrated in FIGS. 13A-13D, a plurality of receivers 11300*a-h* may be arranged throughout an establishment and configured to receive broadcasts of the ID signals 13102 from all of the wireless communication tags within, or in proximity to, the establishment. Because transmitter 2104 may have a broadcast range of 10 meters or more (e.g., 15 meters in some cases or more), the transmitted ID signal 13102 may be received by multiple receivers 11300*e* and 11300*f* in some cases, thus reducing the probability of signal misdetection. In other cases, one receiver may receive the broadcast of ID signal 13102. When a receiver receives an ID signal 13102 from a tag, the signal may be relayed to one or more processors (such as a processor within the establishment and/or a remote platform server) for processing, analysis, and/or storage. As discussed above, the exemplary system may additionally or alternatively include one or more receiver/exciter devices, such as device 1124, which may be configured to deliver energy 13118*a* to the wireless communication tags (similar to exciters 13400) and to receive broadcasts of the ID signals 13102 from the wireless communication tags (similar to receivers 11300); that is, device 1124 may act both as an exciter and a receiver. In some alternative embodiments, such as the embodiment illustrated in FIG. 13A, exciters 13400 and receivers 11300 may be configured as separate devices.

In embodiments in which multiple wireless identification tags are used within the same establishment, three or more channels in the BLE standard (between 2.400-2.4835 GHz WW ISM) may be used for the tags to broadcast their respective ID signals to the receivers. For example, each tag may randomly select one of the three advertisement channels per transmission, or randomly select two of the three advertisement channels per transmission, or randomly select between one and three of the three advertisement channels per transmission. This use of multiple channels, combined with the short duration and low repetition period of each signal transmission, may minimize the likelihood of collisions between different tags' transmissions. In addition, each tag may conserve harvested energy while in the infrastructure-excitable mode due to the infrequency of signal transmission and the small amount of power required for each transmission.

Tag 1100 may be configured to operate in the user-excitable mode of FIG. 13C when the tag receives energy from ambient and intentional 2.4 GHz sources, such as Bluetooth and Wi-Fi devices. In some embodiments, a user may trigger the user-excitable mode in a tag 1100 associated with a tagged item 13210 by scanning the tag with a 2.4 GHz device, such as a smartphone, tablet, or any other user device 11008 configured to transmit a 2.4 GHz trigger signal 13118b to the tag. This may permit a user to receive information about the item 13210 based on a scan of its tag. For example, when the scan occurs, an ID may be transmitted to a server (e.g., either via network infrastructure or via a receiver/transmitter in a device controlled by the user.) The server can then perform a look up of information and transmit it to the user's device. The user might be enabled to define the type of information requested to tailor the output to the user's needs. In an alternative embodiment, the relevant data may already be stored on the user's device, and the lookup may occur on the user's device instead of being sent to a server for analysis.

In the example shown in FIG. 13C, the user may activate the user-excitable mode in tag 1100 within a retail establishment (e.g., with user device 11008); however, user-excitable mode may be triggered in other locations and circumstances, such as when a user scans an item (or a shelf of items in their closet) at home using their smartphone, or during manual inventory scanning (e.g., in a warehouse or other storage facility).

When user-excitable mode is triggered, tag 1100 may harvest the incident 2.4 GHz energy to charge the energy storage circuit 2108. Additionally, when tag 1100 determines that 2.4 GHz energy was received by antenna 2114, transmitter 2104 may transmit ID signal 13102 in a frequency band around 2.4 GHz. However, beacon controller 9030 may adjust the repetition period of the ID signal to be much faster than the repetition period of the ID signal in the infrastructure-excitable mode. For example, transmitter 2104 may broadcast the ID signal 13102 less than 10 seconds after the 2.4 GHz signal 13118b is received by antenna 2114, for a signal duration of about 300 µs. Alternatively, longer or shorter repetition periods may be implemented in the user-excitable mode. By implementing a shorter response period in user-excitable mode, the tag may provide a prompt response to the user when the user-excitable mode is triggered; in comparison, such a prompt response may not be needed in the infrastructure-excitable mode. In some embodiments, beacon controller 9030 may also lower the transmission power when the tag enters user-excitable mode from infrastructure-excitable mode, in order to minimize the chances of interference with other devices operating in the 2.4 GHz frequency band at the same time.

In some embodiments, the tag may broadcast ID signal 13102 back to user device 11008 in user-excitable mode. Additionally, or alternatively, the tag may broadcast ID signal 13102 to one or more receivers around the establishment (e.g., receiver 11300c in FIG. 13C). In some embodiments, tag transmissions in user-excitable mode may be broadcast over one of the three or more BLE channels discussed above, with each tag randomly selecting one or more of the three channels per transmission.

Tag 1100 may be configured to operate in the gate mode of FIG. 13D when EAS coil 2110 receives an EAS signal 13118c from EAS gate 1112, 1114. In some embodiments, EAS signal 13118c may have a frequency within a band between 7-13 MHz or a band between 58-60 kHz. EAS gate 1112, 1114 may be installed near the exit of the establishment and may emit signals 13118c that are more localized than RFID, Wi-Fi, Bluetooth, or other radio-frequency transmissions, providing an accurate indication of when a tagged item passes through the gate (rather than merely walking near the gate). For example, instead of requiring customers to visit a checkout station or register, the user might be permitted to walk out of the store with tagged items. The gate may then read the tags and an identity of the user, such as through the user's mobile device, and send an inventory of the items to be purchased to a server which looks up the prices of the items and automatically charges the user's credit or debit account, or automatically transfers funds from the user's electronic wallet to the seller.

When gate mode is triggered, beacon controller 9030 may control the transmitter 2104 to transmit a short, powerful burst of the ID signal 13102. For example, transmitter 2104 may transmit the ID signal at its full output power for a period of approximately 200 ms, with a repetition period of between 10-80 ms, such that multiple transmissions occur during a very short time-frame. The ID signal 13102 may be received by a dedicated receiver 11300h in proximity to the EAS gate; however, the EAS gate itself may not be triggered by the tag 1100 due to the configuration of EAS coil 2110 and its associated circuitry. In some embodiments, tag 1100 may be configured to operate in the gate mode for a predetermined length of time or for a predetermined number of transmissions of the ID signal 13102, after which it may revert to the tag's previous operation mode or to a default mode (which may be, for example, infrastructure-excitable mode).

Figure 14B:
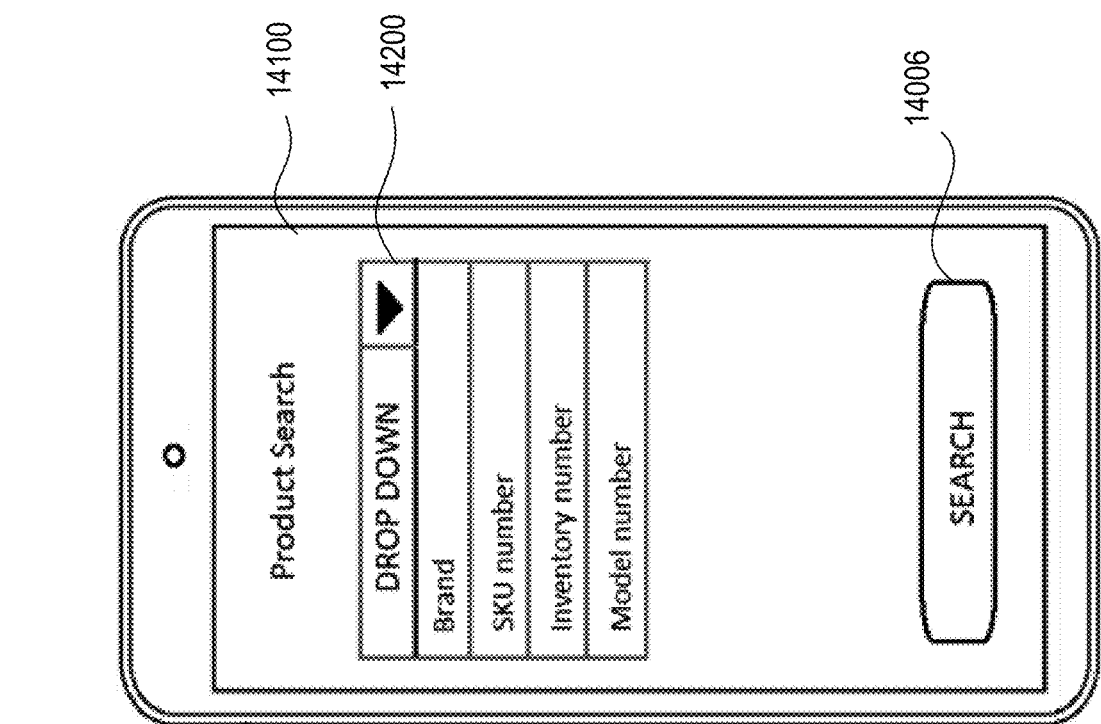
FIG. 14B illustrates a user device displaying a product graphical user interface, consistent with disclosed embodiments.
Figure 14A:
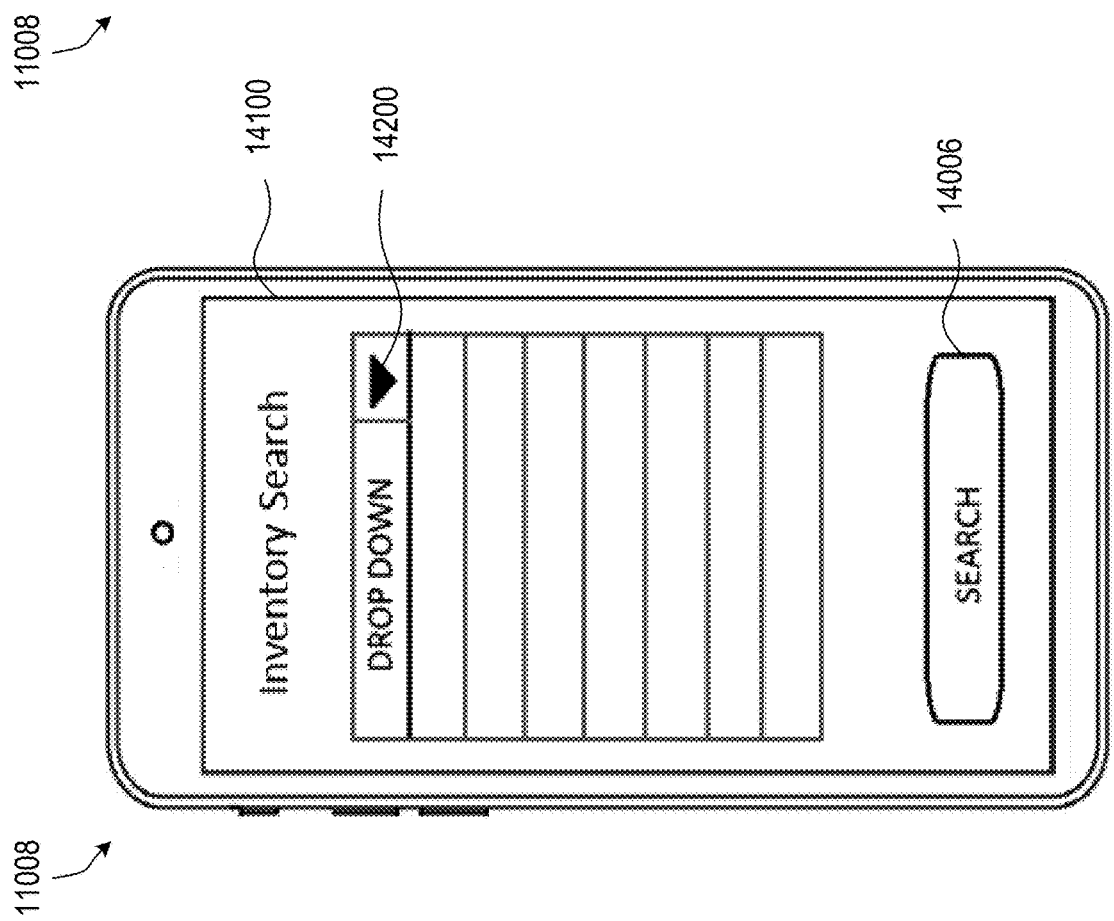
FIG. 14A illustrates a user device displaying an inventory search graphical user interface, consistent with disclosed embodiments.
Figure 14C:
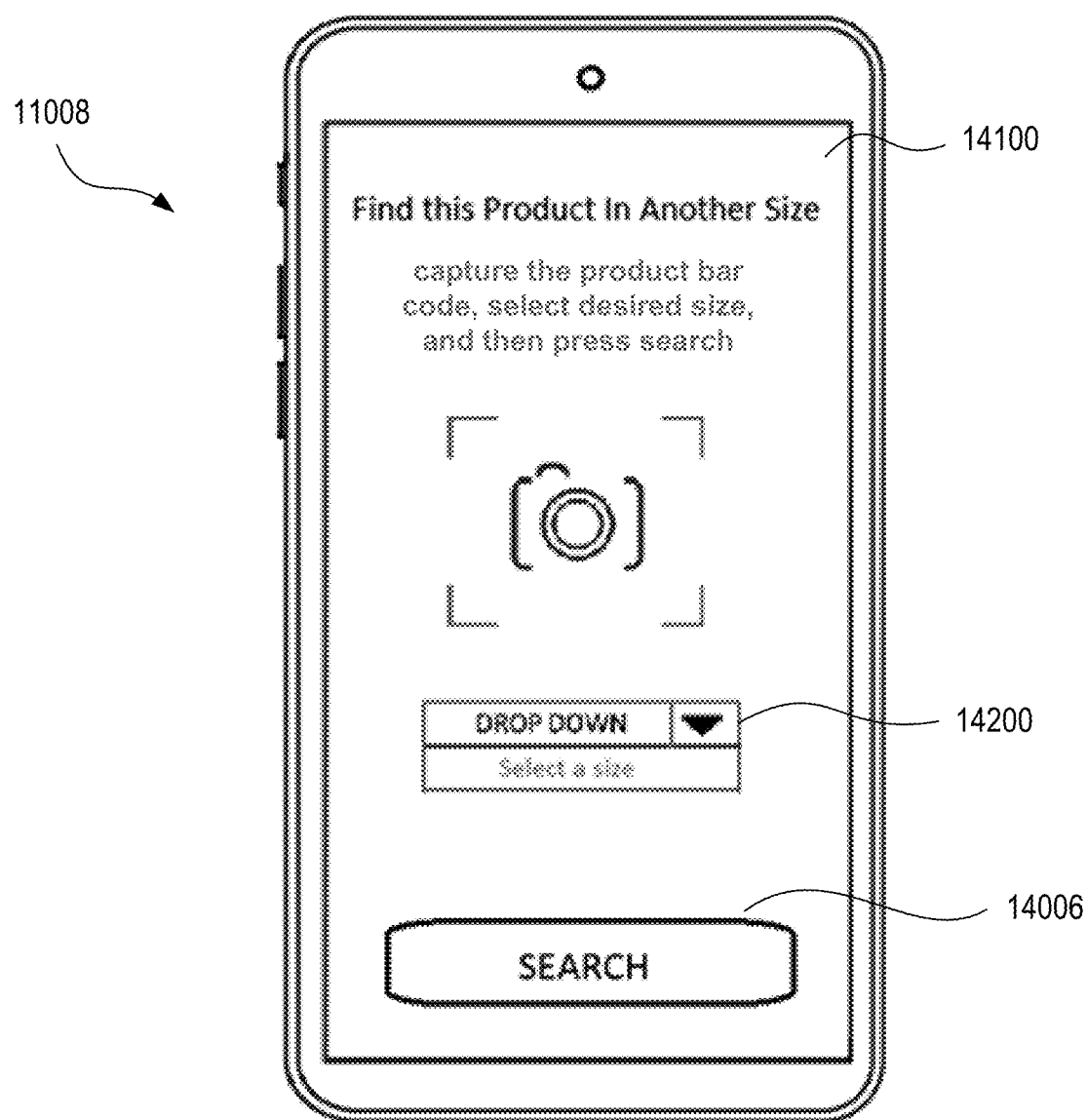
FIG. 14C illustrates a user device displaying a product size search graphical user interface, consistent with disclosed embodiments.

FIGS. 14A, 14B, and 14C illustrate a few non-limiting examples of graphical user interfaces displayed on user device 11008, which may, for example, be a cell phone. As a generic example, FIG. 14A is provided for discussion purposes and illustrates user device 11008 displaying a graphical user interface (GUI) 14100 for conducting an inventory search by enabling a user to enter data into the GUI 14100, and activating an element, such as a search button 14006. A search query may be initiated in many ways, such as by typing search text into a field, by scanning a wireless tag 1100 or a related product with a scanner in user device 11008, or through the use of a drop-down menu 14200. The drop-down menu may provide the user with selection options in order for the user to define and/or refine a search. Once the search is defined, search button 14006 may be touched on the touch screen of user device 11008 in order to initiate the search through a wireless transmission to a receiver, as will be described later in greater detail.

FIG. 14B illustrates user device 11008 displaying a product search GUI 14100. A user searching for a particular product or class of products may be provided with dropdown menu 14200. The drop-down menu 14200 may provide the user with various ways to search for a product, by either entering a brand, SKU, inventory number, or model number. Sub-menus might appear following an initial selection. For example, if the brand drop-down is selected, successive sub-menus might include category, product, size, color, or any other product distinguishing characteristic. Product images might appear in the GUI, enabling the user to select the product of interest. After the product is identified, search button 14006 may be activated by touch.

FIG. 14C provides yet another example of a GUI with an activatable button for searching. This example addresses the common scenario where a customer physically locates a product of interest, such as a clothing item, however the item is not in the customer's size. Instead of searching endlessly for the product in the correct size, the GUI 14100 may prompt the user to enter information about the product of interest. In this example, the customer (or employee of the establishment) may be prompted to take a picture of an associated wireless tag 1100 or of the barcode or QR code on the product identified by the customer. The user may next be prompted via dropdown menu 14200 to input a desired size, color or other variation of the product. After the search is defined, search button 14006 may be touched to initiate the search.

Following a look up, user device 11008 may return alternative sources of information, depending on the nature of the query, system design and/or user permissions. For example, the GUI may be caused to display that the requested product is either out of stock or in stock. If the product is out of stock, the GUI might identify a location where the product is in stock or may provide an ability to order the product for shipment to the customer. If the product is in stock, the GUI might indicate the name of another area where the product is located. It may provide a map of the establishment, indicating a general location of the product. The GUI may provide walking directions directing the user to the area of the product. In some instances, as the user approaches the product's location, the tag 1100 associated with the product may transmit a signal either directly to user device 11008 or via an infrastructure transmitter in the establishment, to enable the user to hone-in on the product's location.

Depending on the nature of a query and the system design, the protocol for retrieving information may vary in response to activation of the GUI element. In various embodiments, user device 11008 may broadcast a signal to tags 1100 in the vicinity, and the tags 1100 may transmit their responses to user device 11008. In other embodiments, user device 11008 may initially transmit the query to an inventory management system for initial look up. The inventory management system might return the IDs of products matching the query. Or, if the item is out of stock, the inventory management system might provide that information for display through the GUI. If the product is in stock and a list of matching tag IDs is sent to hand device 11008, a transmitter such as a 2.4 GHz transmitter in device 11008 might send a trigger signal to cause wireless tags 1100 in the vicinity to send back their unique tag IDs. A comparison might occur on the user device or on a remote system, to identify a match and alert the user. Alternatively, the inventory management system may already have a record of where each product is located, and rather than having the user device 11008 trigger responses from tags 1100, might instead alert the user device 11008 of the prior known location. Alternatively or additionally, the user device 11008 may transmit signals to the inventory management system enabling the system to determine the location of user device 11008 (in the same manner used to determine the location of tags 1100), enabling the inventory management system to more accurately direct the user to the specific location of the desired products. If that first step is unsuccessful in locating the physical product, the user device 11008 may only then probe tags 1100 in a vicinity.

Embodiments of the present disclosure may relate to systems, methods, devices, and computer readable media for electronic security and performing inventory control operations. For ease of discussion, in some instances related embodiments are described below in connection with a system or method with the understanding that the disclosed aspects of the system and method apply equally to each other as well as devices and computer readable media. Some aspects of a related method may occur electronically over a network that is either wired, wireless, or both. Other aspects of such a method may occur using non-electronic means. In the broadest sense, the systems, methods, and computer readable media disclosed herein are not limited to particular physical and/or electronic instrumentalities, but rather may be accomplished using many differing instrumentalities.

Disclosed embodiments may include an electronic security system for protecting against theft of products offered for sale, while also managing sales and inventory levels of the products. In retail establishments such as stores and shopping malls, there is an increased demand for "contactless" purchases in which a customer may either purchase a product remotely and visit the establishment to pick-up the product, or in which a customer may complete the purchase in the establishment without interacting with sales staff (e.g., by completing the purchase on a smartphone, on a mobile device provided by the store, or on a fixed kiosk) and subsequently leaving the establishment with the purchased product. Methods for contactless shopping are especially sought-after due to social distancing requirements, since these methods may both reduce the number of customers and staff permitted within an establishment at a given time, as well as limit interactions between customers and staff. Unfortunately, contactless shopping may also lead to increased occurrences of attempted theft from retail establishments since thieves may feel emboldened by the reduced presence of sales staff and store security, as well as by the normalcy they provide to the act of leaving the store with goods, without going through a regular check-out line or register.

Disclosed embodiments may involve systems, methods, and computer readable media for securing retail establishments against theft while also enabling efficient contactless shopping practices. Embodiments may include an electronic security system for an establishment selling products which have attached to them, or otherwise associated with them, wireless transmitting tags. A customer may purchase a tagged product by using a device (such as a smartphone or store kiosk) to interact with the wireless transmitting tag, look up the product it is associated with, access information about the associated product, and electronically purchase the product. Since the transaction may be completed using the customer's device, no contact with store staff is required. Further, completion of the transaction may cause deactivation of an anti-theft alarm or other anti-theft protections so that the customer may leave the establishment with the purchased product without incident. However, anti-theft alarms and other protections may remain active for all tagged products that have not been purchased. Thus, if a thief tries to take a product from the establishment without purchasing it, the attempted theft may be detected and the anti-theft alarms and other protections may be triggered as a result. Advantageously, disclosed embodiments may protect against the theft of unpurchased products while also providing user-friendly and secure means for contactless shopping.

Disclosed embodiments may include an electronic security system. As used herein, an electronic security system may refer to any arrangement of hardware and software components for detecting and/or signaling an unauthorized intrusion into an area or an attempted robbery, burglary, theft, pilferage, or other loss at a designated location. In some embodiments, an electronic security system may be configured to detect and signal the ingress and/or egress of persons, animals, objects, or materials into, out of, or relative to a designated location. For example, an electronic security system may include at least one device for detecting movement of persons and/or objects, which may indicate an attempted intrusion or an attempted theft of an object. Examples of a device for detecting movement may include an imaging device, microphone, passive infrared sensor, ultrasonic sensor, electromagnetic or radiofrequency detector (e.g., an EAS device, RFID device, microwave sensor, etc.), GPS, or any other suitable means for detecting movement of persons, animals, objects, or materials. The device for detecting movement may be situated at one or more locations within or around an area to be protected, such as at an entrance or exit, a gate, a door, a window, a stairwell or elevator, a storage space, at or near a safe, vault, or lock box, in a hallway, in a passage or doorframe between rooms, at an outer perimeter of the area to be protected, or at any other location where detecting movement of persons and/or objects is desired to safeguard an area.

Additionally, or alternatively, an exemplary electronic security system may be configured to control movement of persons and objects into and/or out of a designated area, in order to safeguard the area and persons and objects therein. For example, an electronic security system may include components for controlling movement of persons and objects through entryways and other control points; examples of such components may include identification (ID) readers, door controllers, turnstiles, request to exit (REX) devices, door position switches/sensors, locking mechanisms, password or pin code input devices, or any other suitable components for controlling passage of persons or objects through or into a designated location.

In some embodiments, an electronic security system may be configured to differentiate between unauthorized or unintended movement of persons or objects (which may indicate an attempted intrusion or theft) and movements that are authorized and therefore do not require an alert or remedial action. For example, the electronic security system may detect movement of a person or object to an unauthorized location (e.g., past a security gate at the exit of a retail establishment, or into a restricted area not open to the public) or at an unauthorized or unscheduled time (e.g., while a retail establishment is closed), or by possession of an object by an unauthorized individual. In some embodiments, an electronic security system may be configured to perform one or more actions when an attempted intrusion or theft is detected, such as initiating an alarm, contacting law enforcement or security personnel, documenting the event (e.g., by recording video or photographs), or limiting access to a designated location (e.g., by automatically closing doors, engaging bars or other obstacles or deactivating elevators). The electronic security system may be further configured to include in the alarm, notification or documentation other information relating to the attempted intrusion or theft, such as an identity or presumed identity of a person or persons identified or presumed identified as participating in the event, or an identification or presumed identification of an object or objects involved in the event (including, but not limited to, an object whose theft is being attempted, or other objects identified or presumed identified during the event which are not the subject of the attempted theft or unauthorized intrusion). The electronic security system may additionally include other elements, circuitry, circuit components, and systems that may be beneficial to detect and/or signal an unauthorized intrusion or an attempted robbery, burglary, or theft. An electronic security system may include one or more of the foregoing elements.

In disclosed embodiments, the electronic security system may be provided for an establishment offering products. As used herein, an establishment may include any area, building, or structure in which an inventory of objects or materials may be stored or maintained, such as, for example, a retail establishment, store, warehouse, distribution center, logistics center, fulfillment center, manufacturing area, shipping area, storage area, home, medical facility, eating establishment, kitchen, or any other area where it may be beneficial to track items. As used herein, a product may include any object or material stored or maintained within an establishment, as discussed above. By way of non-limiting examples, a product may include food, clothing, shoes, electronics, consumer goods, equipment, vehicles, consumables, packaging, accessories, supplies, materials, artistry, animals, instruments, pallets, containers, pharmaceuticals, cosmetics, commodities, articles, devices, machinery, implements, mechanisms, tools, furniture, or any other object that may be present in an establishment. In some embodiments, the establishment may offer the products for sale, exchange, or barter, for display, for safekeeping, for storage, for distribution, and/or for complimentary giveaway.

In disclosed embodiments, the offered products may have associated wireless transmitting tags. As used herein, a wireless transmitting tag may include any wirelessly detectable device, such as, for example, a radio-frequency identification (RFID) device, a Bluetooth Low Energy (BLE) beacon device, a device including a microcontroller powered by radio-frequency energy, or any other structure configured to transmit signals capable of detection. In disclosed embodiments, a wireless transmitting tag may include at least one antenna or any other component, circuit and/or device configured for receiving and/or outputting energy from the air or from any other medium. For example, the wireless transmitting tag may be configured to receive and/or output electromagnetic radiation, electric fields, magnetic fields, acoustic signals (such as in sonar applications), or optical signals (such as in laser applications).

As mentioned above, the offered products may be associated with the wireless transmitting tags. As used herein, to be "associated with" may mean that one wireless transmitting tag may be assigned to, or otherwise paired or correlated with, one product offered in the establishment for the purpose of uniquely identifying that product. For example, the association between a wireless transmitting tag and an associated product may be stored in a data structure. Information of the wireless transmitting tag (e.g., a unique tag identifier such as a serial number or barcode) may be searched in the data structure and, via the association between the tag and the associated product, may be used to access information of the associated product from the data structure; information of the associated product may include, e.g., the product's size and color, price data, location within the establishment, product images, ownership information, care instructions, manufacturing time and location, or any other characteristic of the product.

In some embodiments, a wireless transmitting tag may be attached to an associated product through adhesive, embedding, sewing, mounting, bonding, friction fit, pocketing, tying, wrapping, fastening, or any other type of physical connection. For example, if a product is made of fabric, a tag may be sewn into the fabric, embedded between layers of fabric, adhered to the fabric, attached to the fabric via a hanging tag, or connected to the fabric in any other way that enables a physical attachment. In alternative embodiments, an association between a wireless transmitting tag and a product may be established and, optionally, stored in a data structure without a physical attachment between the tag and product, such as when a tag is placed in the same packaging as the product. In some embodiments, the wireless transmitting tag may not require a battery but may operate on harvested energy (as disclosed herein). In some embodiments the wireless transmitting tag may include a device small enough to be embedded into a product, for example, clothing, during manufacture. In some embodiments, the embedded tag may not be readily detected by a wearer. Other embodiments may remain embedded or attached to a product for long periods of time, for example, many years. Some embodiments of the wireless transmitting tag may be resistive to dust and water, such as up to IP67 standards. Other embodiments may be resistive to washing, drying, dry-cleaning, and ironing.

By way of example, FIG. 1 illustrates an electronic security system for an establishment. The electronic security system of FIG. 1 may include electronic transmitting tags 1100*a*, 1100*b* associated with products offered for sale in the establishment, such as jacket 1106 and bag 1122, as well as components for detecting and signaling an attempted theft of the products. For example, the electronic security system of FIG. 1 may include a security gate 1110, 1112 having transmitters 1116 configured to transmit wireless signals 1118 to tags 1100*a*, 1100*b*; at least one receiver/exciter device 1124 configured to receive broadcasts of signals 1102*a*, 1102*b* from tags 1100*a*, 1100*b*; and an alarm 1114 that may be triggered when an attempted theft of at least one of products 1106 and 1122 is detected.

As another example, FIGS. 13A-13D depict an electronic security system for an establishment offering products, such as shirt 13210. In the examples depicted in FIGS. 1 and 13A-13D, products 1106, 1122, and 13210 may be offered for sale and may include a clothing item or bag; however, persons of ordinary skill will understand that products 1106 and 13210 may include any product discussed above. As shown in FIG. 13A, product 13210 and other products within the establishment may be associated with wireless transmitting tags 1100. For example, each tagged product may be associated with a different wireless transmitting tag 1100 in order to provide unique identification of each tagged product. In some embodiments, wireless transmitting tag 1100 may be configured to receive wireless signals, such as signals 13118*a-c*, and to output or transmit signals in response, such as ID signal 13102. The electronic security system may include a plurality of receivers 11300*a-h* configured to receive broadcasts of ID signal 13102 and other signals from the wireless transmitting tags 1100, as well as exciters 13400*a-e* configured to deliver energy to be collected and stored by the wireless transmitting tags 1100. In some embodiments, the electronic security system of FIGS. 13A-13D may include an alarm (e.g., an alarm at or near security gate 1110, 1112) when an attempted theft of a product associated with an electronic transmitting tag 1100 (e.g., product 13210) is detected.

Disclosed embodiments may include inventory control operations. As used herein, inventory control operations may include systems, methods, techniques, and activities for tracking and controlling products held, stored, processed or offered by an establishment. For example, inventory control operations may include monitoring the inflow and outflow of products from the establishment and monitoring locations where specific products are stored or presented for sale in the establishment. Inventory control operations may also include detecting unauthorized intrusions or attempted robbery or theft of products from an establishment and, in some embodiments, taking corresponding action such as initiating an alarm or contacting law enforcement.

Disclosed embodiments may include at least one electronic article surveillance (EAS) gate. As used herein, an EAS gate may include a surveillance or theft-deterrent system having at least one antenna or transmitter configured to transmit a wireless signal to a security tag attached to, or otherwise associated with, a product brought into proximity with the EAS gate. In some embodiments, and in response to receiving the wireless signal from the EAS gate, the security tag may be configured to output a second wireless signal which may be used to trigger an anti-theft alarm; the second wireless signal may, in some embodiments, be detected by a receiver of the EAS gate or a receiver in proximity to, but separate from, the EAS gate. In some embodiments, the EAS gate may include electro-magnetic EAS components, acousto-magnetic (AM) components, radio-frequency (RF) components, or micro-wave (MW) components, among other detection components.

In some embodiments, the antenna or transmitter of the EAS gate may be incorporated within one or more pedestals located near the entrance or exit of the establishment or at another designated location. For example, the EAS gate may include one pedestal, two pedestals, three pedestals, or any number of pedestals, based on factors including, but not limited to, a distance range, space availability, customer traffic or the type of EAS system used. If the EAS gate includes more than one pedestal, the pedestals may be spaced a distance apart to allow patrons to enter and exit the establishment between the pedestals with minimum hindrance, while the pedestals are within a close enough range of each other to be triggered by a passing tagged product. Additionally, or alternatively, the EAS gate may include a concealed EAS gate, or an EAS gate having one or more pedestals installed such that they are not visible and cause minimal hindrance to the patrons. For example, a pedestal may be installed below the floor, above the ceiling, as part of a doorframe, or behind the walls. Concealed EAS systems may be used, for example, to enhance the effectiveness of surveillance, enhance the shopping experience for customers, or enhance any other facility where the monitoring of objects is desired.

By way of example, FIG. 1 illustrates an exemplary EAS gate including a first pedestal 1110 and a second pedestal 1112, each pedestal having a transmitter 1116 configured to transmit an EAS signal 1118 within a predetermined frequency band. EAS signal 1118 may include electromagnetic energy having a frequency, for example, within the band of 58-60 kHz (AM-EAS waves) or 7-13 MHz (RF-EAS waves). EAS gate 1110, 1112 may also include an EAS receiver 1120 configured to receive wireless signals within the same frequency band as EAS signal 1118. For example, EAS receiver 1120 may receive a signal that is transmitted by an EAS security tag that is brought into proximity with EAS gate 1110, 1112 and triggered by EAS signal 1118. Upon receiving the wireless signals in the same frequency band as EAS signal 1118, EAS receiver 1120 may trigger an alarm 1114 indicating the passage of a tagged product through the EAS gate 1110, 1112.

In some embodiments, an exemplary wireless transmitting tag 1100 (such as, e.g., tags 1100*a* and 1100*b*) may be configured to receive EAS signal 1118 when the product associated with the tag passes through EAS gate 1110, 1112. For example, the electromagnetic energy of EAS signal 1118 may be received by a coil 2110 of the wireless transmitting tag 1100, thereby activating or triggering the tag. Upon activation, wireless transmitting tag 1100 may transmit an ID signal 1102 with transmitter 2104. ID signal 1102 may have a different frequency than EAS signal 1118 (e.g., ID signal 1102 may have a frequency around 2.4 GHz and EAS signal may be within a frequency band between 58-60 kHz or 7-13 MHz). In some embodiments, EAS receiver 1120 may not be triggered by ID signal 1102 because ID signal 1102 may be outside the specified frequency band of EAS receiver 1120. In some embodiments, the wireless transmitting tag 1100 may not generate any signal or interfere with any signal generated by the EAS gate 1110, 1120 such that the tag cannot be detected by the EAS gate's receiver 1120. Instead, another receiver 1124 may be provided which is configured to receive ID signal 1102 and take one or more corresponding actions, such as activating an alarm or transmitting a signal to at least one processor for completion of an electronic purchase of the tagged product 1106 or 1122.

Disclosed embodiments may include at least one receiver. As used herein, a receiver may include a circuit configured to receive signals sent over a communication medium. The signals may carry data (as in the case of communication systems such as Wi-Fi, Bluetooth, cellular communication, Ethernet communication or any other standards-based or proprietary protocol) or just carry energy (as in the case of exciters for RFID, X-ray imaging, or radar). The term "receiver" may refer to a receiver in the context of wireless communication, such that the signal may include an electric signal, a magnetic signal or an electromagnetic signal; the medium may be over-the-air wireless communication; and the signal may carry data of some form according to an agreed-upon communication protocol. A receiver may include a fixed receiver in an environment, a wireless user device (e.g., cellphone, tablet, dedicated hardware, etc.), a handheld receiver (e.g., a handheld scanner provided to an employee or customer by the establishment for use during working routines or in a shopping session), or any other circuit or component that receives signals.

In some embodiments, the at least one receiver may include an antenna tuned to receive electromagnetic energy within a specified frequency band. Additionally, the at least one receiver may be configured to transmit electromagnetic energy within a specified frequency band. For example, the at least one receiver may include a transceiver, a router, a duplexer, or any other device configured to both transmit and receive signals. In disclosed embodiments, the at least one receiver may be configured to receive transmissions from the wireless transmitting tags, as well as from other devices configured to transmit wireless or wired signals. Disclosed embodiments may include one or more receivers fixed at designated locations within the establishment; for example, receivers may be distributed throughout the establishment so that signals transmitted from any point within the establishment may be received by at least one of the receivers. Additionally, or alternatively, embodiments may include one or more mobile receivers (e.g., a wireless user device or a handheld receiver) which may be placed by a user at a desired location within the establishment.

For example, FIGS. 13A-13D depict an exemplary electronic security system including a plurality of receivers 11300a-h distributed throughout the establishment to receive broadcasts of signals from the wireless tags 1100 and other transmitting devices. Receivers 11300a-h may be affixed or otherwise attached to walls, ceilings, racks, displays, or any other fixtures or components within the establishment capable of supporting the receiver. As shown in FIG. 13B, receivers 11300a-h may be configured to receive transmissions of ID signal 13102 from wireless transmitting tag 1100. Each receiver 11300a-h may include at least one of a first antenna 2112 tuned to receive energy at a frequency around 900 MHz (e.g., RFID signals) and a second antenna 2114 tuned to receive energy at a frequency around 2.4 GHz (e.g., Wi-Fi, Bluetooth Low Energy (BLE), or Classic Bluetooth). As shown in FIG. 11, receivers 11300a-h may be configured to receive data transmissions from wireless transmitting tags 1100 and to transmit the data to other components of wireless identification system 11000 via network 11002.

Disclosed embodiments may include at least one processor as described elsewhere in this disclosure. Disclosed embodiments may include receiving transmissions from a plurality of wireless transmitting tags. As discussed above, the transmissions from the wireless transmitting tags may be received by the at least one receiver. Additionally, or alternatively, the transmissions may be received by another component of the electronic security system.

Disclosed embodiments may include receiving a specific tag ID of a specific tag. For example, the at least one processor may be configured to receive a specific tag ID of a specific tag. A tag ID may include information of a given one of the wireless transmitting tags that identifies the tag to a user and/or to other devices or device components. The tag ID may include a numbers, letters, characters, codes, strings, or other forms of data which may identify the wireless transmitting tag to other devices or device components that receive the tag ID. In some embodiments, the tag ID may be unique to a specific tag, and that specific tag may have only one tag ID. Alternatively, the same tag may have multiple tag IDs. In some embodiments, multiple tags may share the same tag ID or groups of IDs. Examples of a tag ID may include a serial number, part number, bar code, UUID, EPC, and/or other data.

In some embodiments, the specific tag may be associated with a specific product for prospective purchase from the establishment. That is, the specific tag ID may be associated with a specific one of the wireless transmitting tags which is, in turn, associated with a specific product for prospective purchase from the establishment. As discussed above, to be "associated with" may mean that the specific one of the wireless transmitting tags (referred to hereafter as "the specific tag") may be assigned to, or otherwise paired or correlated with, a specific product offered in the establishment. The association between the specific tag and the specific product may be stored in a data structure, so that information of one of the specific tag and the specific product may be used to access information of the other from the data structure. In some embodiments, the specific product may be a product that is offered by the establishment to be purchased, rented, leased, or otherwise borrowed (for free or for a fee). Additionally, or alternatively, the specific product may be a product that a customer has decided to buy and for which the customer is performing a transaction to purchase, rent, lease, or otherwise borrow the specific product from the establishment.

Disclosed embodiments may include receiving the specific tag ID from a device operated by a prospective purchaser. For example, the at least one processor may be configured to receive the specific tag ID from a device operated by a prospective purchaser. As used herein, a prospective purchaser may include a customer who is initiating or performing a transaction to purchase, rent, lease, or otherwise borrow the specific product from the establishment. Additionally, or alternatively, a prospective purchaser may include an employee of the establishment who may perform a transaction, in whole or in part, on behalf of a buyer; examples may include an in-store shopper or cashier. Additionally, or alternatively, a prospective purchaser may include any individual authorized to perform a transaction, in whole or in part, on behalf of a buyer; examples may include a shopper engaged via a service or application such as Instacart, Shipt, and Stitch Fix. In some embodiments, the specific tag ID may be received from the device operated by the prospective purchaser following detection of the specific tag ID by the device. For example, the prospective purchaser may use the device to photograph or scan the tag ID or a portion thereof. Additionally, or alternatively, the prospective purchaser may input the specific tag ID, or a portion thereof, into the device via a keyboard, microphone, mouse, or other user input mechanism. Additionally, or alternatively, the prospective purchaser may use the device to select the tag ID on a website or application that is associated with the establishment. Additionally, or alternatively, the prospective purchaser may use the device to trigger the specific tag to transmit its ID, and receive the ID transmission by the device, or by other means such as the receivers 11300*a-h* which then relay to the device the ID of the specific tag. After obtaining the specific tag ID, the device may transmit the specific tag ID to the at least one processor.

FIG. 13C illustrates an example in which a prospective purchaser operates user device 11008 to detect the tag ID of a wireless transmitting tag 1100 attached to a product offered for purchase from the establishment. In this example, user device 11008 may include a smartphone or another device having a camera, which the purchaser may use to detect (e.g., photograph or scan) the tag ID. As shown in FIG. 11, user device 11008 may transmit the tag ID to at least one processor 11004 via network 11002.

In some embodiments, the device operated by the prospective purchaser may include a personal mobile communications device of the prospective purchaser. Exemplary personal mobile communications devices may include a cellular phone, smartphone, tablet, desktop, laptop, PDA, handheld scanner, wearable device, or other mobile communication device. For example, FIG. 13C illustrates an embodiment in which a prospective purchaser operates user device 11008 (e.g., a smartphone) to detect the specific tag ID.

Figure 16:
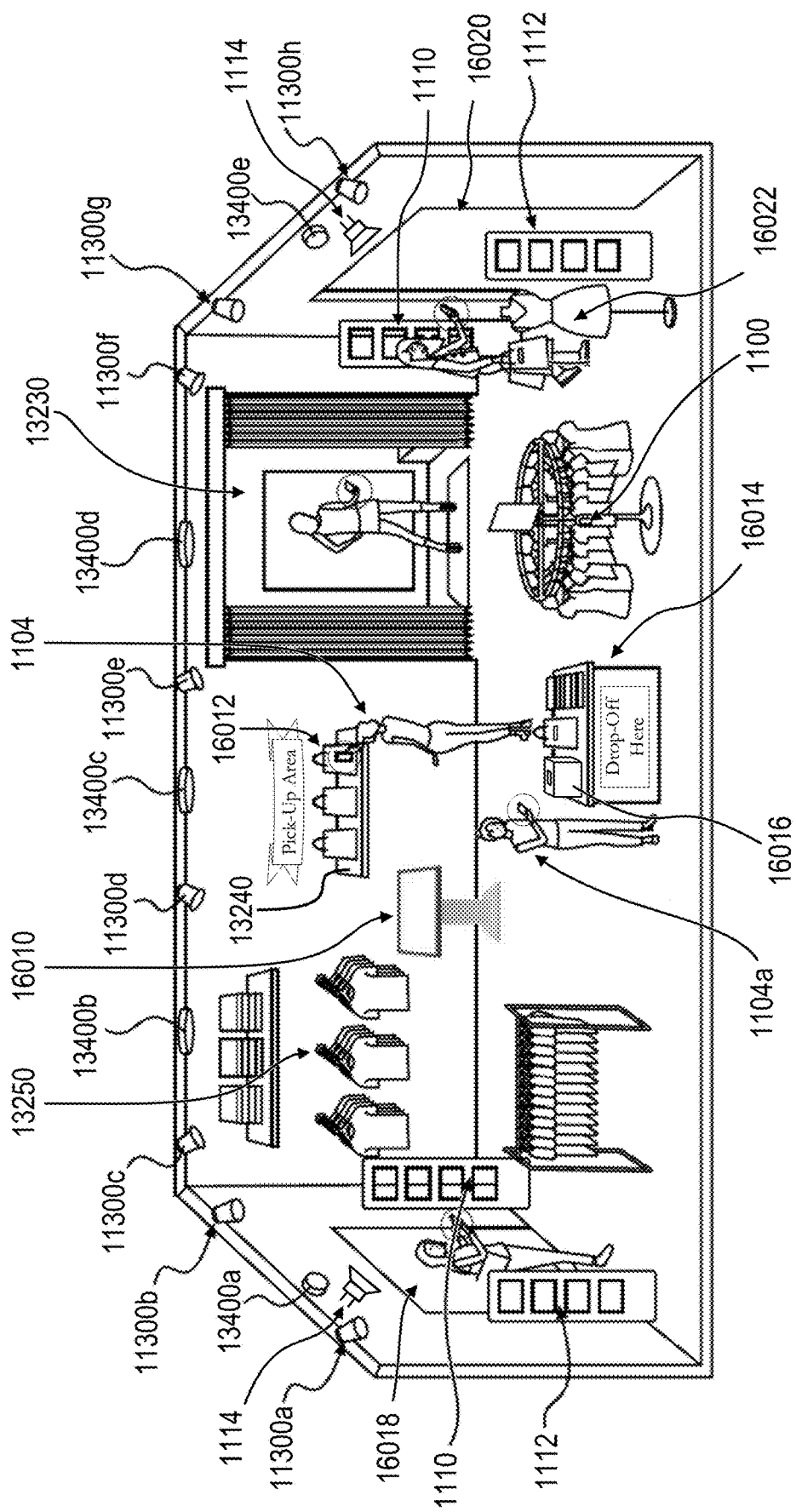
FIG. 16 is a perspective view of an exemplary retail establishment incorporating an exemplary wireless identification system, consistent with disclosed embodiments.

Additionally, or alternatively, the device operated by the prospective purchaser may be associated with a kiosk in the establishment. As used herein, a kiosk may include a small, stand-alone structure with a computer terminal or another input device that customers may use to access information and make purchases from the establishment. In some embodiments, the kiosk may include a structure that is secured against movement, such as a terminal connected to the floor or a touchscreen mounted on the wall. Additionally, or alternatively, the kiosk may be configured to be moved around the establishment so that the kiosk may be placed, for example, in a high-traffic area, near the exit or customer service desk, outside the fitting rooms, or at any other desired location. In some embodiments, the kiosk may be fully-automated so that customers can use the kiosk without input or assistance from employees of the establishment. For example, FIG. 16 illustrates an exemplary establishment with a kiosk 16010 including a computer terminal with a touchscreen or other user input mechanism that customers may use to access information about the establishment and products sold therein and to complete purchase transactions. Other examples of a kiosk may include a self-checkout counter, a fully or partially enclosed booth, a cubicle, a work station, or any other device that may be operated by a customer to access information or purchase products from the establishment.

Disclosed embodiments may include receiving the specific tag ID and other data from the device operated by the prospective purchaser (e.g., by the at least one processor) via one or more communication protocols or techniques. For example, the specific tag ID may be received from the device operated by the prospective purchaser via a local Wi-Fi connection in the establishment or by any other standards-based or proprietary communication protocol. In some embodiments, the at least one processor and the device operated by the prospective purchaser (referred to hereafter as the purchaser's device) may both be connected to the local Wi-Fi network in the establishment so that data such as the specific tag ID may be transmitted between the device and the at least one processor via the Wi-Fi network. Additionally, or alternatively, the at least one processor and the purchaser's device may be connected and configured for data transmission via other protocols such as Bluetooth, cellular communication, Ethernet, ADSL/VDSL/SDSL wired protocols, GSM, 3G, LTE, 5G, ZigBee, Z-wave wireless protocols, a proprietary protocol agreed on by the transmitter and receiver, or any other suitable medium for transmitting data such as the specific tag ID between the purchaser's device and the at least one processor.

In disclosed embodiments, the specific tag ID may be received from the device operated by the prospective purchaser via a wired Local Area Network (LAN) connection. As used herein, a wired LAN may include a network of processors and peripheral devices within a localized area which are physically linked together via, for example, Ethernet cabling and switches. In some embodiments, the at least one processor and the purchaser's device may both have hardwired connections to the LAN (e.g., Ethernet or other network cables may be plugged into both devices). Additionally, or alternatively, the at least one processor may have a wired connection to an access point or router, which may establish a wireless connection with the purchaser's device. The purchaser's device may transmit the specific tag ID and other data to the at least one processor via the access point or router. Additionally, or alternatively, the at least one processor and the purchaser's device may both be configured to access the wired LAN via a wireless connection to an access point or router of the wired LAN. In some embodiments, the at least one processor may include a processor within the establishment, such as a computing device at a checkout station or register, a self-service kiosk, or a handheld device or scanner provided by the establishment to an employee or customer for use during working routines or in a shopping session. The at least one processor may therefore be configured to connect to the purchaser's device via a LAN since both devices are located within or in close proximity to the establishment.

In the example shown in FIG. 11, network 11002 may include a Local Area Network (LAN) providing a connection between a processor 11004 and a user device 11008. In some embodiments, processor 11004 and user device 11008 may both have hardwired connections to network 11002 (e.g., Ethernet or other network cable connections). Additionally, or alternatively, network 11002 may include a wired access point or router to which processor 11004 may have a hardwired connection and with which the user device 11008 may establish a wireless connection. User device 11008 may therefore transmit data (e.g., the specific tag ID) to processor 11004 via the access point or router.

Additionally, or alternatively, the specific tag ID may be received from the device operated by the prospective purchaser via a Wide Area Network (WAN) connection. As used herein, a WAN may include a communications network formed from a collection of local area networks and/or other networks so that the WAN is not tied to a specific geographical area, but instead extends over a large geographic area or, in some embodiments, is a global network. The WAN may be implemented using any suitable communication or networking technology, including ATM, cable modems, dial-up internet, DSL, fiber optics, frame relay, ISDN, leased lines, wireless networks, cellular networks, virtual private networks (VPNs), SONET/SDH, and X.25.

Figure 17:
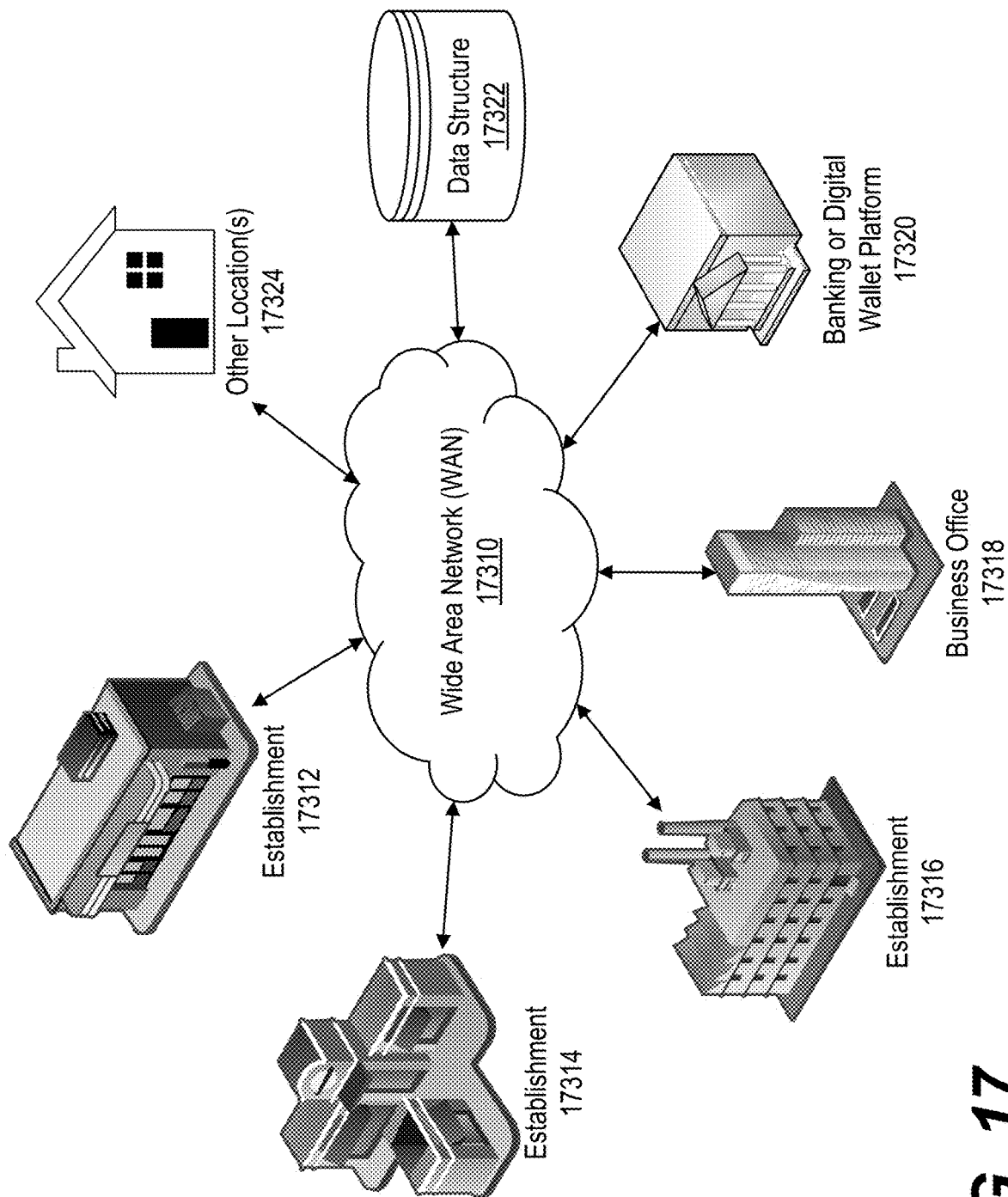
FIG. 17 is a diagram of an exemplary Wide Area Network (WAN) for communications between establishments, consistent with disclosed embodiments.

As an example, FIG. 17 depicts a Wide Area Network (WAN) 17310 for connecting Local Area Networks (LANs) in different geographical areas. In this example, WAN 17310 may connect multiple establishments 17312, 17314, and 17316, each of which may have a wired or wireless LAN for local communications, as discussed above. For example, in some embodiments, each establishment 17312, 17314, and 17316 may have its own local network configured as network 11002 of FIG. 11; as shown in FIG. 11, each network 11002 may include, e.g., at least one processor 11004, data structure(s) 11006, receivers 11300a-11300g, and user devices 11008 (see FIG. 11). In some embodiments, a corporation or other entity having multiple locations may use WAN 17310 to provide communications between individual establishments 17312, 17314, and 17316, as well as additional points such as a business office 17318, a banking or digital wallet platform 17320, a remote or cloud data storage structure 17322, and other locations 17324 such as, e.g., a customer's home or business, school, university, library, government building, or any other location from which access to the business' network may be sought. In various embodiments, the at least one processor and the purchaser's device may be situated in different locations (as a non-limiting example, the purchaser's device may be operated within an establishment 17312 while the at least one processor may be situated within a business office 17318). Data, including the specific tag ID, may be transmitted between the purchaser's device and the at least one processor via WAN 17310.

Disclosed embodiments may include accessing a data structure containing a plurality of tag IDs associated with a plurality of products in the establishment. For example, the at least one processor may be configured to access a data structure containing a plurality of tag IDs associated with a plurality of products in the establishment. As used herein, a data structure may include an ordered or un-ordered storage of information, saved in a computer-accessible form on a medium which is both readable and writable. Some non-limiting examples include databases, spreadsheets, directories, tables, and other data types. Data structures may be designed to enable targeted retrieval of portions of the data or of individual records according to various criteria and at different levels of aggregation. Such retrievals, or queries, may include searching for a single stored piece of information, searching for specific information associated in the data structure with a known piece of information, searching for multiple pieces of information sharing some characteristic, etc. A data structure designed to allow queries and retrieval of information may define a standard interface, including both a medium, tunnel or protocol through which to receive queries and return responses, as well as a language, format, application or other definition for the structure and content of the queries as well as the structure and content of the responses. Such an interface (e.g., an API) enables a person, entity, or device with access to the interface, and knowledge of the format of queries and responses, to retrieve information from the data structure. Such a person, entity or device, referred to as a requester, may be required to provide some form of credentials, log-in, certificate or identification, in order to determine whether the requester is authorized to access the information stored in the data structure. Such authorization data may be general for the entire data structure, or it may be specific for each and every piece of stored information, or to specific characteristics and attributes of the entire data structure but not to other specific characteristics and attributes.

In some embodiments, a data structure may maintain a record including products offered in the establishment, wireless transmitting tags associated with the establishment, tag IDs of the wireless transmitting tags, associations between products and tags, and location data of the products and/or tags. Each tag ID (as well as the corresponding wireless transmitting tag) may be associated with at least one of the products offered in the establishment. In some embodiments, each of the plurality of tag IDs in the data structure may be unique from every other tag ID in the data structure. Additionally, or alternatively, each of the plurality of tag IDs in the data structure may be associated with a single product, and vice versa. Thus, each tag ID may uniquely identify both the corresponding wireless transmitting tag and the associated product within the establishment. In some embodiments, additional information may also be stored in the data structure. For example, information of the wireless transmitting tags associated with each of the plurality of tag IDs (e.g., a tag's power level, manufacturing information, etc.) and information of the plurality of products in the establishment (e.g., each product's size and color, price data, a serial number or unique identifier of each product, a lot number, manufacturing and/or shipping history, or any other information regarding the product) may also be stored within, and accessed from, the data structure. The association (i.e., the pairing or correlation) between the tag ID and the associated product may be stored in a data structure, so that the tag ID may be used to access information of the associated product from the data structure, and vice versa.

As an example, FIG. 11 depicts a processor 11004 which may access a data structure 11006 via network 11002; the plurality of tags IDs (and, optionally, additional information as discussed above) may be stored in data structure 11006. As another example, FIG. 17 shows a remote data storage structure 17322 which may be accessed via WAN 17310; the plurality of tags IDs (and, optionally, additional information as discussed above) may be stored in data structure 17322. A processor configured to access WAN 17310 (e.g., a processor within an establishment 17312 or business office 17318) may therefore access the tag IDs from data structure 17322 via WAN 17310.

Disclosed embodiments may include performing a lookup in the data structure of the specific tag ID. For example, the at least one processor may be configured to perform a lookup in the data structure of the specific tag ID, and the data structure may be configured to receive, process and respond to such lookup requests. The at least one processor may initiate a search for the specific tag ID from among the tag IDs stored in the data structure. Upon finding the specific tag ID in the data structure, embodiments may include identifying the specific product. For example, the processor may use the stored associations between products and tags to identify a specific product associated with the specific tag ID. In some embodiments, the at least one processor may access stored information of the specific product from the data structure. The at least one processor may, in various embodiments, transmit information of the specific tag ID and/or information of the specific product to the purchaser's device.

Disclosed embodiments may include initiating an electronic purchase transaction. For example, the at least one processor may be configured to initiate an electronic purchase transaction. As used herein, an electronic purchase transaction may include an economic transaction where one party (a seller) provides a product or a service (the purchased product) to a second party (the buyer), and the second party provides compensation (money, money-equivalent assets, another product or service, or a commitment to provide such compensation at some future time) in return. An electronic purchase transaction may also include the transfer of ownership, rights of possession, or any other interest in real, personal, tangible, or intangible property between parties in exchange for monetary payment or other consideration, the transaction being executed by a processor such as a computer, tablet, smartphone, cloud computing platform, or any other suitable electronic processing device, component, or unit. In disclosed embodiments, the electronic purchase transaction may be initiated (e.g., by the at least one processor) for an electronic purchase of the specific product. For example, the electronic purchase transaction may be performed between the prospective purchaser and the establishment: the prospective purchaser may acquire the specific product from the establishment by sale, rental, lease, negotiation, pledge, lien, gift, or any voluntary transaction, in exchange for payment of money or other consideration to the establishment for the specific product.

In some embodiments, the at least one processor may be configured to initiate the electronic purchase transaction for the specific product based on receipt of the specific tag ID from the purchaser's device. That is, the electronic purchase transaction may be triggered (i.e., initiated) by receipt of the specific tag ID and the subsequent lookup of the specific tag ID in the data structure. Alternatively, the at least one processor may receive a separate authorization to initiate the electronic purchase transaction, either before or after the receipt of the specific tag ID from the device. For example, the purchaser's device may prompt the prospective purchaser via a user interface to authorize the purchase. When the prospective purchaser authorizes the purchase, the purchaser's device may transmit an authorization signal to the processor that causes the processor to initiate the electronic purchase transaction. However, the at least one processor may be configured to not initiate the electronic purchase transaction when the purchaser's authorization is not received.

In some embodiments, the at least one processor may be configured to access financial accounts or instruments associated with the prospective purchaser in order to obtain funds to complete the electronic purchase transaction. As used herein, accounts or instruments "associated" with the prospective purchaser may include accounts and instruments for which the prospective purchaser is the account holder or an agent, custodian, nominee, signatory, investment advisor, or guardian of the account holder, or an account or instrument from which the prospective purchaser is authorized to make the electronic purchase of the specific product. In some embodiments, the at least one processor may be configured to debit an account associated with the prospective purchaser for the electronic purchase of the specific product. For example, the at least one processor may be linked to a bank account or digital wallet account held by the prospective purchaser (e.g., PayPal, Venmo, Apple Pay, and Zelle) so that the processor may debit funds from the account to complete the electronic purchase transaction. In alternative embodiments, the electronic purchase transaction may include an electronic credit card transaction. For example, the at least one processor may be configured to charge the electronic purchase transaction on a credit card, debit card, or other instrument held by the prospective purchaser or which the prospective purchaser has been authorized to use to complete the transaction. In some embodiments, upon completion of the electronic purchase transaction, the at least one processor may be configured to update the data structure to reflect, for example, that the prospective purchaser is the owner of the specific product and that the establishment is not the owner or possessor of the specific product.

As an example, FIG. 17 depicts a Wide Area Network (WAN) 17310 for communication with a banking or digital wallet platform 17320. In some embodiments, a processor performing the electronic purchase transaction (e.g., a processor within an establishment 17312) may be configured to access a banking or digital wallet platform 17320 associated with the prospective purchaser to access funds for completion of the electronic purchase transaction. For example, the processor may be configured to transfer funds from the prospective purchaser's account to an account associated with the establishment.

Disclosed embodiments may include causing an alarm to be initiated, such as by the at least one processor. As used herein, an alarm may refer to an alert or notification generated by a component of the electronic security system for notifying another component, another system, and/or a person that the electronic security system has detected an unauthorized intrusion into the establishment or an attempted robbery or theft from the establishment. The alarm may include at last one of an audible alert, a visual alert, a haptic alert, a digital message, or any other transmission that conveys the desired information. In some embodiments, the electronic security system may include fixed infrastructure configured to initiate an alarm; examples may include speakers, lights, and/or graphic displays arranged at strategic locations within the establishment such as at the entrance and/or exit, near a checkout counter or self-checkout kiosk, in a storage area, or next to the fitting rooms. Additionally, or alternatively, the electronic security system may include other components for initiating an alarm including notifications on an employee's mobile device, updating a data structure of attempted thefts, instant messages, and/or automated transmissions to local security.

The at least one processor may cause an alarm to be initiated by causing activation of the alarm-initiating components of the electronic security system. In some embodiments, the at least one processor may cause an alarm to be initiated when an unauthorized intrusion into the establishment is detected or in the event of an attempted robbery, burglary, theft, pilferage, or other loss of a product from the establishment. For example, an EAS gate may be provided near the entrance or exit of the establishment and/or at another designated location and may be configured to transmit an activation signal (i.e., an EAS signal) to wireless transmitting tags in proximity to the EAS gate, such as a tag attached to a product being carried through the EAS gate. In embodiments in which the specific tag receives the EAS signal from the EAS gate, the specific tag may be configured to output a signal in a different frequency band than the EAS signal. The specific tag may further be configured to include in the transmission information regarding the state of the tag, for example information indicating that the tag is transmitting the signal in response to receiving an EAS signal from an EAS gate. The at least one receiver of the electronic security system may be configured to receive transmissions upon detection of the EAS gate by the specific tag (i.e., a signal transmitted by the specific tag after the specific tag receives the EAS signal from the EAS gate). However, the EAS gate may not detect the signal transmitted by the specific tag because the signal may be outside a range of frequencies detected by the EAS gate. For example, the EAS gate may be tuned to detect signals in a frequency range of about 7-13 MHz and/or in a frequency range of about 58-60 kHz, while the specific tag may be configured to transmit signals within a frequency band around 900 MHz and/or within a frequency band around 2.4 GHz. Thus, the specific tag (and other wireless transmitting tags disclosed herein) may be configured to come into proximity with the EAS gate, including passing through the EAS gate, without activating the EAS gate alarm.

Once a wireless transmitting tag is detected by the at least one receiver of the electronic security system, the at least one processor may be configured to determine whether the detected tag is associated with a product that has not been paid for or which is otherwise not permitted to exit the establishment. For example, the at least one processor may perform a lookup of the ID of the detected tag to determine if the tag is associated with a product that has been purchased or which is still included in the establishment's inventory list (which may indicate that the product still belongs to the establishment and has not been purchased). If the at least one processor determines that the detected tag and the associated product are not permitted to exit the establishment, the processor may cause activation of an alarm to signify, e.g., that an individual is attempting to exit the establishment with a product without paying for it.

For example, FIG. 1 depicts a customer 1104 exiting through an EAS gate 1110, 1112 with a first product 1106 with a first tag 1100a, and also with a second product 1122 with a second tag 1100b. As discussed above, tags 1100a and 1100b may receive EAS signal 1118 and, in response, output tag ID signals 1102a and 1102b. Receiver 1124 of the electronic security system may detect tag ID signals 1102a and 1102b and a processor of the electronic security system (e.g., processor 11004 of FIG. 11) may determine whether the detected ID signals 1102a and 1102b are associated with products that are authorized to pass through EAS gate 1110, 1112 (e.g., products that have been purchased or designated for return to the establishment). In some embodiments, the processor may cause activation of an alert mechanism such as an audible alert or a flashing light to signal that customer 1104 is not authorized to leave the establishment with products 1106 and 1122 (e.g., customer 1104 may have failed to pay for the products).

In disclosed embodiments, the at least one processor may be configured to disable an ability to initiate an alarm following the electronic purchase of the specific product. For example, the at least one processor may cause a temporary shutdown of some or all of the alarm-initiating components of the electronic security system following the electronic purchase. As a result, products with wireless transmitting tags may pass through the EAS gate (and optionally through other security points) without the alarms being initiated.

Additionally, or alternatively, the at least one processor may be configured to control the alarm-initiating components of the electronic security system to forego initiating an alarm when a pre-approved event occurs, even when the event would otherwise trigger an alarm. For example, specific tags and/or products in the data structure may be designated as being authorized to pass through the EAS gate without the alarm being initiated. Products designated for passage without initiating an alarm may include, e.g., products that have been sold, products that are being returned, products that are being shipped to another establishment, or products being brought in by an employee for stocking the establishment. As a result, when a designated tag (e.g., a tag of a previously purchased product) passes through the EAS gate, the at least one processor may control at least some of the alarm-initiating components of the electronic security system to forego initiating an alarm, allowing the customer to take the tagged product through the EAS gate without interruption. However, the alarm may still be activated when a non-designated tag passes through the EAS gate because the alarm-initiating components remain active.

Following completion of the electronic purchase of the specific product, the prospective purchaser owns the specific product and is free to leave the establishment with the product without interruption by an alarm. Thus, in some embodiments the at least one processor may update the data structure to include a designation that the specific tag is associated with a purchased product and therefore may pass through the EAS gate (or another checkpoint) without triggering an alarm. As a result, when a receiver of the electronic security system receives a transmission from the specific tag in proximity to the EAS gate, the at least one processor may determine that the specific tag is being brought through the EAS gate and may perform a lookup of the specific tag ID. Upon determining that the specific tag ID is associated with a previously purchased product, the at least one processor may disable an ability (e.g., of alarm components near the EAS gate) to initiate an alarm so that the specific product may be brought through the EAS gate without interruption.

Referring again to FIG. 1, at least one processor of the electronic security system (e.g., processor 11004) may initiate an electronic purchase transaction for customer 1104 to electronically purchase tagged products 1106 and 1122. Following the electronic purchase, the processor may update data structure 11006 and/or another data structure to designate products 1106 and 1122 as being authorized for passage through EAS gate 1110, 1112 without an alarm being triggered. When customer 1104 approaches the EAS gate 1110, 1112 with products 1106 and 1122, receiver 1124 may receive signals 1102a, 1102b being transmitted by tags 1100a, 1100b. The processor may perform a lookup of the detected tag IDs and determine that the tags 1100a and 1100b are associated with designated (i.e., purchased) products and may accordingly disable the alarms near EAS gate 1110, 1112. As a result, customer 1104 may exit through the EAS gate with tagged products 1106 and 1122, without being stopped or interrupted by the alarm.

In disclosed embodiments, disabling the ability to initiate the alarm may include performing a lookup of the specific tag ID to determine that the associated specific product was already purchased. For example, a data structure may be provided that contains information of sales and other transactions by the establishment, including tag IDs and/or other identifiers of sold products. The at least one processor may perform a lookup of the specific tag ID in the data structure to access information of the electronic purchase transaction to determine that the specific product associated with the specific tag ID was already purchased and is therefore authorized to pass through the EAS gate without an alarm being initiated. When it is determined that the associated specific product was already purchased, the at least one processor may update the data structure to designate the specific tag ID and/or the specific product as being authorized to pass through the EAS gate without an alarm being initiated. For example, the at least one processor may update the data structure to include an instruction not to initiate the alarm when the at least one receiver receives a transmission from the specific tag in proximity to the EAS gate, which may indicate that the specific tag is passing through the EAS gate. In some embodiments, updating the data structure to include the instruction not to initiate the alarm may include removing from the data structure an indication that the specific product is available for purchase. For example, the at least one processor may change a status indicator in the data structure of the specific product and/or the specific tag to indicate that the specific product was already purchased (and is therefore no longer available for purchase). Additionally, or alternatively, the at least one processor may remove the specific product from a list in the data structure of available inventory in the establishment. In some embodiments, updating the data structure may include, for example, changing the ownership status of the product from the establishment to the purchaser, changing the authorization of the alarm-initiating components to respond to the specific tag, or deleting the tag altogether from the data structure.

In disclosed embodiments, the at least one processor may be configured to determine, based on transmissions received by the at least one receiver, tag locations at the time of transmission. For example, a wireless transmitting tag within an establishment may transmit a signal that may be received by at least one receiver in the establishment. However, depending on the proximity to the at least one receiver, the power level of the signal received by each receiver may differ in magnitude. The at least one processor may use this magnitude data to calculate certain properties of the propagation of the signal over the communication medium, establishing such parameters as the range a signal may be detected at, a value representative of the relative or actual distance at which the signal has been transmitted, the signal-to-noise ratio, interference properties etc. In the context of wireless communication, this magnitude may be measured in units of power, usually either Watts or dBW (decibel-Watts or dB-Watts) which is a logarithmic unit related to Watts (or sometimes in units of dBm, which is related to milliwatts in the same manner dBW is related to Watts). In that sense, a power level of the signal may refer, for example, to a power measurement immediately at the input of the signal at the receiver, while the receiver is actively receiving one or more signals.

In some embodiments, the at least one processor may determine a tag location at the time of transmission (i.e., at the time the tag transmits the signal) by comparing the power levels of the signals received at each receiver and determining the location of the wireless transmitting tag at the time of transmission based on the comparison. For example, the power level of a first signal transmitted by a wireless transmitting tag and received by a first receiver may be higher than the power level of other signals from the tag received by other receivers in the establishment due to the tag being closer to the first receiver than to the other receivers. The first receiver may be associated with a given location, and therefore, based on the first receiver receiving the strongest signal and its association with the given location, it may be determined that the tag is located at that location. Similarly, multiple signal strengths detected by different receivers may be used to estimate a tag's location.

For example, using three signal strengths detected by three receivers, the at least one processor may triangulate the signals to estimate or determine the transmission source, which may correspond to the tag's location at the time of transmission.

By way of example, FIGS. 13A and 13C depict a product 13210 hanging from a shelf that may contain a wireless transmitting tag 1100 configured to transmit an ID signal 13102. Due to the proximity of tag 1100 to receiver 11300*c* (see FIG. 13C), the power level of the signal 13102 received by receiver 11300*c* may be higher than the power level of the signals 13102 received by other receivers located further away from tag 1100 (e.g., receivers 11300*b* and 11300*d*). Therefore, the at least one processor of the electronic security system may determine that the product 13210 is located on or near the shelf of FIG. 13C since the locations of receiver 11300*c* and the shelf may be known beforehand.

In some embodiments, signal strength patterns may be determined in advance for location purposes. For example, measurements taken by multiple receivers in an area (e.g., multiple receivers near the EAS gate) of signals transmitted by a wireless transmitting tag may result in a recognizable pattern that can be matched to determine a tag's location in the future. Tag readings may be collected from throughout the establishment to correlate signal strength patterns with actual locations. The correlations may be stored in a data structure. Then, in the future, a look-up may be performed on signals from a wireless transmitting tag to identify the tag's location based on the stored data. Similarly, the at least one processor may learn over time, using artificial intelligence.

In disclosed embodiments, the at least one processor may be configured to determine tag proximity to the EAS gate based at least in part on the determined tag locations. For example, the location of the EAS gate and/or receivers near the EAS gate may be known beforehand. The at least one processor may therefore compare the determined tag location to the location(s) of the EAS gate and/or receivers near the EAS gate to determine the tag's proximity to the EAS gate. For example, if the distance between the specific tag's location and the EAS gate is less than a predetermined threshold (e.g., 1 meter), the at least one processor may determine that the specific tag is being transported through the EAS gate. The at least one processor may therefore perform a lookup of the specific tag ID and, if appropriate, disable the ability of components near the EAS gate to initiate an alarm. Additionally, or alternatively, the proximity of the tag to the EAS gate may be ascertained by the at least one processor based on the range of transmission of the EAS gate signals, outside of which the specific tag would not receive the EAS gate signal and therefore would not transmit.

For example, FIG. 13D shows a customer approaching an EAS gate 1110, 1112 with a product having a wireless transmitting tag 1100. Receivers such as receiver 11300*h* may receive the signals 13102 transmitted by the tag so that the at least one processor may determine the tag's location. The processor may compare the tag's determined location to a known location of the EAS gate 1110, 1112 and/or another reference point to determine the proximity of tag 1100 to the EAS gate. If tag 1100 is sufficiently close to EAS gate 1110, 1112 (e.g., if the distance between the tag and gate is less than a predetermined threshold), the at least one processor may conclude that tag 1100 is being transported through EAS gate 1110, 1112.

In disclosed embodiments, the at least one processor may be configured to process data associated with a plurality of establishments. As used herein, data "associated with" a plurality of establishments may include data pertaining to or collected from the plurality of establishments, data received from processors in the plurality of establishments, data contained in data structures of the plurality of establishments, or data that is otherwise related to or derived from the plurality of establishments. In some embodiments, the at least one processor may be configured to connect to the plurality of establishments (and networks and/or processors therein) via Wi-Fi connection, a Wide Area Network (WAN) connection, a wired and/or wireless Local Area Network (LAN) connection, or any other means of communication. Additionally, or alternatively, at least some of the plurality of establishments may be connected to separate LANs. For example, each establishment may be connected to a separate LAN or, alternatively, two or more of the establishments may be connected to the same LAN. In such embodiments, the at least one processor may be configured to connect to the LAN of each establishment (e.g., via a WAN or another networking configuration) so that the at least one processor may access and process data associated with each establishment, such as data transmitted to the at least one processor from a processor associated with each individual establishment. In some embodiments, all of the establishments may be of the same type (e.g., all of the establishments may be retail establishments owed by the same entity). Alternatively, the plurality of establishments may include different types of establishments, as defined above.

In disclosed embodiments, the at least one processor may be configured to access a plurality of data structures, each of the plurality of data structures being uniquely associated with one of the plurality of establishments. As used herein, being "uniquely associated" with one establishment may mean that each data structure has a networking connection (e.g., via LAN, Wi-Fi, etc.) with the components of a single one of the establishments and, optionally, that the physical components of each data structure are located within the corresponding establishment. Additionally, or alternatively, being "uniquely associated" with one establishment may mean that each data structure is used to store data that is collected from, related to items or products associated with, or otherwise uniquely associated with the corresponding establishment. Additionally, or alternatively, being "uniquely associated" with one establishment may mean that access to a data structure may be restricted to persons working for the corresponding establishment or who may otherwise have a relationship with the establishment that necessitates access to the data structure. Persons granted access to the data structure may include, for example, employees of the establishment, persons who oversee or supervise those employees (e.g., corporate officers), and/or persons granted access to the data structure for another reason. In some embodiments, each establishment may have its own LAN including at least one data structure. The at least one processor of the electronic security system may be configured to connect to the LAN of each establishment so that the at least one processor may access, change, add, duplicate, or remove data from each data structure. Additionally, or alternatively, the data structures uniquely associated with each establishment may reside together in a single location, not adjacent to, within, or associated with, the plurality of establishments, and the association between each of the plurality of data structures and each of the plurality of establishments may be a purely logical one.

In the example shown in FIG. 17, the electronic security system may include a WAN 17310 interconnecting a plurality of establishments 17312, 17314, and 17316. Each establishment 17312, 17314, and 17316 may be connected to its own data structure (e.g., data structure 11006 of FIG. 11); the data structure may, in turn, be uniquely associated with the corresponding establishment, as discussed above. In some embodiments, the at least one processor may be associated with the same establishment as the data structure and may therefore use local networking means (e.g., Wi-Fi, Bluetooth, cellular communication, Ethernet, etc.) to access the data structure. Alternatively, the at least one processor and the data structure may be situated in different locations (as a non-limiting example, the data structure may be associated with an establishment 17312 while the at least one processor may be situated within a business office 17318 or a different establishment 17314). The at least one processor may connect to the data structure via WAN 17310 and may access, change, add, duplicate, or remove data from the data structure.

In disclosed embodiments, the electronic security system may include a plurality of transmitters for wirelessly sending power to the wireless transmitting tags. As used herein, a transmitter may include any component, group of components, or circuitry capable of sending a signal over a wired and/or wireless medium. The signal may be, for example, a Wi-Fi signal, Bluetooth signal, cellular communication, Ethernet communication, a radio signal, a magnetic or electric field, an audible or ultrasound signal, a light signal, a mechanical vibration, or any other means of transmitting energy and/or information. The signal emitted by a transmitter may be received by a second device which may, in various embodiments, be triggered to perform a predefined action upon receiving the signal.

Consistent with the present disclosure, the plurality of transmitters may be configured to wirelessly send power to the wireless transmitting tags in the form of radio signals, a magnetic or electric field, an audible or ultrasound signal, a light signal, a mechanical vibration, or any other form of energy that may be wirelessly transmitted to the tags. The wireless transmitting tags may, in turn, include antennae or other receivers for receiving the transmitted power. The plurality of transmitters may emit a constant, intermittent, or periodical signal to power the tags and may, in some embodiments, be designed to have an adjustable transmission frequency and/or an adjustable transmission power level. In some embodiments, the plurality of transmitters may include dedicated exciters configured to wirelessly send power to the tags in accordance with a received control signal and/or dedicated programming. Additionally, or alternatively, the plurality of transmitters may include ambient energy sources such as sunlight, wind, vibration, sound, heat, and radio frequency signals. In some embodiments, transmitters may be positioned within or around the establishment in order to transmit power signals throughout the entire establishment; transmitters may be affixed to certain structures in the establishment (e.g., walls, ceilings, racks, displays, or other fixtures or components), located on or above the ceiling, on or under the floor, on or behind the walls, provided on a mobile or movable device (e.g., a smartphone or handheld scanner), or affixed to any other stationary or mobile structure. In some embodiments, the at least one processor may be configured to transmit a trigger command to the transmitters, which may cause the transmitters to send the power signals to the tags.

For example, FIGS. 13A-13D depict a plurality of transmitters 13400a-13400e configured to wirelessly send power signals 13118 to wireless transmitting tags 1100. In this example, transmitters 13400a-13400e may be configured as exciters mounted to the ceiling or walls around the establishment. Wireless tags 1100 may receive and harvest the energy from signals 13118 and may use the harvested energy to power their operations, including transmitting ID signals 13102. In some embodiments, transmitters 13400a-13400e may receive a trigger signal from a processor 11004 of the establishment and, in response, send power signals 13118 to the tags. Additionally, or alternatively, transmitters 13400a-13400e may be pre-programmed to send the power signals 13118, such as on a predetermined schedule or when it is determined that one of the wireless tags in the establishment is low on power.

In some embodiments, the plurality of transmitters may be configured to wirelessly send power within a frequency band around 900 MHz to the wireless transmitting tags. As used herein, a frequency band around 900 MHz may refer to any one or more portions of the ultra-high frequency (UHF) band generally reserved for RFID purposes in any region or jurisdiction. Examples may include the UHF RFID frequency bands of 902-928 MHz (used in the United States), 865-868 MHz (used in the European Union), and 952-956.4 MHz and 952-957.6 MHz, both of which are outside the standard UHF RFID range but were previously used in Japan for UHF RFID purposes and for purposes of this disclosure and in this context, are within a frequency band around 900 MHz.

Additionally, or alternatively, the plurality of transmitters may be configured to wirelessly send power within a frequency band around 2.4 GHz to the wireless transmitting tags. As used herein, a frequency band around 2.4 GHz may refer to any one or more portions of the UHF band designated for the use of radiofrequency energy in a wide variety of scientific, medical, and industrial applications. Services and users of a frequency band around 2.4 GHz may use certain radiocommunication technologies, such as Wi-Fi, Bluetooth Low Energy (BLE), and Classic Bluetooth, for wireless local area networking and personal area networking. Many jurisdictions may reserve one or more of a plurality of frequency bands in the standard 2.4 GHz range for such technologies; however, some jurisdictions may adopt multiple bands and/or other unique bands outside of this standard. As with frequency bands generally designated for UHD RFID, the frequency bands around 2.4 GHz designated for similar purposes may vary according to region and jurisdiction and may be subject to change. For example, according to the Institute of Electrical and Electronics Engineers (IEEE) 802.11, a set of local area network (LAN) protocols specifies a set of media access control (MAC) and physical layer (PHY) protocols for implementing WLAN Wi-Fi communications in frequencies including frequency bands around 2.4 GHz and is the world's most widely used standard for wireless computer networking. Over time, the IEEE has amended 802.11 to designate frequency bands outside of the 2.4 GHz range for similar purposes, such as 5 GHz and even 60 GHz. Therefore, it may be contemplated that the standard frequency ranges for wireless computer networking may be subject to change in the future. Accordingly, it is to be understood that "bands around 2.4 GHz" may refer to a wide range of potential frequency bands, consistent with the present disclosure.

In some embodiments, the wireless transmitting tags may be configured to harvest the energy sent from the plurality of transmitters and use the harvested energy to power the operations of the tags. The energy may be harvested, for example, by a harvesting circuit and stored by an energy storage component of the tag or any element or circuits enabled to accumulate energy. By way of example, an exemplary wireless transmitting tag 1100 illustrated in FIG. 9 may include an antenna 2112 tuned to receive energy from a transmitter in a frequency below 1 GHz (e.g., energy in a frequency band around 900 MHz) and to convey harvested energy to a 900 MHz harvester 9012. Additionally, or alternatively, tag 1100 may include an antenna 2114 tuned to receive energy from a transmitter in a frequency band around 2.4 GHz and to convey harvested energy to a 2.4 GHz harvester 9014. Harvested energy may be stored in energy storage circuit 2108 and subsequently used to power the operations of wireless transmitting tag 1100, including powering the transmissions by transmitter 2104.

Figure 15:
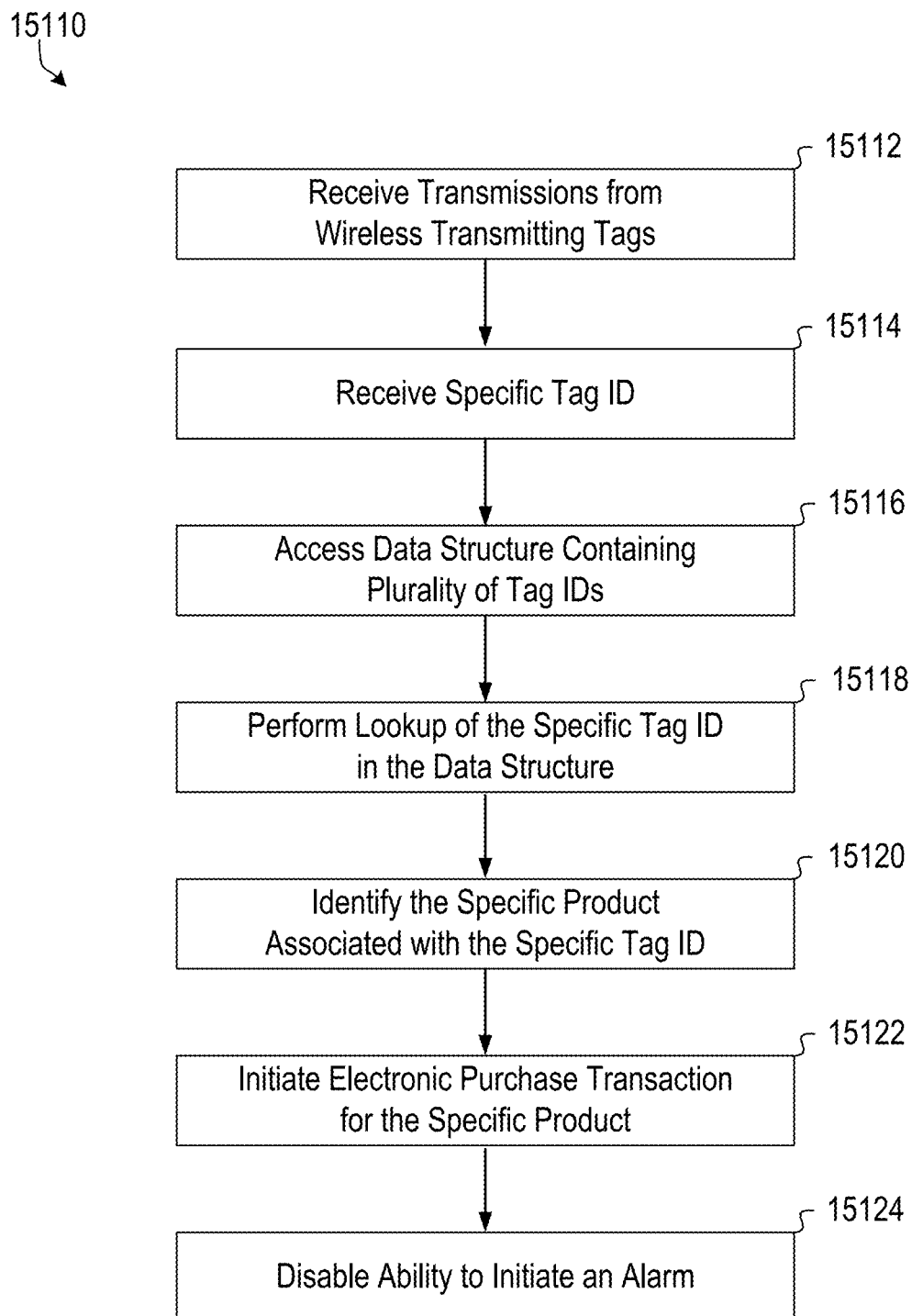
FIG. 15 is a flow chart illustrating an example of inventory control operations, consistent with some disclosed embodiments.

FIG. 15 is a flowchart illustrating an exemplary process 15110 for inventory control operations, consistent with disclosed embodiments. Process 15110 is provided by way of example, and a person of ordinary skill would appreciate various other processes for inventory control consistent with this disclosure. At step 15112, process 15110 may include receiving transmissions from a plurality of wireless transmitting tags. In some embodiments, the transmissions may be received by least one receiver of an exemplary electronic security system. At step 15114, process 15110 may include receiving a specific tag ID from a device operated by a prospective purchaser. The specific tag ID may be associated with a specific one of the plurality of wireless transmitting tags (e.g., a specific tag), which may, in turn, be associated with a specific product for prospective purchase from the establishment. At step 15116, process 15110 may include accessing a data structure containing a plurality of tag IDs. The tag IDs may be associated with a plurality of products in the establishment. For example, each tag ID may be associated with a single product and may uniquely identify that product. At step 15118, process 15110 may include performing a lookup in the data structure of the specific tag ID. At step 15120, due to the association between the specific tag and the specific product, performing a lookup of the specific tag ID may identify the specific product and enable information of the specific product to be accessed from the data structure. At step 15122, process 15110 may include initiating an electronic purchase transaction for the specific product. The electronic purchase transaction may be performed for an electronic purchase of the specific product and may debit an account associated with the prospective purchaser of the specific product. At step 15124, process 15110 may include disabling an ability to initiate an alarm when a transmission is received from the specific tag in proximity to an electronic article surveillance (EAS) gate associated with the establishment.

Disclosed embodiments may include an electronic security system for verifying buy online, pickup in-store (BOPIS) transactions and protecting against the theft of previously-purchased products. Under one exemplary model, customers may remotely purchase desired items such as food, electronics, and home goods, without the need to order them in-store, e.g. through a website associated with an store, through phone ordering or via other means. Once the store has fulfilled the order, the customer may come into the store and pick-up the purchased items without waiting in line or interacting with store staff. One example of such a model, referred to as BOPIS, avoids the downsides of delivery services such as delivery fees, order fulfillment errors, and long delivery wait times.

A disadvantage of the BOPIS model is the risk of theft and order mix-ups. In many cases, establishments using the BOPIS model keep fulfilled orders in a dedicated storage, with only staff having access to that area. This requires that customers who wish to use the BOPIS model need to find a staff member with access to the dedicated BOPIS storage (possibly after standing in line and waiting), identify themselves to that person, and then waiting for that person to go to the dedicated BOPIS storage and retrieve their package. This implementation results in a sub-optimal user experience for the customer, and an increased burden on the staff, reducing the advantages of BOPIS. In some cases, establishments using the BOPIS model have a designated area (e.g., a shelf or table) where fulfilled orders are left by store staff to be picked up by the purchaser. Thieves may pose as the purchaser and take items, for which someone else has paid, from the designated area. Also, customers may inadvertently pick-up another customer's order, leaving multiple customers without the items for which they have already paid. Thus, there is a need, such as with the BOPIS model, for protecting against theft of fulfilled orders while also streamlining the pick-up process to minimize the occurrence of order mix-ups.

Disclosed embodiments may involve systems, methods, and computer readable media for verifying and controlling the in-store pick-up of purchased products. Embodiments may include an electronic security system for an establishment offering in-store pick-up of products which are attached to, or otherwise associated with, wirelessly transmitting tags. A customer may purchase products via an out-of-store transaction, such as online or via telephone. When the customer arrives at the store to retrieve her order, she may notify the electronic security system via a mobile device, such as a smartphone or tablet. Based on the notification, anti-theft alarms and other protections in the store may be deactivated so that the customer may retrieve the purchased products and exit without incident. However, the anti-theft alarms and other protections may remain active for all tagged products that have not been purchased or for which the system has not received a pick-up notification from the purchaser. Thus, when a thief tries to take a product from the store without purchasing it or when a customer retrieves the wrong order, the electronic security system may detect the tag associated with the product and initiate the anti-theft alarms and other protections. Advantageously, disclosed embodiments may provide efficient and contact-free BOPIS transactions while also preventing the theft or mix-up of customer orders.

Disclosed embodiments may include an electronic security system as described elsewhere in this disclosure. The electronic security system may be further configured to include in the alarm, notification or documentation other information relating to the attempted intrusion or theft, such as an identity or presumed identity of a person or persons identified or presumed identified as participating in the event, or an identification or presumed identification of an object or objects involved in the event (including, but not limited to, an object whose theft is being attempted, or other objects identified or presumed identified during the event which are not the subject of the attempted theft or unauthorized intrusion). The electronic security system may additionally include other elements, circuitry, circuit components, and systems that may be beneficial to detect and/or signal an unauthorized intrusion, an attempted robbery, burglary, or theft, or another loss at the designated location. An electronic security system may include one or more of the foregoing elements.

In disclosed embodiments, the electronic security system may be provided for an establishment offering in-store pick-up of previously purchased products. In some embodiments, in-store pick-up of previously purchased products may refer to a practice by which a customer, or another person authorized to act on the customer's behalf, buys, rents, leases, or otherwise acquires one or more products from an establishment while not being physically present at the establishment, and at a later time takes physical custody of the products from the establishment. Thus, between the time of the purchase and the retrieval of the products by the customer, the products may be in the possession or control of the establishment (e.g., held within the establishment) but may be owned or otherwise rightfully possessed by the customer. In some embodiments, the customer may purchase the products remotely, such as via telephone or on a website or application associated with the establishment. In some cases, such remote purchase (e.g. via an app or website) might occur while the purchaser is physically in the establishment or in its vicinity, but wishes to not collect the purchased products immediately but rather have them ready for pick-up at some later time. An employee of the establishment may then gather and pack the products that were purchased by the customer and leave the products at a designated pick-up area from which the customer may retrieve them; example pick-up areas may include a designated shelf or table within the establishment. Additionally, or alternatively, the customer may purchase the products at the establishment and leave the products at the establishment for retrieval at a later time. In some embodiments, the customer (or another authorized to act on the customer's behalf) may enter the establishment to retrieve the products and may exit with the products in their possession. Additionally, or alternatively, the customer may remain outside in the vicinity of the establishment (e.g., in their automobile) and employees of the establishment may bring the products out to the customer (i.e., curbside pick-up). In some embodiments, the electronic security system may notify the customer when their order is ready for pick-up, such as via text message, email, phone call, or pager.

In some disclosed embodiments, the previously purchased products may have associated wirelessly transmitting tags. As disclosed herein, a wirelessly transmitting tag may include any wirelessly detectable device, such as, for example, a radio-frequency identification (RFID) device, a Bluetooth Low Energy (BLE) beacon device, a near field communication (NFC) device, a device including a microcontroller powered by radio-frequency energy, or any other structure configured to transmit signals capable of detection. In disclosed embodiments, a wirelessly transmitting tag may include at least one antenna or any other component, circuit and/or device configured for receiving and/or outputting energy from the air or from any other medium. For example, the wirelessly transmitting tag may be configured to receive and/or output electromagnetic radiation, electric fields, magnetic fields, acoustic signals (such as in sonar applications), or optical signals (such as in laser applications). In some disclosed embodiments, the wirelessly transmitting tags may be configured to transmit signals in one or more predetermined frequency bands. Some non-limiting examples of a predetermined frequency band may include a frequency band around 900 MHz (which may include, e.g., ultra-high frequency RFID signals), a frequency band around 2.4 GHz (which may include, e.g., Bluetooth and Wi-Fi), and a frequency band around 13.6 MHz (which may include, e.g., high-frequency RFID and NFC). In some embodiments, the wirelessly transmitting tag may not require a battery but may operate on harvested energy (as disclosed herein).

Disclosed embodiments may include in-store pick-up of products. For example, in-store pick-up of products may refer to a transfer of possession or control over one or more products (and, optionally, transfer of ownership) from an establishment to another person or entity, such as a purchaser of the products. In some embodiments, the person picking up the products may buy, rent, lease, or otherwise acquire the products beforehand (e.g., the products may be previously purchased products) or at the time of taking custody. In some embodiments, the person picking up the products may enter the establishment to retrieve the products and may exit with the products in their possession. Additionally, or alternatively, the person picking up the products may remain outside in the vicinity of the establishment (e.g., in their automobile) and employees of the establishment may bring the products out to them. In some embodiments, the electronic security system may notify the person picking up the products when the products are ready for pick-up, such as via text message, email, phone call, or pager. In disclosed embodiments, the products may be associated with wirelessly transmitting tags, as discussed above.

By way of example, FIG. 16 illustrates an electronic security system for an establishment offering in-store pick-up of previously purchased products. Products sold in the establishment shown in FIG. 16 may have associated wirelessly transmitting tags, such as tags 1100. The electronic security system depicted in FIG. 16 may include EAS gates (discussed below) 1110, 1112 at each entrance, transmitters 13400a-13400e configured to deliver energy to the tags 1100, and receivers 11300a-11300h configured to detect transmissions from the tags 1100. In some embodiments, customers may purchase products within the establishment, such as at a check-out counter, via self-service kiosk 16010, or by completing the purchase on a mobile device (e.g., user device 11008 of FIG. 11). Once the purchase of a tagged product is complete, the electronic security system may be configured to disable alarm 1114 so that the customer may exit the establishment without interruption. Additionally, or alternatively, customers may purchase products remotely (e.g., online, on an application, or via telephone) and come into the establishment to pick-up their purchased products. The establishment may include a designated pick-up area such as a shelf 13240, where staff of the establishment may leave orders that have been placed in a package 16012 and are ready for pick-up. As discussed in detail below, the electronic security system may be configured to disable alarm 1114 when a customer comes into the establishment to pick-up her purchased products, so that the customer may exit the establishment without interruption.

Disclosed embodiments may include at least one electronic article surveillance (EAS) gate. As disclosed herein, an EAS gate may include a surveillance or theft-deterrent system having at least one antenna or transmitter configured to transmit a wireless signal to a security tag attached to, or otherwise associated with, a product brought into proximity with the EAS gate. In response to receiving the wireless signal from the EAS gate, the security tag may be configured to output a second wireless signal which may be used to trigger an anti-theft alarm. In some embodiments, the antenna or transmitter of the EAS gate may be incorporated within one or more pedestals located near the entrance or exit of the establishment or at another designated location. Additionally, or alternatively, the EAS gate may include a concealed EAS gate.

By way of example, FIG. 13D illustrates an exemplary EAS gate including a first pedestal 1110 and a second pedestal 1112, each pedestal having a transmitter configured to transmit an EAS signal 13118c within a predetermined frequency band, such as the band of 58-60 kHz (AM-EAS waves) and/or the band of 7-13 MHz (RF-EAS waves). EAS gate 1110, 1112 may also include an EAS receiver configured to receive wireless signals within the same frequency band as EAS signal 13118c. For example, the EAS receiver may receive a signal that is transmitted by an EAS security tag that is brought into proximity with EAS gate 1110, 1112 and triggered by EAS signal 13118c. Upon receiving the wireless signals in the same frequency band as EAS signal 1118, the EAS receiver may trigger an alarm indicating the passage of a tagged product through the EAS gate 1110, 1112.

In some embodiments, an exemplary wirelessly transmitting tag 1100 may be configured to detect EAS signal 13118c when a product associated with the tag passes through EAS gate 1110, 1112. For example, the electromagnetic energy of EAS signal 13118c may be received by a coil 2110 of the wirelessly transmitting tag 1100, thereby activating or triggering the tag. Upon activation, wirelessly transmitting tag 1100 may transmit an ID signal 13102 (e.g., with transmitter 2104 depicted in FIGS. 2 and 9). ID signal 13102 may have a different frequency than EAS signal 13118c (e.g., ID signal 13102 may have a frequency around 2.4 GHz and EAS signal 13118c may be within a frequency band between 58-60 kHz or 7-13 MHz). In some embodiments, an EAS receiver of gate 1110, 1112 may not be triggered by ID signal 13102 because ID signal 13102 may be outside the specified frequency band of the EAS receiver. In some embodiments, the wireless transmitting tag 1100 may not generate any signal or interfere with any signal generated by the EAS gate 1110, 1120 such that the tag cannot be detected by the EAS gate's receiver 1120. Instead, the electronic security system may include another receiver 11300h configured to receive ID signal 13102 and take one or more corresponding actions, such as activating an alarm or transmitting a signal to at least one processor for completion of an electronic purchase of the product associated with tag 1100.

Disclosed embodiments may include at least one receiver configured to receive transmissions from the wirelessly transmitting tags. For example, FIGS. 13A-13D depict an exemplary electronic security system including a plurality of receivers 11300a-h distributed throughout the establishment to receive broadcasts of signals from the wireless tags 1100 and other transmitting devices. Receivers 11300a-h may be affixed or otherwise attached to walls, ceilings, racks, displays, or any other fixtures or components within the establishment capable of supporting the receiver. As shown in FIG. 13B, receivers 11300a-h may be configured to receive transmissions of ID signal 13102 from wirelessly transmitting tag 1100. Each receiver 11300a-h may include at least one of a first antenna 2112 tuned to receive energy at a frequency around 900 MHz (e.g., RFID signals) and a second antenna 2114 tuned to receive energy at a frequency around 2.4 GHz (e.g., Wi-Fi, Bluetooth Low Energy (BLE), or Classic Bluetooth). As shown in FIG. 11, receivers 11300a-h may be configured to receive data transmissions from wirelessly transmitting tags 1100 and to transmit the data to other components of wireless identification system 11000 via network 11002.

Disclosed embodiments may include at least one processor. As discussed above, the at least one processor may include any kind of electronic device, component or unit with data processing capabilities, including, by way of non-limiting example, a personal computer, a wearable computer, a tablet, a smartphone, a server, a computing system, a cloud computing platform, a communication device, a digital signal processor (DSP), an image signal processor (ISR), a microcontroller, a field programmable gate array (FPGA), an application specific integrated circuit (ASIC), a central processing unit (CPA), a graphics processing unit (GPU), a visual processing unit (VPU), any other electronic computing device, or any combination of the above. In some embodiments, the at least one processor may include more than one processor. Each processor may have a similar construction, or the processors may be of differing constructions that are electrically connected or disconnected from each other. As non-limiting examples, the at least one processor may include processor(s) 11004 of FIG. 11 and/or a processor(s) of Wide Area Network (WAN) 17310 of FIG. 17.

Disclosed embodiments may involve receiving transmissions from at least one of the wirelessly transmitting tags. As discussed above, the transmissions from the wirelessly transmitting tags may be received by the at least one receiver. Additionally, or alternatively, the transmissions may be received by another component of the electronic security system. In disclosed embodiments, receiving transmissions from at least one of the wirelessly transmitting tags may include receiving transmissions from one tag, from multiple tags, or from all of the tags. In some embodiments, transmissions may be received from the at least one wirelessly transmitting tag in response to receipt of an external stimulus by the at least one tag. For example, the at least one wirelessly transmitting tag may broadcast the transmissions in response to receiving energy from an exciter (such as transmitters 13400a-13400e of FIGS. 13 and 16), when triggered by a user device (such as user device 11008), and/or in response to an EAS signal from EAS gate 1110, 1112. Additionally, or alternatively, the at least one wirelessly transmitting tag may include an internal timing circuit configured to trigger the tag's transmissions according to a desired timing sequence, such as after a predetermined period elapses between transmissions, after a predetermined sequence of events is detected, or according to a randomized timing sequence. For example, and as illustrated in FIG. 10, an exemplary wirelessly transmitting tag 1100 may include a crystal oscillator 10022 (an example of a timing circuit), which may provide a reference clock signal to the tag's top-level controller 9020 to control the timing of transmissions by transmitter 2104. Additionally or alternatively, tag 1100 may include a real time clock 10024 (another example of a timing circuit), which may provide a slow clock signal to top level controller 9020 to control the timing of transmissions by transmitter 2104.

Disclosed embodiments may include an out-of-store product purchase. As used herein, an out-of-store product purchase may refer to a transaction in which a purchaser buys, rents, leases, or otherwise acquires a product from an establishment, with the purchaser initiating or executing the transaction from a location other than the establishment. The purchaser may be located at any desired location at the time of the transaction, such as in a home, business, vehicle, school, university, government building, religious building, or outdoors. In some embodiments, the purchaser may perform the out-of-store product purchase via a website or application associated with the establishment, by electronic correspondence (e.g., email, text message, or messaging services such as WhatsApp, Facebook Messenger, and Skype), over the telephone, in writing (e.g., via written order or letter), or by any other method for remotely purchasing a product from an establishment.

In disclosed embodiments, the out-of-store product purchase may include an electronic credit card transaction. For example, once the purchaser initiates or executes the out-of-store product purchase, a processor performing the out-of-store product purchase may be configured to charge the purchase on a credit card, debit card, or other instrument held by the purchaser or which the purchaser has been authorized to use to complete the out-of-store product purchase. As another example, a website or application on which the purchaser performs the out-of-store product purchase may prompt the purchaser to enter her credit card information to complete the transaction. As another example, the website or application may prompt the purchaser to select a credit card, debit card, or other instrument from a digital wallet information to complete the transaction. Additionally, or alternatively, the out-of-store product purchase may include debiting an account owned or otherwise associated with the purchaser. For example, the processor performing the out-of-store product purchase may be linked to a bank account or digital wallet account held by the purchaser (e.g., PayPal, Venmo, Apple Pay, Zelle) so that the processor may debit funds from the account to complete the out-of-store product purchase.

As an example, FIG. 17 depicts a Wide Area Network (WAN) 17310 for communication with a banking or digital wallet platform 17320. In some embodiments, a processor performing the out-of-store product purchase (e.g., a computer or mobile communications device in another location 17324 such as the purchaser's home, or a processor within an establishment 17312) may be configured to access a banking or digital wallet platform 17320 associated with the purchaser to access funds for completion of the out-of-store product purchase. For example, the processor may be configured to access the banking or digital wallet platform 17320 to initiate the electronic credit card transaction or to transfer funds from the purchaser's account to an account associated with the establishment.

Disclosed embodiments may include accessing a purchase transaction record of an out-of-store product purchase. For example, one or more processors may be configured to access a purchase transaction record of an out-of-store product purchase. A purchase (or purchase transaction) may include an economic transaction where one party (a seller) provides a product or a service (the purchased product) to a second party (the buyer), and the second party provides compensation (money, money-equivalent assets, another product or service, or a commitment to provide such compensation at some future time) in return. A purchase (or purchase transaction) may be performed in a place of business of the seller (e.g. a store), where the product or service is provided to the buyer immediately, or remotely as in over a phone call or internet connection, where the product or service is committed to be provided to the buyer at some future time (e.g. by delivery, or by the buyer coming to the seller's place of business or to some other agreed-upon location, to receive the product or service). In disclosed embodiments, a purchase transaction record may include an entry in a data structure containing the required information describing a specific purchase, including the seller, the buyer, the provided product or service, the compensation, the times at which the product or service is provided to the buyer, and/or at which the compensation is provided to the seller. A purchase transaction record may include data associated with transactions to which the establishment was a party, including purchases, sales, conveyances of products, and/or any other interaction between the establishment and another individual or entity resulting in the transfer of ownership or possession of a product from one party to another party. In disclosed embodiments, the purchase transaction record may include information related to purchased products. For example, the purchase transaction record may include an identification of at least one purchased product. In some embodiments, an identification of at least one purchased product may include a unique identifier of the purchased product such as a serial number, unique EPC code, stock keeping unit (SKU), universal product code (UPC), barcode, QR code, a unique database entry, or any other identifying information of the at least one purchased product. The identification may additionally or alternatively be associated with a group of purchased products. For example, a group of purchased products which were purchased in the same transaction may be bundled together and share a common ID. Additionally, or alternatively, an identification of at least one purchased product may include descriptive information of the product such as the product's style, price, size, weight, color, purchase history, and/or location. Additionally, or alternatively, an identification of at least one purchased product may include information of the out-of-store product purchase, such as an order number, timestamp, and/or price information.

Additionally, or alternatively, the purchase transaction record may include information related to purchasers of products from the establishment. For example, the purchase transaction record may include purchaser-identifying information of a purchaser associated with the at least one purchased product. In some embodiments, a purchaser associated with the at least one purchased product may include an owner or rightful possessor of the purchased product, an individual who executed the out-of-store product purchase, the owner of a device (e.g., computer or smartphone) on which the out-of-store product purchase was performed, or an individual authorized to pick-up the purchased product from the establishment. As used herein, purchaser-identifying information may include information sufficient to identify a person (e.g., purchaser, buyer) who participated in a specific purchase transaction. For example, purchaser-identifying information may include a unique identifier of the purchaser, such as their name, physical address, email address, birthday, customer number, loyalty program number, account number, credit or debit card information, a unique password or pass code, social security number, government-issued ID information (e.g., driver's license number), and/or any other information that is unique to the purchaser or that may be used to link the purchaser to a specific purchase transaction. Additionally, or alternatively, purchaser-identifying information may include information of an electronic device owned or used by the purchaser, such as a phone number, mobile device identifier, unique device identifier (UDID), Android ID, international mobile equipment identity (IMEI), SIM card number, media access control (MAC) address, serial number, or any other information that is unique to the purchaser's device. In some embodiments, the purchase transaction record may include a purchase history of individual customers, including the purchaser associated with the at least one purchased product. Additionally or alternatively, the purchaser identification information may be unique to the transaction. For example, the system may assign a unique identifier to a particular transaction involving one or more items.

Additionally, or alternatively, the purchase transaction record may include information of individual transactions, including out-of-store product purchase transactions. For example, the purchase transaction record may include the establishment from which a product was purchased, the date and time of a transaction, the employee who completed a transaction, a register or self-checkout device number, the number, type, style or other information related to the products in the transaction, pricing information (e.g., total retail price, the price of individual products, taxes, promotional amounts (e.g. coupons), discounted price, and markdown amounts), the tender type and amount (e.g., cash, credit, check, charge, or coupon), specific information about each tender (e.g., credit card number, coupon identifier, and check number), and/or a unique identifier assigned to the transaction (such as an order number).

In some embodiments, the purchase transaction record may be stored in at least one data structure that may be accessible by the at least one processor and other authorized users and which may be configured to enable queries and retrieval of information therefrom. For example, the data structure may include at least one of a local data structure and a remote storage component (e.g., a cloud-based data structure). In some embodiments, data included in the purchase transaction record may be received from a device or processor used to conduct a given transaction and added to the purchase transaction record. For example, purchase transaction information may be received from a mobile communications device, a cash register, a desktop computer, a laptop, a tablet, a handheld scanner, a computer terminal, or any other device configured to perform a transaction and convey information to the purchase transaction record. Additionally, or alternatively, information associated with a transaction may be entered manually into the purchase transaction record. The at least one processor may be configured to access the purchase transaction record directly (e.g., via a Local Area Network connection) or indirectly (e.g., via a Wide Area Network connection). In some embodiments, the purchase transaction record may be stored in the same data structure as the information associated with the wirelessly transmitting tags (e.g., unique tag IDs of each wirelessly transmitting tag). In alternative embodiments, the purchase transaction record and the information associated with the tags may be stored in different data structures, all of which may be accessed by the at least one processor.

Figure 18:
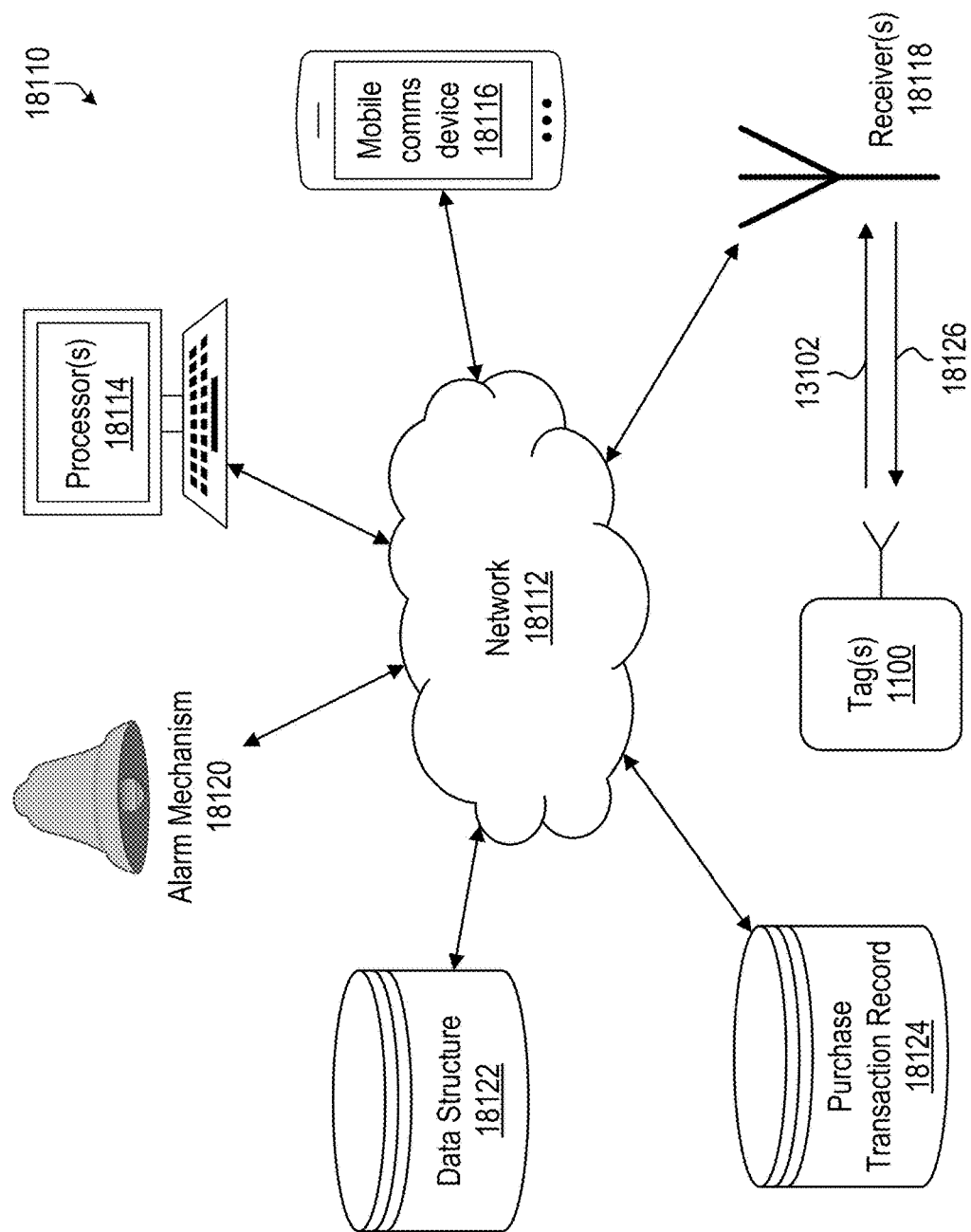
FIG. 18 is a network diagram of an exemplary wireless identification system for in-store pick-up of previously purchased products, consistent with disclosed embodiments.

FIG. 18 is a network diagram of an exemplary wireless identification system 18110 for in-store pick-up of previously purchased products. In some implementations, system 18110 may be established within, or otherwise associated with, at least one establishment as defined herein. System 18110 may include network 18112 enabling the exchange of data and/or information between elements of the system such as processor(s) 18114, mobile communications device 18116, receiver(s) 18118, alarm mechanism 18120, data structure 18122, and purchase transaction record 18124. Network 18112 may include any type of wired and/or wireless computer networking arrangement configured for exchanging data. As non-limiting examples, network 18112 may include a local Wi-Fi connection in the at least one establishment, a wired or wireless Local Area Network (LAN) connection, or a Wide Area Network (WAN) connection.

System 18110 may include at least one alarm mechanism 18120 configured to initiate an alarm when, for example, an unauthorized intrusion into the establishment, an attempted robbery or theft, or another loss is detected. Alarm mechanism 18120 may include an audible alert (such as speakers or a siren), a visual alert (such as lights or graphic displays), a haptic alert, a digital message, or any other transmission that conveys the desired information. In some embodiments, alarm mechanism 18120 may include fixed infrastructure within the establishment (such as alarm 1114, which may include speakers, lights, and/or graphic displays), which may include components arranged at strategic locations around the establishment such as at the entrance and/or exit, near a checkout counter or self-checkout kiosk, in a storage area, or next to the fitting rooms.

System 18110 may include at least one mobile communications device 18116 configured for wired and/or wireless communication with network 18112. In some embodiments, mobile communications device 18116 may include a user device such as a cellular phone, smartphone, tablet, desktop, laptop, PDA, handheld scanner, wearable device, or other mobile computing device having computer programs (examples of applications) for controlling the operations of device 18116. For example, mobile communications device 18116 may include a user device 11008. In some embodiments, device 18116 may be configured to receive a user input and to transmit a corresponding signal to network 18112. For example, user input may be received via a user interface (e.g., a touchscreen, keypad, or microphone), by collecting at least one image with a camera of the device 18116 (e.g., capturing an image of a wirelessly transmitting tag 1100 or of a barcode or QR code associated with a product or a package holding a product), by wired or wireless transmission of a user input to the device 18116, or by any other means of conveying a user input to device 18116. Additionally, or alternatively, device 18116 may include at least one user interface configured to output a notification signal to the user, such as an audible signal, a visual signal, a haptic signal, or another sensory signal; examples of a user interface may include a display screen or a speaker.

Wireless identification system 18110 may include one or more receivers 18118 configured to receive broadcasts of signals from wireless tags 1100 and to exchange data and/or information with network 18112. Receivers 18118 may be configured to receive one or more identification signals 13102 from tags 1100 and to transmit data of the received identification signals (e.g., a tag ID specified by the identification signal 13102 and/or a strength or power level of the signal) to network 18112. In some embodiments, receivers 18118 may also be configured as exciters for delivering energy 18126 to be collected and stored by the wireless tags 1100. However, persons of ordinary skill will understand that exemplary wireless identification system 18110 may include receiver/exciter devices (such as device 1124), separate receiver devices and exciter devices, or any desired combination thereof.

Wireless identification system 18110 may include at least one data structure 18122 for storing inventory information of the establishment. In disclosed embodiments, the at least one data structure 18122 may include at least one database, such as a local database for storing local information related with a particular facility or store, a regional database, or a global database. The at least one data structure 18122 may contain data including, but not limited to, an inventory of products offered by the establishment, product IDs of specific products, information of specific products (e.g., product style, size, color, material, location, manufacturing and/or shipping history, and/or ownership information), purchase status of specific products (e.g., whether a specific product has been purchased, picked up from the establishment, or designated for return to the establishment), information of wirelessly transmitting tags 1100, tag IDs of the wirelessly transmitting tags 1100, associations between specific tags and specific products, encryption keys of tags 1100, and/or information of purchasers of specific products. Information stored in the at least one data structure 18122 may be accessible to one or more processors 18114 directly or indirectly through network 18112.

Wireless identification system 18110 may include a data structure containing a purchase transaction record 18124. As discussed above, purchase transaction record 18124 may include data of transactions to which the establishment was a party, including purchases, sales, conveyances of products, and/or any other interaction between the establishment and another individual or entity resulting in the transfer of ownership or possession of a product from one party to another party. Purchase transaction record 18124 may include information related to purchased products (e.g., identifications of purchased products), information related to purchasers of products from the establishment (e.g., purchaser-identifying information of purchasers associated with purchased products), and/or information of individual transactions. In disclosed embodiments, the data structure containing purchase transaction record 18124 may include at least one database, such as a local database for storing local information related with a particular facility or store, a regional database, or a global database. Information contained in the purchase transaction record 18124 may be accessible to one or more processors 18114 directly or indirectly through network 18112. In some embodiments, purchase transaction record 18124 may be stored in the at least one data structure 18122. In alternative embodiments, purchase transaction record 18124 may be stored in a separate data structure from the at least one data structure 18122.

Wireless identification system 18110 may include at least one processor 18114 configured to receive, store, and process information from the components of system 18110. For example, processor 18114 may receive (via receivers 18118) and process information related to wireless identification tags 1100, receive data from and transmit data to mobile communications device 18116 and other processing devices, control the ability of alarm mechanism 18120 to initiate an alarm, and access, look-up, read, add to, alter, delete, and share data contained in the at least one data structure 18122 and purchase transaction record 18124.

Disclosed embodiments may include receiving a unique tag ID of a specific one of the wirelessly transmitting tags. For example, the at least one processor may be configured to receive a unique tag ID of a specific tag. A tag ID may include information of a given one of the wirelessly transmitting tags that uniquely identifies the tag to a user and/or to other devices or device components, such that a specific tag may be differentiated from the other wirelessly transmitting tags. In some embodiments, the tag ID may be unique to a specific tag, and that specific tag may have only one unique tag ID. Alternatively, the same tag may have multiple unique tag IDs. Examples of a unique tag ID may include a serial number, part number, barcode, UUID, EPC, or other forms of data which may uniquely identify the corresponding tag to a user and/or to other devices.

In disclosed embodiments, the received tag ID may be a unique tag ID of a specific tag associated with at least one specific product in inventory. That is, the unique tag ID may be associated with a specific one of the wirelessly transmitting tags which may, in turn, be associated with a specific product in the establishment's inventory. As used herein, an inventory may include a list, table, database, spreadsheet, or any other data structure containing information of products that are offered by the establishment (e.g., products offered for sale, exchange, barter, or giveaway) or otherwise owned or possessed by the establishment. An inventory may include identifiers of specific products, such as stock keeping units (SKUs), universal product codes (UPCs), or serial numbers. For example, in a retail store, an inventory may include all products that are on display for sale, stored in a storage area, or in the hands of customers but have not yet been purchased. In some embodiments, an inventory may not include damaged items that were returned by customers or identified by staff, or items that have already been purchased but awaiting delivery or pick-up. In some embodiments, an inventory may also include a tag ID of a specific one of the wirelessly transmitting tags that is associated with a specific product in inventory.

In disclosed embodiments, the at least one specific product associated with the received tag ID may correspond to the at least one purchased product in the purchase transaction record. Some embodiments may include finding the purchased product in the establishment's inventory and retrieving, from the inventory, the unique tag ID associated with the purchased product; in such embodiments, the purchased product (included in the purchase transaction record) may be the same item as the specific product in the establishment's inventory. These embodiments may include sales of one-of-a-kind or custom products, for which it is important that the purchaser receives the exact item for which she has paid. For example, the at least one processor may obtain the identification of the purchased product from the purchase transaction record, search the establishment's inventory for the purchased product (e.g., perform a search of the purchased product's SKU, UPC, or serial number), and based on the search, obtain information of the purchased product including the unique tag ID of the associated wirelessly transmitting tag.

Alternative embodiments may include finding a specific product in the establishment's inventory that is similar or identical to the purchased product in the purchase transaction record. When the specific product is found in inventory, the unique tag ID of a wirelessly transmitting tag associated with the specific product may also be received. For example, the at least one processor may obtain the identification of the purchased product from the purchase transaction record, determine characteristics of the purchased product (e.g., the product's style, size, color, and price), and search the establishment's inventory for a specific product having identical characteristics as the purchased product. The at least one processor may then obtain information of the specific product with the identical characteristics, including the unique tag ID of a wirelessly transmitting tag associated with the specific product.

Disclosed embodiments may include assigning the at least one specific product to a record associated with the purchase transaction. In some embodiments, a record associated with the purchase transaction may include data in the purchase transaction record pertaining to the out-of-store product purchase (which may include an identification of the purchased product and purchaser-identifying information, as discussed above). In some embodiments, assigning the at least one specific product to a record associated with the purchase transaction may include updating the purchase transaction record to include an association between the purchased product and the corresponding specific product in inventory. For example, the association may designate the specific product as the merchandise that was conveyed in the out-of-store product purchase and, thus, may also designate the specific product as belonging to the purchaser. Additionally, or alternatively, assigning the at least one specific product to a record associated with the purchase transaction may include updating the purchase transaction record to include information of the associated specific product in inventory, such as an identifier of the specific product (e.g., a stock keeping unit (SKU), universal product code (UPC), or serial number) and the unique tag ID of the wirelessly transmitting tag associated with the specific product.

In the example shown in FIG. 18, a processor 18114 may receive an identification of the purchased product from purchase transaction record 18124. Processor 18114 may perform a search in data structure 18122 to find the purchased product in the establishment's inventory. Alternatively, processor 18114 may perform a search in data structure 18122 to find a specific product in inventory that is similar or identical to the purchased product. Since data structure 18122 may also contain associations between individual products and wirelessly transmitting tags 1100, processor 18114 may also receive the unique tag ID of the tag 1100 that is associated with the specific product. In some embodiments, processor 18114 may assign the specific product to a record associated with the purchase transaction by updating purchase transaction record 18124 to include the association between the purchased product and the specific product in inventory. Additionally, or alternatively, processor 18114 may assign the specific product to a record associated with the purchase transaction by updating purchase transaction record 18124 to include information of the associated specific product in inventory, such as the unique tag ID of the tag 1100 associated with the specific product.

Disclosed embodiments may include receiving a notification from a mobile communications device associated with the purchaser. In some embodiments, a mobile communications device may include any movable or unfixed device, structure, or combination of devices configured to receive and transmit wired and/or wireless communication signals. Examples of a mobile communications device may include a cellular phone, smartphone, tablet, personal computer, PDA, smart glasses, handheld scanner, wearable device, a combination of any of the forgoing or any other mobile electronics configured for sending and/or receiving data. As a non-limiting example, FIG. 18 illustrates an embodiment in which a mobile communications device 18116 (e.g., a smartphone) may be configured for communication with network 18112. As used herein, a mobile communications device "associated with" the purchaser may include a device owned or otherwise possessed by the purchaser; a device owned or otherwise possessed by an individual authorized to pick-up the purchased product from the establishment; a device authorized to receive and transmit communications on behalf of the purchaser; a device communicating via the purchaser's telephone number, email address, screen name, or other unique communication means; or a device logged into an account of the purchaser.

In disclosed embodiments, the received notification may include a notification that the at least one purchased product is being picked up at the establishment. For example, once the notification is received from the mobile communications device, the specific product in inventory corresponding to the purchased product may be authorized for pick-up (e.g., authorized to leave the establishment). Referring again to the example shown in FIG. 18, mobile communications device 18116 may transmit (and in some embodiments, may generate) the notification that the purchased product is being picked up at the establishment. Device 18116 may transmit the notification to a processor 18114 directly or via network 18112.

In some embodiments, the notification that the purchased product is being picked up may include an electronic correspondence from the mobile communications device, such as an email, phone call, text message, or message via a messaging service. Additionally, or alternatively, the mobile communications device may be used to access a website or application associated with the establishment; the website or application may include a user prompt or selection option (e.g., a button, drop-down menu, or text field) that may be used to generate the notification.

Additionally, or alternatively, the notification that the purchased product is being picked up may be generated based on an interaction between the mobile communications device and at least one of the specific product, a wirelessly transmitting tag of the specific product, or a package holding the specific product (discussed in detail below). For example, when the purchaser arrives at the establishment to pick-up the specific product, she may use a camera of the mobile communications device to scan the wirelessly transmitting tag of the specific product or a tag or label on a package holding the specific product. Based on the scan, the mobile communications device may generate the notification and transmit the notification to the at least one processor.

Additionally, or alternatively, the notification that the purchased product is being picked up may be generated based on location information of the mobile communications device. For example, the mobile communications device or another processor may use location information of the device (e.g., GPS data) to determine if a location of the device corresponds to the establishment or if the device is within a predetermined distance of the establishment or the specific product. The notification may be generated when it is determined, based on the location information of the mobile communications device, that the device is within the establishment or within the predetermined distance from the establishment or specific product. As another example, the electronic security system may include at least one receiver or detector configured to detect the mobile communications device and determine if the device is located within the establishment. In disclosed embodiments, the notification may be generated when it is determined that the mobile communications device is located within the establishment.

In disclosed embodiments, the notification that the at least one purchased product is being picked up may include location-identifying information indicating that the mobile communications device associated with the purchaser is located within the establishment. For example, the location-identifying information may include GPS data, data of a device-tracking program (e.g., Apple's Find My iPhone, Google's Find My Device, and Samsung's Find My Mobile), or other data indicating the location of the mobile communications device. In some embodiments, the notification that the purchased product is being picked up may include a communication that the mobile communications device is located within the establishment. Additionally, or alternatively, the notification that the purchased product is being picked up may include a designation of the device's location within the establishment. For example, the notification may include a map specifying the device's location or the name of a reference location within the establishment that is near the device's location (e.g., a designation that the mobile communications device is near the fitting rooms, the pick-up area, or the establishment's entrance).

In disclosed embodiments, the purchase transaction record may include identifying information of a package holding the at least one specific product during a pick-up waiting time at the establishment. As used herein, a package may refer to a container, covering, or other structure that partially or entirely encompasses the specific product. For example, a package holding the at least one specific product may include a box, a bag, a cup, a bottle or other vessel, wrapping paper or plastic, bubble wrap, an envelope, a crate, a container (e.g., a shipping container), a bucket, a tank, a jug, or any other structure that partially or entirely encompasses the specific product. In disclosed embodiments, an employee of the establishment or another individual may retrieve the specific product(s) from inventory that correspond to the purchased product(s), pack the specific product(s) within the package, and prepare the package to be picked-up from the establishment. Once prepared, the package may be placed in a storage area or in a designated pick-up area during a pick-up waiting time at the establishment, so that the package may be retrieved by the purchaser or another authorized to pick-up the package. As used herein, a pick-up waiting time at the establishment may include a time period between a time when the package is ready to be picked up and a time when the package is picked up. Alternatively, a pick-up waiting time at the establishment may include a time period between a time when the package is authorized to be picked up and a time when the package is picked up. Alternatively, a pick-up waiting time may also include a time period within the day during which packages are placed in a pick-up area and Await pick-up.

As a non-limiting example, FIG. 16 depicts an establishment having a shelf 13240 designated as a pick-up area for purchased products, including packages 16012 holding purchased products. A purchaser 1104 who previously completed an out-of-store product purchase may enter the establishment, identify the package 16012 on shelf 13240 holding her purchased product(s), and leave the establishment with her package 16012. Advantageously, this configuration may allow the purchaser to save time (since she is not required to search the store for her desired products or wait in a check-out line) and also to minimize interactions with store staff and others.

To tell individual packages apart, each package may include identifying information which may be included in the purchase transaction record. Thus, the purchaser may access the purchase transaction record to obtain the identifying information of a package holding her purchased products. The identifying information of the package may be added automatically to the purchase transaction record, such as by the at least one processor of the electronic security system, by the mobile communications device associated with the purchaser, by a device used to perform the out-of-store product purchase, by a device associated with the establishment (e.g., a handheld scanner, checkout station, or register), or by another processor or program. Additionally, or alternatively, the identifying information of the package may be manually added to the purchase transaction record, such as by the purchaser or by an individual who packed the purchased product within the package or who placed the package at a pick-up area within the establishment.

In some embodiments, the identifying information of a package may be indicated in text, images, or a machine-readable printed code that may be included on the package, included on a tag or label attached to or otherwise associated with the package, included on an object inside the package, or which may otherwise be provided in a way that identifies the package. For example, identifying information of a package may include an identifier of the purchaser (e.g., the purchaser's name or ID), an identifier of the purchased product (e.g., a description of the product, the product's SKU, UPC, serial number, or barcode, or a tag ID of a wirelessly transmitting tag associated with the product), or an identifier of the purchase transaction of the product (e.g., an order number, a barcode assigned to the transaction, or a number or ID of the package).

Additionally, or alternatively, the identifying information of the package may include information readable by the mobile communications device. For example, the identifying information of the package may include information organized in a machine-readable format such as commaseparated variables (CSV), resource description framework (RDF), JavaScript object notation (JSON), extensible markup language (XML), a barcode, a QR code, or other machine-readable formats. In some embodiments, the mobile communications device may receive the identifying information of the package from another device or network. Additionally, or alternatively, the mobile communications device may receive the identifying information of the package by scanning a barcode or QR code (which may be provided, for example, on the package, on a tag or label of the package, or on the specific product held in the package) In some embodiments, the package may be associated with a wireless transmitting tag attached to the package or placed inside the package, the wireless transmitting tag having been associated with the package at the time of packing or at the time of placement in a pick-up area, or during the remote purchase transaction or at any other time prior to pick-up of the package. The mobile communications device may then scan the wireless transmitting tag, receive its tag ID transmission (either directly or through receivers such as receiver 11300a-h in FIG. 16), and use the tag ID as information uniquely identifying the specific package. In some embodiments, the notification from the mobile communications device that the at least one purchased product is being picked up at the establishment may include the identifying information of the package holding the at least one specific product. For example, after receiving the identifying information of the package, the mobile communications device may transmit the notification (which may include the identifying information of the package) to the at least one processor. In some implementations, this may enable the processor to identify the package that is referred to by the notification.

Figure 19:
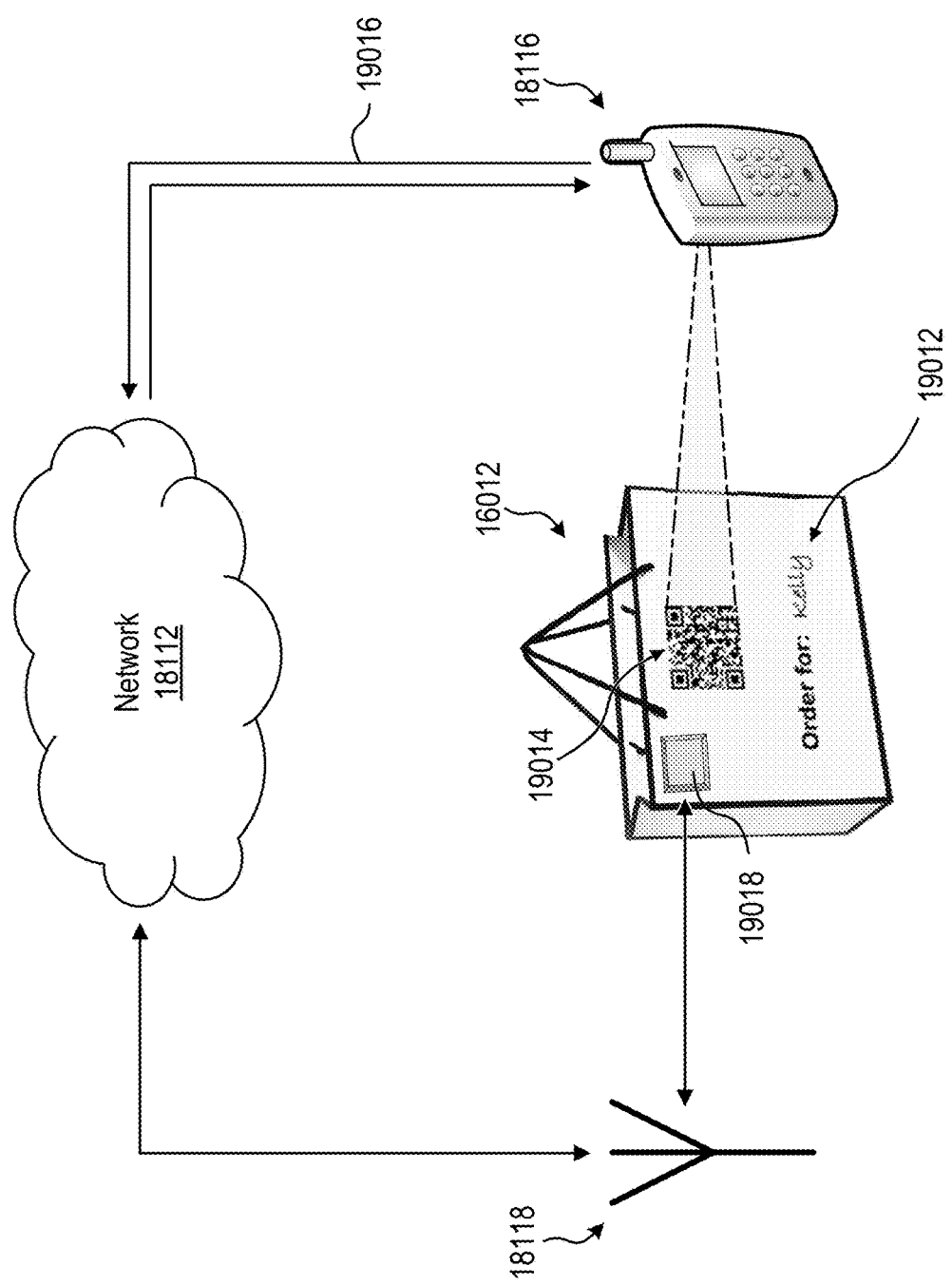
FIG. 19 depicts an exemplary package holding at least one product purchased from an establishment, consistent with disclosed embodiments.

FIG. 19 illustrates an example of a package 16012 configured to hold products purchased from an establishment. Package 16012 may include identifying information, such as a printed identifier 19012 of the purchaser and a machine-readable code 19014 (e.g., a QR code), which may be included in purchase transaction record 18124. Mobile communications device 18116 associated with the purchaser may be configured to read the package identifying information; for example, device 18116 may be configured to capture an image of machine-readable code 19014 and obtain the package identifying information from the image. Mobile communications device 18116 may transmit notification signal 19016 to network 18112 and processors connected thereto (e.g., processor 18114). In some embodiments, notification signal 19016 may include some or all of the identifying information of package 16012 and may indicate that the at least one purchased product is being picked up at the establishment.

In some embodiments, packages holding purchased products may have associated wirelessly transmitting tags. For example, one wirelessly transmitting tag may be assigned to, or otherwise paired or correlated with, one package at the establishment. For example, the association between a wirelessly transmitting tag and a corresponding package may be stored in a data structure. Additionally, or alternatively, a wirelessly transmitting tag may be attached to a corresponding package through adhesive, one or more mechanical connectors (e.g., clips or staples), tying, wrapping, fastening, or any other type of physical connection. Additionally, or alternatively, a wirelessly transmitting tag may be incorporated into the package without physical attachment, such as when a tag is placed freely inside the package along with the products contained by the package, or when the tag is connected to a shelf, bin, drawer or other fixture on which or inside which the package may be placed. The wirelessly transmitting tags associated with the packages may be of the same type or of a different type from the wirelessly transmitting tags associated with the products offered by the establishment. Due to associations between wirelessly transmitting tags and packages at the establishment, the identifying information of a package may include an identifier (i.e., a tag ID) of an associated wirelessly transmitting tag.

In some embodiments, a wirelessly transmitting tag associated with a package may be configured for near-field communication (NFC). For example, the tag associated with the package may be configured to communicate with the mobile communications device or other receivers via NFC signals. In such embodiments, the identifying information of the package may include a Near Field Communication tag ID.

Additionally, or alternatively, a wirelessly transmitting tag associated with a package (referred to hereafter as a wirelessly transmitting package tag) may be similarly configured as wirelessly transmitting tags associated with products offered by the establishment. In such embodiments, the identifying information of the package may include a package tag ID of a wirelessly transmitting package tag associated with the package. The package tag may be unassociated with any products in the establishment. For example, the package tag may be devoid of physical connections to products in the establishment (e.g., the package tag may be physically connected to a package but not to any products). Additionally, or alternatively, data structures of the establishment may not include associations or pairings between wirelessly transmitting package tags and products of the establishment.

FIG. 19 illustrates an example of a package 16012 having an associated wirelessly transmitting package tag 19018. In the example shown, package tag 19018 may be adhered or otherwise connected to an outer surface of package 16012. However, persons of ordinary skill will understand that any suitable means may be employed to connect package tag 19018 with package 16012. Package tag 19018 may be devoid of associations with, and physical connections to, products of the establishment; instead, package tag 19018 may be uniquely associated with package 16012. In some embodiments, package tag 19018 may be configured to transmit signals (e.g., product tag ID signals) to receivers 18118 of the establishment. Additionally, or alternatively, package tag 19018 may be configured to collect and store power transmitted from receiver 18118 (or receivers 1300a-11300h) (which may be configured as an exciter) and to use the stored power to power operations of the package tag 19018.

In disclosed embodiments, a wirelessly transmitting package tag may be configured to detect an activation signal (e.g., an EAS signal) transmitted by an EAS gate when the package tag is brought in proximity to the EAS gate (e.g., when the package associated with the package tag is carried through the EAS gate). For example, when the package tag receives the EAS signal from the EAS gate, the package tag may be configured to output a signal in a different frequency band than the EAS signal. The specific tag may further be configured to include in the transmission information regarding the state of the tag, for example information indicating that the tag is transmitting the signal in response to receiving an EAS signal from an EAS gate. At least one receiver of the electronic security system may receive the signals transmitted by the package tag after the package tag receives the EAS signal from the EAS gate. However, the EAS gate may not detect the signal transmitted by the package tag because the signal may be outside a range of frequencies detected by the EAS gate. For example, the EAS gate may be tuned to detect signals in a frequency range of about 7-13 MHz and/or in a frequency range of about 58-60 kHz, while the package tag may be configured to transmit signals within a frequency band around 900 MHz and/or within a frequency band around 2.4 GHz. Thus, the package tag (and other wirelessly transmitting tags disclosed herein) may be configured to come into proximity with the EAS gate, including passing through the EAS gate, without activating the EAS gate alarm.

Disclosed embodiments may include packages of the establishment, each package holding at least one specific product purchased from the establishment. The packages may have associated wirelessly transmitting package tags, while the specific products held by the packages (and, optionally, other products offered by the establishment) may not have associated wirelessly transmitting tags. In such embodiments, the wirelessly transmitting package tags associated with the packages may be configured to include all aspects of wirelessly transmitting tags and to perform all functions of wirelessly transmitting tags disclosed herein. Further, in such embodiments, the data structure may store an ID associated with the wirelessly transmitting package tags in association with information identifying the one or more products (e.g., model number, SKU number, price, or other product information) included in the package. For example, in some embodiments, wirelessly transmitting package tags (rather than wirelessly transmitting tags associated with products) may be implemented with electronic security systems disclosed herein. Additionally, or alternatively, disclosed embodiments may include disabling an ability to initiate an alarm when a transmission is received from a specific package tag (rather than a specific tag associated with a product) in proximity to an EAS gate.

Disclosed embodiments may involve authorizing pick-up of the at least one specific product based on information received from the mobile communications device associated with the purchaser. Information received from the mobile communications device may include a notification that the purchased product is being picked up (which may, in some embodiments, include identifying information of the package holding the specific product) and/or other information received from the mobile communications device. In some embodiments, authorizing the pick-up of the at least one specific product may include permitting the specific product to be taken from the establishment. For example, authorizing pick-up may include disabling an ability to initiate an alarm (discussed in detail below), updating a data structure to include an indication that the specific product is authorized for pick-up, and/or sending a notification to a device associated with the establishment (e.g., an employee device or a computer) to move the specific product from a storage area to a designated pick-up area, so that the purchaser may retrieve the specific product from the pick-up area without any impediments. Additionally, or alternatively, authorizing the pick-up of the at least one specific product may include sending a notification to the mobile communications device associated with the purchaser. For example, the notification may include pick-up information, such as a pick-up location, an identifier of a package holding the specific product, or a photograph or other image of the specific product and/or a package holding the specific product. Other information that may be included in the pick-up notification may be a copy of the purchase invoice (including, for example, the time and place of the remote purchase, the details of the purchased products, the details of the means of payments and whether payment was received and processed in order or not), information regarding a purchaser's Loyalty Account or other membership with the establishment (detailing for example discounts received with the purchase, or points, miles, cashback or other benefits achieved with the purchase), or recommendations for future purchases complementary to the products purchased in this transaction, or to products previously purchased by the same purchaser, or any other product recommended by the establishment.

In disclosed embodiments, the purchase transaction record may include information of a time period over which the at least one specific product is authorized for pick-up. For example, the purchaser may specify the time period while performing the out-of-store product purchase, when sending the notification that the purchased product is being picked up, or at some other time. Alternatively, or additionally, the establishment may specify the time period during the out-of-store purchase, when sending a notification to the purchaser that the order is ready for pick-up, as a general policy of the establishment available for purchaser's to review, or at some other time. In some embodiments, pick-up of the specific product may be authorized or denied based on whether the pick-up is attempted during the time period over which the specific product is authorized for pick-up.

For example, disclosed embodiments may include checking, upon receiving the notification that the at least one purchased product is being picked up, whether the notification was received within the time period over which the at least one specific product is authorized for pick-up. As an illustrative example, processor 18114 shown in FIG. 18 may receive the notification that the at least one purchased product is being picked up from mobile communications device 18116. Upon receiving the notification, processor 18114 may access purchase transaction record 18124 to obtain information stored therein indicating the time period over which the at least one specific product is authorized for pick-up. Processor 18114 may then determine whether the notification was received from device 18116 within the time period. For example, processor 18114 may receive a timestamp indicating when the notification was received from device 18116 (or when the notification was generated by device 18116) and may determine whether the timestamp falls within the time period.

Disclosed embodiments may include authorizing the pick-up if the notification was received within the time period over which the at least one specific product is authorized for pick-up. For example, and as discussed above, authorizing the pick-up may include permitting the specific product to be taken from the establishment and/or sending a notification to the mobile communications device associated with the purchaser. Disclosed embodiments may additionally or alternatively include denying the pick-up if the notification was received outside of the time period over which the at least one specific product is authorized for pick-up. For example, denying the pick-up may include sending a denial notification to the mobile communications device associated with the purchaser, enable an ability to initiate an alarm, and updating a data structure to include an indication that a pick-up of the specific product was requested and denied.

Disclosed embodiments may include disabling an ability to initiate an alarm. As used herein, an alarm may refer to an alert or notification generated by a component of the electronic security system for notifying another component, another system, and/or a person that the electronic security system has detected an unauthorized pick-up of the specific product or another intrusion into or loss from the establishment. In some embodiments, the electronic security system may include fixed infrastructure configured to initiate an alarm; examples may include speakers, lights, and/or graphic displays arranged at strategic locations within the establishment such as at the entrance and/or exit, near a checkout counter or self-checkout kiosk, in a storage area, or near a pick-up area. The at least one processor may cause an alarm to be initiated by causing activation of the alarm-initiating components of the electronic security system. Additionally, the at least one processor may disable an ability of the alarm-initiating components to initiate an alarm. As a result, the alarm-initiating components may be controlled to forego initiating an alarm when a certain event occurs (e.g., when a tagged product is brought through an EAS gate), even when the event would otherwise trigger an alarm.

Disclosed embodiments may involve disabling an ability to initiate an alarm when the at least one receiver receives a transmission from the specific tag in proximity to the EAS gate. In disclosed embodiments, the disabling of the ability to initiate an alarm may occur following the authorization of pick-up of the at least one specific product. For example, if a product is not authorized for pick-up, the alarm initiating components of the electronic security system may initiate an alarm when a receiver detects an attempted passage of the product's wirelessly transmitting tag through the establishment's EAS gate (or another security point). However, following the authorization of pick-up of the at least one specific product, the at least one processor may update a data structure to include a designation that the specific tag associated with the specific product is authorized to be picked up and to leave the establishment without triggering an alarm. As a result, when a receiver of the electronic security system receives a transmission from the specific tag in proximity to the EAS gate, the at least one processor may determine that the specific tag is being brought through the EAS gate and may perform a lookup of the specific tag ID. Upon determining that the specific tag ID is associated with a product authorized for pick-up, the at least one processor may disable an ability (e.g., of alarm components near the EAS gate) to initiate an alarm so that the specific product may be brought through the EAS gate without interruption.

As an example, FIG. 16 depicts a purchaser 1104 using a mobile communications device (e.g., device 18116 of FIG. 18) to transmit a notification that a purchased product is being picked up from pick-up area 13240. For example, the purchaser 1104 may use the mobile communications device to scan a barcode or other machine-readable code on the purchased product and/or on a package 16012 holding the purchased product; based on the scanned information, the mobile communications device may generate the notification and transmit the notification to a processor of the establishment (e.g., processor 18114 of FIG. 18). Based on receiving the notification, the processor may authorize pick-up of the purchased product and disable an ability of alarm 1114 to sound when the purchased product approaches EAS gate 1110, 1112. When purchaser 1104 approaches the EAS gate 1110, 1112 with the purchased product, receivers 11300 may receive signals transmitted from the purchased product's wirelessly transmitting tag. The processor may perform a lookup of the detected tag's ID and determine that the tag is associated with a product that is authorized for pick-up. The processor may disable alarm 1114 near EAS gate 1110, 1112 so that purchaser 1104 may exit through the EAS gate with her purchased products without being stopped or interrupted by the alarm.

In disclosed embodiments, disabling the ability to initiate an alarm may include performing a lookup of the unique tag ID to determine that the associated at least one specific product is authorized for pick-up. As non-limiting examples, the data structure may include data structure 18122, purchase transaction record 18124, and/or another data structure. The at least one processor may perform a lookup of the unique tag ID in the data structure to access information of the specific product associated with the unique tag ID. The at least one processor may determine if the information of the specific product includes a designation that the product is authorized for pick-up.

When it is determined that the specific product is authorized for pick-up, the at least one processor may update the data structure to designate at least one of the specific product, the associated specific tag, or a package holding the specific product as being authorized to pass through the EAS gate without an alarm being initiated. For example, the at least one processor may update a data structure to include an instruction not to initiate the alarm when the at least one receiver receives a transmission from the specific tag in proximity to the EAS gate, which may indicate that the specific tag is passing through the EAS gate. In some embodiments, the data structure to be updated may include inventory information of the establishment. As non-limiting examples, updating a data structure may include updating at least one of data structure 18122, purchase transaction record 18124, or another data structure. In some embodiments, updating the data structure to include the instruction not to initiate the alarm may include removing the unique tag ID and a product ID of the associated at least one specific product from the data structure. As a result, the unique tag ID and the product ID may no longer be counted as part of the establishment inventory available for sale. In alternative embodiments, updating the data structure to include the instruction not to initiate the alarm may include changing a status indicator in the data structure of the specific product and/or the specific tag to indicate that the specific product is authorized for pick-up and, accordingly, is also authorized to pass through the EAS gate without initiating the alarm.

Disclosed embodiments may include a plurality of transmitters for wirelessly sending power to the wirelessly transmitting tags. In disclosed embodiments, the at least one receiver may be configured to receive transmissions upon detection of the EAS gate by the specific tag. The specific tag may further be configured to include in the transmission information regarding the state of the tag, for example information indicating that the tag is transmitting the signal in response to receiving an EAS signal from an EAS gate.

In disclosed embodiments, the wirelessly transmitting tags may be configured to transmit immediately upon sensing the EAS gate (e.g., upon receiving the EAS signal from the EAS gate). As used herein, transmitting "immediately" may mean that the wirelessly transmitting tags are configured to transmit signals as soon as possible upon sensing the EAS gate, and that the tags may not be programmed to wait a specified delay period after sensing the EAS gate before transmitting signals. Sensing an EAS gate may include receiving, via dedicated means, a signal transmitted by the EAS gate. Sensing the EAS gate may also include identifying, above a threshold sensitivity level, that the received signal's properties match those expected from an EAS gate's signal. Sensing the EAS gate may further include generating an internal signal in the tag indicating that the EAS gate's signal was identified. Additionally, or alternatively, the wirelessly transmitting tags may be configured to transmit an ID transmission indicating proximity to the EAS gate upon sensing the EAS gate. For example, after a wirelessly transmitting tag receives the EAS signal from an EAS gate, the tag may be configured to transmit a signal indicating the tag's unique tag ID. Thus, the source of the signal may be determined based on the tag ID specified by the signal. In some embodiments, a signal transmitted by the tag based on sensing the EAS gate may differ from signals transmitted by the tag based on other triggers. For example, the transmitted signals may differ in at least one aspect, such as transmission power level, phase, duration, frequency, length of a delay period before beginning transmissions, and/or information contained within the signal. In some embodiments, the tag may only sense the EAS gate when the tag is in close enough proximity to the EAS gate to detect the EAS signals. Thus, the signal transmitted by the tag based upon sensing the EAS gate may indicate proximity of the tag to the EAS gate, since the signal is different from signals transmitted by the tag in other situations.

For example, FIG. 1 depicts a purchaser 1104 exiting through an EAS gate 1110, 1112 with a first product 1106 with a first wirelessly transmitting tag 1100a, and also with a second product 1122 with a second wirelessly transmitting tag 1100b. Tags 1100a and 1100b may be configured to detect EAS gate 1110, 1112 based on receiving EAS signal 1118. In response, tags 1100a and 1100b may immediately transmit tag ID signals 1102a and 1102b, without including a delay period before beginning the transmissions. Receiver 1124 of the electronic security system may detect tag ID signals 1102a and 1102b and a processor of the electronic security system (e.g., processor 11004 of FIG. 11 or processor 18114 of FIG. 18) may determine whether the detected ID signals 1102a and 1102b are associated with products that are authorized to pass through EAS gate 1110, 1112 (e.g., products that are authorized for pick-up from the establishment). In some embodiments, the processor may cause activation of an alert mechanism such as an audible alert or a flashing light to signal that products 1106 and 1122 are not authorized to leave the establishment. However, if products 1106 and 1122 are authorized to leave the establishment, the processor may disable activation of the alert mechanism while purchaser 1104 passes through the EAS gate with the products.

In disclosed embodiments, the at least one processor may be configured to determine, based on transmissions received by the at least one receiver, tag locations at the time of transmission, thereby determining tag proximity to the EAS gate. For example, the proximity of the tag to the EAS gate may be ascertained by the at least one processor based on the range of transmission of the EAS gate signals, outside of which the specific tag would not receive the EAS gate signal and therefore would not transmit. By way of example, FIGS. 13A and 13C depict a product 13210 hanging from a shelf that may contain a wirelessly transmitting tag 1100 configured to transmit an ID signal 13102. Due to the proximity of tag 1100 to receiver 11300c (see FIG. 13C), the power level of the signal 13102 received by receiver 11300c may be higher than the power level of the signals 13102 received by other receivers located further away from tag 1100 (e.g., receivers 11300b and 11300d). Therefore, the at least one processor of the electronic security system may determine that the product 13210 is located on or near the shelf of FIG. 13C since the locations of receiver 11300c and the shelf may be known beforehand.

Disclosed embodiments may include an electronic security system for facilitating returns of purchased items to the establishments from which they were purchased and for preventing theft of returned items. As the number of online purchases increases, so do the number of merchandise returns. It is estimated that the return rate for remote purchases (including online transactions) is almost four times greater than the return rate of products purchased in-store, and in some markets and segments may reach 50% or more of all online purchases. This has resulted in a large increase in the number of in-store return transactions, especially since some retailers charge return shipment costs that many consumers prefer to avoid paying. Currently, most in-store return transactions require the customer to wait in line to reach a point-of-sale (POS) terminal, where a staff member may complete the return. The increased number of in-store returns may be unprofitable for retailers since many customers returning merchandise do not make additional purchases while in the store; this increased traffic in retail establishments may result in longer wait times for customers making new purchases, while also making it more difficult for customers to locate desired items within the store. Further, social distancing may be difficult due to the increased number of people in a store at a given time. Thus, there is a need for a returns model that allows fast and contact-free returns of items in-store while securing returned items against theft and other losses.

Disclosed embodiments may involve systems, methods, and computer readable media for expediting and safeguarding in-store returns of previously purchased products. Embodiments may include an electronic security system for an establishment offering products which are attached to, or otherwise associated with, wirelessly transmitting tags. When a purchaser wishes to return a purchased product to the establishment, she may bring the product into the establishment, place the product in a designated drop-off location, and notify the electronic security system that the product has been returned (such as by using her mobile device to scan the product, its wirelessly transmitting tag, or a package holding the product). The electronic security system may verify that the correct product was returned to the establishment (such as by confirming the identity of the attached wirelessly transmitting tag) and may control the establishment's security gates and other anti-theft alarms to initiate an alert if anyone tries to take the returned product from the establishment without paying for it. Moreover, once the condition of the returned product is approved, the electronic security system may automatically reimburse the purchaser for the returned product. Advantageously, disclosed embodiments may enable quick and low-contact returns of merchandise, while also preventing theft and other losses of returned items from the establishment.

Disclosed embodiments may include an electronic security system, as defined elsewhere in the present disclosure. In some embodiments, an electronic security system may be configured for preventing theft of returned goods or items. As used herein, returned goods and returned items may include any object or material that was previously sold, given, distributed, or otherwise transferred from a first party (e.g., a seller) to a second party (e.g., a purchaser), and subsequently transferred back to the first party or to a third party that is associated with the first party. In some embodiments, the purchaser may return (e.g., transfer) the goods or items back to the seller in exchange for some or all of the purchase price of the goods or items. By way of non-limiting examples, a returned good or item may include food, clothing, shoes, electronics, consumer goods, equipment, vehicles, consumables, packaging, accessories, supplies, materials, artistry, animals, instruments, pallets, containers, pharmaceuticals, cosmetics, commodities, articles, devices, machinery, implements, mechanisms, tools, furniture, or any other object that may be transferred between two or more parties.

Disclosed embodiments may include preventing theft of returned goods and/or returned items. Embodiments for preventing theft of returned goods and returned items may include any arrangement of hardware and software components for detecting, signaling, and/or hindering any taking or removal of a returned good or item without the permission or consent of the good's or item's owner or rightful possessor. Disclosed embodiments may be configured to enable the return of goods and items to a store or other establishment and to prevent the returned goods or items from being stolen, pilfered, or unlawfully removed from the establishment; embodiments may, for example, permit the removal of returned goods and returned items from an establishment when the returned goods or items have been repurchased or authorized for removal (e.g., when returned goods or items are to be sent to an off-site inventory or donated to charity). Disclosed embodiments may be configured to detect a removal of a returned good or item from a store or other establishment, such as the removal of a returned good or item from a designated shelf, table, or other storage location or the passage of a returned good or item through an entryway, exit, security gate, window, doorway, or another checkpoint in an establishment. Additionally, or alternatively, disclosed embodiments may be configured to determine when a taking or removal of a returned good or item is unauthorized. For example, embodiments may determine when a returned good or item has not been paid for, is not authorized to be taken from the establishment, or is being taken by the wrong person.

In disclosed embodiments, returned items may include wirelessly tagged returned items. As used herein, a wirelessly tagged returned item may include any returned item having at least one wireless tag. In some embodiments, a wireless tag may include any device or structure configured to identify the returned item or otherwise convey information about the returned item via wireless means. As a non-limiting example, a wireless tag may include a wirelessly transmitting tag, discussed in detail herein. As another non-limiting example, a wireless tag may include a non-transmitting device or structure bearing an identifier or other information of the corresponding returned item. Examples of a wireless tag may include stickers, adhesive tags or labels, hanging tags, buttons, sewn-on labels, tape, clip-on tags, and any other structure for identifying the returned item without use of wires. In some embodiments, a wireless tag may be attached or connected to a corresponding returned item through adhesive, embedding, sewing, mounting, bonding, friction fit, pocketing, tying, wrapping, fastening, or any other type of physical connection. Additionally, or alternatively, an association (e.g., an assigned pairing or correlation) between a returned item and a wireless tag may be established and stored in a data structure without a physical attachment between the tag and the returned item, such as when a tag is placed in the same packaging as the product.

By way of example, FIG. 16 illustrates an electronic security system for an establishment offering products with associated wireless tags (e.g., wirelessly transmitting tags 1100). Customers may purchase products from the establishment in-store or remotely (e.g., online or over the telephone) and may pick-up purchased products at the establishment or may have purchased products delivered (e.g., via mail, UPS, FedEx, or courier) to the customer's home or another delivery location. To return purchased items to the establishment, customers may bring purchased products 16016 to the establishment and complete a return transaction with a smartphone or another mobile communications device. For example, a previous purchaser 1104a may return purchased products 16016 by bringing the products into the establishment and leaving them at a designated drop-off area 16014, such as a shelf, bin, or table. Products 16016 may be returned alone or in a bag or package. In some embodiments, previous purchaser 1104a may complete the return by indicating to the electronic security system which products she wishes to return. In the depicted example, previous purchaser 1104a may use her mobile device (e.g., mobile communications device 18116) to scan QR codes or barcodes on the products or on packages holding the products, and the mobile device and/or a processor of the establishment may determine the products associated with the scanned codes and indicate that the products have been returned to the establishment. Once the return transaction is confirmed by the establishment (e.g., once store staff confirm the condition of returned products 16016), the electronic security system may automatically reimburse previous purchaser 1104a for the returned products.

In some embodiments, the returned products 16016 may have associated wirelessly transmitting tags 1100. In some embodiments, alarm components 1114 (e.g., sirens or flashing lights) may be controlled to forego initiating an alarm when previous purchaser 1104a brings the tagged products 16016 into the establishment. However, after the products are returned, alarm components 1114 may be re-activated with respect to the returned products 16016, so that an alarm may be triggered if any of the returned products are detected passing through security gate 1110, 1112. Advantageously, this reactivation may prevent a thief from grabbing a returned product 16016 from returns area 16014 and removing it from the establishment. Further, disclosed embodiments may enable customers to return products to the establishment without interacting with store staff or waiting to access a point-of-sale (POS) terminal.

Disclosed embodiments may include at least one electronic article surveillance (EAS) gate, as discussed throughout this disclosure. The at least one EAS gate may include an Acousto-Magnetic EAS (AM-EAS) gate, which may generate a time-varying magnetic field configured to interact with a mechanically-vibrating magnetic element in a security tag attached to a product in a store. Additionally, or alternatively, the at least one EAS gate may include a Radio-Frequency EAS (RF-EAS) gate, which may generate a frequency-swept magnetic field configured to interact with a finely-tuned resonance circuit in a security tag. Additionally, or alternatively, the at least one EAS gate may include a Micro-Wave EAS (MW-EAS) gate, which may send RFID transmissions to and receive RFID transmissions from a security tag.

In disclosed embodiments, the at least one EAS gate may be provided in an establishment. In some embodiments, the at least one EAS gate may be located within the establishment at or near an entrance and/or exit to the establishment, within a doorway between rooms of the establishment, or at any other location within the establishment. If the EAS gate includes more than one pedestal, the pedestals may be spaced a distance apart to allow patrons to enter and exit the establishment between the pedestals with minimum hindrance, while the pedestals are within a close enough range of each other to be triggered by a passing EAS tag or wirelessly transmitting tag. Additionally, or alternatively, the at least one EAS gate may include a concealed EAS gate with a pedestal installed within the establishment below the floor, above the ceiling, or behind the walls.

By way of example, FIG. 16 illustrates an exemplary establishment having EAS gates 1110, 1112 located at an entrance 16018 and at an exit 16020. In some embodiments, EAS gates 1110, 1112 may be located within the doorway of entrance 16018 and exit 16020 or, alternatively, within the establishment a short distance from the entrance and exit (e.g., immediately adjacent to entrance 16018 and/or exit 16020). In some embodiments, EAS gates 1110, 1112 may each include a transmitter configured to transmit an EAS signal within a predetermined frequency band; for example, the transmitted EAS signal may include electromagnetic energy having a frequency, for example, within the band of 58-60 kHz (AM-EAS waves) or 7-13 MHz (RF-EAS waves). EAS gate 1110, 1112 may also include an EAS receiver configured to receive wireless signals within the same frequency band as the transmitted EAS signal. For example, an EAS security tag brought near EAS gate 1110, 1112 may detect the transmitted EAS signal and, in response, may transmit or reflect a second signal at the same frequency back to the EAS gate 1110, 1112. Upon receiving this second signal from the security tag, the EAS gate 1110, 1112 may trigger an alarm 1114 indicating the passage of a tagged product through the EAS gate. As another example, a wirelessly transmitting tag 1100 near EAS gate 1110, 1112 may detect the transmitted EAS signal and, in response, transmit a second signal having a different frequency than the EAS signal. In some embodiments, EAS gate 1110, 1112 may not be triggered by tag 1100 because the signal transmitted by tag 1100 may be outside the specified frequency band of the EAS receiver. Thus, wirelessly transmitting tag 1100 may remain "invisible" to EAS gate 1110, 1112 (that is, a signal transmitted by tag 1100 may not trigger a response by the EAS gate).

Disclosed embodiments may include wirelessly transmitting tags. In disclosed embodiments, a wirelessly transmitting tag may include at least one antenna or any other component and/or device configured for transmitting, and optionally also for receiving, information and/or energy from the air or from any other medium. In disclosed embodiments, the wirelessly transmitting tags may be configured to transmit and receive signals in one or more predetermined frequency bands.

In some embodiments, wirelessly transmitting tags may be attached to products offered in or previously purchased from the establishment. For example, tags may be attached to products through adhesive, embedding, sewing, mounting, bonding, friction fit, pocketing, tying, wrapping, fastening, or any other type of physical connection. Additionally, or alternatively, a wirelessly transmitting tag may be assigned to, or otherwise paired or correlated with, a product or a package holding a product, without a physical attachment between them. For example, a pairing or association between a wirelessly transmitting tag and an associated product may be pre-established and stored in a data structure.

Disclosed embodiments may include receiving transmissions from wirelessly transmitting tags. In some embodiments, signals transmitted from a wirelessly transmitting tag may include information of the tag's identity (e.g., an alphanumeric ID or serial number); thus, the identity of the transmitting tag may be determined by evaluating the ID information in the signal transmitted by the tag.

Disclosed embodiments may include at least one receiver configured to receive transmissions from wirelessly transmitting tags. In disclosed embodiments, a receiver may include a fixed receiver in an environment, a wireless user device (e.g., cellphone, tablet, dedicated hardware, etc.), a handheld receiver (e.g., a handheld scanner provided to an employee or customer by the establishment for use during working routines or in a shopping session), or any other circuit or component that receives signals. Disclosed embodiments may include one or more receivers fixed at designated locations within the establishment; for example, receivers may be distributed throughout the establishment so that signals transmitted from any point within the establishment may be received by at least one of the receivers. Additionally, or alternatively, embodiments may include one or more mobile receivers (e.g., a wireless user device or a handheld receiver) which may be placed or held by a user at a desired location within the establishment.

FIG. 16 depicts another example of an electronic security system including a plurality of receivers 11300a-h distributed throughout the establishment to receive broadcasts of signals from wirelessly transmitting tags 1100 and other transmitting devices. Receivers 11300a-h may be affixed or otherwise attached to walls, ceilings, racks, displays, or any other fixtures or components within the establishment capable of supporting the receiver. In some embodiments, wirelessly transmitting tags 1100 may be attached to products offered in the establishment, including previously purchased products. Additionally, or alternatively, wirelessly transmitting tags 1100 may be attached to packages holding products, such as package 16012 depicted in FIG. 19.

Disclosed embodiments may include at least one processor as described elsewhere in this disclosure. In disclosed embodiments, the at least one processor may be configured to receive and transmit information via at least one communications interface. As used herein, a communications interface may include any type of physical or wireless networking arrangement enabling the interchange of information between two or more entities conforming to an agreed-upon protocol. For example, a communications interface may include a wired or wireless network, such as the Internet, a private data network, a virtual private network using a public network, a Wi-Fi network, a LAN or WAN network, and/or other suitable connections that may enable information exchange among various components of embodiments disclosed herein. In some embodiments, a communications interface may include one or more physical links used to exchange data, such as a telephone line, Ethernet, USB, Thunderbolt, coaxial cables, twisted pair cables, fiber optics, or any other suitable physical medium for exchanging data. A communications interface may also include a public switched telephone network ("PSTN"), a wireless cellular network, and/or a logical connection overlaid on another interface (such as TCP-IP and UDP). Some embodiments of a communications interface may include communicating directly through a dedicated communication network. Direct communications may use any suitable technologies, including, for example, Bluetooth™, Bluetooth Low Energy™ (BLE), Zigbee, Wi-Fi, near field communications (NFC), or other suitable communication methods that provide a medium for exchanging data and/or information between separate entities.

Disclosed embodiments may include receiving a notification from a mobile communications device. For example, the at least one processor may be configured to receive a notification from a mobile communications device. As used herein, a notification may include a communication signal generated by a first component of a system to alert at least one of a second component of the system, another system, or a user, of the occurrence of a certain event. In some embodiments, a notification may be generated and transmitted by an electronic device, component, or unit with data processing capabilities including, by way of non-limiting example, a personal computer, a wearable computer, a tablet, a smartphone, a server, a computing system or terminal, a cloud computing platform, a communication device, any other electronic computing device, or any combination of the above. The notification may be received by a second electronic device, component, or unit with data processing capabilities and/or by a human user; for example, a notification may include a digital signal transmitted from a first electronic device to a second electronic device. In some embodiments, a notification may be used to control a user interface to output at least one of an audible signal (e.g., a siren or voice recording), a visual signal (e.g., flashing lights or a digital display), a haptic output (e.g., vibration of a user device), or any other output perceptible to a user, to convey information of the notification to the user.

In some embodiments, a mobile communications device may include any movable or unfixed device or structure configured to receive and transmit wired and/or wireless communication signals, including exemplary notification signals discussed above. In some embodiments, a mobile communications device may be configured to detect the occurrence of a certain event (e.g., receipt of a certain user input) and transmit a corresponding notification to a processor of the electronic security system, to another device, and/or to a user.

In disclosed embodiments, the mobile communications device may be associated with a previous purchaser. In various embodiments, a previous purchaser may include a person or entity who bought, rented, leased, borrowed, was gifted, or otherwise acquired a specific product from an establishment; a person or entity who bought or otherwise acquired a specific product from another person or entity who, in turn, bought or otherwise acquired a specific product from an establishment (e.g., a downstream purchaser); the legal owner or possessor of a specific product; or a person or entity authorized to return a specific product to an establishment on behalf of the owner or legal possessor of the product. As used herein, a mobile communications device "associated with" a previous purchaser may include a device owned or otherwise possessed by the previous purchaser; a device owned or otherwise possessed by an individual authorized to return a product to an establishment on behalf of the owner or legal possessor of the product; a device authorized to receive and transmit communications on behalf of the previous purchaser; a device communicating via the previous purchaser's telephone number, email address, screen name, or other unique communication means; or a device logged into an account of the previous purchaser.

In disclosed embodiments, the received notification may include a notification of intent to return a previously purchased product to the establishment. For example, the notification may include an identification of products that were previously purchased from the establishment (by the previous purchaser or by another) and which the previous purchaser wishes to return or transfer back to the establishment. In some embodiments, the previous purchaser may return (or intend to return) the previously purchased product to the establishment for a refund of some or all of the purchase price, to exchange the previously purchased product for another product, or for another type of reimbursement. In some embodiments, the previous purchaser may use the mobile communications device to access a website or to run an application associated with the establishment which may contain the previous purchaser's transaction history and/or a record of products owned or possessed by the previous purchaser. The previous purchaser may generate the notification by selecting, on the website or application, one or more products to be returned to the establishment, and the mobile communications device may transmit information of the selected products (e.g., the products to be returned) to the at least one processor. In some implementations, the previous purchaser may receive an estimated refund amount, return instructions, or other information during or after generation of the notification.

In alternative embodiments, the previous purchaser may use the mobile communications device to interact with the products to be returned, to obtain information about the products. The mobile communications device may then transmit the information about the products to the at least one processor. For example, the previous purchaser may use the mobile communications device to scan or capture an image of a QR code, barcode, serial number, or another unique identifier of each product that she wishes to return. In some embodiments, the mobile communications device may identify the products associated with the scanned codes (e.g., by accessing a data structure containing associations between specific products and unique product identifiers like barcodes or serial numbers) and transmit information of the identified products to the at least one processor. Alternatively, the mobile communications device may transmit the scanned codes to the at least one processor, which may use the codes to identify the products to be returned.

As another example, the mobile communications device may be configured to receive transmissions from wirelessly transmitting tags associated with the products to be returned; the transmissions may be sent via a communication protocol such as Bluetooth or NFC. In some embodiments, the signals transmitted by a specific tag may include identifying information about the tag, such as the tag's unique identifier (tag ID). In some embodiments, the mobile communications device may receive a transmitted signal from a wirelessly identifying tag, identify a product associated with the tag (e.g., by accessing a data structure containing associations between specific products and unique tag IDs), and transmit information of the identified product to the at least one processor. Alternatively, the mobile communications device may send the tag ID information received from the wirelessly transmitting tag to the at least one processor, which may use the tag ID to identify the product to be returned.

For example, FIG. 18 depicts a network diagram of an exemplary wireless identification system 18110 for an establishment offering products with associated wirelessly transmitting tags 1100. As discussed elsewhere in the present disclosure, system 18110 may include network 18112 enabling the exchange of data between elements of the system, including processor(s) 18114, mobile communications device 18116, data structure 18122, and purchase transaction record 18124. In some embodiments, at least one data structure 18122 may be provided for storing inventory information of the establishment, including information of specific products offered in the establishment. Additionally, or alternatively, the at least one data structure 18122 may contain information of wirelessly transmitting tags 1100, such as tag IDs of each tag 1100 and associations between specific tags and specific products. In some embodiments, system 18110 may include a data structure containing a purchase transaction record 18124. As discussed elsewhere in the present disclosure, purchase transaction record 18124 may include data of individual transactions (e.g., the specific product(s) sold in a given transaction) and data of purchasers (e.g., unique purchaser identifiers and purchase histories).

Figure 20:
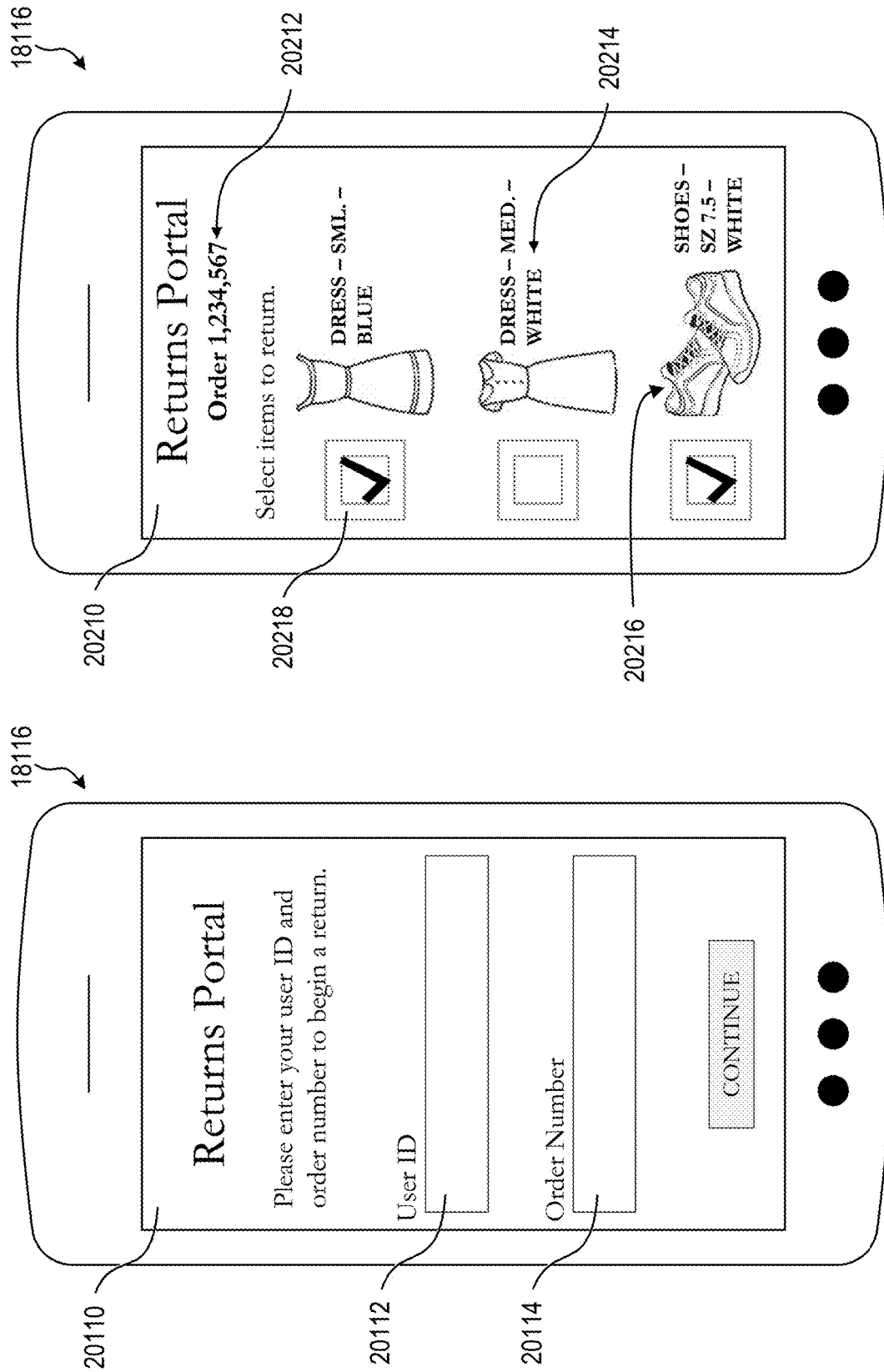
FIG. 20A depicts a mobile communications device displaying a first graphical user interface for generating a return notification, consistent with disclosed embodiments.
FIG. 20B depicts a mobile communications device displaying a second graphical user interface for generating a return notification, consistent with disclosed embodiments.

In some embodiments, a customer wishing to return a previously purchased product to an establishment may use mobile communications device 18116 to transmit a notification of intent to return the product to processor(s) 18114. For example, the customer may use device 18116 to access a website or run an application to generate the notification. As a non-limiting example, FIGS. 20A and 20B depict exemplary graphical user interfaces (GUIs) for generating a notification of intent to return one or more previously purchased products. In some embodiments, the customer may use mobile communications device 18116 to access a website or run an application associated with an establishment; the website or application may include GUIs 20110 and 20210 for generating notifications of intent to return products to the establishment.

FIG. 20A illustrates a non-limiting example of a graphical user interface (GUI) 20110 displayed on mobile communications device 18116 for accessing information of products that were previously purchased by, or otherwise acquired by, a customer. For example, GUI 20110 may include a first field 20112 in which the customer may enter her unique purchaser identifier ("user ID"), which may include, e.g., a user name, email address, or phone number. GUI 20110 may also include a second field 20114 in which the customer may enter an order or transaction number for the product(s) to be returned. Mobile communications device 18116 may perform a search for the user ID in purchase transaction record 18124 to access the customer's transaction history. Device 18116 may use the order or transaction number from second field 20114 to identity a specific transaction in the customer's transaction history and may display a second GUI 20210 with information of the products purchased in the identified transaction. As discussed in further detail below, the customer may use second GUI 20210 to select products to be returned to the establishment.

In alternative embodiments, mobile communications device 18116 may receive from the user her unique user ID and may perform a search for the user ID in purchase transaction record 18124 to access the customer's transaction history, without requiring an order or transaction number. In some embodiments, device 18116 may prompt the user to select a specific transaction from the transaction history, and may then display a second GUI 20210 with information of the products purchased in the identified transaction. In alternative embodiments, mobile communications device 18116 may access the customer's transaction history to generate a listing of all of the products previously purchased from the establishment by the customer. Device 18116 may then display a second GUI 20210 with information of the products purchased from the establishment.

FIG. 20B illustrates a non-limiting example of a graphical user interface (GUI) 20210 displayed on mobile communications device 18116 for selecting one or more previously purchased products to be returned to an establishment. GUI 20210 may include an identifier 20212 of the transaction or order and/or of the customer who is generating the notification. GUI 20210 may also include descriptions 20214 of purchased products, images 20216 of purchased products, and fields 20218 (e.g., check boxes) that the user may select to designate individual products for return. Based on the selections in fields 20218, mobile communications device 18116 may generate the notification of intent to return the selected products and transmit the notification to the at least one processor 18114.

In disclosed embodiments, the at least one processor of the electronic security system may be configured to communicate with the mobile communications device of the previous purchaser via one or more communication protocols or techniques; the at least one processor may receive, inter alia, the notification of intent to return a previously purchased product from the mobile communications device via the one or more communication protocols or techniques. For example, the mobile communications device may communicate with the at least one processor via one or more protocols as discussed elsewhere in this disclosure.

Disclosed embodiments may include at least a second receiver in the establishment, the second receiver being configured to receive a wireless transmission from the mobile communications device associated with the previous purchaser. For example, the second receiver may include an access point or wireless router in the establishment, which may establish a wireless connection with the mobile communications device. The at least one processor may have a wired (e.g., Ethernet) and/or wireless connection to the second receiver, thus enabling data transmission between the mobile communications device and the at least one processor. In some embodiments, the at least one receiver configured to receive transmissions from wirelessly transmitting tags (e.g., receivers 11300a-11300g of FIG. 11 or receivers 18118 of FIG. 18) may include the second receiver. Alternatively, the second receiver may be different from the at least one receiver configured to receive transmissions from the tags. In some embodiments, the second receiver may be configured to receive, from the mobile communications device, the notification of intent to return a previously purchased product to the establishment; for example, the previous purchaser may use the mobile communications device to send the notification via a Wi-Fi-connection while in the establishment. The second receiver may also be configured to receive wireless transmissions of other information from the mobile communications device.

Disclosed embodiments may additionally or alternatively include receiving a transmission over a cellular network, or any other network connection, from the mobile communications device associated with the previous purchaser. For example, the at least one processor may be configured to receive a transmission over a cellular network from the mobile communications device. In some embodiments, transmissions received from the mobile communications device over a cellular network may include the notification of intent to return a previously purchased product to the establishment; thus, the previous purchaser may use the mobile communications device to generate the notification remotely (e.g., while the purchaser is at home or in her vehicle). Transmissions received over a cellular network may also include other information transmitted from the mobile communications device. As an example, network 18112 shown in FIG. 18 may be configured as a cellular network in various embodiments. Information, including the notification of intent to return a previously purchased product to the establishment, may be transmitted between mobile communications device 18116 and processor(s) 18114 via network 18112.

Disclosed embodiments may include a unique tag ID of a specific wirelessly transmitting tag. As used herein, a unique tag ID may refer to data assigned to or otherwise associated with a specific one of the wirelessly transmitting tags that is unique to the specific tag and which identifies the tag to a user and/or to other devices or device components. The unique tag ID may include numbers, letters, characters, codes, strings, or other forms of data which may allow identification of the corresponding tag apart from the other wirelessly transmitting tags. In some embodiments, the unique tag ID may be unique to a specific tag, and that specific tag may have only one tag ID. Alternatively, the same tag may have multiple unique tag IDs. Examples of a tag ID may include a serial number, part number, bar code, UUID, EPC, and other data unique to a specific wirelessly transmitting tag. In some embodiments, the unique tag ID may be paired with or assigned to the specific tag at the time the specific tag is manufactured or programmed. For example, the wirelessly transmitting tags may arrive from a tag supplier preprogrammed with tag IDs, or the tag IDs might be programmed by the establishment or by an entity upstream from the establishment on the tag's chain of distribution.

In some embodiments, the specific wirelessly transmitting tag may be associated with the previously purchased product. That is, the unique tag ID may correspond to a specific wirelessly transmitting tag which may, in turn, be associated with the previously purchased product. As used herein, to be "associated with" may mean that the specific wirelessly transmitting tag (referred to hereafter as "the specific tag") may be assigned to, or otherwise paired or correlated with, the previously purchased product. The pairing or association between the specific tag and the previously purchased product may be stored in a data structure, so that information of the specific tag (e.g., a unique tag ID of the specific tag) may be used to access information of the previously purchased product from the data structure, and vice versa.

In some embodiments, to be "associated with" may additionally or alternatively mean that the specific tag is physically attached to the previously purchased product. For example, the specific tag may be attached to the previously purchased product through adhesive, embedding, sewing, mounting, bonding, friction fit, pocketing, tying, wrapping, fastening, or any other type of physical connection. In some embodiments, the specific tag may be attached to the previously purchased product in a permanent or semi-permanent manner, such that it may be difficult to remove the specific tag from the product or such that removal of the specific tag from the product may damage the product.

Disclosed embodiments may include at least one data structure, as defined elsewhere herein. In some embodiments, the at least one processor of the electronic security system may be configured to access, search for, retrieve, add, modify, overwrite, and/or remove data from the at least one data structure. In some embodiments, other communication devices such as the mobile communications device associated with the previous purchaser may be configured to access some or all of the data stored in the at least one data structure. In some embodiments, a data structure associated with the electronic security system may contain information of the wirelessly transmitting tags (including a unique tag ID of each tag) and information of products previously sold and/or currently offered by the establishment (including a unique product identifier, or "product ID," such as a serial number, unique EPC code, stock keeping unit (SKU), universal product code (UPC), barcode, or QR code, for each product). The data structure may also contain information of pairings between tag IDs and product IDs, including information of the pairing between the unique tag ID and a product ID of the previously purchased product. In some embodiments, the at least one data structure associated with the electronic security system may contain a purchase transaction record, as defined herein. As a non-limiting example, the data structure may include purchase transaction record 18124 depicted in FIG. 18. Additionally, or alternatively, the data structure associated with the electronic security system may contain inventory information of the establishment. As a non-limiting example, the data structure may include data structure 18122 depicted in FIG. 18.

Disclosed embodiments may include identifying the unique tag ID of the specific wirelessly transmitting tag in a data structure. For example, identifying a unique tag ID of the specific tag may include performing a lookup in a data structure, which may contain at least one of a purchase transaction record (as defined herein) and inventory information of the establishment. In some embodiments, identifying the unique tag ID in a data structure may include receiving a product ID of the specific product (e.g., the previously purchased product) and performing a lookup of the product ID in the data structure. Due to the association between the product ID of the previously purchased product and the unique tag ID of the specific wirelessly transmitting tag, the product ID may be used to access information of the corresponding wirelessly transmitting tag from the data structure, including the tag's unique tag ID.

Disclosed embodiments may include identifying the unique tag ID in a data structure following receipt of the notification of intent to return a previously purchased product to the establishment. In some embodiments, information included in the notification may be used to identify the unique tag ID in the data structure. For example, the notification may include a product ID of the previously purchased product that the previous purchaser intends to return to the establishment. As discussed above, the product ID may be used to perform a lookup in a data structure to identify the unique tag ID of the specific tag.

In alternative embodiments, identifying the unique tag ID of the specific tag associated with the previously purchased product may include receiving the unique tag ID from the mobile communications device of the previous purchaser. For example, the mobile communications device may provide the unique tag ID to the at least one processor as information included in the notification of intent to return the previously purchased product, or in another data transmission. In such cases, it may not be necessary to perform a look-up in a data structure to identify the unique tag ID.

As an illustrative example, FIG. 18 depicts a processor 18114 configured to receive a product ID of a previously purchased product from mobile communications device 18116. For example, the product ID may be included in the notification of intent to return the previously purchased product, which may be transmitted from device 18116 to processor 18114. Alternatively, the product ID may be included in a different transmission from device 18116 to processor 18114. Processor 18114 may perform a lookup of the product ID in a data structure containing information of pairings between wirelessly transmitting tags 1100 and specific products; the data structure may include one or both of data structure 18122 and purchase transaction record 18124. Based on the lookup, processor 18114 may access information of the specific tag associated with the previously purchased product, including the tag's unique tag ID.

In some embodiments, mobile communications device 18116 may be configured to obtain the unique tag ID and send the unique tag ID to processor 18114. For example, device 18116 may receive the unique tag ID by scanning or capturing an image of a barcode, QR code, or another identifier of the previously purchased product and may perform a lookup of the product identifier (e.g., in data structure 18122 or purchase transaction record 18124) to access the corresponding unique tag ID. As another example, the specific wirelessly transmitting tag 1100 associated with the previously purchased product may transmit a signal containing information of the unique tag ID to device 18116 via a communication medium such as NFC. Device 18116 may then send the unique tag ID to processor 18114.

In disclosed embodiments, the data structure may include information of a time period over which the previously purchased product is authorized for return. In some embodiments, the time period over which the previously purchased product is authorized for return (referred to hereafter as the authorized return period) may be determined by the establishment, the manufacturer of the previously purchased product, a distributer of the previously purchased product, the previous purchaser, or by another individual or entity. Alternatively, the authorized return period may be automatically determined by a processor (e.g., the at least one processor of the electronic security system) and stored in the data structure. In some embodiments, the authorized return period of the previously purchased product may be a length of time (e.g., 30 days, 90 days, or any other time period) determined by the establishment and may correspond to the length of time for which the establishment plans to keep an inventory of the previously purchased product and offer the product for sale. Thus, the end of the authorized return period may coincide with the time when the establishment stops offering the previously purchased product for sale. In some embodiments, the authorized return period may be dictated by regulations governing the establishment (such as a minimum period for returns mandated by law). In some embodiments, the previously purchased product may be ineligible for return to the establishment after the end of the authorized return period.

Disclosed embodiments may include checking, upon receiving the notification of intent to return the previously product to the establishment, whether the notification was received within the time period over which the previously purchased product is authorized for return (that is, within the authorized return period). As an illustrative example, processor 18114 shown in FIG. 18 may receive the notification of intent to return the previously product from mobile communications device 18116. Upon receiving the notification, processor 18114 may access information of the authorized return period from at least one of the data structure 18122 and the purchase transaction record 18124. Processor 18114 may then determine whether the notification was received from device 18116 within the authorized return period. For example, processor 18114 may receive a timestamp indicating when the notification was received from device 18116 (or when the notification was generated by device 18116) and may determine whether the timestamp falls within the authorized return period.

Disclosed embodiments may include authorizing the return of the previously purchased product to the establishment if the notification was received within the time period. For example, authorizing the return of the previously purchased product may include sending a notification with drop-off instructions to the mobile communications device associated with the purchaser. Authorizing the return of the previously purchased product may also include updating the data structure to include an indication that a return of the previously purchased product was requested and authorized. Disclosed embodiments may also include denying the return of the previously purchased product to the establishment if the notification was received outside of the time period. For example, denying the return of the previously purchased product may include sending a denial notification to the mobile communications device associated with the purchaser and updating the data structure to include an indication that a return of the previously purchased product was requested and denied.

Disclosed embodiments may include verifying that a specific product identified by the unique tag ID of the specific tag was purchased by the previous purchaser. In some embodiments, the verification may be performed upon receipt of the notification of intent to return the previously purchased product. For example, verifying that a specific product identified by the unique tag ID was purchased by the previous purchaser ("the verification") may include confirming that the previous purchaser is the owner or rightful possessor of the products that she intends to return to the establishment; this may allow identification of situations where a customer is attempting to return a product that is owned by someone else. In some embodiments, the verification may include accessing a purchase history of the specific product(s) that the previous purchaser intends to return to the establishment. For example, the specific product's purchase history may be contained in the data structure and may include information of individuals who currently or previously owned the specific product(s). From the purchase history, the at least one processor may receive identifying information of the person who currently owns the specific product(s); the identifying information may include a unique identifier of the current owner, such as their name, email address, or unique customer number. The identifying information of the current owner may be compared to identifying information of the previous purchaser to determine if the previous purchaser is the current owner. Additionally, or alternatively, if the previous purchaser purchased the item as a gift, and received a gift certificate or exchange note along with the product, the person who received the product as a gift (along with the gift certificate or exchange note) may use the gift certificate or exchange note to identify themselves as the current owner of the product eligible for return, despite their identity not being included in the purchase transaction record, based on the inclusion in the purchase transaction record of the fact that a gift certificate or exchange note was provided as part of the purchase.

If it is determined that the previous purchaser is the current owner, the previously purchased product may be verified as having been purchased by the previous purchaser. Disclosed embodiments may include updating the data structure when the previously purchased product is verified as having been purchased by the previous purchaser. Updating the data structure may include addition of a verification designation to information of the previously purchased product in the data structure. However, if it cannot be determined that the previous purchaser is the current owner (e.g., if the previous purchaser is not included in the purchase history or if the previous purchaser is not the most current owner in the purchase history), then the previously purchased product may not be verified as having been purchased by the previous purchaser. Disclosed embodiments may include averting updating the data structure if the previously purchased product is unverified as having been purchased by the specific previous purchaser. In some embodiments, averting updating the data structure may include foregoing addition of a verification designation to information of the previously purchased product in the data structure. In some embodiments, the at least one processor may require verification of the previously purchased product before authorizing the return of the previously purchased product to the establishment or before issuing a refund to the previous purchaser. Thus, the previous purchaser may be prevented from returning products that are owned by someone else.

In some embodiments, the previous purchaser may complete the return by dropping the products off at the establishment. For example, when the previous purchaser is ready to return a previously purchased product to the establishment, she may place the product in a bag or package (e.g., with the products' original tags), bring the product into the establishment, and place the product in a designated drop-off area. The previous purchaser may then use the mobile communications device to send a notification to the electronic security system indicating that the product has been returned and may leave the establishment without needing to complete a transaction at a POS terminal. In some embodiments, the electronic security system may send the mobile communications device a confirmation of receipt of the previously purchased product.

In some embodiments, the previous purchaser may use the mobile communications device to notify the electronic security system that the previously purchased product has been returned to the establishment (e.g., to send a return completion notification to the establishment). The return completion notification may include identifying information of the specific product that was returned to the establishment (the "returned product"). For example, the previous purchaser may use the mobile communications device to access a website or to run an application associated with the establishment, which may include a user interface or other mechanism for generating the return completion notification. The return completion notification may be generated, for example, based on a scan of a barcode or QR code of the returned product with the mobile communications device or based on a user selection of the returned product on a graphical user interface (GUI) displayed on the mobile communications device. Alternatively, the return completion notification may be generated by other methods.

For example, FIG. 16 shows a previous purchaser 1104a returning a previously purchased product 16016 to a drop-off area 16014 in the establishment. In the example shown, returned product 16016 may be returned in a box or other package. Once she has dropped off product 16016 in area 16014, previous purchaser 1104a may use a mobile communications device 18116 to scan a barcode or QR code on product 16016 or on a tag or package of the product. Device 18116 may use the scanned barcode or QR code to generate a return completion notification and may send the notification to a processor of the establishment. In some embodiments, the return completion notification may include identifying information of returned product 16016.

Disclosed embodiments may include updating the data structure to indicate that the previously purchased product was returned to the establishment. For example, the at least one processor may receive an identifier of the returned product based on the return completion notification and may use the identifier of the returned product to confirm that the previous purchaser returned the correct product to the establishment (e.g., by comparing the identifier of the returned product to a product ID specified in the notification of intent to return the previously purchased product to the establishment). When it is confirmed that the previously purchased product (e.g., the product specified in the notification of intent to return the previously purchased product) was returned to the establishment, the at least one processor may update information of the previously purchased product in the data structure to indicate that the product has been returned. After the previously purchased product is returned to the establishment (and, optionally, after the data structure is updated to indicate that the previously purchased product was returned), the at least one processor may perform one or more actions to finalize the return, such as notifying store staff of the return, reimbursing the previous purchaser, adding the returned products to the establishment's inventory, re-activating an alert mechanism for the returned products. These exemplary actions are discussed below.

Disclosed embodiments may include initiating a refund transaction. For example, the at least one processor may be configured to initiate a refund transaction. As used herein, a refund transaction may include the transfer of money or other consideration from the establishment to the previous purchaser in exchange for the return of the previously purchased product. In some embodiments, the previous purchaser may be refunded for a portion or the entirety of the purchase price for the previously purchased product or, alternatively, for a different amount. In some embodiments, the at least one processor may be configured to initiate the refund transaction based on the data structure being updated to indicate that the previously purchased product was returned to the establishment. Alternatively, the refund transaction may be initiated based on a different triggering event, such as the addition of the returned product to the establishment's inventory, confirmation by store staff that the returned product is in a satisfactory condition to be returned, or receiving a refund authorization from the previous purchaser's mobile communications device.

In some embodiments, funds for the refund transaction may be accessed from a financial account or instrument (e.g., a bank account or digital wallet) held by the establishment or by a subsidiary, parent company, affiliated company, corporate officer, owner, or any other individual or entity associated with the establishment. The at least one processor may be configured to access this account or instrument to withdraw funds for completing the refund transaction. In some embodiments, the at least one processor may be configured to access financial accounts or instruments held by or otherwise associated with the previous purchaser to refund the previous purchaser for the return. Examples of financial accounts or instruments of the previous purchaser may include a bank account or digital wallet account held by the previous purchaser (e.g., PayPal, Venmo, Apple Pay, or Zelle), a credit card, debit card, or any other instrument held by the previous purchaser or which the previous purchaser has been authorized to use for returning the previously purchased product. In some embodiments, upon completion of the refund transaction, the at least one processor may be configured to update the data structure to reflect, for example, that the previous purchaser has been reimbursed for the returned products and that the previous purchaser is no longer the owner of the returned products.

As an example, FIG. 17 depicts a Wide Area Network (WAN) 17310 for communication with one or more banking or digital wallet platforms 17320. In some embodiments, a processor performing the refund transaction may be configured to access a first banking or digital wallet platform 17320 associated with the establishment to withdraw funds for the refund transaction. The processor may transfer the funds to a second banking or digital wallet platform 17320 associated with the previous purchaser. In some embodiments, the processor may send a notification to the previous purchaser (e.g., to mobile communications device 18116) when the refund transaction is completed.

Disclosed embodiments may include delaying refunding the previous purchaser until staff at the establishment have examined the returned previously purchased product and deemed the previously purchased product eligible for return. For example, once the data structure is updated to indicate that the previously purchased product was returned to the establishment, the at least one processor may send an alert to a communications device of one or more employees of the establishment. The communications device may include, for example, a desktop computer, a laptop, a point-of-sale (POS) terminal, a handheld scanner, a smartphone, a cellular phone, a tablet, a pager, or any other device configured to receive a signal from the at least one processor and output a notification to the establishment staff. In some embodiments, the notification sent to the establishment staff may include an identifier of the returned product (e.g., a product ID or a description of the product's style, size, color, etc.), as well as additional information such as the time when the product was returned to the establishment and location information of the product. While the notification is sent to the establishment staff, the at least one processor may refrain from initiation and/or completing the refund transaction (e.g., may delay transmitting the refund amount to the previous purchaser's bank account or digital wallet) until the returned product is deemed eligible for return.

In some embodiments, the notification sent to establishment staff may indicate that the returned product should be examined by a member of the establishment staff to confirm that the product is in sufficiently good condition to be eligible for return. A member of the establishment staff may examine the returned product and send an indication to the at least one processor (e.g., via a communication device) of whether the returned product (e.g., the previously purchased product) is eligible for return. If the returned product is indicated as eligible for return, the refund transaction may be completed, the returned product may be added to the establishment's inventory, and/or the data structure may be updated to include an indication that the returned product was found eligible for return. Additionally, or alternatively, if the returned product is indicated as ineligible for return (e.g., due to the product's poor condition), the at least one processor may send a notification to the mobile communications device associated with the previous purchaser, may send a notification to a member of establishment staff (e.g., a notification with instructions to dispose of the returned product), and/or may update the data structure to include an indication that the returned product was found ineligible for return and/or to include an indication of the return product's condition.

Disclosed embodiments may include enabling an ability to initiate an alarm. As described elsewhere in this disclosure, an alarm may refer to an alert or notification generated by a component of the electronic security system for notifying another component, another system, and/or a person that the electronic security system has detected an attempted theft, an unauthorized taking or removal of a product from the establishment, an attempt to tamper with product so that the product does not trigger an anti-theft alarm (e.g., attempting to remove a security tag from a product), an attempt to shutdown the electronic security system or render the electronic security system ineffectual (e.g., by transmitting strong radio signals to overwhelm the capability of the system's at least one receiver), or another intrusion into or loss from the establishment. In some embodiments, the electronic security system may include fixed infrastructure configured to initiate an alarm; examples may include speakers, lights, and/or graphic displays arranged at strategic locations within the establishment such as at the entrance and/or exit, near a checkout counter or self-checkout kiosk, in a storage area, near a pick-up area, or near a drop-off area.

The at least one processor may be configured to cause an alarm to be initiated by causing activation of the alarm-initiating components when a certain event occurs. The at least one processor may also be configured to disable an ability of the alarm-initiating components to initiate an alarm. As a result, the alarm-initiating components may be controlled to forego initiating an alarm when a certain event occurs (e.g., when a tagged product is brought through an EAS gate), even when the event would otherwise trigger an alarm. As used herein, enabling an ability to initiate an alarm may include controlling the alarm-initiating components to change from a disabled state (e.g., a state in which the alarm-initiating components forego initiating an alarm when a triggering event occurs) to an enabled state (e.g., a state in which the alarm-initiating components initiate an alarm when the triggering event occurs). Additionally, or alternatively, enabling an ability to initiate an alarm may include controlling the alarm-initiating components to change from a first enabled state to a second, different enabled state in which at least one characteristic of the alarm is changed.

Disclosed embodiments may include enabling an ability to initiate an alarm when the at least one receiver receives a transmission from the specific tag associated with the previously purchased product in proximity to the EAS gate. In disclosed embodiments, enabling the ability to initiate an alarm may occur upon (e.g., may occur after or based on) updating the data structure to indicate that the previously purchased product was returned to the establishment. For example, prior to the data structure being updated, the alarm-initiating components of the electronic security system may be controlled to forego initiating an alarm when a receiver detects passage of the previously purchased product (or its associated wirelessly transmitting tag) through the establishment's EAS gate. This may allow the previous purchaser to bring the product into the establishment for the return transaction without initiating the alarm. However, following the update of the data structure, the at least one processor may control the alarm-initiating components to initiate an alarm when at least one receiver of the electronic security system detects the specific tag associated with the previously purchased product (e.g., receives a transmission from the specific tag) in proximity to the EAS gate. As a non-limiting example, an alarm may be initiated when the specific tag is determined to be within one meter from the space in between the pedestals of the EAS gate. As a result, the alarm may be initiated when a thief attempts to steal the previously purchased product or when another customer accidentally attempts to leave the establishment with the previously purchased product, rather than a different product that they have purchased (e.g., in the event of a product mix-up).

As an example, FIG. 16 depicts a previous purchaser 1104*a* leaving a previously purchased product 16016 at a designated drop-off area 16014 and using a mobile communications device (e.g., device 18116 of FIG. 18) to transmit a notification that the previously purchased product 16016 was returned to the establishment. For example, the previous purchaser 1104*a* may use the mobile communications device to scan a barcode or other machine-readable code on the previously purchased product 16016 and/or on a package holding the product. Based on the scanned information, the mobile communications device may generate the notification that the previously purchased product was returned and transmit the notification to a processor of the establishment (e.g., processor 18114 of FIG. 18).

Prior to receiving the notification, the processor may disable an ability of alarm 1114 to sound when product 16016 is detected in proximity to EAS gate 1110, 1112; this may allow previous purchaser 1104a to bring product 16016 into the establishment without incident. Based on receiving the notification from device 18116, the processor may update a data structure (e.g., data structure 18122 and/or purchase transaction record 18124) to indicate that previously purchased product 16016 was returned to the establishment. The processor may also enable an ability of alarm 1114 to sound when product 16016 is detected in proximity to EAS gate 1110, 1112. As a result, when product 16016 is brought into proximity with the EAS gate 1110, 1112 (e.g., within one meter of the gate), receivers 11300 may receive signals transmitted from the product's wirelessly transmitting tag. The processor may perform a lookup of the tag's unique tag ID in the data structure and determine that the tag is associated with a product that is not authorized to leave the establishment. As a result, the processor may cause activation of alarm 1114 to signal and prevent the attempted theft of previously purchased product 16016.

In disclosed embodiments, the data structure may be configured, prior to receipt of the notification of intent to return the previously purchased product, to maintain an indication to disable the ability to initiate an alarm when the at least one receiver receives a transmission from the specific tag associated with the previously purchased product in proximity to the EAS gate. As used herein, an indication may include an instruction for the at least one processor to perform a specific action when a specific triggering event occurs. For example, before the notification of intent to return the previously purchased product is received from the mobile communications device, the data structure may include an indication, or instruction, for the at least one processor to control the alarm-initiating components in the establishment to forego initiating an alarm when the previously purchased product (or the product's tag) is detected in proximity to the EAS gate. This may allow the previous purchaser to bring the product into the establishment without the alarm being triggered. In disclosed embodiments, enabling the ability to initiate an alarm may include updating the data structure to enable initiation of the alarm when the at least one receiver receives a transmission from the specific tag associated with the previously purchased product in proximity to the EAS gate. For example, after the data structure is updated to indicate that the previously purchased product was returned to the establishment, the at least one processor may further update the data structure by changing or removing the aforementioned indication to disable the ability to initiate an alarm. Instead, the data structure may be updated to include an indication enabling initiation of the alarm (e.g., instructing the at least one processor to cause activation of the alarm-initiating components when the previously purchased product (or the product's tag) is detected in proximity to the EAS gate).

Disclosed embodiments may include sending a notification to the mobile communications device associated with the previous purchaser indicating that a return process of the previously purchased product is complete. For example, the at least one processor may be configured to send a notification indicating that a return process of the previously purchased product is complete (referred to hereafter as a "return completion notification") to the mobile communications device based on the data structure being updated to indicate that the previously purchased product was returned to the establishment, based on completion of a refund transaction, based on receiving confirmation from establishment staff that the previously purchased product is eligible for return, or based on some other triggering event.

Disclosed embodiments may include receiving an indication that the returned previously purchased product was repurchased by another purchaser. For example, the at least one processor may receive the indication that the returned product was repurchased based on an electronic purchase transaction being initiated for the other purchaser to buy the returned product, based on information of the product being purchased in the store it was returned to, an out-of-store product purchase of the returned product, or by other means of notifying the at least one processor about the returned product being repurchased. In some embodiments, upon receiving the indication that the returned previously purchased product was repurchased by another purchaser, the at least one processor may disable the ability to initiate an alarm upon detection of the specific tag associated with the returned previously purchased product. As a result, the other purchaser may leave the establishment with the product without the alarm being initiated.

Disclosed embodiments may include determining, based on transmissions received by the at least one receiver, tag locations at a time of transmission, to thereby determine tag proximity to the EAS gate. In some embodiments, the proximity of the tag to the EAS gate may be ascertained by the at least one processor based on the range of transmission of the EAS gate signals, outside of which the specific tag would not receive the EAS gate signal and therefore would not transmit.

By way of example, FIGS. 13A and 13C depict a product 13210 hanging from a shelf that may contain a wirelessly transmitting tag 1100 configured to transmit an ID signal 13102. Due to the proximity of tag 1100 to receiver 11300c (see FIG. 13C), the power level of the signal 13102 received by receiver 11300c may be higher than the power level of the signals 13102 received by other receivers located further away from tag 1100 (e.g., receivers 11300b and 11300d). Therefore, the at least one processor of the electronic security system may determine that the product 13210 is located on or near the shelf of FIG. 13C since the locations of receiver 11300c and the shelf may be known beforehand.

Disclosed embodiments may include receiving location-identifying information. The location-identifying information may indicate a location of the previous purchaser, the mobile communications device, or another subject. For example, the location-identifying information may include GPS data, data of a device-tracking program (e.g., Apple's Find My iPhone, Google's Find My Device, and Samsung's Find My Mobile), data transmitted from the mobile communications device to a receiver associated with the establishment and/or the at least one processor, or other data indicating the location of the mobile communications device. Disclosed embodiments may include determining, based on the location-identifying information, that the mobile communications device associated with the previous purchaser is located within the establishment. For example, the location of the device may be determined and compared with a known location of the establishment. It may be determined, based on the comparison, whether the mobile communications device is located within the establishment. In some embodiments, the at least one processor may only authorize the return of the previously purchased product if the mobile communications device is determined to be within the establishment. Additionally, or alternatively, the at least one processor may send a notification to the mobile communications device, that the return transaction can only be completed within the establishment, or block the mobile communications device from accessing the portion of the website or application where a return transaction can be initiated, if the mobile communications device is determined to be located outside the establishment.

In disclosed embodiments, the at least one receiver may be configured to receive tag signals reflecting sensing of the EAS gate; the tag signals may be transmitted by the wirelessly transmitting tags. As used herein, a tag signal may include a transmission sent by one of the wirelessly transmitting tags. A tag signal may include, for example, identifying information of the tag (e.g., the tag's unique tag ID) and/or an indication of the triggering event of the transmission. For example, and as discussed above, an EAS gate may be provided near the entrance or exit of the establishment and/or at another designated location and may be configured to transmit an activation signal (e.g., an EAS signal) to wirelessly transmitting tags in proximity to the EAS gate, such as tags associated with products or with packages being carried through the EAS gate. In response to sensing (e.g., detecting or receiving) the EAS signal from the EAS gate, a wirelessly transmitting tag may be configured to output a signal in a different frequency band than the EAS signal. The at least one receiver may be configured to receive the signal transmitted by the tag (that is, a tag signal reflecting sensing of the EAS gate by the wirelessly transmitting tag). However, the EAS gate may not detect the signal transmitted by the tag because the signal may be outside a range of frequencies detected by the EAS gate. The specific tag may further be configured to include in the transmission information regarding the state of the tag, for example information indicating that the tag is transmitting the signal in response to receiving an EAS signal from an EAS gate.

In disclosed embodiments, the specific tag associated with the previously purchased product may be configured to transmit immediately upon sensing the EAS gate (e.g., upon receiving the EAS signal from the EAS gate). Additionally, or alternatively, the specific tag may be configured to transmit, upon sensing the EAS gate, an ID transmission indicating the specific tag is in proximity to the EAS gate. For example, after the specific tag receives the EAS signal from an EAS gate, the specific tag may be configured to transmit a signal indicating the tag's unique tag ID. Thus, the source of the signal may be determined based on the tag ID specified by the transmitted signal. In some embodiments, a signal transmitted by the specific tag based on sensing the EAS gate may differ from signals transmitted by the specific tag based on other triggers. For example, the transmitted signals may differ in at least one aspect, such as transmission power level, phase, duration, frequency, length of a delay period before beginning transmissions, and/or information contained within the signal. In some embodiments, the specific tag may only sense the EAS gate when the tag is in close enough proximity to the EAS gate to detect and be triggered by the EAS signal. Thus, the signal transmitted by the specific tag based upon sensing the EAS gate may indicate proximity of the specific tag to the EAS gate, since the signal is different from signals transmitted by the specific tag in other situations.

For example, FIG. 1 depicts a purchaser 1104 exiting through an EAS gate 1110, 1112 with a first product 1106 with a first wirelessly transmitting tag 1100a, and also with a second product 1122 with a second wirelessly transmitting tag 1100b. Tags 1100a and 1100b may be configured to sense EAS gate 1110, 1112 based on receiving EAS signal 1118. In response, tags 1100a and 1100b may immediately transmit tag ID signals 1102a and 1102b, without including a delay period before beginning the transmissions. Receiver 1124 of the electronic security system may detect tag ID signals 1102a and 1102b and a processor of the electronic security system (e.g., processor 11004 of FIG. 11 or processor 18114 of FIG. 18) may determine whether the detected ID signals 1102a and 1102b are associated with products that are authorized to pass through EAS gate 1110, 1112. In some embodiments, the processor may cause activation of an alert mechanism such as an audible alert or a flashing light to signal that products 1106 and 1122 are not authorized to leave the establishment. However, if products 1106 and 1122 are authorized to leave the establishment, the processor may disable activation of the alert mechanism while purchaser 1104 passes through the EAS gate with the products.

Disclosed embodiments may involve systems, methods, and computer readable media for wirelessly purchasing merchandise displayed in store windows or other display areas. For example, when a prospective customer passes by a store's display window, she may see an item in the display that she would like to purchase or about which she would like to receive additional information, such as the item's price, size, and care instructions. In disclosed embodiments, the particular display window may be identified by detecting the location of the customer's mobile device (e.g., cellphone, smartphone, or wearable computing device) and determining which display window is in the device's vicinity. In disclosed embodiments, a list of items that are currently on display in the window, such as with images and/or textual descriptions of individual items may be relayed to the customer's device. The customer may use her device to select and purchase desired items and may also select a delivery method for each purchased item. In disclosed embodiments, the customer's order may be received, the purchase transaction may be completed and arrangements may be made for the purchased items to be delivered via the customer's specified delivery method(s).

Advantageously, disclosed embodiments may improve the customer's shopping experience by enabling the customer to obtain information of displayed items and to complete purchases even when the store is closed and even if the customer does not wish, or does not have enough time, to enter the store. In addition, disclosed embodiments may provide a more user-friendly alternative to traditional online shopping because particular items on display may be quickly identified based on the customer's location and information of those items may be sent to the customer's device. Thus, the customer may avoid browsing long lists of items and conducting searches on the store's website to find particular items.

Further, disclosed embodiments may also be beneficial for retailers because the embodiments may allow retailers to complete sales to customers outside of the store and to sell items even when the store is closed. In addition, the disclosed embodiments may allow retailers to generate sales revenue from displays that are not directly attached to the store, such as "pop-up displays" in temporary locations (e.g., temporary displays at flea markets, concerts, and fairs) and displays in high-traffic areas that are near, but not immediately adjacent to, the retailer's store (e.g., in another area of a shopping mall or on a main street or thoroughfare a few blocks away from the store).

Disclosed embodiments may include wireless transactions and wireless transaction operations. As used herein, a transaction may include an agreement or arrangement between two or more parties to exchange personal property or real property for monetary payment or other consideration. For example, a transaction may include an exchange between a commercial seller (such as a store or retail establishment) and a buyer, in which the buyer purchases, rents, leases, borrows, or otherwise acquires one or more items from the seller in exchange for monetary payment. In some embodiments, a wireless transaction may include a transaction, as defined above, that is performed in whole or in part via a wireless connection. For example, a buyer and seller may perform a wireless transaction using electronic devices connected by a wireless connection, such as Wi-Fi, Bluetooth, near-field communication (NFC), a cellular network, ZigBee, Z-wave wireless protocols, a LAN or WAN network, or any other suitable wireless medium for transmitting data between parties. As used herein, wireless transaction operations may include any act, instance, step, process, or manner of functioning for initiating, performing, or completing a wireless transaction.

Disclosed embodiments may include a system for conducting wireless transaction communications. In some embodiments, a system for conducting wireless transaction communications may include any type of wireless networking arrangement enabling the exchange of information and/or data between parties to a wireless transaction. For example, a system for conducting wireless transaction communications may include an arrangement enabling wireless communications between a seller and a buyer, such as communications regarding products offered for sale, offers to make a purchase, acceptances of offers, and transfers of money.

As a non-limiting example, FIG. 18 depicts a system 18110 configured for conducting wireless transaction communications. As discussed in detail elsewhere in the present disclosure, system 18110 may include network 18112 enabling the exchange of data and/or information between elements of the system such as processor(s) 18114 and mobile communications device 18116. In some embodiments, network 18112 may include any type of wireless computer networking arrangement configured for exchanging data. System 18110 may also include at least one processor 18114, which may be associated with a seller such as a retail store. For example, processor 18114 may include a desktop computer, a laptop, a server, a virtual server, a point-of-sale (POS) terminal, a handheld scanner, a smartphone, a tablet, a pager, or any other wireless communication device. Processor 18114 may be located within a retail establishment and/or may be used by employees and other individuals associated with the retail establishment for business purposes, including performing wireless transaction operations. System 18110 may also include a mobile communications device 18116, such as a cellular phone, smartphone, tablet, desktop, laptop, PDA, handheld scanner, wearable device, or other mobile computing device. In some embodiments, device 18116 may be associated with a buyer or a customer to the retail establishment. In some embodiments, a buyer and seller may perform a wireless transaction using mobile communications device 18116 and processor 18114, respectively, which may communicate wirelessly via network 18112.

Disclosed embodiments may include at least one processor, as defined elsewhere in the present disclosure. As a non-limiting example, FIG. 18 depicts at least one processor 18114. Disclosed embodiments may include and/or access at least one data structure. As used herein, a data structure may include an ordered or un-ordered storage of information, saved in a computer-accessible form on a medium which is both readable and writable. A person, entity or device, referred to as a requester, may be required to provide some form of credentials, log-in, certificate or identification, in order to determine whether the requester is authorized to access the information stored in the data structure. Such authorization data may be general for the entire data structure, or it may be specific for each and every piece of stored information, or to specific characteristics and attributes of the entire data structure but not to other specific characteristics and attributes.

In some embodiments, the at least one processor of the disclosed system may be configured to access data contained in the at least one data structure. Additionally, the at least one processor may be configured to search for, retrieve, add, modify, overwrite, and/or remove data from the at least one data structure. As a non-limiting example, the at least one data structure may include data structure 18122 depicted in FIG. 18, which may be accessed by processor(s) 18114.

In disclosed embodiments, the at least one data structure may contain identities of a plurality of display areas. As used herein, a display area may include any region, zone, room, or area in which products offered for sale are presented to the public in order to promote the products and/or the establishment selling the products. In some embodiments, a display area may include a structure or fixture that arranges the products for viewing by prospective customers and other members of the public; some examples of a structure or fixture in a display area may include a cabinet, shelf, rack, hamper, bin, window display, display case, or table. Additionally, or alternatively, such structures or fixtures may include a mannequin or display doll, or any other similar structure designed to mimic the use of the displayed item in real life. Disclosed embodiments may include a plurality of display areas, that is, a plurality of regions or areas for presenting products offered for sale to the public. In some embodiments, the plurality of display areas may be included within the same store or building. Additionally, or alternatively, the plurality of display areas may be owned or used by the same individual or entity (e.g., by the same corporation). The plurality of display areas may be located in the same geographical area or in different geographical areas (e.g., in different stores or buildings, at different addresses, in different cities or countries, etc.). In some embodiments, the at least one data structure may contain additional information of the display areas, such as location information of each display area.

Figure 21:
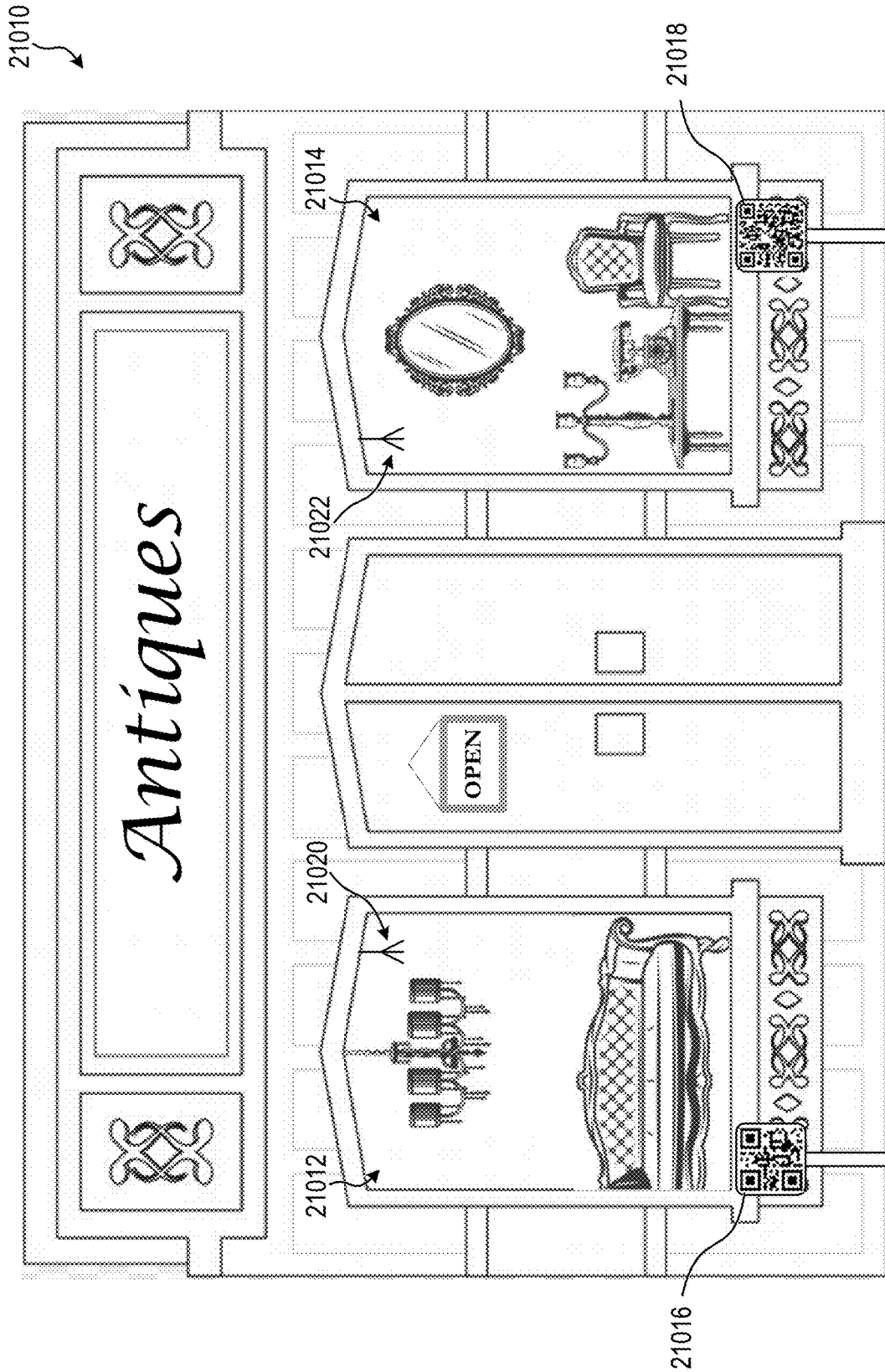
FIG. 21 illustrates an exemplary retail establishment with multiple display areas for displaying offered products, consistent with disclosed embodiments.

As a non-limiting example, FIG. 13A shows a shelf 13240 and rack 13250, both of which may be considered as a display area because both the shelf 13240 and rack 13250 may display products (in this example, clothing) in a manner that encourages customers to view and purchase the products. As another non-limiting example, FIG. 21 depicts a retail establishment 21010 including two display areas 21012 and 21014, each of which may display one or more items offered for sale by the establishment. In the example shown in FIG. 21, display areas 21012 and 21014 may be configured as window displays. As also illustrated in FIG. 16, mannequin 16022 may be a display area.

As mentioned above, the at least one data structure may contain identities of the plurality of display areas. In some embodiments, an identity of a display area (referred to hereafter as a "display area ID") may include data assigned to or otherwise associated with a specific one of the display areas that is unique to the specific display area and which identifies the display area to users and/or to devices. A unique display area ID may include numbers, letters, characters, codes, strings, or other forms of data which may allow identification of the corresponding display area apart from the other plurality of display areas. In some embodiments, each display area ID may be unique to a specific display area, and that specific display area may have only one display area ID. Alternatively, the same display area may have multiple unique display area IDs. Examples of a display area ID may include a serial number, part number, bar code, QR code, EPC, and other data unique to a specific display area. Additionally, or alternatively, a display area ID may include an identification of its location, such as a street address, GPS coordinates, or coordinates relating to an indoor map of a shopping mall. Once the pairing or association between a given display area and a specific display area ID is established, the pairing or association may be stored in the at least one data structure.

In some embodiments, a display area's unique ID may be displayed within or near the display area so that the ID may be scanned or photographed by devices with imaging components (e.g., by a camera on a smartphone or laptop). For example, a display area's unique ID may be displayed on a sign, sticker, banner, flag, post, hanging tag, or any other display mechanism on which the unique ID is perceptible to the public. To illustrate, FIG. 21 depicts a first display area 21012 having a corresponding display area ID 21016, which may be configured as a scannable graphical code (e.g., a QR code). FIG. 21 also depicts a second display area 21014 having a different corresponding display area ID 21018. In some embodiments, a person wishing to receive additional information of products shown in one of the display areas may scan the corresponding display area ID using a smart device and may receive the requested information on their smart device in response.

In disclosed embodiments, the at least one data structure may contain identities of a plurality of products associated with the plurality of display areas. A product may be displayed in or offered for sale by a retail establishment. In some embodiments, each of the plurality of products may be associated with at least one of the plurality of display areas. As used herein, to be "associated with" may mean that a product is housed in a specific display area, arranged for public viewing within a specific display area, or otherwise assigned to or paired with a specific display area.

As mentioned above, the at least one data structure may contain identities of the plurality of products. In some embodiments, an identity of a product (referred to hereafter as a "product ID") may include data assigned to or otherwise associated with a specific product for purposes of identification. A product ID may include numbers, letters, characters, codes, strings, or other forms of data which may allow identification of the corresponding product. Some non-limiting examples of a product ID include a serial number, unique EPC code, stock keeping unit (SKU), universal product code (UPC), barcode, or QR code. In some embodiments, a specific product's ID may be unique to the specific product, so that the product may be differentiated from the other plurality of products. Once the pairing or association between a given product and a specific product ID is established, the pairing or association may be stored in the at least one data structure.

Disclosed embodiments may include receiving a request for information from a mobile communications device. For example, the at least one processor may be configured to receive a request for information from a mobile communications device. As a non-limiting example, FIG. 18 illustrates an embodiment in which a mobile communications device 18116 (e.g., a smartphone) may be configured for sending communications, including a request for information, to other components via network 18112. As used herein, a request for information may include a communication signal sent from a first device to a second device that solicits a responsive communication signal from the second device and which designates certain information to be included in the responsive communication signal. In some embodiments, the mobile communications device may be operated by, e.g., a customer within a retail establishment, a customer outside a retail establishment, or a passerby seeking information of one or more products in a display area.

In disclosed embodiments, the request received from the mobile communications device may include a request for information related to a particular display area in a vicinity of the mobile communications device. In some embodiments, a display area in a vicinity of the mobile communications device may include a display area within viewing distance of an individual holding or operating the mobile communications device. Additionally, or alternatively, a display area in a vicinity of the mobile communications device may include the display area that is the shortest distance away from the mobile communications device, relative to other display areas.

In disclosed embodiments, the request for information related to the particular display area may include a location ID input into the mobile communications device. For example, a person requesting information about a particular display area may generate the request by inputting into their mobile communications device a location identifier (or "location ID") that designates the particular display area. For example, the location ID may be derived from a scan of a graphical code using the mobile communications device or another device with a camera or imaging tool; the mobile communications device (and/or another processor) may derive the location ID from the scan and may generate and send the request for information, which may include the location ID, to the at least one processor. In some embodiments, the location ID may correspond to, or may be identical to, the display area ID of the particular display area. For example, in FIG. 21, display area ID 21016 may include a scannable QR code that may be scanned in order to generate the request for information about display area 21012.

As another example, the location ID may be derived from a Near Field Communication (NFC) tag associated with the particular display area. That is, an NFC tag may be located near the particular display area or may otherwise uniquely correspond to the particular display area. A person seeking information about the particular display area may use their mobile communications device to receive a transmission from the NFC tag, and the mobile communications device may use the information received from the NFC tag to determine the location ID and generate the request for information. Alternatively, the location ID of the particular display area may be received by other means (such as a geo-tagged picture taken by the mobile communications devices, or by the mobile device communicating with a Bluetooth Beacon or local WiFi network associated with the particular display area) in order to generate the request for information.

Disclosed embodiments may include receiving location information associated with a locus of the mobile communications device. For example, the at least one processor may be configured to receive location information associated with a locus of the mobile communications device. As used herein, a locus of the mobile communications device may refer to a particular position, point, or place where the mobile communications device is located. In addition, location information associated with the locus of the mobile communications device may include a set of numbers, strings, coordinates, or digital bits representing numbers, strings or coordinates, that may refer to or identify a physical location or locus of a subject (here, the mobile communications device) relative to a predetermined coordinate system or another reference. That is, location information may include data that identifies or specifies the physical location of the mobile communications device in space. In some embodiments, receiving the request for information from the mobile communications device may trigger the at least one processor to request or access the location information of the mobile communications device.

Some non-limiting examples of location information may include a street address, a point on a map or other Geographic Information Systems (GIS), Global Positioning System (GPS) coordinates, indoor navigation system measurements, and any other data indicating the locus or physical location of the mobile communications device. For example, in disclosed embodiments, the location information associated with the locus of the mobile communications device may include at least one of a GPS location, a Global Navigation Satellite System (GLONASS) location, a Galileo location (that is, location information derived from the Galileo satellite system), or other Global Navigation and Positioning System location information associated with the mobile communications device. Additionally, or alternatively, the location information associated with the locus of the mobile communications device may include information received from at least one of an indoor-navigation system or an indoor-positioning system (such as a WiFi-based time-of-flight (ToF) or round-trip-time (RTT) positioning systems, or Ultra-Wideband (UWB) based positioning systems), which may use strategically-placed relays and beacons throughout an area to determine the position of a subject (for an indoor-positioning system) and/or to direct a subject to a target location (for an indoor-navigation system).

Disclosed embodiments may include performing, in response to the location information, a look-up in the at least one data structure to identify the particular display area in the vicinity of the mobile communications device. For example, the mobile communications device may be assumed to be located in the same location as the particular display area or within a short distance of the particular display area. Further, the at least one data structure may include location information of each display area, as discussed above. Accordingly, the at least one processor may perform a look-up in the at least one data structure to identity the display area having the same location as the mobile communications device, or which is closest to the mobile communications device, or which is within a predetermined distance of the mobile communications device. This display area may be identified as the particular display area in the vicinity of the mobile communications device (that is, the display area that was the subject of the request for information).

In alternative embodiments, the at least one processor may be configured to identify the particular display area based on the request for information received from the mobile communications device. For example, in some embodiments the request for information may include the location ID of the particular display area, which may correspond to or may be identical to the particular display area's display area ID. The at least one processor may be configured to determine the identity of the particular display area based on the received location ID (e.g., by performing a look-up of the received location ID in the at least one data structure to determine the corresponding display area).

In some embodiments, the particular display area may include a window display. For example, a window display may include a window in a retail establishment (often a window on the front façade of the establishment) in which products may be displayed, so that customers may view the products from outside the establishment. As an example, FIG. 21 depicts display areas 21012 and 21014 configured as window displays. Additionally, or alternatively, the particular display area may be adjacent to a sales establishment carrying the products associated with the particular display area. As used herein, a display area adjacent to a sales establishment may include a display area external to, but in close proximity to, the sales establishment. This may include, for example, a display area down the block or across the street from the sales establishment, a display area in a front façade of a building in which the sales establishment is also located, and a display area located in a different area of a shopping mall from the sales establishment. As used herein, a sales establishment carrying the products associated with the particular display area may include a sales establishment that maintains the products in inventory and/or that offers the products for sale or rental.

In some embodiments, the particular display area may be in a vicinity of a storage establishment maintaining the products associated with the particular display area as products available for shipping. As used herein, a storage establishment may include a location where products are placed or held as an interim stage, between different stages of a supply chain or a production chain. For example, a storage establishment may include a location where products are held between manufacturing and shipping, a location where products are held between importation into a country and distribution within the country to a target location, or a location where products are held between arrival in a destination country and shipping to a final customer. In some embodiments, the particular display area may be situated within, adjacent to, or near the storage establishment so that potential customers may view the display area and purchase the displayed products. In such cases, purchased products may be shipped from the establishment to the purchaser, in some embodiments.

In some embodiments, the particular display area may be associated with a remote establishment for at least one of sales of products or storage of products. For example, the particular display area may not be located adjacent to or within viewing distance of the establishment. This may include embodiments in which a temporary display area is set up in a high traffic area, such as at flea markets and concerts, but the inventory of products remains at the establishment which is remote from the display area. This may also include embodiments in which a display area is set up in a country or region where the establishment does not have a permanent presence (such as stores or storage facilities), but still wishes to conduct business in. In some embodiments, the remote establishment may offer the products associated with the particular display area as products available for sale, for shipping, or for pick-up. For example, products displayed in the particular display area may be offered for purchase in the establishment. The establishment may offer to ship purchased products to customers who completed purchases from the particular display area, so that the customers are not required to travel to the establishment to retrieve their purchased items. Additionally, or alternatively, the establishment may offer in-store pick-up of products purchased from the particular display area, such that customers who made a purchase from the particular display may come into the establishment to make possession of their purchased products.

Disclosed embodiments may include retrieving product-related information of products associated with the particular display area from the at least one data structure based on the identification of the particular display area. For example, when the identification of the particular display area (i.e., the particular display area ID) is known, the at least one processor may perform a look-up of the particular display area ID in the at least one data structure to access information of the particular display area. The accessed information may include the list of products as well as product-related information of the products that are associated with (i.e., products housed in, arranged for public viewing within, or otherwise paired with) the particular display area. In some embodiments, product-related information may include data regarding a specific item or data regarding a type or class of a specific item. Examples of product-related information may include price information, MSRP, pictures of the product, descriptions of the product, care instructions, usage instructions, material composition, manufacturing time and location, shipping history, processing history, and ownership history. In some embodiments, the product-related information of products associated with the particular display area may include identities of at least some of the products associated with the particular display area (that is, the unique product identifier or product ID of at least some of the products associated with the particular display area). Additionally, or alternatively, the product-related information of products associated with the particular display area may include information of a physical location where a product associated with the particular display area is available for pick-up. For example, the product-related information may include information of retail establishments, storage facilities, and other locations where particular products in the display area may be picked-up. This may include, for example, a list of retail establishments near the customer or near an address associated with the customer (such as a home address, an office address, or a hotel or other lodging where the customer is currently staying) in which a particular product is in stock.

Disclosed embodiments may include transmitting the product-related information to the mobile communications device. For example, the at least one processor may be configured to transmit all of the product-related information or a selection of the product-related information to the mobile communications device. As a result, the individual operating the mobile communications device may receive information about the product that may be helpful in making a purchase decision. In disclosed embodiments, transmitting the product-related information to the mobile communications device may include transmitting a signal to cause the mobile communications device to display the product-related information on a graphical user interface. As used herein, a graphical user interface (GUI) may include an interface through which a user may interact with an electronic device such as a computer, hand-held device, smartphone, tablet, touchscreen device, and other appliances. The GUI may use icons, menus, and/or other visual indicator (graphics) representations to display information and related user controls. GUI representations may be manipulated by a pointing device such as a mouse, trackball, stylus, or a finger on a touch screen. In some embodiments, the GUI may include a display on the mobile communications device, which may be configured as a touch screen in some embodiments. As an example, FIG. 11 shows an exemplary system 11000 including at least one processor 11004 configured to transmit information via network 11002 to a user device 11008, which may include a user interface 11010 such as a GUI. In some embodiments, processor 11004 may transmit a signal to device 11008 that causes device 11008 to display the product-related information on a GUI of user interface 11010.

In some embodiments, the graphical user interface may be configured to display the product-related information in at least one of a textual format or a graphical format. As used herein, textual format may refer to a display including alphanumerical information of products, such as a product's name, type, price, color, size, or location. Further, as used herein, graphical format may refer to a display including at least one image, photograph, or pictorial rendering of a product. In some embodiments, the display of the product-related information may include information in textual format and information in graphical format.

Figure 22:
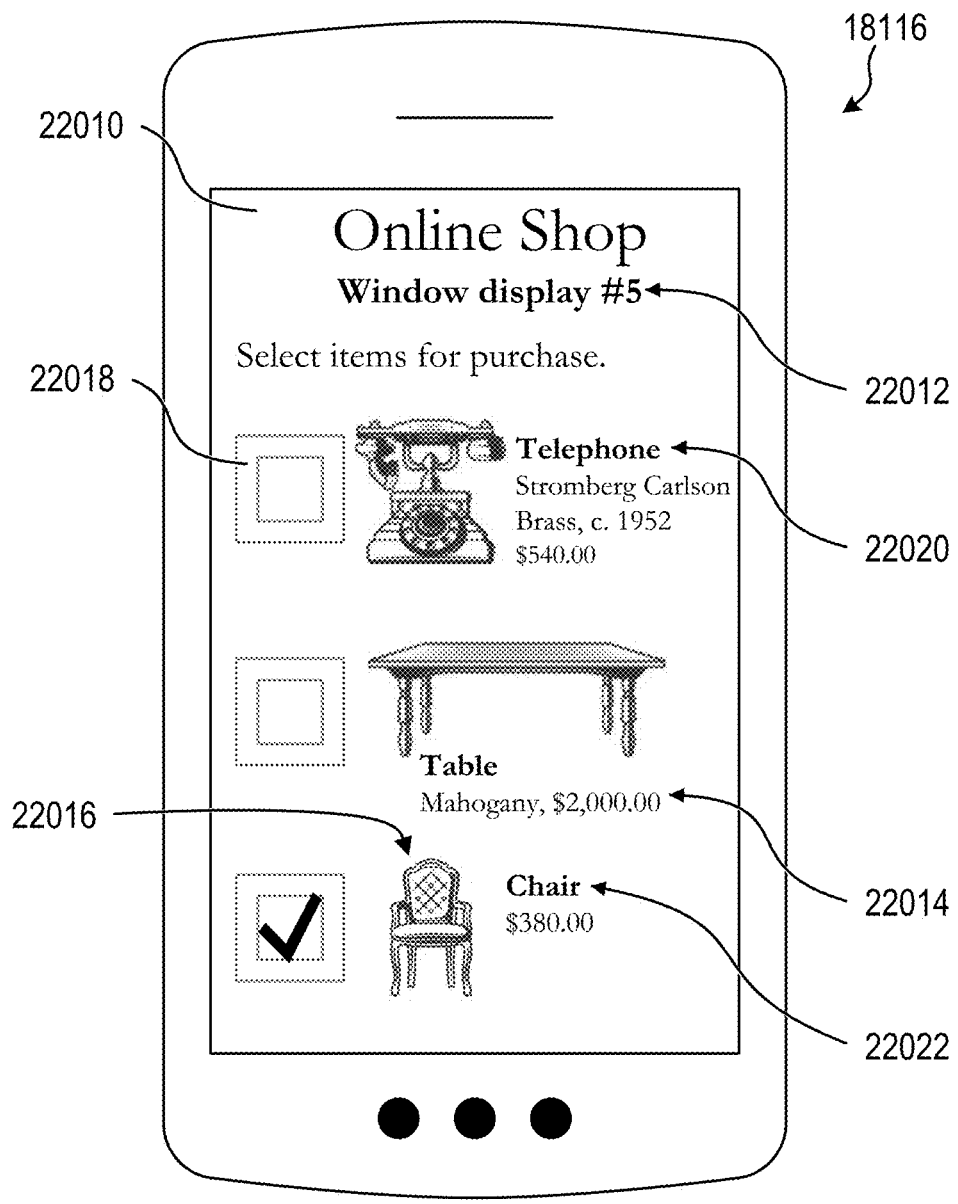
FIG. 22 depicts a mobile communications device displaying a graphical user interface with product-related information, consistent with disclosed embodiments.

FIG. 22 illustrates a non-limiting example of a graphical user interface (GUI) 22010 displayed on mobile communications device 18116. GUI 22010 may display product-related information of products associated with display area 21014 of FIG. 21. In the example shown in FIG. 22, GUI 22010 may be configured as an online purchase interface for the purchase of products in display area 21014; however, in alternative embodiments, GUI 22010 may be configured to display the product-related information separate from the online purchase interface. GUI 22010 may include an identifier 22012 of the particular display area where the products are on display. GUI 22010 may include textual information 22014, such as a written description of each product offered in display area 21014. GUI 22010 may also include graphical information 22016, such as photographs or images of each item. GUI 22010 may also include fields 22018 (e.g., check boxes) that the user may select to purchase specific products.

Disclosed embodiments may additionally or alternatively include transmitting a signal to cause the mobile communications device to output the product-related information as audible information for presentation via the mobile communications device. For example, the mobile communications device may include a speaker or another audio output mechanism. The at least one processor may transmit a signal to the mobile communications device that causes the device to output the product-related information via the speaker as audible information, such as spoken information related to the products of the particular display area.

Disclosed embodiments may include at least one receiver associated with the particular display area. In some embodiments, a receiver "associated with" a particular display area may include receivers located partially or entirely within the particular display area, receivers configured to receive signals transmitted to the particular display area or from the particular display area, and receivers that receive signals containing information related to the particular display area.

In disclosed embodiments, the at least one receiver may be configured to receive wireless signals from the mobile communications device. For example, the receiver may include an access point or wireless router within or near the particular display area, which may establish a wireless connection with the mobile communications device. The at least one processor may have a wired (e.g., Ethernet) and/or wireless connection to the receiver, thus enabling data transmission between the mobile communications device and the at least one processor, even when the mobile communications device is operated by a user standing outside looking at the particular display area. As an example, FIG. 21 shows receiver 21020 associated with display area 21012 and receiver 21022 associated with display area 21014; in the example shown, the receivers may be located within their respective display areas. Receivers 21020 and 21022 may be configured to receive wireless signs from a mobile communications device, such as device 18116.

Disclosed embodiments may include determining, based on the signals received via the at least one receiver, a location of the mobile communications device in relation to the particular display area. For example, a mobile communications device may transmit a signal that may be received by the at least one receiver. However, depending on the proximity to the at least one receiver, the power level of the signal received by each receiver may differ in magnitude, phase, angle of arrival or time of arrival. The at least one processor may use this signal data to calculate certain properties of the propagation of the signal over the communication medium, establishing such parameters as the range a signal may be detected at, a value representative of the relative or actual distance at which the signal has been transmitted, the signal-to-noise ratio, interference properties etc. In the context of wireless communication, magnitude may be measured in units of power, usually either Watts or dBW (decibel-Watts or dB-Watts) which is a logarithmic unit related to Watts (or sometimes in units of dBm, which is related to milliwatts in the same manner dBW is related to Watts). In that sense, a power level of the signal may refer, for example, to a power measurement immediately at the input of the signal at the receiver, while the receiver is actively receiving one or more signals.

In some embodiments, the at least one processor may determine a location of the mobile communications device by comparing the power levels of the signals received at each receiver and determining the location of the device based on the comparison. For example, the power level of a first signal transmitted by the mobile communications device and received by a first receiver may be higher than the power level of other signals from the device received by other receivers due to the device being closer to the first receiver than to the other receivers. The first receiver may be associated with a given location, and therefore, based on the first receiver receiving the strongest signal and its association with the given location, it may be determined that the mobile communications device is located at that location. Similarly, multiple signal strengths detected by different receivers may be used to estimate a device's location. For example, using three signal strengths detected by three receivers, the at least one processor may triangulate the signals to estimate or determine the transmission source, which may correspond to the location of the mobile communications device. In disclosed embodiments, the at least one processor may be configured to determine a location of the mobile communications device in relation to the particular display area since the location of the at least one receiver and/or particular display area may be known beforehand. The at least one processor may compare the determined location of the mobile communications device to the location(s) of the at least one receiver and/or particular display area to determine the location of the mobile communications device in relation to the particular display area.

Disclosed embodiments may include transmitting a signal to the mobile communications device to cause the mobile communications device to prioritize the product-related information based on a proximity of the plurality of products associated with the particular display area to the mobile communications device. As discussed in detail below, prioritizing the product-related information may include controlling at least one parameter of a presentation of the product-related information by the mobile communications device. In some embodiments, proximity of products to the mobile communications device may refer to a distance between a given product and the mobile communications device. Thus, in some embodiments, the mobile communications device may be caused to prioritize the product-related information based on the distance between a given product and the mobile communications device. In some embodiments, products that are closer to the mobile communications device may have a "higher" priority than products that are further away. Alternatively, products that are closer to the mobile communications device may have a "lower" priority than products that are further away.

In some embodiments, prioritizing the product-related information may include controlling an order in which the product-related information is presented by the mobile communications device based on proximity of the products to the mobile communications device. For example, when the product-related information is displayed on a graphical user interface, products determined to be closer to the mobile communications device may be displayed earlier or placed higher in an ordered list than products that are further away. To illustrate, in GUI 22010 depicted in FIG. 22, telephone 22020 may be the closest product to the mobile communications device and may therefore be listed first in GUI 22010. Conversely, chair 22022 may be the product farthest from the mobile communications device and may therefore be listed last in GUI 22010.

Additionally, or alternatively, prioritizing the product-related information may include controlling a level of detail of the product-related information presented by the mobile communications device based on proximity of the products to the mobile communications device. For example, when the product-related information is displayed on a graphical user interface, more information may be shown of products close to the mobile communications device, while less information may be shown of products further away. As an illustrative example, GUI 22010 may include the largest number of informational fields for telephone 22020 (including manufacturer, material, date, and price), which is the closest product to the mobile communications device. However, the interface may include fewer information fields for products that are further away. For example, GUI 22010 may include the smallest number of information fields for chair 22022 (only the price), since chair 22022 is the farthest product from the mobile communications device in various embodiments.

Additionally, or alternatively, prioritizing the product-related information may include controlling a selection of the product-related information for presentation by the mobile communications device based on proximity of the products to the mobile communications device. For example, when the product-related information is displayed on a graphical user interface, the interface may only include information of a predetermined number of products (e.g., five products); the five products which are closest to the mobile communications device may be included in the display, while products that are further away may not be included.

Disclosed embodiments may include receiving, from the mobile communications device, a selection of at least one specific product associated with the particular display area. For example, the mobile communications device may receive the selection from a user via a user interface such as a touch screen or keyboard. Disclosed embodiments may also include initiating an activity associated with the selection. As used herein, an activity may include one or more functions executed by the at least one processor based on the selection of the at least one specific product.

In disclosed embodiments, the selection may include a purchase request and the activity may include a purchase transaction. As used herein, a purchase request may include a communication signal generated by the mobile communications device indicating an order to purchase the at least one specific product from the establishment on behalf of the user of the mobile communications device or another person or entity. As disclosed elsewhere in this disclosure, a purchase transaction may include the transfer of ownership, rights of possession, or any other interest in the at least one specific product from the establishment to the user of the mobile communications device or another person or entity, in exchange for monetary payment or other consideration. In some embodiments, the purpose transaction may be performed electronically by the at least one processor or by another processor. In embodiments in which another processor performs the purchase transaction, the at least one processor may be configured to initiate the purchase transaction by transferring information and/or instructions for the purchase transaction to the other processor. Alternatively, the purchase transaction may be performed manually, such as by an individual associated with a bank or clearinghouse. In such embodiments, the at least one processor may be configured to initiate the purchase transaction by sending information and/or instructions for the purchase transaction to the party that is to perform the transaction (e.g., to a bank or clearinghouse).

Disclosed embodiments may include transmitting, to the mobile communications device, options for product delivery in connection with the purchase transaction. For example, the options for product delivery may include options available for delivering the at least one specific product (purchased in the purchase transaction) to the user of the mobile communications device or to a designated third-party recipient. Some non-limiting examples of options for product delivery may include picking up the at least one specific product at a location in a vicinity of the particular display area (e.g., in-store pick-up of the at least one specific product from the retail establishment to which the particular display area is attached, by the purchaser or by another authorized to pick-up the at least one specific product), picking up the at least one specific product at a location other than the location in the vicinity of the particular display area (e.g., picking up the at least one specific product from another branch or location associated with the same business or vendor), and delivering the at least one specific product to a specified address (e.g., shipping the at least one specific product to a designated address, such as the recipient's home or business address, or shipping the at least one specific product to be collected from a central pick-up location such as a post office, shipping company location, outlet, or collection locker). In some embodiments, the user of the mobile communications device may select an option for product delivery using the mobile communications device.

In disclosed embodiments, the purchase request may include a request that the at least one specific product associated with the particular display area be shipped to a location specified via the mobile communications device. For example, a delivery address may be inputted to the mobile communications device and included with the purchase request sent to the at least one processor. In some embodiments, after the purchase transaction is completed, the at least one specific product (i.e., the purchased product(s)) may be delivered to the address or location designated via the mobile communications device.

In disclosed embodiments, the selection may include a request for additional information and the activity may include transmitting the additional information to the mobile communications device. As used herein, a request for additional information may include a communication signal sent from the mobile communications device to the at least one processor that solicits a responsive communication signal from the at least one processor and which designates certain information to be included in the responsive communication signal. For example, the request for additional information may solicit information about the at least one specific product (or any other product in the particular display area or in another display area) that was not previously provided to the mobile communications device. In response to the request for additional information, the at least one processor may transmit the additional information to the mobile communications device or, alternatively, may transmit an indication that the additional information is not available or is not authorized to be sent to the mobile communications device.

Disclosed embodiments may include a system for reading wireless transmitting tags in an establishment containing a plurality of wirelessly tagged products, and for automatically generating a product distribution planogram. A wireless transmitting tag may include any wirelessly detectable device, such as, for example, a radio-frequency identification (RFID) device, a Bluetooth Low Energy (BLE) beacon device, a device including a microcontroller powered by radio-frequency energy, or any other structure configured to transmit signals capable of detection. As used herein, an establishment may include any area, building, or structure in which an inventory of objects or materials may be stored or maintained, such as, for example, a retail establishment, store, warehouse, distribution center, logistics center, fulfillment center, manufacturing area, shipping area, storage area, home, medical facility, eating establishment, kitchen, or any other area where it may be beneficial to track items. As used herein, a product may include any object or material stored or maintained within an establishment, as discussed above. By way of non-limiting examples, a product may include food, clothing, shoes, electronics, consumer goods, equipment, vehicles, consumables, packaging, accessories, supplies, materials, artistry, animals, instruments, pallets, containers, pharmaceuticals, cosmetics, commodities, articles, devices, machinery, implements, mechanisms, tools, furniture, or any other object that may be present in an establishment. In some embodiments, the establishment may offer the products for sale, exchange, or barter, for display, for safekeeping, for storage, for distribution, and/or for complimentary giveaway.

Embodiments of the system may read wireless transmitting tags in an establishment by placing a receiver to receive signals. Wireless transmitting tags may emit signals continuously or may be activated when a scanner is in proximity. In some embodiments, wireless transmitting tags may be RFID tags activated by a magnetic field of a scanner. In some embodiments, wireless transmitting tags may include visual signals. By way of non-limiting examples, visual signals may include barcodes and two-dimension bar codes such as QR codes captured by a dedicated optical scanner or a camera. Embodiments of the system may include wireless transmitting tags that may include a power source and a computing source, and may emit signals without any activation. In some embodiments, the system may incorporate multiple forms of wireless transmitting tags emitting signals in different forms.

A wireless transmitting tag may be associated with a product to enable the product, via the tag, to provide self-identification. As discussed elsewhere in this disclosure, embodiments of a wireless transmitting tag may include any device suitable to attach to any object for the purpose of identifying the object visually, tactilely, audibly, or electronically without the use of externally connected cables or wires. Other embodiments may be embedded into an item as part of the manufacturing process or later, for example, by a retailer.

A product distribution planogram may include any visual representation of products in an establishment. By way of non-limiting examples, visual representations may include images of products overlaid on a floor map of an establishment. A planogram may include detailed interiors of an establishment visually represented in a two-dimensional image or a three-dimensional image with visual representations of wirelessly tagged products placed in positions matching the actual placement of wirelessly tagged products in the establishment. A planogram may include a detailed visual representation of various aisles and/or shelves present in an establishment. In some embodiments, a planogram may include a navigable interface to move between different shelves and aisles of an establishment. A product placement planogram may include an informative representation of the distribution and placement of products in an establishment. By way of non-limiting examples, the informative representation may include symbols, icons, pictograms, names or images of products and/or product families or categories, overlaid on a floor map or other graphical or schematic representation of an establishment. A planogram may include a sketch of an interior of the establishment or a detailed schematic, diagram, drawing or other representation, in a two-dimensional or a three-dimensional or a perspective form, overlaid with an informative representation of the placement and/or location of wirelessly tagged products in the establishment. A planogram may include a rough representation in the level of detail of wards, zones or departments of an establishment, or a more detailed representation at the level of detail of individual fixtures, or an even more detailed representation at the level of individual shelves, bins, drawers, hangers or other subdivisions of the fixtures, or at any other level desired by the owners or operators of the establishment. In some embodiments, a planogram may include a navigable interface to move between different zones, areas, aisles or fixtures of an establishment.

For example, a planogram may include a map of an establishment, including an overlay layer of information, the overlay layer detailing the designated locations of various items in the establishment. The planogram may include a map of, for example, a store including division of the store into one or more departments, the subdivision of the one or more departments into one or more sub-departments based on a desired hierarchy of the store's catalog. The planogram may include an exact designated distribution of items (possibly including quantities and attributes) on fixtures (e.g., shelves), zones (e.g., aisles), or locations in the store. In some embodiments, a planogram may include a map of a work-area including designated placement of various tools and implements around the work-area, possibly including locations of dedicated work-stations and/or equipment required to be present at each work-station. In some embodiments, the planogram may include a map of a warehouse or other storage location, including one or more items that are to be located in each section, location, fixture, or shelf in the warehouse or other storage area (possibly including quantities or any other attributes associated with the one or more items).

A planogram may be viewed and interacted with using a desktop device, a mobile device, or any other type of computational device using one or more input devices (e.g., keyboard, mouse, microphone, pointing devices, touch screens, or another input mechanism). Alternatively, or additionally, a planogram may be printed to be used by staff, customers or visitors in the establishment. In some embodiments of the system, a planogram may be viewed using a head-mounted display, such as Occulus VR headset, Microsoft Holo lens, HTC Vive. A planogram may be generated using image processing technology such as Matterport to create an immersive three-dimensional planogram. Embodiments of the system may present the planogram in different ways based on a device used for interacting with the planogram. For example, a planogram may be presented in a three-dimensional manner when interacting with the planogram using an AR/VR headset and as a two-dimensional floor map when interacting with the planogram using a tablet or mobile phone.

Disclosed embodiments may include at least one processor as described elsewhere in this disclosure. In some embodiments, the at least one processor is configured to receive from a plurality of receivers in the establishment, wireless signals from the plurality of the wirelessly tagged products, wherein the wireless signals include an ID associated with each of the plurality of wirelessly tagged products. In some embodiments, the wireless signals include an ID associated with each of the plurality of wirelessly tagged products. In some embodiments, the at least one processor is configured to access a data structure associating each ID of each wirelessly tagged product with classification information. By way of example, data structure 11006, as illustrated in FIG. 11, may include associations between wirelessly tagged products and additional information such as classification information.

As used herein, classification information may include one or more items of data that describe one or more characteristics of the one or more wirelessly tagged products that may allow for organizing and/or arranging the one or more products in categories or in hierarchies. Classification information associated with the wirelessly tagged products may be used to group wirelessly tagged products into one or more groups or sub-groups in a hierarchical manner such that any product is assigned a single grouping at each hierarchy level. The resulting classification may be arranged in the form of a catalog, which lists all products according to their hierarchical association, down to a final hierarchy level where each product is assigned a unique code, number or other identifier. By way of non-limiting examples, classification information may include one or more of a name of a product, size of the product, type of the product (e.g., solid, liquid, gel, paste), description of the product (e.g., oil, detergent, clothing), the brand name of the product, name of the product manufacturer, non-visible meta information such as collection name, spring or fall collection, the purpose of the wirelessly tagged product, or any other information associated with the wirelessly tagged product. Classification information may also include a combination of different characteristics of the product, including size, shape, color, and other information described above. Classification information may be used to help determine the location of an actual product placed in an establishment. By way of example, classification information may be based on a catalog of items in a clothing store, arranged into first-level hierarchies such as "Menswear", "Womenswear", "Childrenswear" and "Accessories." The "Womenswear" hierarchy may be further divided inro second-level hierarchy such as "Shirts", "Skirts", "Dresses", "Pants", "Underwear", "Footwear" and "Outerwear." The "Pants" hierarchy may be further divided into third-level hierarchies such as "Denim", "Dress Pants", "Shorts" and "Home Pants." Additional hierarchical levels may also be included. By way of another example, classification information may be based on and so on a work-area catalog arranged into first-level hierarchies such as "Powered tools", "Unpowered tools", "Nuts and Bolts", "Screws and Nails", "Consumables" and "Liquids and Canisters." The "Unpowered tools" hierarchy may be further divided into second-level hierarchies such as "Hammers", "Screwdrivers", "Sharp tools", "Pliers and pincers", and "Delicate tools." The "Screwdrivers" hierarchy may be further divided into third-level hierarchies such as "Cross-headed", "Flat-headed", "Hexagon-headed" and "Other." Additional hierarchical levels may also be included. A product's classification information may include all hierarchy levels the product is associated with in a given catalog.

Disclosed embodiments may use classification information to provide recommendations on locations where a new product may be placed in an establishment. For example, a new clothing product belonging to a certain brand may be placed along with other clothing products of the same brand. In another example, a new clothing product in an extra small size may be placed in the petite section of the establishment with all other extra small clothing products belonging to different brands and manufacturers. Classification information may be associated with a location in an establishment using a mapping table between different classification information and locations in an establishment. Mapping between classification information and locations within an establishment may be stored in a data structure. In some embodiments, mapping between classification information and locations within an establishment may be determined using a machine learning model trained using past relationships between establishment locations and classification information of products, as well as other related information such as sales data, calendar data (such as holidays), trends data, manufacturing forecasts, delivery forecasts etc. Wirelessly tagged products may be part of different groups. For example, classification information based on the size of products and brand may result in a clothing establishment considering placing all petite clothes in a single location or placing the same clothes of a matching brand in one location.

In some embodiments, the classification information includes a product model code and wherein the planogram indicates on the map a location of at least one group of products sharing the product model code. As used herein, product model code may include a number, code, or other forms of data uniquely associated with a type of product, object, material, or any other item, as part of a stock management system, inventory keeping system, or other such data management platform. Examples of product model codes include SKU codes, EPC codes, barcodes, ISBN codes, product numbers, part numbers, catalog numbers, or any other identifying indicia. A product model code may include an identifier, e.g., a textual, graphical, numerical, alphanumeric, or digital representation that describes a model, brand name, manufacturer, or other classification information associated with a product. In some embodiments, a product model code may include a model number provided by a manufacturer of wireless tagged products. In some embodiments, a product model code may include a subgroup of products within matching characteristics used in determining classification information. For example, a group of laptop products may have the same model code having some common hardware specifications but may include laptops of different configurable memory (RAM). Alternatively, or additionally, the group of laptops may have the same model code only if they share all hardware specifications, including the same configurable memory (RAM). An identifier used for a product model code may include portions representing different characteristics of the product. For example, the product model code of a laptop product may include the processor characteristics (e.g., clock speed, L2 Cache size), memory size (e.g., 16 GB, 32 GB) and configuration (e.g., single card, dual card), hard disk type (e.g., magnetic, NAND flash, hybrid). In some embodiments, a product model code may use mnemonics to represent different characteristics. For example, the first letter of the type of hard disk type (e.g., 'M' for magnetic, 'F' for flash) may be used in the product model code.

Figure 23:
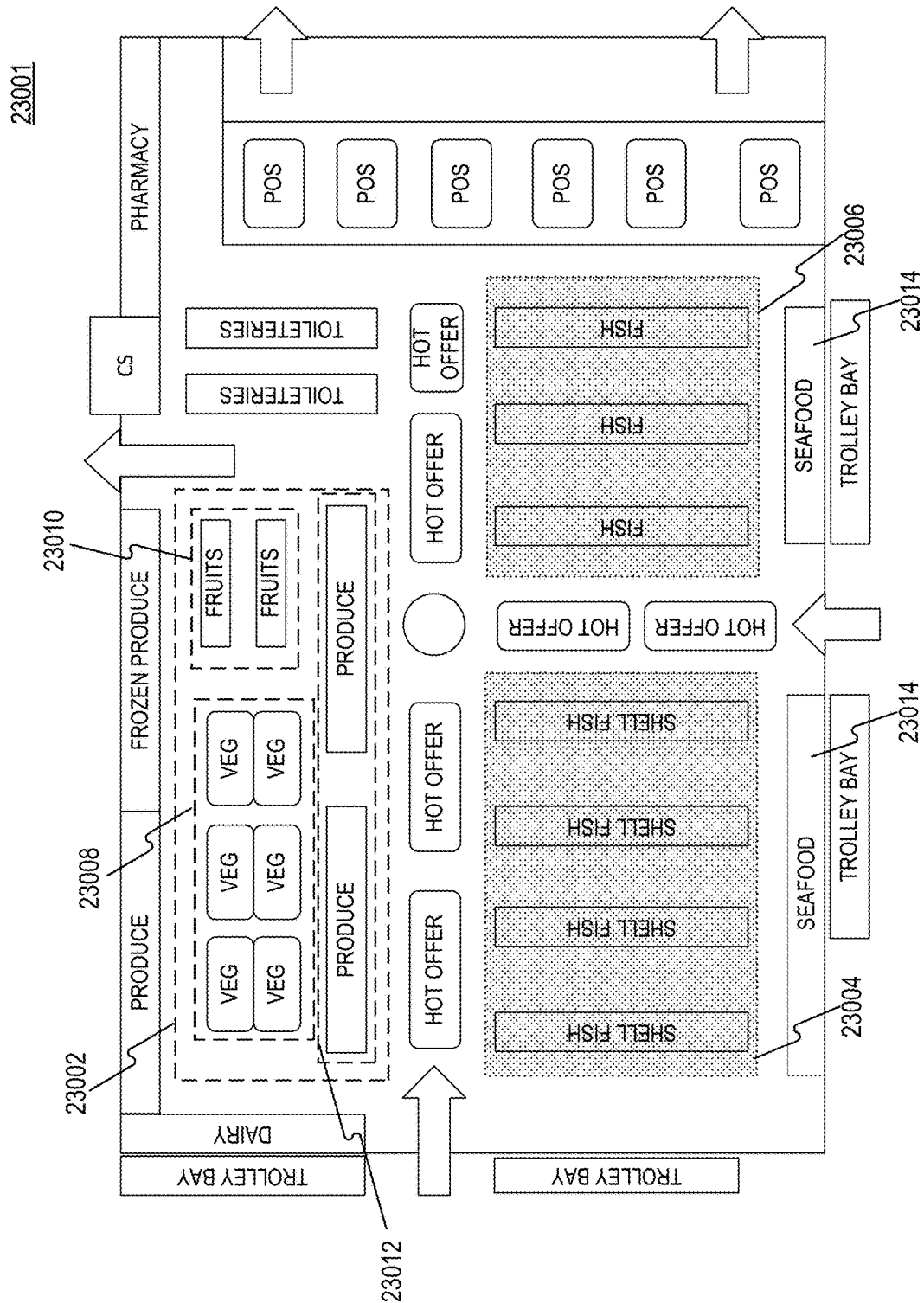
FIG. 23 illustrates an exemplary planogram representing a floor map of an establishment, consistent with embodiments.

In some embodiments, the planogram indicates on the map of the establishment a location of at least one group of products sharing the product model code. A location on the map may be an outline in the map of the establishment indicating a total space occupied by the group of products in the establishment, an icon on the map indicating the area, zone or fixture where the group of products can be found, or a pointer to a position in the map of the establishment approximately where at least one of the group of products is present in the establishment. Indications of this manner can result in a location on the map depicting a position where the group of products may be approximately found in the establishment or exactly match the location of the group of products in the establishment. In some embodiments, the location may be represented with a visual representation of products presented as images of actual products, images of brand or manufacturer, icons representing the products, text or other code representing the product, or some other sign which may be interpreted in a legend of the planogram or by accessing a database interpreting the various indications on the planogram for the approximate or accurate locations of the group of products or groups of products. In some embodiments, the location may include generic images of a class of products. For example, a soup product may be represented using a generic soup can. Location indication in a map may include highlighting the images of products. For example, the system may gray out images of products overlaid on the map except for the group of products. Additional product details such as product model code may help identify products sharing other classification information and shared location. For example, a planogram representing a grocery establishment may have several dairy products, such as milk cartons from different manufacturers with milk cartons from the same manufacturer having shared classification information. The shared classification information may be used to determine an aisle location for the products. A subset of those products that share the product model code may be located on a common shelf within the shared aisle location. By way of example, as illustrated in FIG. 23, a group of products with shared classification information may include an indicator in the form of an outline as shown surrounding groups 23002 and 23008. For example, vegetable products, fruits, and other products present in an establishment represented by planogram 23001 may share a common product model code of vegetarian food and thus may have outline 23002 indicating the location shared by all these products. An additional outline 23008 surrounding vegetable products only is shown in FIG. 23 to indicate the vegetable products sharing the product model code of vegetable.

In some embodiments, the classification information includes an associated product model code for each wirelessly tagged product, wherein the planogram indicates locations of a plurality of groups of wirelessly tagged products, with each group of wirelessly tagged products sharing a common product model code. As discussed above, in some embodiments, the planogram may indicate a group of wirelessly tagged products sharing a common product model code with a visual representation. In some embodiments, the planogram may include a plurality of such visual representations, each visual representation representing a group of wirelessly tagged products sharing a common product model code. For example, in an electronics establishment, laptop products with the same hardware specifications may have different model codes for a different amount of memory. A planogram may include a visual representation indicating a subset of products such as laptops with the same memory size sharing a product model code.

In some embodiments, the classification information includes for each wirelessly tagged product, an associated product family indicator, and wherein the planogram divides a map of the establishment by product family. As used herein, a product family may include a group of products having a matching functionality or purpose, or some other matching characteristic. As used herein functionality of a product includes features that may be required for operation, features that may be used by a user, or functions of the product when powered on or operated by a user. For example, various air purifier fans found in an appliance store type establishment may have the same functionality of cleaning various impurities in the air and would be considered part of the same product family. A purpose of a product is determined based on what the product is used for by a user. For example, different gaming consoles (e.g., Sony Play Station, Microsoft Xbox, Nintendo Switch) are meant for the same purpose of playing video games, although they function differently and would be considered part of the same product family. A product family may include different brand products and from different manufacturers. In some embodiments, a user may be allowed to configure which brands and manufacturers' products may be included under one product family. In some embodiments, products of a specific brand or made by a specific manufacturer may be designated as belonging to a product family separate from other brands or manufacturers, despite having similar or common functionality or purpose. For example, an eyewear store may designate an area of their display solely to glasses belonging to a specific brand, for example Ray Ban, despite having sunglasses, reading glasses and optical glasses by other brands available in other areas of the store and arranged there according to purpose and functionality, and not by brand. In some embodiments, a user may also be allowed to configure definitions of matching functionality or purpose, or any other characteristic which is advantageous for the user in cataloging their products. For example, a product family may be represented by the one or more hierarchical levels in a catalog discussed above.

As used herein, a product family indicator may be a link to a product family information. An indicator may be a visual code or label overlaid on a planogram and is issued to indicate that a group of products share functionality or purpose. In some embodiments, a product family indicator may be presented in visual format as different colors, textual format as different labels. A product family indicator is one of the forms of indicator (described above) that may be used by a planogram generator to include in a planogram to indicate the subset of products among all the products shown by the planogram that would be considered a family. A family of products may be defined based on the functionality and purpose of the products, and some of the products may be of different brands and made by different manufacturers. By way of example, a link and/or visual indicator depicting one or more of the hierarchical levels (e.g., product family) may be displayed on the planogram.

As discussed above, classification information may include common characteristics between various products, including common family information. Classification information may include product family information or may be linked to product family information. In some embodiments, classification information may be linked to an indicator of a product family. In some embodiments, a product family indicator may include an outline around locations of a planogram where products sharing different product details are placed. In some embodiments, a product family indicator may include, for example, a list of locations in text format, highlighting of different visual representations of products in planogram, color-coded highlighting of visual representation of products, color-coded highlighting of an outline of a location based on product model code, product family or other shared classification information, or any other type of visual representation that may help to distinguish product families.

A planogram may use classification information such as product family indicators to provide visual representations of different product families present in an establishment. For example, a planogram of a supermarket establishment may illustrate all products in a vegetable products family in a different color or use a different graphical icon as compared to all the products in a seafood products family. Thus, the planogram may provide a visual representation indicating the different product families. By way of example, as illustrated in FIG. 23, a planogram 23001 may include product family indicator 23012 and 23014 shown as a rectangular bars, identifying groups of products that are part of a product family.

In some embodiments, the classification information includes a product model code, and wherein the data structure contains information associating each product model code with a product family, wherein the at least one processor is configured to access the data structure and ascertain from each determined model code associated with each wireless tag, an associated product family. In some embodiments, a product model code may be stored in the same data structure storing classification information. For example, a product model code may be in the same record as classification information or linked to the record containing classification information. Classification information stored in the data structure may additionally or alternatively include product family information in addition to product model code and may include associated relationships. Product groups forming a product family may be part of another product family in a hierarchical manner, with the product family at the top having the least number of matching characteristics between products and the products at the bottom having the greatest number of matching characteristics. For example, an electronics manufacturer of various computing devices may have various laptops with product model codes belonging to the laptop product family. In some embodiments, product family information may be hierarchical. For example, in the above example of computing devices, a laptop product family may be part of the computing devices product family. In some embodiments, the data structure may contain information associating each product model code with a product family. In some embodiments, the data structure may include a hash map associating a product ID with various product details, including product model code. In some embodiments, a product model code may be the product ID. The data structure may include multiple hash maps for each product with mappings between product ID and products details at different levels matching the product family hierarchy. For example, the data structure may store a first mapping between a product's model code and product details common across the model. For example, a product model code representing a laptop may include common product details such as screen size, number of keys in the keyboard, weight, camera resolution, CPU speed but may not include configurable network adaptor MAC address. In some embodiments, the data structure may store a second mapping between each product serial number and product details specific to an instance of a product. In the above example, the second mapping may include a unique serial number of an instance of a laptop product mapped to the network MAC address of the network adaptor, included in the instance of the product, or to the license key to the operating system (OS) installed on the specific device with the unique serial number.

In some embodiments, the at least one processor is configured to access the data structure and ascertain from each determined model code associated with each wireless tag, an associated product family. The system may utilize processors (e.g., processors 11004 of FIG. 11) to access data structures to ascertain, based on the given product model code, the mapped product family. As described above, a data structure (e.g., data structures 1106 of FIG. 11) may include hash map mapping between product ID represented using product model code and a product family. Processors may supply the product model code as an input key to the hash map to look up the product family. In some embodiments, a product model code may be supplied by a user searching for product family details by selecting a product and, in turn, supplying the product model code associated with the selected product. The product model code may be accessed from various product details associated with the product stored in a different hash map by providing "product model code" string as a key.

Some disclosed embodiments may involve determining from wireless signals, locations in the establishment of each of the wirelessly tagged products. For example, one or more processors may utilize characteristics of wireless signals to determine the location of the wirelessly tagged products associated with signal generating wireless transmitting tags. Some embodiments may involve determining locations based on at least one of an amplitude, a phase, an angle of arrival, or a time of arrival of the received wireless signals. One or more receivers may provide locations of wireless transmitting tags associated with wirelessly tagged products with the system based on the angle of the wireless signal received by receivers. One or more receivers may additionally or alternatively provide amplitude, phase, angle, and time of arrival of wireless signals at the one or more receivers. The at least one processor may determine locations of the wirelessly tagged products based on the information regarding the wireless signals provided by the receivers. In some embodiments, characteristics of wireless signals such as angle and time of arrival and associated locations in the establishment may be stored in a data structure. In some embodiments, the at least one processor may utilize the stored mapping between wireless signal characteristics and locations to retrieve location information associated with newly received wireless signals. By way of a non-limiting example, as illustrated in FIG. 9, tag(s) 1100 attached to wirelessly tagged products may share the wireless signals through receiver(s) 11300*a-g* via network 11002. One or more processors 11004 may determine location information associated with the wirelessly tagged products based on the received wireless signals. In some embodiments, a machine learning model may be trained to determine the location of wirelessly tagged products. For example, known locations and associated characteristics (e.g., angles, amplitudes, or other signal characteristics) of wireless signals may be used as training data to train the machine learning model. The trained machine learning model may then be executed by the at least one processor to determine locations of the wirelessly tagged products by providing one or more characteristics of the wireless signals as input to the trained machine learning model.

In some embodiments, the system may determine locations of wirelessly tagged products upon receiving multiple instances of wireless signals from each wireless transmitting tag associated with the wirelessly tagged products belonging to the same product family or sharing the same product model code. In some embodiments, the system may determine the location of wirelessly tagged products upon receiving wireless signals from a wireless transmitting tag over a period of time. For example, the at least one processor may determine the origin location of an emitted wireless signal and, in turn, the wirelessly tagged product location based on the characteristics (e.g., amplitude, phase, angle) of the wireless signal, as described above. The processor may designate the determined location as a temporary location until a threshold number of wireless signals, including an ID of a wirelessly tagged product, are emitted from the same location. In some embodiments, the at least one processor may receive characteristics of the wireless signals for a set period of time (e.g., an hour, a day, a week, or any other predetermined period of time) before finalizing the association of a location with a wirelessly tagged product. Embodiments of the system may allow configuration of the number of instances and amount of time of receipt of wireless signals associated with wireless transmitting tags. Embodiments may use signals collected over a period of time to determine a possible range of characteristics of signals that may occur in an establishment. For example, a clothing establishment may have multiple copies of the same item of clothing stacked in a pile. The multiple copies may each be associated with a wireless transmitting tag. The wireless transmitting tags of the different items of clothing may generate wireless signals with different characteristics based on their placement in the establishment on multiple shelves of an aisle. In another scenario, wireless signals emitted by wireless transmitting tags associated with wirelessly tagged products may be received by different receivers resulting in different characteristics associated with the signals emitted by different instances of the same product. In yet another scenario, other entities present in the establishment emitting wireless signals (e.g., mobile phones, pagers, other radio frequency signal emitting devices), or otherwise interfering with wireless signals (e.g. people moving about the establishment and blocking different signals at different times between different tags and different readers) may distort the wireless signals originating from wirelessly tagged products resulting in signals of different characteristics received over time. A processor of the disclosed system may store characteristics of various signals over a period of time to determine a range of values for signal characteristics that represent a location in an establishment and identify a location if a new wireless signal characteristic values fall within the stored range of values.

Some embodiments may involve performing a lookup in the data structure of each ID of each of the wirelessly tagged products to determine the product classification information associated with each of the wirelessly tagged products. One or more processors may, for example, determine classification information related to wirelessly tagged products using identifying information, such as tag ID. For example, one or more processors may search a data structure storing the classification information in association with tag IDs. By way of example, the data structure utilized in looking up classification information may include a hash map that may have keys that include IDs of wirelessly tagged products and values with one or more product details, such as product name, dimensions, technical specification, manufacturer name, brand name, classification information, and/or any other information or data associated with the products. In some embodiments, the data structure may include a key pointing to a storage location (e.g., memory location) containing product details or the classification information portion of product details. In some embodiments, the at least one processor may transform data or information included in wireless signals emitted by a wireless transmitting tag associated with a wirelessly tagged product to a tag ID associated with the wirelessly tagged product. Transformation may include combining different data (e.g., product serial number, wireless signal receipt timestamp, wireless signal characteristics such as amplitude and angle) to uniquely identify a product. For example, a unique tag ID associated with a clothing product with a wireless transmitting tag may include information, such as brand name, product name, and size. A processor (e.g., processors 11004 of FIG. 11) of the system may be used to transform data in a received wireless signal to generate a tag ID and use it to access product classification information by using the tag ID to lookup a location of product classification information in a hash map included in the data structure defined above. The processor may then access the identified storage location to retrieve the classification information.

Some embodiments may involve generating a planogram for the establishment using the determined locations of each wirelessly tagged product and the determined product classification information, wherein the planogram indicates on a map of the establishment locations of groups of the wirelessly tagged products sharing common classification information. In some embodiments, the at least one processor may retrieve one or more visual, textual, iconographic, schematic, contextual or other representations of one or more wirelessly tagged products from a data storage (e.g., data structure 11006 of FIG. 11) based on product classification information to generate a planogram. In some embodiments, the at least one processor may additionally or alternatively provide previously determined location information for the one or more wireless tagged products to a planogram generator module. The at least one processor may execute the planogram generator module to insert the one or more representations associated with the one or more wirelessly tagged products into corresponding locations in a planogram. In some embodiments, the at least one processor may use locations associated with each wirelessly tagged product to determine location boundaries defining the beginning and ending positions of a type of product in an establishment. The type of product may refer to classification information, product model code, and/or product family. For example, location boundaries may determine one or more shelves within an aisle and/or coordinates within the one or more shelves where each wirelessly tagged product may be located. Thus, for example, in some embodiments, the planogram generated by the planogram generator may indicate on a map of an establishment locations of groups of the wirelessly tagged products sharing common classification information.

In some embodiments, the planogram generator may use the location information of wirelessly tagged products to determine the order in which products are located in an establishment when placing representations of the wirelessly tagged products in the planogram. The planogram generator may retrieve images of products from a data storage (e.g., data structure 11006) or search via a search engine for visual representations using product classification information, or use data stored in a data structure to match a product or a product family to a desired representation on the planogram. Product images based on product classification information may be generic images of a class of products. For example, a soup product may be represented in a planogram using a generic soup can. The planogram generator may use additional product details such as brand name, to place accurate images of products in the planogram by conducting image search using product identifying data, such as model code, brand name, product name, and manufacturer name. In some embodiments, the at least one processor may use classification information along with location information to correctly place a representation of a product in a planogram that matches the location information of the actual product in an establishment. In some embodiments, an establishment may have specific locations designated for products of a particular product type, product family, or classification information. For example, a grocery establishment may store products having a dairy classification placed at one end of the store. The planogram generator uses such information with the default location of a class of products in an establishment to generate a visual representation of the class of products without waiting for wireless signals from wirelessly tagged products to determine location. In some embodiments, establishment may not have locations a-priori designated for particular product families, the planogram generator may create a planogram of the actual state of the establishment and the distribution of products based on determined locations of products using emitted wireless signals. Planogram generator may use the current location as default location and track changes in the planogram of an establishment, enabling establishment staff and customers to more easily find items in the establishment, and enabling the processor to recommend changes in the placement of products that would be advantageous to improving sales, reducing inventory, reducing costs or improving productivity.

In some embodiments, the planogram generator may place a visual representation of a product in an approximate area within a predetermined distance of the location of the actual product in an establishment. The approximate area may include any location which is within the location boundaries of the product. For example, a product having location boundaries defined as including the top three shelves of an aisle in an establishment may be presented on a planogram by inserting a visual representation of that product on the top shelf of the planogram representing the establishment.

FIG. 23 is an exemplary planogram 23001 representing a floor map of an establishment, according to some embodiments of the present disclosure. As illustrated in FIG. 23, planogram 23001 includes representations of different sections of the establishment with groupings of products with shared classification information. For example, group 23002 corresponds to products such as vegetables, fruits, and produce, and group 23004 corresponds to seafood products such as shellfish. Groups of products may be grouped in a hierarchical manner with groups containing subgroups of products with matching classification information. For example, in group 23002, vegetable products, fruits, and produce are subgroups 23008, 23010, 23012, which share classification information.

In some embodiments, the map of the establishment may include areas designated for storage and areas designated for display, and wherein the at least one processor is further configured to include in the planogram for each group of products sharing classification information, at least one common location in a storage area and at least one common location in a display area. For example, a planogram may identify different areas of an establishment associated with different functions or purposes. As one example, some areas of the planogram may be identified as areas designated for storage of one or more products, whereas other areas of the planogram may be identified as areas designated for display of the one or more products. These different areas of the planogram may match portions of the establishment designated for storing products for keeping, and displaying products for sale, respectively. A storage area may include a backroom or a warehouse portion of an establishment where additional copies of the products displayed for sale may be stored due to lack of display space. Storage areas may also include areas of an establishment where products may be stored to preserve them and increase their shelf life. For example, an establishment may include a refrigerated storage section to store the vegetables not in the display area to avoid spoilage. In some embodiments, the storage area may include an area of the warehouse where large packaging of products may be placed and that may need to be split into small packaging for presenting in the display area for sale. For example, a storage area of an establishment may include products tightly packed together on a pallet. The display area may include products organized in different aisles and shelves for visitors to an establishment to view and purchase products.

As used herein, a common location is a location in the establishment that would be considered the place where a certain type of product would be found if searched for in a display or storage area and may also be the place to return any misplaced instances of the type of product. For example, in a grocery store type establishment, the dairy products may be located at the back of the store, and that would be the common location of dairy products. A storage location may have common locations for a group of products sharing classification information so that a staff member of an establishment may easily find a product based on their knowledge of another product of the same class. Similarly, a visitor to an establishment to purchase a product in the display area may want to efficiently find products without having to inspect the complete display area. Common locations for a group of products in the display area may also aid a staff member in putting back misplaced products quickly without having to guess their correct location. In some embodiments, an establishment may designate a portion of the establishment as a common location for placing groups of products having common classification information. For example, in a department store establishment, classification information related to different brands may be used to place products that belong to the same brand at a common location even though the products may include different models and types of products. Alternatively, in an electronics store establishment, products having the same functionality (e.g., speakers, televisions, laptops, mobile phones, etc.) may share a common location irrespective of the product brand. In some embodiments, a planogram may have multiple common locations for the same set of products. For example, an establishment and its planogram may have products and their representations placed in a common location by both brand and functionality, forming multiple common locations.

In some embodiments, the system may allow a user interacting with the planogram to switch between the different areas. For example, a user may use one or more input devices associated with a display device displaying the planogram to switch between a view of a storage area and a display area. Different areas of the planogram (e.g., storage area and display area) may present different types of information related to the wirelessly tagged products. For example, an area of planogram designated warehouse may present information associated with one or more pallets on which one or more wirelessly tagged products may be stored. As another example, an area designated as the front store may present information associated with locations of aisle and/or shelves, prices and available sizes of wirelessly tagged products, a number of the wirelessly tagged products present in that area, and/or any other information associated with a configuration of the establishment or the wirelessly tagged products located in the front store area. In some embodiments, some of that information may be withheld or hidden from a user interacting with the planogram, depending on the role and permission level of the user, for example when the user is a staff member of the establishment or a visiting customer.

Visual representations of wirelessly tagged products in a planogram may match in count with the actual wirelessly tagged products present in an establishment. In some embodiments, visual representations of wirelessly tagged products may indicate multiple instances of actual wirelessly tagged products present in an establishment. For example, a planogram may include a single visual representation of a wirelessly tagged product for a predetermined number of instances (e.g., one, two, ten, or any other number) of the actual products. Visual representations of wirelessly tagged products may include labels, including additional information. By way of non-limiting examples, labels may include a total count of wirelessly tagged products in an establishment, a price, an available discount coupon, or any other information associated with the wirelessly tagged products. A planogram may also allow a user to switch views between different storage or retail locations belonging to the same establishment.

Some disclosed embodiments may involve indicating, for at least one group of products sharing product classification information, at least two locations where products in the least one group are clustered and to identify the at least two locations on the planogram. Clustered groups of products may include two or more products placed together or in a common section or region of an establishment. In some embodiments, a planogram generator may divide a group of products with shared classification information into multiple clusters in different locations based on product families. A planogram generator may do so because the available space in a particular portion of the establishment may be insufficient to accommodate all the products sharing product classification information. For example, products sharing the classification "seafood" may include products in a "shellfish" family of products and a "fish" family of products. The planogram generator may identify more than one location for placing the products having the common classification "seafood" because a single location may not have sufficient available space to accommodate all the products in the seafood family. Thus, for example, the planogram may include the seafood classification of products presented in two clusters, one for the shellfish product family and one for the fish product family. The planogram generator may include indicators on the planogram to indicate these multiple locations. In some embodiments, the planogram may allow a user to search for all locations in a planogram where clusters of products sharing certain classification information (e.g., seafood) are present. When a user performs such a search, the planogram may highlight or otherwise identify all the locations associated with the common classification information (e.g., seafood). By way of example, as illustrated in FIG. 23, a group of products may form clusters 23004 of shellfish family products and 23006 of fish family products as shown in FIG. 23 that spread across multiple locations in the planogram. Alternatively, or additionally, an establishment may choose to place identical products having the same product model code in more than one location in the establishment (for example, placing one rack of socks next to the Footwear section and another rack of socks next to the Pants section, where both racks carry the same assortment of socks, in a clothing store). Accordingly, in some embodiments, the planogram may indicate two locations on the map of the establishment as the common location of a product, e.g., a specific type, color and size of sock, when a user performs a search for that specific product.

Some embodiments may involve tracking the planogram over time, wherein tracking the planogram includes comparing current common locations of at least one group of products to a history of common locations of the at least one group of products, determining whether the current common location diverge from the history of common locations, and updating the planogram to indicate the new common location if the divergence is greater than a predefined threshold. As used herein, a common location is a location in the establishment that would be considered the place where a certain product would be found if searched for and is the place to return any misplaced instances of the product. For example, in a grocery store type establishment, the dairy products may be located at the back of the store, and that would be the common location of dairy products such as milk, yogurt, and cheese. Such common locations a group of products may be considered default locations to present visual representations of the group of products in a planogram.

As used herein, tracking the planogram over time may include determining changes to the planogram, including additions, deletions, and/or updates of products and/or their locations within the planogram. Tracking the planogram over time may additionally or alternatively include determining changes to a grouping of products in a planogram. By way of non-limiting examples, embodiments of the system may automatically update a planogram at predetermined intervals of time or may be configured to determine changes to the planogram that may be caused by the occurrence of certain events over time. Such events may include storing products and/or comparing locations of products in an establishment.

In some embodiments, tracking the planogram may include comparing current common locations of at least one group of products to a history of common locations of the same group of products, determining whether the current common location diverges from the history of common locations, and updating the planogram to indicate the new location if the divergence is greater than a predefined threshold. As used herein, a history of common locations may include a range of locations where the group of products was considered to be present in the establishment by default over some period of time. A history of common locations may be determined by providing previously defined common locations of products manually by a user or determined using wireless signals emitted by wireless transmitting tags attached to wirelessly tagged products. For example, a processor may determine distances between current common locations and the history of common locations for one or more products. A group of products may be considered to diverge from a history of common locations when those products move away from the range of locations of the history of common locations or when the size of locations of those products shrinks or increases in size compared to the size of the history of common locations. By way of example, the group of products may be considered to diverge from a history of common locations when one or more of the distances determined by the processor exceeds a predetermined threshold distance. A processor may keep track of common locations by storing aisles, shelves, number of aisles, number of shelves, and coordinates within each aisle and shelf where the group of products is present in an establishment. The processor (e.g., processor 11004 of FIG. 11) may note changes to these locations of the group products based on the changes to the characteristics of the wireless signals emitted by wireless transmitting tags associated with the wirelessly tagged products. The processor may compute a divergence (i.e., change in location) by determining product locations based on a most recently received set of wireless signals and previously stored history of common locations stored in a data storage, such as a data structure (e.g., data structure 11006 of FIG. 11). The processor may determine whether the divergence is greater than a predetermined threshold and may update the common locations of the group of products stored in the data structure. For example, a planogram may be tracked to observe if a group of products has moved beyond a certain number of feet, then update the limits between which the groups of products can be present in the establishment. By way of non-limiting examples, planogram updates may include updating a location of a visual representation of products, a number of copies of visual representation of products indicating a change in a count of products in an establishment, or modifying or altering any other information associated with the planogram. In some embodiments, a planogram may be updated when tracked events change values such as location or when the total count reaches certain values. For example, a planogram may be updated to indicate a new common location if the divergence is greater than a predefined threshold. In some embodiments, a threshold amount may be separately defined for each type of establishment, product, or group of products. The threshold amount may automatically be adapted based on several factors related to establishments and wirelessly tagged products present in an establishment.

Some disclosed embodiments may involve adapting the predefined threshold based on at least one of a type of establishment, an owner of establishment, a history of planogram updates in establishment, classification information of products in establishment or a user input. Adapting a threshold may include, but is not limited to, raising or lowering the threshold (whereby raising a threshold would require future divergences to be larger in order to generate an update to the planogram, and lowering the threshold would result in smaller future divergences to generate an update to the planogram). Adapting a threshold may include changing a rate at which the threshold is adapted, changing a rate at which divergences are measured against the threshold, or changing one or more parameters that cause the threshold to be adapted. By way of example, a grocery type establishment may be expected to have the dairy products placed at a farther end of a store and thus may have a low predetermined threshold of divergence from this common location. In some embodiments, the common location of products in an establishment may be determined based on ownership. For example, if an establishment is a franchise, then a common location of products in the establishment may tend to match the common locations in other establishments associated with the franchise irrespective of the owners of the other establishment. In this case, the predetermined threshold for the divergence of the common location of products may be lower.

In some embodiments, updating the planogram further includes sending an alert that the planogram was updated. In some embodiments, one or more alerts may be transmitted to one or more devices associated with a user when changes are made to a planogram. In some embodiments, one or more alerts may be sent to staff in an establishment, to management overseeing the establishment, or to a function in an organization in charge of compliance of establishments in the organization to location and placement guidelines issued by the organization to its member establishments. User devices may include, for example, a laptop computer, a desktop computer, a tablet, a smartphone, a smartwatch, smart glasses, or any other type of electronic or computational device associated with the user. An alert may refer to an indication that an event requiring action and/or response has occurred. An alert may refer to one or more textual or graphical symbols, sounds, or tactile outputs (e.g., vibrations) provided on one or more devices associated with a user or users. For example, an alert may include phone notifications such as text messages or smartphone notifications. As another example, an alert may include textual or graphical information provided via other communication channels such as electronic mail. A user viewing a planogram may receive alerts by selecting and subscribing to one or more alerts. A user may subscribe to the planogram update alerts in the smartphone application or a website used to view the planogram by checking the boxes for each alert in the Settings portion of the planogram. A user may use a web browser or a smartphone to subscribe to the alerts. In some embodiments, alerts may be provided in real-time or based on certain update events. For example, the at least one processor may cause a real-time alert to be provided in response to events such as one or more wirelessly tagged products going out of stock or changing in position. In some embodiments, a user may configure the time of alert notifications for planogram updates. For example, a user may request alert notifications as an hourly, 8-hourly, daily, or weekly digest of planogram updates, or at any other desired time or frequency.

In some embodiments, the at least one processor is further configured to receive, over a communications interface, a request to identify a location of a specific product in the establishment, and to respond to the request by sending back at least one common location of products sharing classification information with the product identified in the request. As used herein, a communication interface may be a hardware interface of the system for communicating with nearby wireless transmitting tags using technologies such as Bluetooth, Near Field Communication (NFC). A communication interface may include a circuit configured to receive signals sent over a communication medium. The signals may carry data (as in the case of communication systems such as Wi-Fi, Bluetooth, cellular communication, Ethernet communication or any other standards-based or proprietary protocol). The medium may be over-the-air wireless communication; and the signal may carry data of some form according to an agreed-upon communication protocol. A communication interface may include a fixed interface in an environment, a wireless user device (e.g., cellphone, tablet, dedicated hardware, etc.), a handheld device (e.g., a handheld scanner provided to an employee or customer by the establishment for use during working routines or in a shopping session), or any other circuit or component that receives wireless signals.

As used herein, a request may include a wireless signal with an embedded operation code to perform a task and to determine the information to display. The system may receive a request from a receiver (e.g., receivers 11300*a-g* of FIG. 11) through wireless signals over the network (e.g., network 11002 of FIG. 11) to perform an operation associated with the product, such as determine a location of a wirelessly tagged product, determine an available inventory of a wirelessly tagged product, or determine any other information associated with a wirelessly tagged product. In some embodiments, a user may request for receipt of wireless signals from a wirelessly tagged product. For example, a user of a smartphone with NFC capability may request to receive a wireless signal by bringing the smartphone close to a wirelessly tagged product with an NFC tag to activate the wireless transmitting tag and emit a wireless signal. The user may select an operation (e.g., location of a product) to activate the RFID tag.

In some embodiments, a user may request a receiver device to receive wireless signals by bringing the receiver device in close proximity to wireless transmitting tags associated with wirelessly tagged products. For example, a smartphone with NFC capability may be brought close to a product with an NFC tag to activate the wireless transmitting tag and emit a wireless signal, including information about the product. In some embodiments, wireless signals may be relayed using wireless receiver devices to a processor to identify location over a network. By way of a non-limiting example, as illustrated in FIG. 11, receiver(s) 11300*a-g* receive wireless signals from tag(s) 1100 over network 11002 with processors 11004 to identify locations of tag(s) 1100.

Embodiments of the system may respond to a request by retrieving data requested in a received wireless signal and displaying the retrieved data. For example, a received request for a location of a wirelessly tagged product may result in processing a received wireless signal to retrieve a tag ID associated with the wirelessly tagged product by the processor. The processor may use the tag ID to retrieve location information associated with the wirelessly tagged product from a data storage (e.g., data structures 11006).

In some embodiments, the request to identify the location of a specific product includes identification information of the requester, indicating whether the requester is an authorized establishment staff member. As used herein, identification information of the requester may be information to uniquely identity the individual (e.g., employee number in an establishment, employee name) or their role in an establishment (e.g., employee title). The at least one processor may extract the identity of a user generating a request from the received request. In some embodiments, the identity of a user may be retrieved based on data in the received location request. For example, information identifying a user may be available as part of cookies stored on the user's device. In another scenario, a user's request for location may be a web request submitted as a form with a user identifying information included in the hidden fields of the form. In some embodiments, the at least one processor may retrieve identification information based on authentication information associated with the software used for generating location requests. For example, user identity information may be part of a session generated when the user logs into an application to view a planogram of the establishment and requests a location of the products in the planogram. A user access token generated as part of the user authentication and stored on a server associated with the establishment or on the user's device may be used as user identification information. In some embodiments, identity information may be based on the identity of hardware used for generating location requests, such as network IP address, MAC ID, a device's IMEI, a serial number or other hardware-identifying information. In some embodiments, the at least one processor may look up in a data structure information associated with the retrieved identification information and use that to determine whether the request is authorized. For example, a location request for a product's availability in a warehouse may result in reviewing user title (e.g., manager) to determine if an individual with a certain title has access to the location information in the warehouseto decide whether to provide location details of the searched product within the establishment.

In some embodiments, the at least one processor may determine whether the identification information of the requester indicates whether the requester is an authorized staff member. An authorized establishment staff member may be an individual associated with an establishment who has the authorization to access certain information about the establishment and/or wirelessly tagged products in an establishment. Authorization (in the context of user roles in a data system) may include one or more permissions, from an entity managing a data system, to access certain types, aspects or categories of data stored in the data system. For example, different employees of an establishment may require different authorization or different permission levels to access sensitive personal data such as birthdays or addresses as opposed to less sensitive personal data such as full names, email addresses or phone numbers. By way of another example, employees of an establishment (e.g., a retail store) may require different authorization or different permission levels to access sensitive business information such as stock levels and future orders as opposed to less sensitive business information such as price or product pictures. For example, a staff member in a retail establishment may be allowed access to location information of products present in certain areas (e.g., warehouse, storefront) and certain types of products (e.g., clothing, dairy, groceries).

As discussed above, the at least one processor may receive a request to identify the location of a specific wirelessly tagged product. In some embodiments, the wireless signal, including the request, may include identification data of a user seeking information of wirelessly tagged products along with an ID of the product. In some embodiments, user identification data may be provided manually by a user of the device that sent a request to identify the location of a specific wirelessly tagged product. Additionally or alternatively, user identification data may be provided by the device used for requesting location. For example, the device may provide identification data, such as phone number, address, employee ID, authentication credentials used by a user to log into the device used for generating a request.

In some embodiments, the user identification data may be used to control access to location information associated with a specific product. In some embodiments, a location identification request may be denied if the user is not an authorized user for the requested search operation. A user may be considered unauthorized to access location data related to a product based on identity information associated with the user. For example, a location lookup request as part of an inventory search may be authorized only for staff members of an establishment who have access to the backroom storage of products. By way of a non-limiting example, as illustrated in FIG. 14A-C, device 11008 may transmit identification information of the user along with a tag ID of a product with search request generated using search button 14006. User search requests for identifying the location of a product may include a search for inventory availability with location or search for product details (as described in FIG. 14A), including location given model number and other details (as described in FIG. 14B).

In some embodiments, additional information associated with a location request, such as time of the day, wait time between requests, or the number of repeated requests, may be used in determining whether the user is authorized to access location information. For example, a location request made outside business hours may be considered unauthorized unless it is a manager making a request. In another scenario, location requests in very quick succession may be understood to be made by automated software and not a human being and deemed unauthorized. In yet another scenario, a repeated request for location request beyond a threshold number may be considered unauthorized.

Access to location information may be configured to certain users or devices. A user may be allowed to configure access control restriction rules and store them in a data storage, such as data structures 11006. Processors 11004 may receive user configurations and may store them in various formats, including flat files, databases, etc. Embodiments may allow configuration to control access to classification information and determination of location information.

In some embodiments, when the request originates from an entity other than an authorized establishment staff member, products located in storage areas may be excluded from a corresponding response. An unauthorized person may be any individual not authorized to access locations of products in a planogram and thus may not use that feature when viewing the planogram of an establishment. In some embodiments, an unauthorized person may be an individual not part of an establishment, such as a customer visiting the establishment, or a delivery person dropping new stock of products, an individual using an unauthorized device, such as a personal phone instead of establishment provided kiosk, or accessing locations of products in a planogram in an unorthodox manner, such as accessing information too frequently, accessing information outside business hours. A staff member may be regarded as unauthorized to request location information based on the staff member's title. For example, a staff member with the title "manager" may be allowed to request and access location information. But another staff member with the title "janitor" or "check-out-clerk" may be considered an unauthorized staff member, and a request by such a staff member to access location information may be denied.

Figure 24:
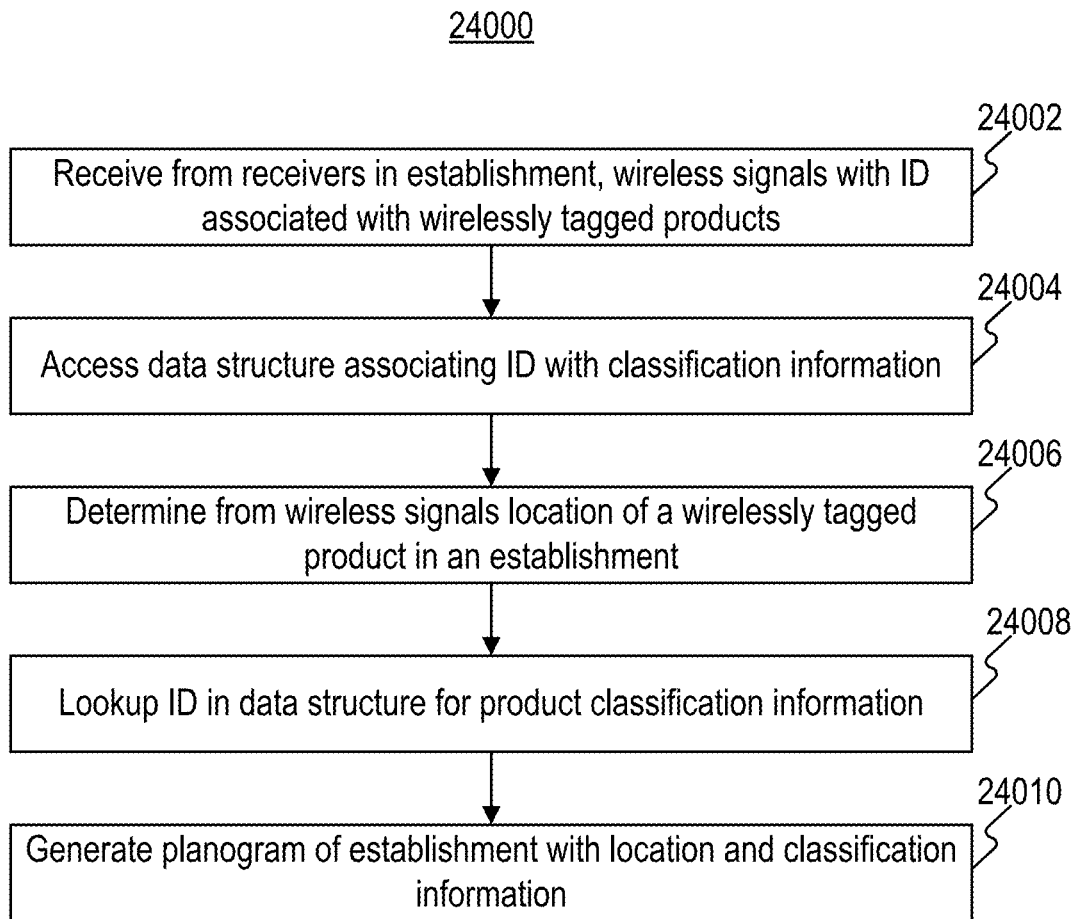
FIG. 24 is a flow chart illustrating an exemplary embodiment of an aspect of the generation of planogram, consistent with embodiments.

FIG. 24 is a flow chart illustrating operations of an exemplary method 24000 for the generation of a planogram, according to some embodiments of the present disclosure. In step 24002, the at least one processor receives from receivers wireless signals from wirelessly tagged products. In some embodiments, wireless signals may include an ID associated with each of the plurality of wirelessly tagged products. In step 24004, the at least one processor may access a data structure associating received ID in wireless signal with classification information. In step 24006, the at least one processor determines locations of wirelessly tagged products in establishments. In step 24008, the at least one processor determines product classification information from the received ID. In step 24010, the at least one processor generates a planogram using determined locations and classification information of wirelessly tagged products.

In step 24002, the at least one processor may receive wireless signals associated with wirelessly tagged products in an establishment from a plurality of wireless receivers. By way of example, as illustrated in FIG. 11, processor(s) 11004 belonging to system 11000 may receive wireless signals of tag(s) 1100 associated with wireless tagged products, such as 1106 (as shown in FIG. 1) and 1122 (as shown in FIG. 1) through receiver(s) 11300a-g.

In step 24004, in response to received wireless signals including ID of wirelessly tagged products in step 24002, the at least one processor may access a data structure associating the ID of wirelessly tagged products with classification information. By way of example, as illustrated in FIG. 11, processor(s) 11004 may access data structure(s) 11006 upon receiving wireless signals with ID via receiver(s) 11300a-g.

In step 24006, the at least one processor may utilize the received wireless signals to determine locations of wirelessly tagged products transmitting wireless signals in an establishment. By way of example, as illustrated in FIG. 13A, a retail establishment may include tag 1100 associated with merchandise moved between different sections of establishment and emitting signals received by receivers in those sections.

In step 24008, the at least one processor may use the data structure retrieved in step 24004 to lookup classification information associated with a wirelessly tagged product. The at least one processor may also use ID data in wireless signals received in step 24002 for looking up classification information. By way of example, as illustrated in FIG. 14B, a device 11008 may be used to look up product information based on received information such as brand, SKU number, inventory number, or model number.

In step 24010, the at least one processor may generate a planogram of the establishment using the determined location of wirelessly tagged products in the establishment in step 21006 and classification information determined in step 24008. Embodiments of the system may utilize location information to place visual representations of wirelessly tagged products present in an establishment. Embodiments of the system may utilize classification information in determining the visual representations of wirelessly tagged products. In some embodiments, the system may utilize classification and location information to verify the authenticity of a wireless signal associated with the wirelessly tagged products. For example, classification information may be utilized to determine if a wireless product is placed in the correct location. In some embodiments, the system may utilize classification information to verify if a user accessing information related to a product is an authorized user. Embodiments of the system upon completion of step 24010, completes (step 24002-99) executing method 24000.

Disclosed embodiments may include a system for reading wireless transmitting tags in an establishment containing a plurality of wirelessly tagged products, and for automatically generating replenishment alerts. A wirelessly tagged product may include any item with which a tag may be associated. A product may include any object or material stored or maintained within an establishment. By way of non-limiting examples, a product may include food, clothing, shoes, electronics, consumer goods, equipment, vehicles, consumables, packaging, accessories, supplies, materials, artistry, animals, instruments, pallets, containers, pharmaceuticals, cosmetics, commodities, articles, devices, machinery, implements, mechanisms, tools, furniture, or any other object that may be present in an establishment. In some embodiments, the establishment may offer the products for sale, exchange, or barter, for display, for safekeeping, for storage, for distribution, and/or for complimentary giveaway. A wireless transmitting tag may be associated with a product to enable the product, via the tag, to provide self-identification.

Embodiments of a wireless transmitting tag may include any device suitable to attach to any object for the purpose of identifying the object visually, tactilely, audibly, or electronically without the use of externally connected cables or wires. Other embodiments may be embedded into an item as part of the manufacturing process or later, for example, by a retailer. Replenishment alerts may include alert signals used to indicate a need to restock items based on the occurrence of an event. In some embodiments, a user may configure events for the generation of alerts and also types of alerts to generate upon the occurrence of an event. Replenishment alerts may also include a specific type of alert that suggests the restocking of certain products.

In the context of stock management at an establishment, an alert signal may indicate that certain items or products stocked are below a desired minimum stock level (or about to go below a desired minimum stock level), or alternatively that they are above a desired maximum stock level. Other alert signals may indicate that certain items or products stocked have an expiry date approaching or already passed, or that a threshold for the period of time that a certain item or product is present in the establishment has passed (or is about to pass).

A wirelessly tagged product may power the wireless transmitting tag to activate the tag to provide information. Power source to wireless transmitting tag may be continuous power source from an AC or DC circuit or stored energy such as batteries. In some embodiments, tags of the wirelessly tagged products lack batteries. When a wirelessly tagged product lacks an energy source, a wireless transmitting tag associated with a wirelessly tagged product may be activated by an external device. For example, a user of a smartphone with NFC capability may request to activate a wireless tag by bringing the smartphone close to a wirelessly tagged product with an RFID tag to activate the wireless transmitting tag.

In some embodiments, tags of the wirelessly tagged products are powered by capacitors. The energy provided by an external device may be briefly stored in capacitors to activate the wireless transmitting tags to emit wireless signals sharing information related to associated wirelessly tagged products. A capacitor may be a hardware component for storing energy in a wireless transmitting tag. As discussed above, a wireless transmitting tag may include an energy storage circuit having a storage capacitor configured to store the ambient energy shared by an external device. Additionally, or alternatively, a tag may include a 2.4 GHz harvester configured to harvest energy in a frequency band around 900 MHz (e.g., ambient and intentional energy sources around 900 MHz, such as RFID or cellular signals in this band). A storage capacitor may be electrically connected to a radio energy harvester to store ambient energy received by the harvesters, and together with the harvester, power the wirelessly tagged products. In some embodiments, wireless transmitting tags may include transfer capacitors configured for collecting and storing the ambient energy harvested by wireless transmitting tags. In some embodiments, ambient energy may be collected by a harvester and initially stored in the transfer capacitors. The transfer capacitors may be configured for temporarily storing ambient energy collected in the form of electrical energy, and the storage capacitor may be configured as the main store of the collected ambient energy in the form of electrical energy. The harvested, collected, and stored energy in capacitors may be used to power the circuitry of a wireless transmitting tag.

In some embodiments, the system includes at least one transmitter for wirelessly powering tags of the wirelessly tagged products. A transmitter may include any circuit configured to transfer, send, radiate, deliver, or output signals. The signals may contain energy such that upon receipt the energy is used by receiving tags to power the tags. The transmitter may therefore include one or more antenna for transmitting signals containing energy, and the tags may each include one or more antenna for receiving the signals containing energy. A transmitter may transmit the energy directly obtained from a power source or previously stored energy in a capacitor or other energy storage component, to power circuitry in wireless transmitting tags of wirelessly tagged products.

Disclosed embodiments may include at least one processor as described elsewhere in this disclosure. In some embodiments, the at least one processor is configured to receive from a plurality of receivers in the establishment, wireless signals from the plurality of wirelessly tagged products, wherein the wireless signals reflect an ID associated with each of the plurality of wirelessly tagged products. In some embodiments, the wireless signals include an ID associated with each of the plurality of wirelessly tagged products. An ID (e.g., tag ID) may include information of a given one of the wireless transmitting tags that identifies the tag to a user and/or to other devices or device components. The ID may include numbers, letters, characters, codes, strings, or other forms of data that may identify the wireless transmitting tag to other devices or device components that receive the ID. In some embodiments, the ID may be unique to a specific tag, and that specific tag may have only one ID. Alternatively, the same tag may have multiple IDs. In some embodiments, multiple tags may share the same ID or groups of IDs. Examples of an ID may include a serial number, part number, bar code, UUID, EPC, and/or other data.

In some embodiments, the at least one processor is configured to access at least one data structure associating each ID of each wirelessly tagged product with one of a plurality of product models. In some embodiments, each of the plurality of product models are associated with an SKU. As used herein, product model may include instances of a product with common attributes identified using a number, code, or other forms of data that is uniquely associated with a type of product, item, object, material, etc., as part of a stock management system, inventory keeping system, or other such data management platform. Examples of codes that represent a product model include SKU codes, EPC codes, barcodes, ISBN codes, product numbers, part numbers, catalog numbers, etc. A product model may be identified and managed using a product model code that virtually represents a physical instance of a product model.

In some embodiments, the at least one processor is configured to perform a look-up in the data structure of a product model associated with at least one ID of at least one wirelessly tagged product. The at least one processor may determine products related to wirelessly tagged products using identifying information, such as tag ID. For example, the at least one processor may search a data structure storing the details of product models in association with tag IDs. By way of example, the data structure utilized in looking up product models may include a hash map that may have keys that include IDs of wirelessly tagged products and values with one or more product model details, such as product name, dimensions, technical specification, manufacturer name, brand name, and/or any other information or data associated a product model. In some embodiments, the data structure may include a key point to a storage location (e.g., memory location) containing product details. In some embodiments, the at least one processor may transform data or information included in wireless signals emitted by a wireless transmitting tag associated with a wirelessly tagged product to a tag ID associated with the wirelessly tagged product. Transformation may include combining different data (e.g., product serial number, wireless signal receipt timestamp, wireless signal characteristics such as amplitude and angle) to uniquely identify a product model. Transformation may further include decryption, descrambling, re-ordering or other predefined mathematical manipulations of the transmitted data. For example, a unique tag ID associated with a clothing product with a wireless transmitting tag may include information, such as brand name, product name, and size. A processor (e.g., processors 11004 of FIG. 11) of the system may be used to transform data in a received wireless signal to generate a tag ID and use it to access the product model by using the tag ID to look up a location of the product model in a hash map included in the data structure defined above. The processor may then access the identified storage location to retrieve the product model.

In some embodiments, one or more processors may be configured to determine, based on the look-up, a total number of units of each product model detected in the establishment. For example, the processor may count a number of look-up operations performed to determine a total number of units of a product model. A processor may keep track of separate counts for each product model by saving tag IDs present in wireless signals associated with each product model in a list and counting the number of unique tag IDs in the list. In some embodiments, the processor may create a new list to add tag IDs when no other lists exist, or when the processor has not previously looked up a product model in the data structure. A processor may store in a data structure a list of all unique tag ID's present in an establishment, and update the list from time to time based on reports from other parts of the system, and use that list to count the number of units of a product model. The product model associated with the tag IDs in the data structure that have previously been accessed or looked-up by the processor may point to each of the lists of tag IDs used for look-up in the data structure. In some embodiments, the processor may keep an array of counters, one for each product model, and increment the value of a respective array cell upon identifying a product model in the data structure.

A processor may look up product models associated with tag IDs for a predetermined period of time to determine the number of units of the product model in an establishment. A user may configure the predetermined amount of time associated with each of the product models. In some embodiments, a user may configure the time at which the processor may look up product models associated with tag IDs in received wireless signals. For example, a user may configure a processor (e.g., processors 11003 of FIG. 11) to look up tag IDs in a data structure (e.g., data structures 11006 of FIG. 11) for product model IDs after business hours to see how many units of a product remain in the establishment. In some embodiments, the system may be configured to calculate the total count of units per product model multiple times per day based on a time of the year. For example, a user may configure the system's processor to determine the total count of units present in an establishment multiple times during the day on weekends when there may be more visitors to the establishment as compared to a weekday.

In some embodiments, the determined total number of units of each product model in the establishment may be an estimation. A processor (e.g., processors 11004 of FIG. 11) may confirm the total number of units of a product model upon collection of wireless signals emitted by wirelessly tagged products for a predetermined period and using tag IDs in wireless signals to look up product model codes. During the predetermined time period the processor may not receive wireless signals from every wirelessly tagged product associated with a product model in the establishment. Thus, the total count of units of a product model may not represent an exact count of units present in the establishment. The count of units determined by the processor may then be considered an estimate of the actual count of units in the establishment. Alternatively, or additionally, a processor may use the count of units from which wireless signals were received during the time period, along with information about the rate of transmission of the wireless identification tags, to generate an estimate of the actual number of units present in the establishment.

In some embodiments, an estimate of the total number of units of a product model in an establishment may be determined by processing the number of units of product models identified by collecting and processing tag IDs present in wireless signals emitted by wireless transmitting tags and their associated product models. A system's processor may calculate the average, mean or median value of the total number of units of a product model as calculated from different sets of wireless signals received and processed to identify product models from tag IDs in the wireless signals and use them as estimate values. Different sets of wireless signals used in calculating average, mean, and median values of the number of units of a product model may have overlapping signals shared between at least two sets. In some embodiments, a set of signals used to calculate the total count of units of a product model may be a subset of signals. In some embodiments, various counts of units of a product model may be used as a discrete set of estimated values. In some embodiments, the various counts may be ordered (e.g., arranged in an ascending or descending order) to determine a range of values and use the determined range as an estimate of the total number of units of the product model.

In some embodiments, the estimation may be based on data from some remote sensing system (e.g., a computer vision system, a tag reading system, an imaging-radar system, a LIDAR detection system, etc.), or it may be based on historical data regarding stock movements in the store, or it may be based on a combination of previous stock counts and sales data, or any combination of the above.

In some embodiments, the at least one processor is configured to access in the at least one data structure a target threshold of units associated with each product model in the establishment. A target threshold may be a value stored in a data storage. The value of the target threshold may be an actual or estimated number of units needed or expected in inventory. By way of example, disclosed embodiments may include an arrangement similar to data structures 11006 (as shown in FIG. 1), and may indicate the minimum number of units of a product model an establishment needs to have in stock or display in the establishment. In some embodiments, the threshold is at least one of a number or a number range. The threshold value may include multiple discrete values based on various factors such as establishment size, time of year, time at which stock in the establishment is replenished or any other factors that may affect the receipt or sale of products in the establishment. For example, a threshold value of a number of units of a product model may vary based on a size of the establishment with a higher threshold number of units of a product model in a larger establishment, such as a superstore and a lower threshold in a smaller establishment, such as a neighborhood store. In another scenario, the threshold value of a product model may be higher during periods of the year associated with higher sales volumes such as Thanksgiving, Christmas, and/or other holidays. A user may be allowed to configure the threshold number of units associated with a product model using a processor and store the threshold in a data structure. In some embodiments, a user may be allowed to identify the periods of higher sales volume and the threshold values to be associated with each such time period.

In some embodiments, the threshold may be a number range. For example, the threshold may represent multiple conditions that need to be met for the threshold to be passed. For example, a threshold number range of 3 to 5 may be associated with the conditions such as "less than three items, or less than five items if the stock is below that level for more than twelve hours." As another example, a threshold number range of 2 to 3 may be associated with the conditions such as "less than two items, unless it is a Friday in which case less than three items.

A system's processor may retrieve the threshold number of units of a product model from a data structure by using a code associated with a product model code. A data structure may include a hash map with code representing the product model as keys that point to a value representing the threshold number of units of a product model. A processor may access the data structure to look-up the threshold value of a product model by providing a code identifying a product model. In some embodiments, a hash map may point to a memory location to a list with various threshold values associated with a product model for different environments and times of the year.

Some embodiments may involve comparing the determined total number of units of each product model with the target threshold to determine when a particular product model falls below an associated threshold. For example, a processor may compare a count of the total units of a product model in an establishment to a threshold value associated with that product model and/or establishment. Comparisons of total available units and the threshold value may be used to take one or more actions, such as, determining whether the product model is low in number and needs to be restocked or too high in number and needs to be moved to a warehouse. A system's processor (e.g., processors 11004 of FIG. 11) may compare the total units of a product model and its threshold value once or multiple times in a day, in a week, in a month, or over any other desired time period. The total number of times and the frequency of comparing the total available units of a product model in an establishment and its threshold value may vary with each product model. In some embodiments, the comparison schedule of a product model may be based on various factors such as establishment size, time of day, or time of year. For example, a frequency of a comparison of the total number of units of a product model in an establishment and its threshold value may vary based on the size of an establishment with lower frequency in a larger establishment, such as a superstore with a high number of units of product model available and a higher frequency in a smaller establishment, such as a neighborhood store with a low number of units of product models. In another scenario, the comparison schedule of a product model may include a higher frequency during periods having higher sales volumes such as Thanksgiving, Christmas, or other holidays. A user may be allowed to configure the comparison schedule frequency of a product model using a processor and store the frequency in a data structure. In some embodiments, a user may be allowed to identify the periods of higher sales volume and the comparison frequency to be associated with each configured period.

The disclosed comparison may include a simple comparison of a threshold number of units of a product model to a number of units of the product present in an establishment. In some embodiments, the comparison may include comparing whether the total number of units of a product model falls within a range of values of threshold values of the product model and/or how close the total number of units is to a minimum or maximum threshold value. The processor may take different actions based on where the total number of units of a product model in an establishment falls within the threshold range of values of the product model. For example, if the total number of available units of the product model in an establishment is close to a minimum value of the threshold range of values of the product model, then the product model may need to be restocked immediately. In another scenario, if the total number of available units of the product model in an establishment is close to a maximum value of the threshold range of values, the processor may provide a timeline for restocking the product model in the establishment.

Some embodiments may involve outputting a replenishment notification for the particular product model. A notification is a signal generated by a component of one system, used to alert another component of the system, or a different system, or a person (or any combination of the above) of the occurrence of a certain event. The notification signal can be audible (such as a heavy truck beeping when it is driven in reverse), visual (such as the flashing lights of an ambulance alerting other drivers to move out of the way), another sensory signal (such as the vibration of a phone set to "silent" when a call comes in), or a digital signal (such as a notification signal to an app on a mobile device, an interrupt signal to a CPU in an electric circuit board, or an entry in a system alert log) among other forms.

A replenishment notification is a notification indicating that a replenishment action needs to be performed. This notification may be sent to a store employee directing them that a product needs to be brought from a storage area of the establishment to a display area of the establishment, so the product would be available for sale. In some embodiments, the notification may be sent to a store employee directing them that a product needs to be ordered from a warehouse because it is no longer available in the store (or it is expected to be no longer available at some future point in time) and needs to be replenished. As another example, the notification may be sent from an inventory management system in the establishment to a central ordering system of the organization, generating an automatic order to replenish inventory at the establishment.

An individual replenishment notification may be sent to a user device for each product model when a total number of units of the particular product model in the establishment falls below a threshold number of units associated with that product model. A replenishment notification of a particular product model may be sent in real-time or may be delayed and sent along with other product model notifications in a batch manner. The timing of replenishment notifications may be based on an amount by which the total number of units of a particular product model differs from a threshold value associated with that product model. The timing of the replenishment notification may indicate an urgency of restocking the units of the particular product model in the establishment.

In some embodiments, the notification may include a message that the total number of units of the particular model is below a threshold. Replenishment notifications may include a message in text format displayed on a user device to take action. The message may include a reason for the notification, for example, the total number of units of a particular model of the product is below the threshold value, and a description of the action suggested or required to be taken. In some embodiments, the replenishment notification may include codes for the reason and action, and the user device (e.g., user device 11008) may looks-up text messages for determining the reason for replenishment notification and action to be taken.

In some embodiments, a data structure may store a plurality of replenishment rules, and in response to the replenishment notification at least one processor may be configured to access an associated replenishment rule from the plurality of replenishment rules, and to submit an order for restocking the particular product. In some embodiments, at least one processor may be configured to access replenishment rules for preventing restocking order submissions for particular products.

As used herein, a replenishment rule may include a set of algorithms, conditions, or requirements that determine, based on a possibly wide array of inputs, whether a replenishment needs to be performed. The replenishment rule may also provide requirements associated with the replenishment. By way of example, a replenishment rule may specify that a product model may not be replenished or restocked when the product has not been purchased in the last N days. As another example, a replenishment rule may specify that a product model may be replenished based on a day of the week and/or a time of day. By way of another example, a replenishment rule may specify that a product model may be replenished if the coming week includes a holiday, special event, or a planned sale or a planned new collection launch. Various other conditions for replenishing product models may be specified in the form of one or more replenishment rules. The inputs to the algorithm may include, for example, a sales history, an inventory history, an engagement history, catalog information, price information, price change information, date and time information, staffing information, organizational processes information (e.g., set replenishment times or set order requirements) or any other information indicating a volume or rate at which a product model comes into (e.g., due to restocking or returns by a customer) or goes out (e.g., due to sales) of an establishment. Requirements for replenishment may include, for example, a minimum or a maximum number of items in the order, a combined minimum or maximum number over several aggregated orders in a defined time period, an association between product information and the facility, organization, or entity the order is sent to.

Replenishment rules may include instructions that require performance of an action when the total number of units of a particular product model differs from a threshold value associated with that product model. Replenishment rules may be generated by a user and stored in data storage such as data structure 11006 (as shown in FIG. 11). The total number of units and the threshold number of units may be considered to differ when a difference between the two values is more than a predetermined difference value. In some embodiments, the predetermined difference value may include an error percentage associated with estimating the total number of units of the product model. In some embodiments, the total number of units may be considered to be different from the threshold number when the total number of units is lower than the range of values included in the threshold associated with the particular model. In some embodiments, a user may be allowed to configure different predetermined difference values to be associated with different product models, different establishments, and/or different time periods. A user may be allowed to configure the predetermined difference values associated with a product model using a processor and store it in a data structure (e.g., data structure 11006 of FIG. 11). A processor may send a replenishment notification when the total number of units of a particular model differs from the threshold number of units of the product model.

A user device may access one or more replenishment rules on receipt of a replenishment notification generated based on a difference between the total and threshold number of units of a product model. A user device may access the one or more replenishment rules by searching a data structure using a code representing the product model. In some embodiments, the replenishment notification received by the user device may include the code representing the product model. The data structure may include a hash map with product models as keys pointing to replenishment rules. A user device may provide a product model as input to the hash map to look-up one or more replenishment rules. The accessed one or more replenishment rules may include instructions presented to a user in the form of display on the user device. Replenishment instructions may include actions associated with stocking of a product model in an establishment. Actions may include restocking units of the product model in different areas (e.g., front display area, back warehouse area) of the establishment or moving units of the product model from one area of the establishment to another. Restocking units may include placing orders for units of product model from a vendor to ship to the establishment.

As used herein, an order may include a shopping cart order to ship requested products. In some embodiments, an order may be sent to a remote system to bring units of the product model to the establishment from a storage facility. A shopping cart order may result in automatically adding items to a shopping cart and presenting a link to the shopping cart to a user to authorize and/or place an order.

Some embodiments may involve accessing replenishment rules for delaying submission of orders for restocking a particular product based on at least one of the particular product in the restocking order, a number of other restocking orders submitted over a recent time period, a particular products for which other restocking orders were submitted over a recent time period, a sale history of the particular product in the restocking order, a sales history of the particular products for which other restocking orders were submitted over a recent time period, or a time at which the restocking order is submitted. For example, a processor may execute one or more replenishment rules to determine where and when to issue restocking orders. The one or more replenishment rules may include various conditions for determining a location and a time for ordering units of a product model. The location for ordering units of a product model may represent one or more sources from which an establishment may obtain one or more units of the product model. Such sources may include, for example, e-commerce stores and associated websites, product manufacturer's websites, wholesaler's websites, or a physical or electronic address associated with an entity or a person supplying one or more products to an establishment. Placement of the orders may be instantaneous or may delayed based on various factors. Factors that may delay placement of orders for restocking a product model may include orders for other product models requiring restocking, establishment size, time of the year, or other conditions that may determine whether or not one or more product models are required to be present in an establishment. For example, a restocking order request made during the fall season for a product model representing a summer clothing collection may be delayed until a spring season immediately preceding the following summer season. In another scenario, products that have a shorter shelf life, such as produce, dairy, or other time-sensitive items, such as a certain in trend clothing, may be prioritized for a restocking order over other restocking order requests. One or more replenishment rules for determining the timing for processing restocking orders of a product may be based on particular products for which other restocking orders were submitted over a recent time period and meta information associated with those restocking orders. Such meta information may include, for example, a number (e.g., total count) of other restocking orders submitted over a recent time period, sales history of a particular product in the restocking order, sales history of the particular products for which other restocking orders were submitted over the recent time period, or a time at which the restocking order is submitted. For example, submission of a restocking order for a product may be delayed when the sales history for that product indicates that a sales volume of that product is relatively small over a long time period (e.g., only 1 or 2 units sold over a week, or over a month). As another example, submission of s restocking order for a product may be delayed when several other restocking orders for that same product have already been previously submitted. Various other criteria may be used to define rules for delaying submission of restocking orders for particular products.

Figure 25:
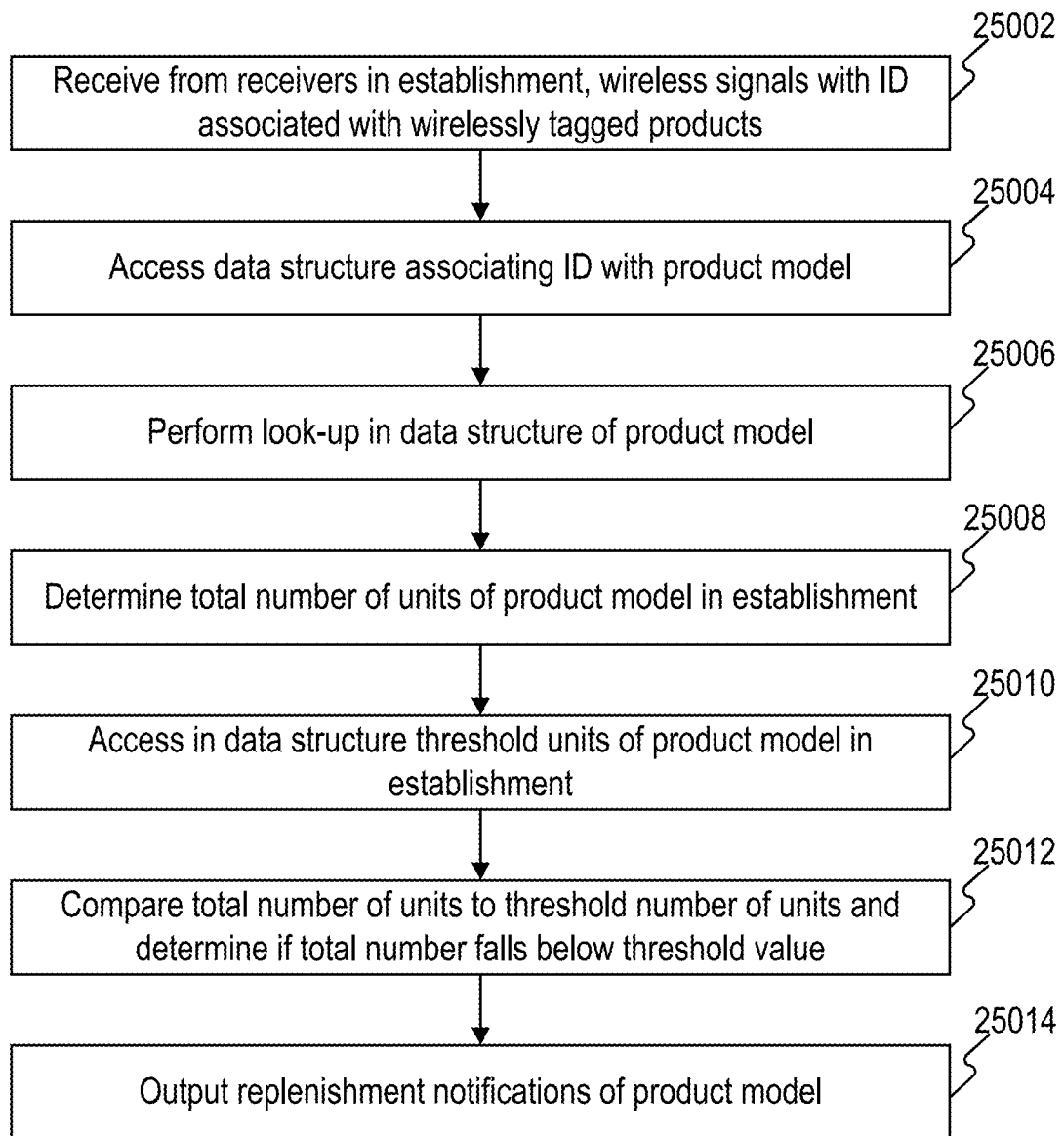
FIG. 25 is a flow chart illustrating an exemplary embodiment of an aspect of the generation of replenishment notifications, consistent with embodiments.

FIG. 25 is a flow chart illustrating operations of an exemplary method 25000 for the generation of replenishment notifications, according to some embodiments of the present disclosure. In step 25002, the at least one processor receives from receivers wireless signals from wirelessly tagged products. In some embodiments, wireless signals may include an ID associated with each of the plurality of wirelessly tagged products. In step 25004, the at least one processor may access a data structure associating received ID in wireless signal with product model. In step 23008. the at least one processor performs a look-up in data structure with tag ID. In step 25008, the at least one processor determines the total number of units of the product model in an establishment. In step 25010, the at least one processor accesses data structure threshold units of the product model in the establishment. In step 25012, the at least one processor compares the total number of units of the product model with the threshold number of units of the same product model. In step 25014, the at least one processor outputs the replenishment notifications for the product model.

In step 25002, the at least one processor may receive wireless signals associated with wirelessly tagged products in an establishment from a plurality of wireless receivers. By way of example, as illustrated in FIG. 11, processor(s) 11004 belonging to system 11000 may receive wireless signals of tag(s) 1100 associated with wireless tagged products, such as 1106 (as shown in FIG. 1) and 1122 (as shown in FIG. 1) through receiver(s) 11300*a-g*.

In step 25004, in response to received wireless signals including ID of wirelessly tagged products in step 25002, the at least one processor may access a data structure associating the ID of wirelessly tagged products with the product model. By way of example, as illustrated in FIG. 11, processor(s) 11004 may access data structure(s) 11006 upon receiving wireless signals with ID via receiver(s) 11300*a-g*.

In step 25006, the at least one processor may utilize the accessed data structure to perform look-up product model. By way of example, as illustrated in FIG. 14B, a device 11008 may be used to look-up a product model based on received ID information associated with a wireless transmitting tag associated with a wirelessly tagged product.

In step 25008, the at least one processor may use the looked-up product models numbers associated with IDs in step 25006 to determine the total number of units of product model in an establishment. By way of example, as illustrated in FIG. 14A, a device 11008 may be used to determine the total number of units of the product model based on received ID information associated with a wireless transmitting tag associated with a wirelessly tagged product.

In step 25010, the at least one processor may access in data structure threshold units of the product model. By way of example, as illustrated in FIG. 11, processor 11004 may access data structure 11006 directly or over network 11002 to access threshold units values for a product model.

In step 25012, the at least one processor compares the total number of units of a product model obtained in step 25008 to the threshold number of units of the same product model obtained in step 25010. Embodiments of the system may compare to determine if the total number of units of the particular product model is lower than the threshold number of units of the particular product model.

In step 25014, the at least one processor outputs a replenishment notification of the product model based on the result of comparison in step 25012. By way of example, as illustrated in FIG. 14A, a device 11008 may be used to notify replenishment of the product model. Embodiments of the system share replenishment notifications requesting restocking or avoiding restocking items. Embodiments of the system share replenishment notification to move units of the product model between different areas of the establishment.

Figure 26:
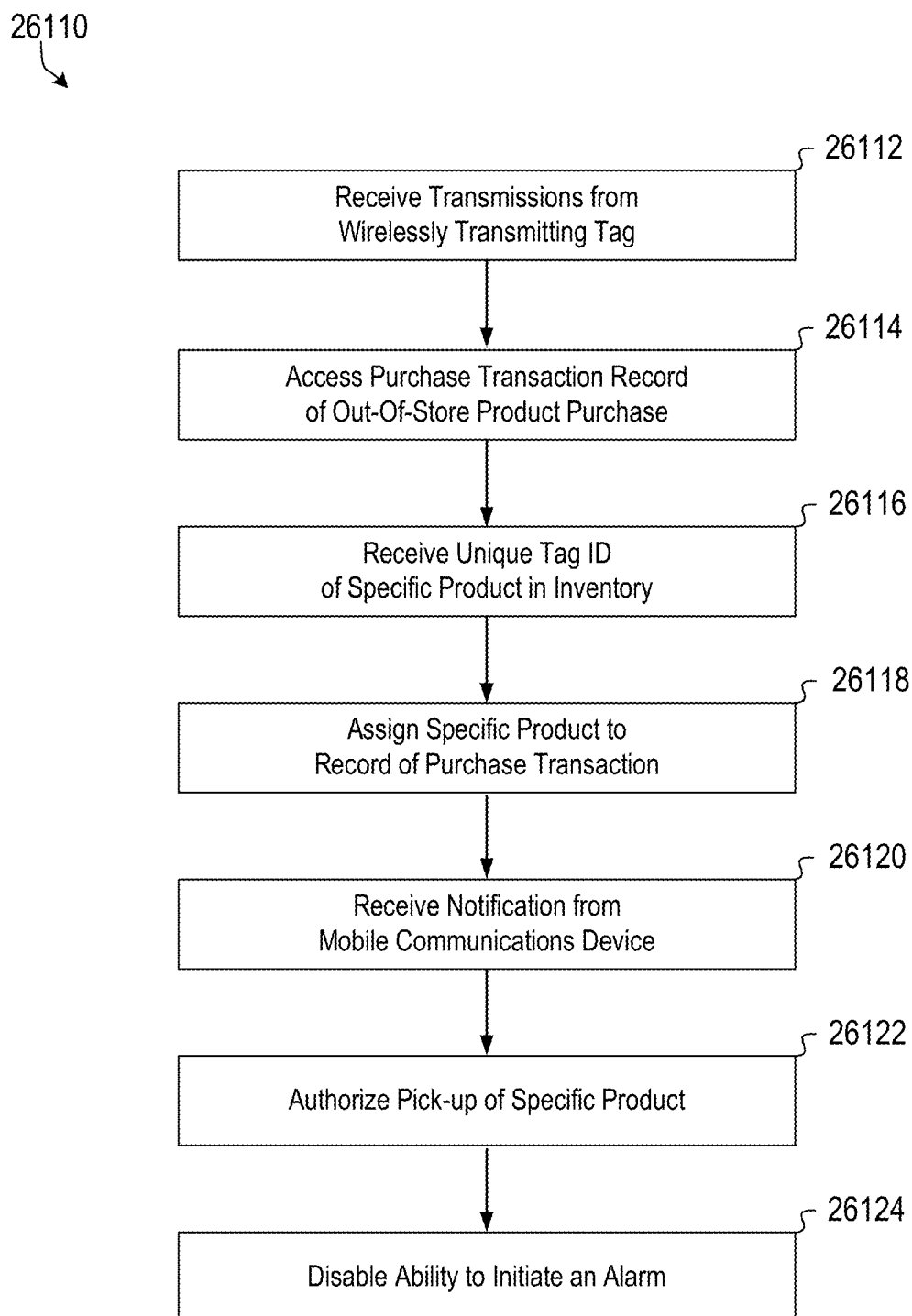
FIG. 26 is a flow chart illustrating an example of in-store pick-up of previously purchased products, consistent with some disclosed embodiments.

FIG. 26 is a flowchart illustrating an exemplary process 26110 for in-store pick-up of previously purchased products, consistent with disclosed embodiments. Process 26110 is provided by way of example, and a person of ordinary skill would appreciate various other processes for inventory control consistent with this disclosure. At step 26112, process 26110 may include receiving transmissions from at least one wirelessly transmitting tag. In some embodiments, the at least one wirelessly transmitting tag may be associated with a previously purchased product. At step 26114, process 26110 may include accessing a purchase transaction record of an out-of-store product purchase from an establishment. In some embodiments, the purchase transaction record may include an identification of at least one purchased product and purchaser-identifying information of a purchaser associated with the at least one purchased product. At step 26116, process 26110 may include receiving a unique tag ID of a specific wirelessly transmitting tag associated with at least one specific product in inventory which, in turn, may correspond to the at least one purchased product. At step 26118, process 26110 may include assigning the at least one specific product to a record associated with the purchase transaction. In some embodiments, a record associated with the purchase transaction may include data in the purchase transaction record pertaining to the out-of-store product purchase of the at least one purchased product. At step 26120, process 26110 may include receiving, from a mobile communications device associated with the purchaser, a notification that the at least one purchased product is being picked up at the establishment. At step 26122, process 26110 may include authorizing pick-up of the at least one specific product based on information received from the mobile communications device associated with the purchaser. In some embodiments, information received from the mobile communications device may include the notification that the purchased product is being picked up and/or other information received from the mobile communications device. At step 26124, process 26110 may include disabling an ability to initiate an alarm when a transmission is received from the specific tag in proximity to an electronic article surveillance (EAS) gate associated with the establishment.

Figure 27:
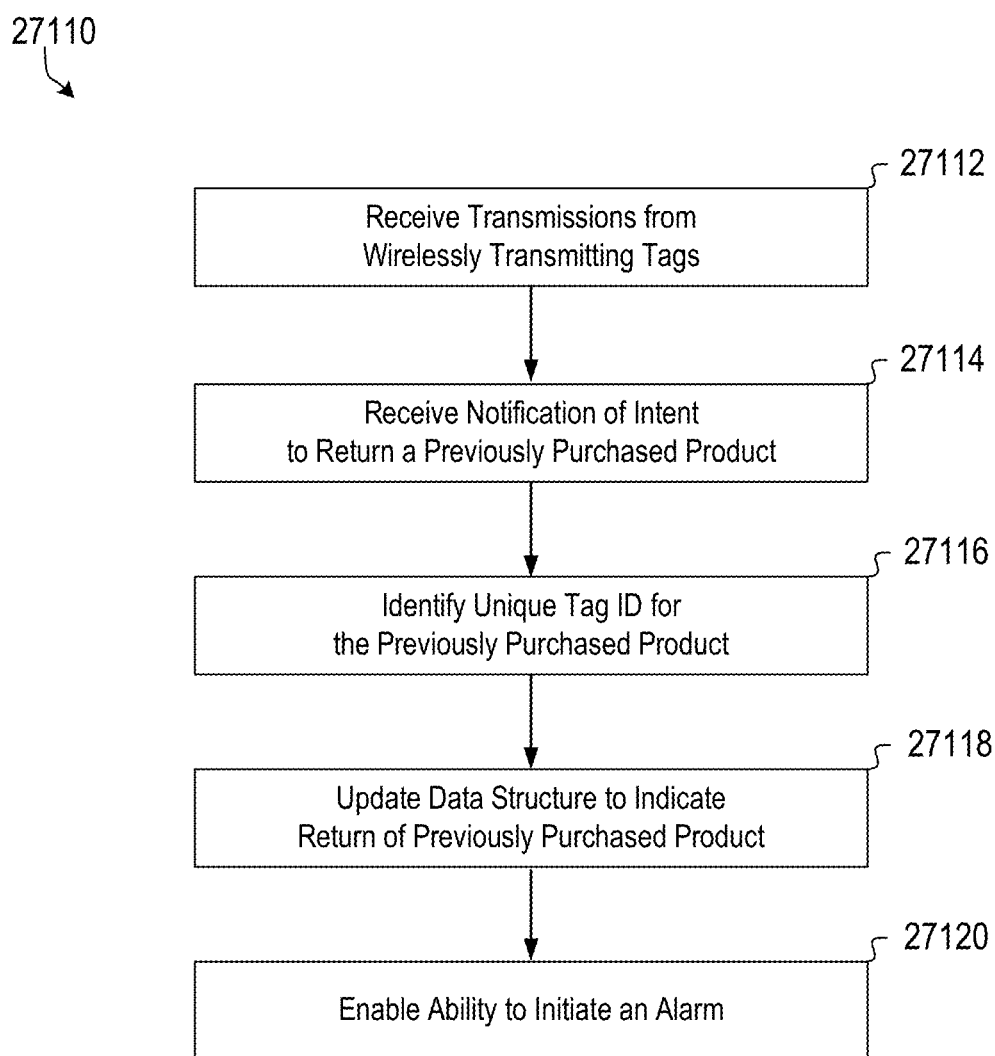
FIG. 27 is a flow chart illustrating an example of preventing theft of wirelessly tagged returned items, consistent with some disclosed embodiments.

FIG. 27 is a flowchart illustrating an exemplary process 27110 for preventing theft of wirelessly tagged returned items, consistent with disclosed embodiments. Process 27110 is provided by way of example, and a person of ordinary skill would appreciate various other processes for inventory control consistent with this disclosure. At step 27112, process 27110 may include receiving transmissions from wirelessly transmitting tags. In some embodiments, at least one of the wirelessly transmitting tags may be associated with a product that was previously purchased from an establishment. At step 27114, process 27110 may include receiving, from a mobile communications device, a notification of intent to return the previously purchased product to the establishment. In some embodiments, the mobile communications device may be associated with a previous purchaser of the previously purchased product. At step 27116, process 27110 may include identifying, in a data structure, a unique tag ID of a specific wirelessly transmitting tag associated with the previously purchased product. At step 27118, process 27110 may include updating the data structure to indicate that the previously purchased product was returned to the establishment. For example, the data structure may be updated based on receiving a notification that the previously purchased product was returned to the establishment. At step 27120, process 27110 may include enabling an ability to initiate an alarm when a transmission is received from the specific tag associated with the previously purchased product in proximity to an EAS gate in the establishment.

Figure 28:
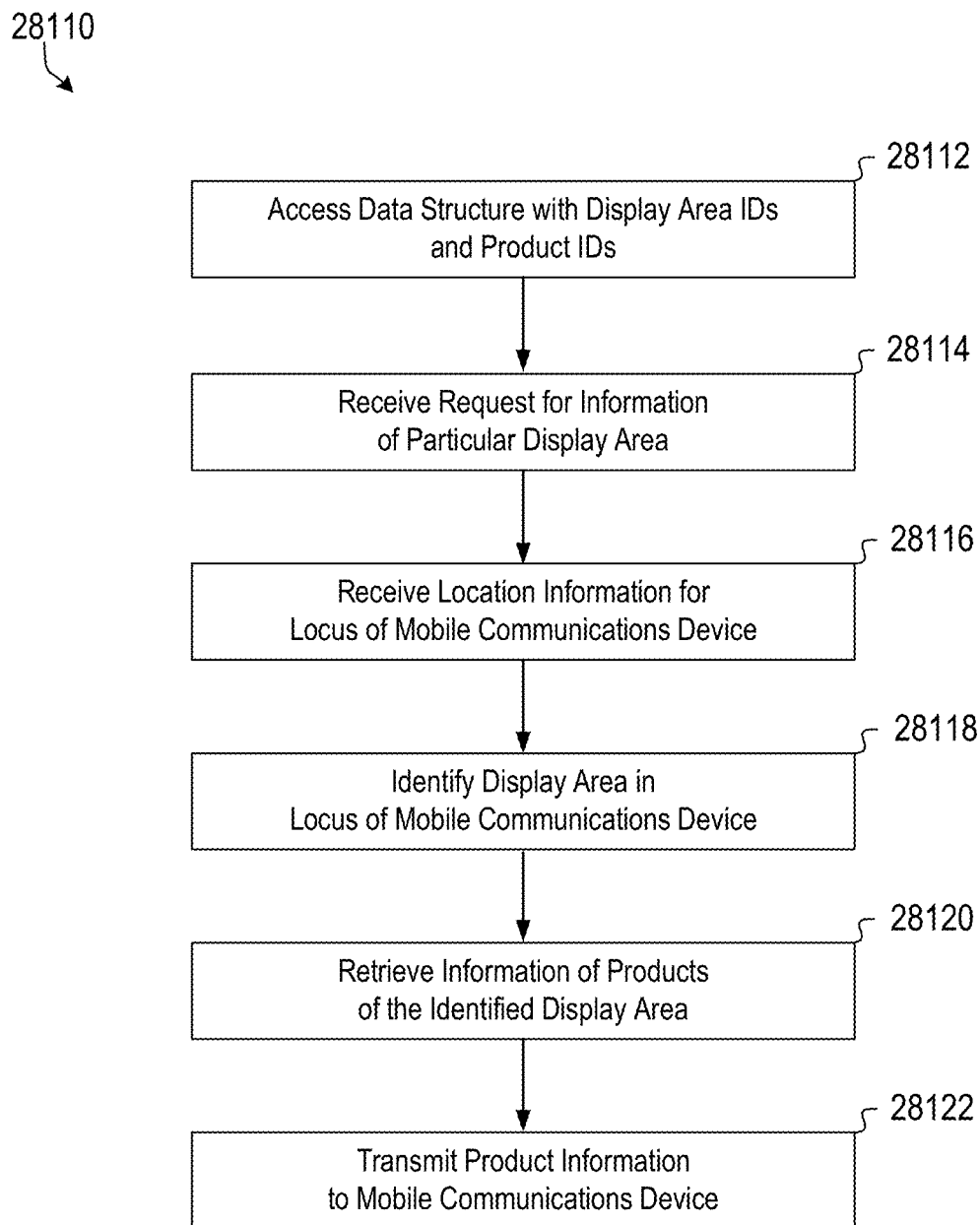
FIG. 28 is a flow chart illustrating an example of performing wireless transactions, consistent with some disclosed embodiments.

FIG. 28 is a flowchart illustrating an exemplary process 28110 for performing wireless transactions, consistent with disclosed embodiments. Process 28110 is provided by way of example, and a person of ordinary skill would appreciate various other processes for inventory control consistent with this disclosure. At step 28112, process 28110 may include accessing at least one data structure containing identities of a plurality of display areas (display area IDs) and identities of a plurality of products (product IDs) associated with the plurality of display areas. At step 28114, process 28110 may include receiving, from a mobile communications device, a request for information related to a particular display area. In some embodiments, the particular display area may be in a vicinity of the mobile communications device. At step 28116, process 28110 may include receiving location information associated with a locus of the mobile communications device. At step 28118, process 28110 may include performing a look-up in the at least one data structure to identify the particular display area in the locus of the mobile communications device. In some embodiments, the look-up may be performed in response to, or based on, the received location information. At step 28120, process 28110 may include retrieving, from the at least one data structure, product-related information of products associated with the particular display area. In some embodiments, retrieving the product-related information may be based on the identification of the particular display area. At step 28122, process 28110 may include transmitting the product-related information of the products associated with the particular display area to the mobile communications device.

Disclosed embodiments may include any one of the following bullet-pointed features alone or in combination with one or more other bullet-pointed features, whether implemented as a system and/or method, by at least one processor, and/or stored as executable instructions on non-transitory computer readable media.

- an electronic security system
- an establishment offering products
- products having associated wireless transmitting tags
- at least one electronic article surveillance (EAS) gate
- at least one receiver configured to receive transmissions from wireless transmitting tags
- at least one processor
- receiving, from a device operated by a prospective purchaser, a specific tag ID of a specific tag associated with a specific product for prospective purchase from an establishment
- accessing a data structure containing a plurality of tag IDs associated with a plurality of products in an establishment
- performing a lookup in a data structure of a specific tag ID, to thereby identify a specific product
- initiating an electronic purchase transaction to debit an account associated with a prospective purchaser for an electronic purchase of a specific product
- disabling an ability to initiate an alarm when at least one receiver receives a transmission from a specific tag in proximity to an EAS gate
- a personal mobile communications device of a prospective purchaser
- performing a lookup of a specific tag ID to determine that an associated specific product was already purchased
- updating a data structure to include an instruction not to initiate an alarm when at least one receiver receives a transmission from a specific tag in proximity to an EAS gate
- removing from a data structure an indication that a specific product is available for purchase
- an electronic credit card transaction
- receiving a specific tag ID from a device operated by a prospective purchaser following detection of the specific tag ID by the device
- receiving a specific tag ID from a device operated by a prospective purchaser via a local Wi-Fi connection in an establishment
- receiving a specific tag ID from a device operated by a prospective purchaser via a Wide Area Network (WAN) connection
- receiving a specific tag ID from a device operated by a prospective purchaser via a wired Local Area Network (LAN) connection
- each of a plurality of tag IDs in a data structure that is unique from every other tag ID in the data structure
- determining, based on transmissions received by at least one receiver, tag locations at a time of transmission
- determining tag proximity to an EAS gate
- a kiosk in an establishment
- processing data associated with a plurality of establishments
- accessing a plurality of data structures, each of the plurality of data structures being uniquely associated with one of a plurality of establishments
- a plurality of transmitters for wirelessly sending power to wireless transmitting tags
- at least one receiver configured to receive transmissions upon detection of an EAS gate by a specific tag
- inventory control operations
- receiving transmissions from a plurality of wireless transmitting tags
- inventory control operations for a plurality of products equipped with a plurality of wireless transmitting tags
- an establishment offering in-store pick-up of previously purchased products
- accessing a purchase transaction record of an out-of-store product purchase
- identification of at least one purchased product and purchaser-identifying information of a purchaser associated with the at least one purchased product
- receiving a unique tag ID of a specific tag associated with at least one specific product in inventory corresponding to at least one purchased product
- assigning at least one specific product to a record associated with a purchase transaction
- receiving, from a mobile communications device associated with a purchaser, a notification that at least one purchased product is being picked up at an establishment
- authorizing pick-up of at least one specific product based on information received from a mobile communications device associated with a purchaser
- following authorization of pick-up of at least one specific product, disabling an ability to initiate an alarm when at least one receiver receives a transmission from a specific tag in proximity to an EAS gate
- performing a lookup of a unique tag ID to determine that an associated at least one specific product is authorized for pick-up
- updating a data structure to include an instruction not to initiate an alarm when at least one receiver receives a transmission from a specific tag in proximity to an EAS gate
- removing a unique tag ID and a product ID of an associated at least one specific product from a data structure, such that the unique tag ID and the product ID are no longer counted as part of an establishment inventory available for sale
- identifying information of a package holding at least one specific product during a pick-up waiting time at an establishment
- information readable by a mobile communications device
- a notification from a mobile communications device that at least one purchased product is being picked up at an establishment including identifying information of a package holding at least one specific product a machine-readable printed code
a Near Field Communication tag ID
a package tag ID of a wirelessly transmitting package tag associated with a package, the package tag being unassociated with any products in an establishment
a purchase transaction record including information of a time period over which at least one specific product is authorized for pick-up
checking, upon receiving a notification that at least one purchased product is being picked up, whether the notification was received within a time period,
authorizing a pick-up if a notification was received within a time period
denying a pick-up if a notification was received outside of a time period
location-identifying information indicating that a mobile communications device associated with a purchaser is located within an establishment
sending a notification to a mobile communications device associated with a purchaser
a plurality of transmitters for wirelessly sending power to wirelessly transmitting tags
at least one receiver configured to receive transmissions upon detection of an EAS gate by a specific tag
wirelessly transmitting tags configured to transmit immediately upon sensing an EAS gate
wirelessly transmitting tags configured to transmit an ID transmission indicating proximity to an EAS gate upon sensing the EAS gate
determining, based on transmissions received by at least one receiver, tag locations at the time of transmission, thereby determining tag proximity to an EAS gate
operations for enabling in-store pick-up of products associated with wirelessly transmitting tags
receiving transmissions from at least one wirelessly transmitting tag
electronic security systems for preventing theft of returned goods
at least one electronic article surveillance (EAS) gate in an establishment
at least one receiver configured to receive transmissions from wirelessly transmitting tags
receiving, from a mobile communications device associated with a previous purchaser, a notification of intent to return a previously purchased product to an establishment
following receipt of a notification, identifying in a data structure, a unique tag ID of a specific wirelessly transmitting tag associated with a previously purchased product
updating a data structure to indicate that a previously purchased product was returned to an establishment
upon updating a data structure, enabling an ability to initiate an alarm when at least one receiver receives a transmission from a specific tag associated with a previously purchased product in proximity to a EAS gate
a data structure configured, prior to receipt of a notification, to maintain an indication to disable an ability to initiate an alarm when at least one receiver receives a transmission from a specific tag associated with a previously purchased product in proximity to an EAS gate
updating a data structure to permit initiation of an alarm when at least one receiver receives a transmission from a specific tag associated with a previously purchased product in proximity to an EAS gate
at least a second receiver in an establishment, the second receiver being configured to receive a wireless transmission from a mobile communications device associated with a previous purchaser
receiving a transmission over a cellular network from a mobile communications device associated with a previous purchaser
performing a lookup in a data structure containing purchase transaction records
verifying, upon receipt of a notification of intent to return a previously purchased product, that a specific product identified by a unique tag ID of a specific tag was purchased by a previous purchaser associated with a mobile communications device
updating a data structure when a previously purchased product is verified as having been purchased by a previous purchaser
averting updating a data structure if a previously purchased product is unverified as having been purchased by a previous purchaser
receiving a unique tag ID from a mobile communications device of a previous purchaser
receiving an indication that a returned previously purchased product was repurchased by another purchaser
upon receiving an indication, disabling an ability to initiate an alarm upon detection of a specific tag
initiating a refund transaction
delaying refunding a previous purchaser until staff at an establishment have examined a returned previously purchased product and deemed the previously purchased product eligible for return
at least one receiver configured to receive tag signals reflecting sensing of an EAS gate
a specific tag configured to transmit immediately upon sensing an EAS gate
a specific tag configured to transmit, upon sensing an EAS gate, an ID transmission indicating the specific tag is in proximity to the EAS gate
determining, based on transmissions received by at least one receiver, tag locations at a time of transmission, to thereby determine tag proximity to an EAS gate
sending a notification to a mobile communications device indicating that a return process of a previously purchased product is complete
a data structure including information of a time period over which a previously purchased product is authorized for return
checking, upon receiving a notification of intent to return a previously purchased product to an establishment, whether the notification was received within a time period over which the previously purchased product is authorized for return
authorizing a return of a previously purchased product to an establishment if a notification was received within a time period
denying a return of a previously purchased product to an establishment if a notification was received outside of a time period
receiving location-identifying information
determining, based on location-identifying information, that a mobile communications device associated with a previous purchaser is located within an establishment
preventing theft of wirelessly tagged returned items
receiving transmissions from wirelessly transmitting tags receiving, from a mobile communications device associated with a previous purchaser, a notification of intent to return a previously purchased product to an establishment
system for conducting wireless transaction communications
identities of a plurality of display areas
identities of a plurality of products associated with the plurality of display areas
receive, from a mobile communications device
a request for information related to a particular display area in a vicinity of the mobile communications device
receive location information associated with a locus of the mobile communications device
in response to the location information, perform a look-up in the at least one data structure
identify the particular display area in the vicinity of the mobile communications device
based on the identification of the particular display area, retrieve from the at least one data structure
product-related information of products associated with the particular display are
transmit the product-related information to the mobile communications device
a selection of at least one specific product associated with the particular display area
initiate an activity associated with the selection
in connection with the purchase transaction, transmit options for product delivery
picking up the at least one specific product at a location in a vicinity of the particular display area,
picking up the at least one specific product at a location other than the location in the vicinity of the particular display area
delivering the at least one specific product to a specified address
selection includes a request for additional information
activity includes transmitting the additional information to the mobile communications device
location information associated with the locus of the mobile communications device includes at least one of a GPS location, a GLONASS location, a Galileo location, or other Global Navigation and Positioning System location information associated with the mobile communications device
request for information related to the particular display area includes a location ID input into the mobile communications device
the location ID is derived from a scan of a graphical code or a Near Field Communication (NFC) tag associated with the particular display area
particular display area includes a window display
product-related information of products associated with the particular display area includes identities of at least some of the products associated with the particular display area
purchase request includes a request that the at least one specific product associated with the particular display area be shipped to a location specified via the mobile communications device
transmitting the product-related information includes transmitting a signal to cause the mobile communications device to display the product-related information on a graphical user interface,
graphical user interface is configured to display the product-related information in at least one of a textual format or a graphical format
transmit a signal to cause the mobile communications device to output the product-related information as audible information for presentation via the mobile communications device
at least one receiver associated with the particular display area
receiver being configured to receive wireless signals from the mobile communications device
a system for reading wireless transmitting tags in an establishment
plurality of wirelessly tagged products
automatically generating a product distribution planogram
receive from a plurality of receivers in the establishment, wireless signals
wireless signals from the plurality the plurality of wirelessly tagged products
wireless signals include an ID associated with each of the plurality of wirelessly tagged products
data structure associating each ID of each wirelessly tagged product with classification information
access a data structure
determine from the wireless signals, locations in the establishment
perform a lookup in the data structure of each ID of each wirelessly tagged products
determine the product classification information associated with each of the wirelessly tagged products
generate a planogram for the establishment using determined locations of each wirelessly tagged product and the determined product classification information
classification information includes a product model code
planogram indicates on the map a location of at least one of group products sharing the product model code
planogram indicates locations of a plurality of groups of wirelessly tagged products
classification information includes for each wirelessly tagged product, an associated product family indicator
planogram divides a map of the establishment by product family
data structure contains information associating each product model code with a product family
ascertain from each determined model code associated with each wireless tag, an associated product family
indicate, for at least one group of products sharing product classification information
at least two locations where products in the latest one group are clustered
identify the at least two locations on the planogram
Track the planogram over time
tracking the planogram includes comparing common locations of at least one group of products to a history of common locations
determining whether the current common location diverge from the history of common locations
updating the planogram to indicate the new common location if the divergence is greater than a predefined threshold
updating planogram further includes sending an alert that planogram was updated
adapt the predefined threshold
predefined threshold based on at least one of a type of the establishment, an owner of the establishment, a history of planogram updates in the establishment, the classification information of the products in the establishment, or a user input determine locations based on at least one of an amplitude, a phase, an angle of arrival, or a time of arrival of the received wireless signals map of the establishment includes areas designated for storage and areas designated for display include in the planogram for each group of products sharing classification information, at least one common location in a storage area and at least one common location in a display area receive, over a communications interface, a request to identify a location of a specific product in the establishment request to identify the location of a specific product includes identification information of the requester, indicating whether the requester is an authorized establishment staff member when the request originates from an entity which is not an authorized establishment staff member exclude from a corresponding response, products located in storage areas non-transitory computer readable medium containing instructions perform operations for generating a planogram based on information collected from wireless tags method for generating a planogram based on information collected from wireless tags establishment wireless merchandise tags in an establishment plurality of wirelessly tagged products replenishment alerts receiving from a plurality of receivers in the establishment wireless signals from the plurality of wirelessly tagged products wireless signals reflect and ID ID associated with each of the plurality of wirelessly tagged products data structure associated with each id if each wirelessly tagged product with one of a plurality of product models access at least one data structure associated with each ID of each wirelessly tagged product perform a look-up in the data structure of a product model product models detected in the establishment determine, based on the look-up, a total number of units of each product model target threshold of units associated with each product model access in the at least one data structure a target threshold of units compare the determined total number of units of each product with the target threshold product model falls below an associated threshold output a replenishment notification plurality of product models are associated with an SKU determined total number of units of each product model in the establishment is an estimation threshold is at least one of a number or a number range at least one data structure stores a plurality of replenishment rules in response to the replenishment notification the at least one processor is configured to access an associated replenishment rule from the plurality of replenishment rules submit an order for restocking the particular product the at least one processor is configured to access replenishment rules for preventing restocking order submissions for particular products at least one processor is configured to access replenishment rules for delaying submission of orders for restocking a particular product delaying submission of orders for restocking a particular product based on at least one of the particular product in the restocking order number of other restocking orders submitted over a recent time period particular products for which other restocking orders were submitted over a recent time period sale history of the particular product in the restocking order sales history of the particular products for which other restocking orders were submitted over a recent time period time at which the restocking order is submitted tags of the wirelessly tagged products lack batteries tags of the wirelessly tagged products are powered by capacitors comprising at least one transmitter for wirelessly powering tags of the wirelessly tagged products a non-transitory computer readable medium containing instructions perform operations for automatically generating replenishment alerts a method for automatically generating replenishment alerts based on signals from a plurality of wirelessly tagged products Systems and methods disclosed herein involve unconventional improvements over conventional approaches. Descriptions of the disclosed embodiments are not exhaustive and are not limited to the precise forms or embodiments disclosed. Modifications and adaptations of the embodiments will be apparent from consideration of the specification and practice of the disclosed embodiments. Additionally, the disclosed embodiments are not limited to the examples discussed herein.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure may be implemented as hardware alone.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and, accordingly, all suitable modifications and equivalents may be resorted to, falling within the scope of the disclosure.

Computer programs based on the written description and methods of this specification are within the skill of a software developer. The various functions, scripts, programs, or modules may be created using a variety of programming techniques. For example, programs, scripts, functions, program sections or program modules may be designed in or by means of languages, including JAVASCRIPT, C, C++, JAVA, PHP, PYTHON, RUBY, PERL, BASH, or other programming or scripting languages. One or more of such software sections or modules may be integrated into a computer system, non-transitory computer readable media, or existing communications software. The programs, modules, or code may also be implemented or replicated as firmware or circuit logic.

Moreover, while illustrative embodiments have been described herein, the scope may include any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods may be modified in any manner, including by reordering steps or inserting or deleting steps. It is intended, therefore, that the specification and examples be considered as exemplary only, with a true scope and spirit being indicated by the following claims and their full scope of equivalents.

What is claimed is:

1. An electronic security system for preventing theft of returned goods, the electronic security system comprising:
   at least one electronic article surveillance (EAS) gate in an establishment;
   at least one receiver configured to receive transmissions from wirelessly transmitting tags; and
   at least one processor configured to:
      receive, from a mobile communications device associated with a previous purchaser, a notification of intent to return a previously purchased product to the establishment,
      following receipt of the notification, identify in a data structure, a unique tag ID of a specific wirelessly transmitting tag associated with the previously purchased product,
      update the data structure to indicate that the previously purchased product was returned to the establishment, and
      upon updating the data structure, enable an ability to initiate an alarm when the at least one receiver receives a transmission from the specific tag associated with the previously purchased product in proximity to the EAS gate.

2. The electronic security system of claim 1, wherein the data structure is configured, prior to receipt of the notification, to maintain an indication to disable the ability to initiate an alarm when the at least one receiver receives a transmission from the specific tag associated with the previously purchased product in proximity to the EAS gate.

3. The electronic security system of claim 1, wherein enabling the ability to initiate an alarm includes updating the data structure to permit initiation of the alarm when the at least one receiver receives a transmission from the specific tag associated with the previously purchased product in proximity to the EAS gate.

4. The electronic security system of claim 1, further comprising at least a second receiver in the establishment, the second receiver being configured to receive a wireless transmission from the mobile communications device associated with the previous purchaser.

5. The electronic security system of claim 1, wherein the at least one processor is configured to receive a transmission over a cellular network from the mobile communications device associated with the previous purchaser.

6. The electronic security system of claim 1, wherein identifying a unique tag ID of the specific tag associated with the previously purchased product includes performing a lookup in a data structure containing purchase transaction records.

7. The electronic security system of claim 1, wherein the at least one processor is configured to verify, upon receipt of the notification of intent to return the previously purchased product, that a specific product identified by the unique tag ID of the specific tag was purchased by the previous purchaser associated with the mobile communications device.

8. The electronic security system of claim 7, wherein the at least one processor is configured to:
   update the data structure when the previously purchased product is verified as having been purchased by the previous purchaser; and
   avert updating the data structure if the previously purchased product is unverified as having been purchased by the previous purchaser.

9. The electronic security system of claim 1, wherein identifying the unique tag ID of the specific tag associated with the previously purchased product includes receiving the unique tag ID from the mobile communications device of the previous purchaser.

10. The electronic security system of claim 1, wherein the at least one processor is configured to:
    receive an indication that the returned previously purchased product was repurchased by another purchaser; and
    upon receiving the indication, disable the ability to initiate an alarm upon detection of the specific tag.

11. The electronic security system of claim 1, wherein the at least one processor is configured to initiate a refund transaction.

12. The electronic security system of claim 1, wherein the at least one processor is configured to delay refunding the previous purchaser until staff at the establishment have examined the returned previously purchased product and deemed the previously purchased product eligible for return.

13. The electronic security system of claim 1, wherein the at least one receiver is configured to receive tag signals reflecting sensing of the EAS gate.

14. The electronic security system of claim 1, wherein the specific tag is configured to transmit immediately upon sensing the EAS gate.

15. The electronic security system of claim 1, wherein the specific tag is configured to transmit, upon sensing the EAS gate, an ID transmission indicating the specific tag is in proximity to the EAS gate.

16. The electronic security system of claim 1, wherein the at least one processor is configured to determine, based on transmissions received by the at least one receiver, tag locations at a time of transmission, to thereby determine tag proximity to the EAS gate.

17. The electronic security system of claim 1, wherein the at least one processor is configured to send a notification to the mobile communications device indicating that a return process of the previously purchased product is complete.

18. The electronic security system of claim 1, wherein the data structure includes information of a time period over which the previously purchased product is authorized for return.

19. The electronic security system of claim 18, wherein the at least one processor is configured to:
- check, upon receiving the notification of intent to return the previously purchased product to the establishment, whether the notification was received within the time period over which the previously purchased product is authorized for return;
- authorize the return of the previously purchased product to the establishment if the notification was received within the time period; and
- deny the return of the previously purchased product to the establishment if the notification was received outside of the time period.

20. The electronic security system of claim 1, wherein the at least one processor is configured to receive location-identifying information and to determine, based on the location-identifying information, that the mobile communications device associated with the previous purchaser is located within the establishment.

21. A non-transitory computer readable medium containing instructions that when executed by at least one processor, cause the at least one processor to perform operations for preventing theft of wirelessly tagged returned items, the operations comprising:
- receiving transmissions from wirelessly transmitting tags;
- receiving, from a mobile communications device associated with a previous purchaser, a notification of intent to return a previously purchased product to an establishment;
- following receipt of the notification, identifying in a data structure, a unique tag ID of a specific wirelessly transmitting tag associated with the previously purchased product;
- updating the data structure to indicate that the previously purchased product was returned to the establishment; and
- upon updating the data structure, enabling an ability to initiate an alarm when at least one receiver associated with the establishment receives a transmission from the specific tag associated with the previously purchased product in proximity to at least one electronic article surveillance (EAS) gate in the establishment.

22. A method for preventing theft of wirelessly tagged returned items, the method comprising:
- receiving transmissions from wirelessly transmitting tags;
- receiving, from a mobile communications device associated with a previous purchaser, a notification of intent to return a previously purchased product to an establishment;
- following receipt of the notification, identifying in a data structure, a unique tag ID of a specific wirelessly transmitting tag associated with the previously purchased product;
- updating the data structure to indicate that the previously purchased product was returned to the establishment; and
- upon updating the data structure, enabling an ability to initiate an alarm when at least one receiver associated with the establishment receives a transmission from the specific tag associated with the previously purchased product in proximity to at least one electronic article surveillance (EAS) gate in the establishment.

* * * * *